United States Patent [19]

Davis, Jr. et al.

[11] Patent Number: 4,628,353

[45] Date of Patent: Dec. 9, 1986

[54] VIDEO MEASURING SYSTEM

[75] Inventors: Ray E. Davis, Jr., Old Lyme; Robert G. Foster, Clinton; Michael J. Westkamper, Oakdale; Dana L. Duncan, Old Lyme; James R. Hall, Clinton, all of Conn.

[73] Assignee: Chesebrough-Pond's Inc., Greenwich, Conn.

[21] Appl. No.: 596,842

[22] Filed: Apr. 4, 1984

[51] Int. Cl.[4] .......... H04N 7/18

[52] U.S. Cl. .......... 358/107; 356/387; 358/183; 358/903; 364/560

[58] Field of Search .......... 358/107, 106, 101, 93, 358/903, 183; 364/555, 560, 561, 562, 563; 356/386, 387

[56] References Cited

U.S. PATENT DOCUMENTS

| | | | |
|---|---|---|---|
| 3,868,508 | 2/1975 | Lloyd | 250/330 |
| 4,041,286 | 8/1977 | Sanford | 235/151.3 |
| 4,064,534 | 12/1977 | Chen | 358/107 |
| 4,135,204 | 1/1979 | Davis, Jr. et al. | 358/101 |
| 4,166,541 | 9/1979 | Smith, Jr. | 209/587 |
| 4,173,788 | 11/1979 | Laliotis | 364/560 |
| 4,186,378 | 1/1980 | Moulton | 382/2 |
| 4,212,031 | 7/1980 | Schmitt et al. | 358/101 |
| 4,232,336 | 11/1980 | Henry | 358/106 |
| 4,245,243 | 1/1981 | Gutjahr et al. | 358/106 |
| 4,344,146 | 8/1982 | Davis, Jr. et al. | 364/522 |
| 4,400,728 | 8/1983 | Long | 358/107 |
| 4,445,185 | 4/1984 | Davis, Jr. | 358/107 |
| 4,477,830 | 10/1984 | Lindman | 358/183 |
| 4,493,105 | 1/1985 | Beall | 358/107 |
| 4,554,580 | 11/1985 | Hayashi | 358/107 |

FOREIGN PATENT DOCUMENTS

| | | |
|---|---|---|
| 1127361 | 9/1968 | United Kingdom . |
| 1483963 | 8/1977 | United Kingdom . |
| 2031207 | 4/1980 | United Kingdom . |

*Primary Examiner*—Howard W. Britton

[57] ABSTRACT

A user-friendly video measuring system employing a TV camera having a two-axis array of photosensors, a memory, a monitor, a keyboard and a joystick. The camera takes a first picture, which is stored in memory and displayed on the monitor. In response to a series of menus, an operator uses the joystick to manipulate a cursor on the monitor to locate a series of start search points for the first picture, and to select gradient threshold for one or more features. Both the start search points and gradient thresholds are stored. The operator also selects and stores tolerances for the measurements. A second picture is taken and examined, commencing with the stored start search points, to determine whether the gradients exceed the stored threshold.

42 Claims, 8 Drawing Figures

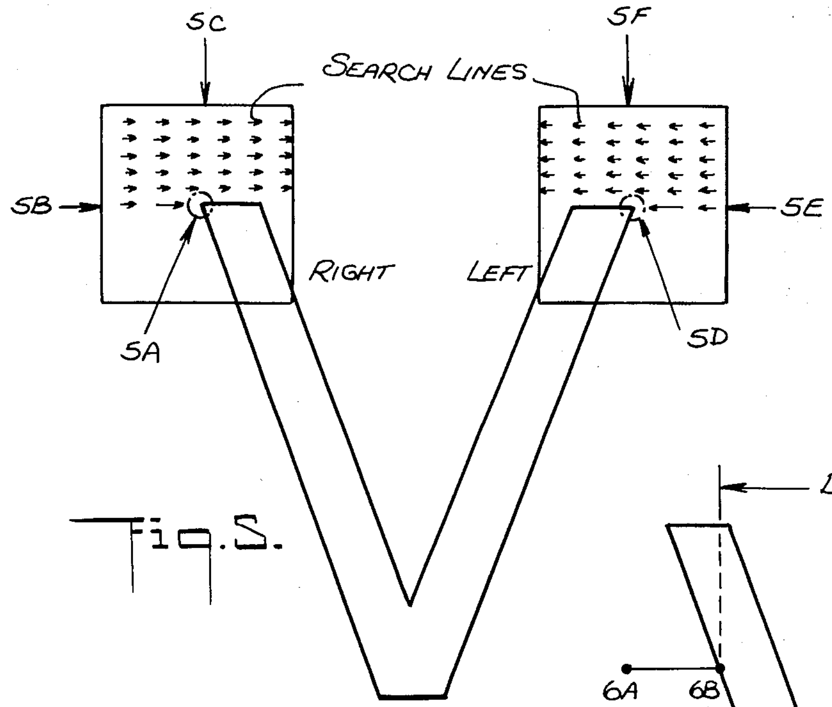
Fig. 5.
Fig. 6.
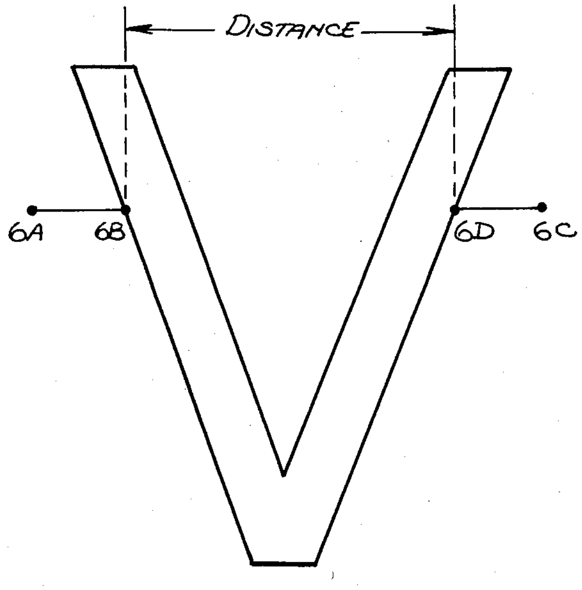
Fig. 8.
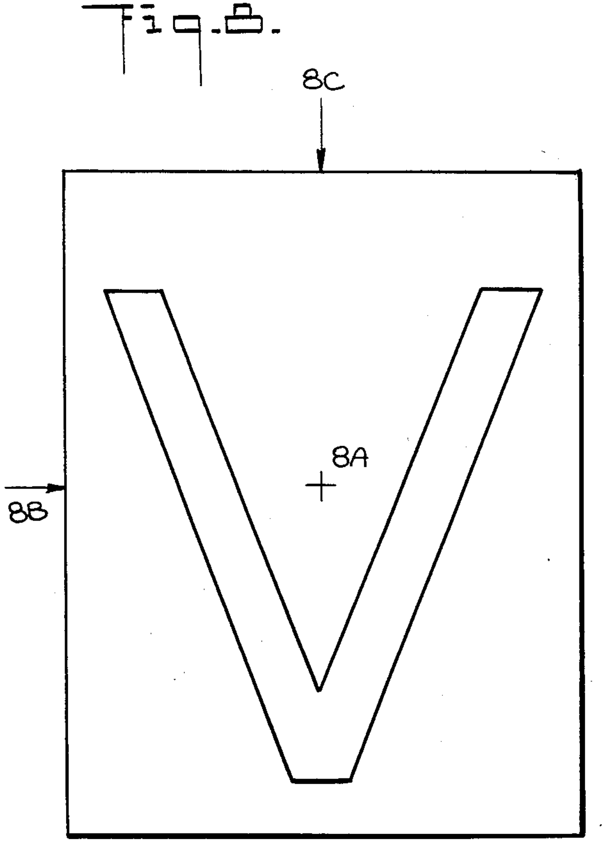
Fig. 7.
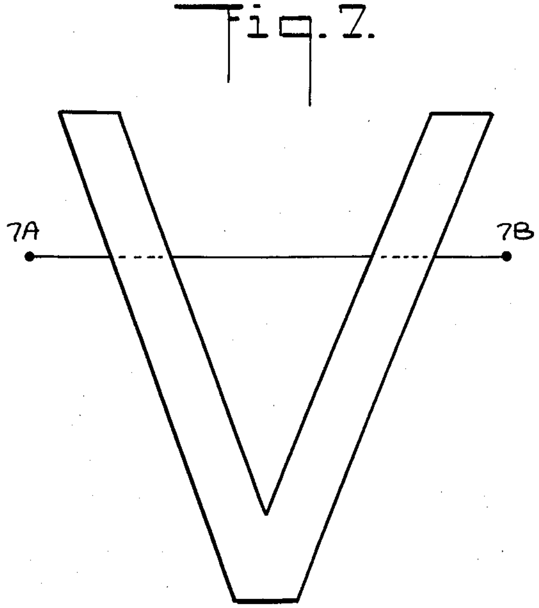

VIDEO MEASURING SYSTEM

BACKGROUND AND BRIEF DESCRIPTION OF THE INVENTION

The present invention relates to a video measuring system and, more particularly, to a fast, efficient, user-friendly video measuring system.

It is known to employ a solid state TV camera for industrial process control. For example, U.S. Pat. No. 4,135,204 to Ray E. Davis, Jr. et al, which is entitled "Automatic Glass Blowing Apparatus And Method" and is assigned to the assignee of the present application, discloses the use of an analog video signal to control the growth of a thermometer end opening blister in a heated hollow glass rod by monitoring and iteratively controlling the growth of the edges of the blister using analog edge detection techniques. It is also known to employ a solid state TV camera in a video inspection system. For example, U.S. Pat. No. 4,344,146 to Ray E. Davis, Jr. et al, which is entitled "Video Inspection System" and is assigned to the assignee of the present application, discloses the use of such a TV camera in a high speed, real time video inspection system wherein the TV camera has at least sixteen levels of grey scale resolution.

The present invention represents an improvement over both of these prior art systems and complements the video inspection system of U.S. Pat. No. 4,344,146. In addition to being user-friendly, the present invention is highly efficient because it can effectively perform measurements using only a small part of the information obtained by the system. It is extremely fast while, at the same time, being relatively inexpensive and very reliable.

In a preferred embodiment, the present invention employs a pair of solid state TV cameras, a pair of interface/memory circuits (also known as "frame grabbers"), a pair of TV monitors, a computer, a keyboard, a joystick and strobe lights. In the system are stored a series of "menus" which guide the operator in defining those features of the object which are to be measured. These menus and the manner in which they are presented render the system very user-friendly.

Initially, the operator takes a picture of an object such as a package using the TV camera. The picture is stored in memory and displayed on the monitor. The operator then uses the joystick to manipulate a cursor on the monitor and specifies those features of the object to be measured. The operator designates points where the system is to start searching for the features and also specifies intensity gradient threshholds for the features. The intensity gradient is the rate of change of light intensity at a particular point on the monitor and has both a magnitude and a direction. It may be defined as the difference in intensity between neighboring picture elements.

If the object is a package having a closure and a label, the operator defines the package, defines the closure and defines the label. In addition, the operator specifies tolerances for these measurements. All of this is done with the assistance of various menus which are presented to the operator and provide step-by-step guidance for the operation of the system.

After this information has been entered and stored, the system is ready to operate. A picture is now taken of each package as it moves past the TV camera, for example along a high speed fill line. The picture is stored and the system measures the package, the closure and the label for each package. The system will indicate when these features are out of tolerance or missing altogether so that corrective action can be taken.

An important advantage of the present invention is that it permits accurate measurements but does not require large amounts of data to effect the measurements. Thus, to measure an object the system starts at specific points and searches along lines of picture elements or "pixels," looking for gradients which exceed the selected threshholds. It is not necessary for the system to examine more than a small percentage of the pixels in order to measure an object or a particular feature of the object. For example, if the TV camera comprises a two dimensional array containing over 50,000 photodetectors, it is possible to measure an object by examining fewer than 400 pixels, or less than one percent of the information captured and presented on the TV monitor. Similarly, it is possible to measure a series of features using less than five percent of the pixels.

Because the video measuring system is user-friendly, and because it is highly efficient in its use of information, it is an extremely valuable industrial tool. Thus, it can be used for process control in manufacturing operations, for the quality control of both raw materials and finished goods, and to provide sensory signals for robotics.

BRIEF DESCRIPTION OF THE DRAWINGS

The present invention is described with reference to the following drawings which form a part of the specification and wherein:

FIGS. 5, 6, 7 and 8 are line drawings illustrating ways in which the system of FIG. 1 can be used to measure and analyze various features of the package shown in FIG. 1.

DETAILED DESCRIPTION OF A PREFERRED EMBODIMENT

Figure 1:
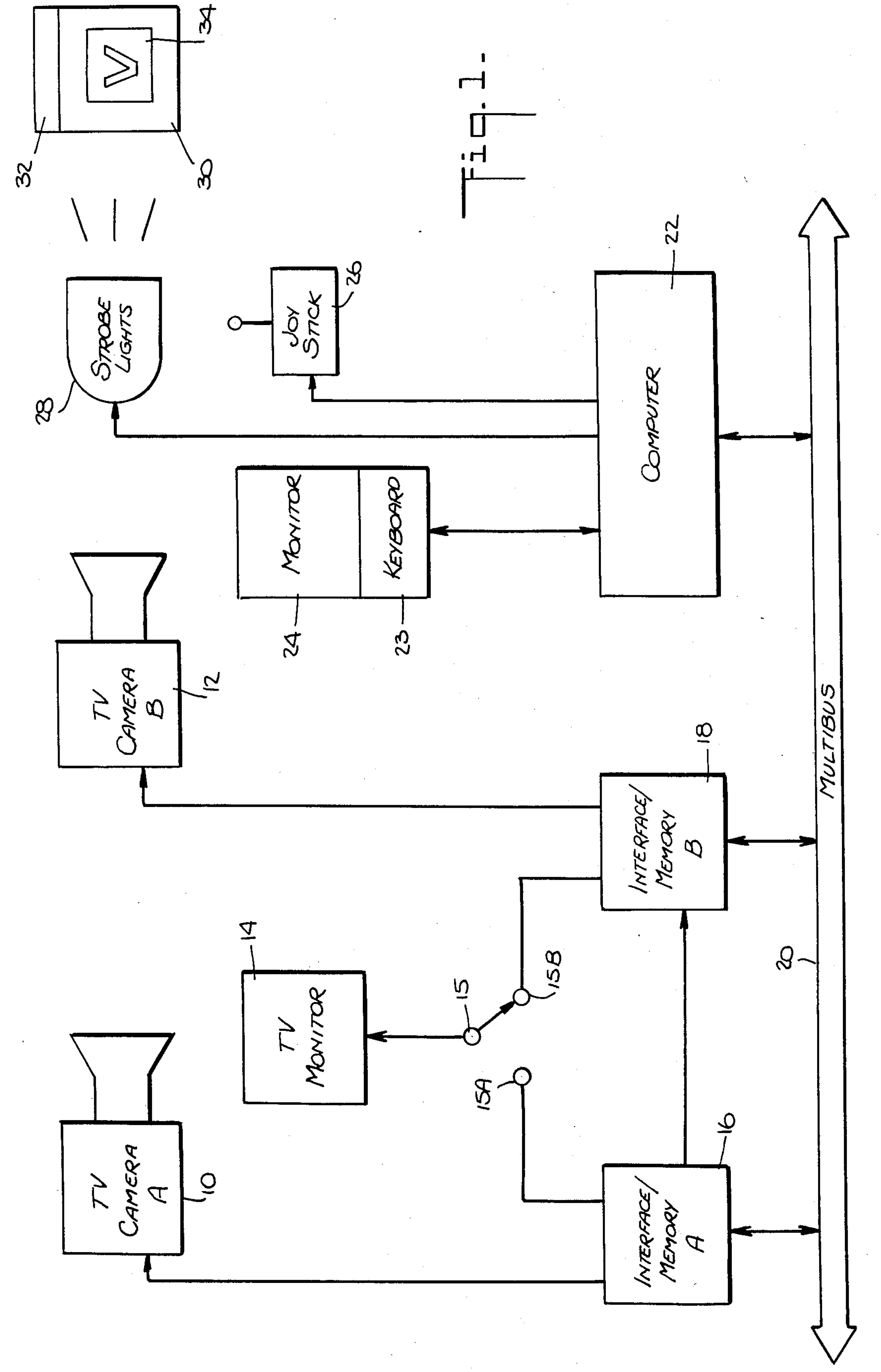
FIG. 1 is a functional block diagram of a preferred embodiment of the video measuring system of the present invention.

The basic system architecture of a preferred embodiment is shown in FIG. 1. The system employs two TV cameras 10 and 12, designated "A" and "B." Connected to TV cameras 10 and 12 are two interface/memory units 16 and 18, also designated "A" and "B." Associated with TV cameras 10 and 12 is a TV monitor 14 which is connected to either interface/memory 16 or interface/memory 18, depending on the position of switch 15. TV camera 10 and interface/memory 16 form channel "A," while TV camera 12 and interface/memory 18 form channel "B." Two channels are employed because when the system is used, for example, to inspect packages on a high speed fill line, these packages frequently have both front and rear labels and it is desirable to inspect both labels.

Interface/memory units 16 and 18 are connected to computer 22 via a conventional multibus arrangement. Also connected to computer 22 are joystick 26, strobe lights 28, keyboard 23 and monitor 24. The operator uses keyboard 23 to communicate with computer 22 and uses joystick 26 to manipulate the cursor on monitor 24.

Strobe lights 28 illuminate package 30, which comprises a top closure 32 and a label 34 containing the letter "V." The strobe lights are synchronized with the TV camera and the movement of package 30.

Monitor 14 and monitor 24 may, for example, be a Panasonic TR-932 dual monitor made by Matsushita Electric, Osaka, Japan. Joystick 26 may be a 91 MOB-6 joystick made by Machine Components Corp., 70 New Tower Road, Plainview, NY 11803. Strobe lights 28 may be a Model 834 dual stroboscope control unit made by Power Instruments, Inc., 7352 North Lawndale, Skokie, IL 60076. Keyboard 23 may be a VP-3301 keyboard data terminal made by RCA Microcomputer Marketing, New Holland Avenue, Lancaster, PA 17604. Computer 22 may be an Am 97/8605-1 8086 16 bit MonoBoard Computer made by Advanced Micro Devices, 901 Thompson Place, P.O. Box 453, Sunnyvale, CA 94086. This computer is software transparent to code written for the SBC-86/05 and SBC-86/12A computers. A suitable program is included at the end of the specification. Inferface/memory units 16 and 18 may be "frame grabber" boards Model VG-120B made by Datacube, Inc., 4 Dearborn Road, Peabody, MA 01960. These units acquire a full screen of video information from any EIA-standard video source. The information is stored in an on-board memory for access by any MULTIBUS-based computer. The Model VG-120B frame grabber also generates EIA-standard video from the on-board memory for a TV monitor. Finally, TV cameras 10 and 12 may be Model KP-120 solid state TV cameras made by Hitachi Denshi America, Ltd., 175 Crossways Park West, Woodbury, NY 11797. This is a solid state black and white TV camera employing solid state imaging. It has a two-dimensional photosensor array with 320 horizontal and 244 vertical picture elements or 78,080 pixels. The frame grabbers capture information from an array of 320 by 240 photosensors or 76,800 pixels.

The system operation will now be explained with reference to a preferred embodiment of the invention using an illustrative object, in this case package 30 shown in FIG. 1. In the preferred embodiment, the invention employs a "Master Menu" from which the operator makes selections. The Master Menu includes the following operating routines.

1. Select Product
2. Teach Product
3. Measure
4. Run
5. Stop Run
6. Tally

Assuming the operator wishes to select a product and then teach that product to the system, the operator turns the power on, initiates the "Select Product" routine and enters the product number. Next the operator initiates the "Teach Product" routine, which has its own menu, and includes the following sub-routines.

1. Get Image
2. Teach Product Name
3. Define Package
4. Define Closure
5. Define Label
6. Define Feature 1
7. Define Feature 2
8. Teach Tolerances The operator initiates the "Get Image" routine and then decides whether a continuous image or a single image is desired. A continuous image is used, for example, when the system is being set up, to adjust lighting levels. A single image is employed, for example, to capture the image of the package as it moves along a high speed fill line. Taking the image is synchronized with the physical location of the package on the fill line and the TV camera and involves the use of strobe lights 28 shown in FIG. 1. Once a satisfactory image is obtained, the operator so indicates and the image is stored in memory. The system then returns to the Teach Menu.

The operator now initiates the "Teach Product Name" routine and teaches the product name, either by selecting an existing name or by entering a new name. In the preferred embodiment up to ten product names may be stored in memory. The operator now decides whether to enable label A and/or label B. Label A may be the front label while label B may be the rear label. Enabling label A involves enabling TV camera A, interface/memory A and the associated strobe light and tells the system that label A should be taught. Enabling label B involves enabling TV camera B, interface/memory B and the associated strobe light and tells the system that label B should be taught. Once images of one or both labels are taken and stored, the system returns to the Teach Menu.

Figure 2:
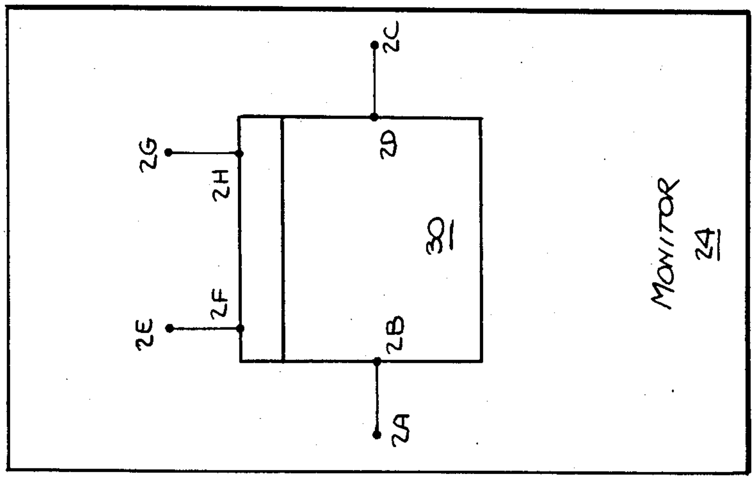

The operator now initiates the "Define Package" routine. This can more easily be understood by referring to FIG. 2, which shows package 30 drawn in outline on TV monitor 24. The first step is to designate the starting point 2A for locating the left edge of package 30. This is accomplished by using joystick 26 to move a cursor until the cursor has reached point 2A, which is then stored. It is necessary to designate a starting point to the left of the actual left package edge because, when the image of the package is obtained as the package is moving, the image will not always appear in the center of TV monitor 24. The cursor is now moved to point 2B, which is the left edge of package 30, which is temporarily held. Next the cursor is moved to point 2C, which is the starting point for locating the right edge of package 30, which is also stored. Thereafter, the cursor is moved to point 2D, which is the right edge of package 30, which is also temporarily held. The system then stores the difference between points 2B and 2D, which is the measure of the package width. Points 2B and 2D need not be stored. In a similar manner, joystick 26 is used to locate starting points 2E and 2G for determining the left and right top package edge points 2F and 2H. Note that points 2E and 2F are spaced to the right of the left package edge, while points 2G and 2H are spaced to the left of the right package edge. This ensures that the top edge of the package can be detected even if the image of package 30 is not centered on TV monitor 24 because of less than perfect synchronization. Only points 2E and 2G need be stored.

At points 2B, 2D, 2F and 2H there exist gradients in light intensity corresponding to the transitions at the edges of the package. In addition to locating the points 2B, 2D, 2F and 2H, the operator also selects gradient threshholds for those points, e.g., by selecting a value between minus 63 and plus 63 for each point. To assist the operator in choosing an appropriate gradient threshhold, the system will, on request, visually display the gradient which exists at any given point on the TV monitor. By selecting appropriate gradient threshholds for points 2B, 2D, 2F and 2H and storing them in memory, the operator ensures that the edges of the package can be accurately located.

Points 2A, 2C, 2E and 2G, together with gradient threshholds for points 2B, 2D, 2F and 2H, are stored in a package offsets table. See step number 246 of the computer program. Also stored in that package offsets table are the package width and the package elevation, which is the average of points 2F and 2H. The package elevation, which forms a horizontal reference, is also stored in a work table for later use. See step 247 of the program. Also stored in the work table is the package center, which is the average of points 2B and 2D, and forms a vertical reference. After these various values have been stored, the system returns to the Teach Menu.

Figure 3:
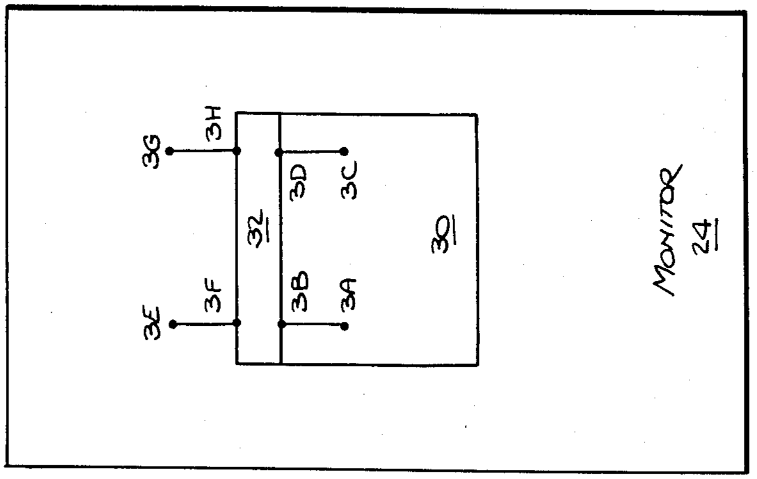

Having completed the "Define Package" routine, the operator now initiates the "Define Closure" routine, since package 30 has a closure 32. If there were no closure, this routine would be bypassed. Referring to FIG. 3, the operator uses joystick 26 to position the cursor at point 3A, which is then stored. This is the starting point for locating the top closure. Next the operator moves the cursor to point 3B, selects an appropriate gradient threshhold (magnitude and sign), which is then stored. This process is repeated for the remaining points 3C through 3H, which together define top closure 32. Points 3A, 3C, 3E and 3G are stored. The difference between points 3B and 3F and the difference between points 3D and 3H are also stored, together with the gradient threshholds for points 3B, 3D, 3F and 3H. If, as package 30 travels down a high speed fill line, top closure 32 is either misaligned or absent altogether, this defect can be readily detected by the system and appropriate corrective action taken.

In the preferred embodiment, the absolute locations of points 3A, 3C, 3E and 3G are not stored. Rather, these points are stored relative to the horizontal and vertical package references previously computed and stored in the work table. This permits the closure to be located and measured irrespective of where the image of the package appears in the picture. The relative locations of points 3A, 3C, 3E and 3G, as well as gradient threshholds for points 3B, 3D, 3F and 3H, are stored in a closure offsets table. See step number 249 of the program. It should be noted that points 3A, 3C and points 3E, 3G need not be located on opposite sides of the closure. All may be located below the closure. All may be located above the closure. All may be located within the closure. The system will operate properly in each case.

Figure 4:
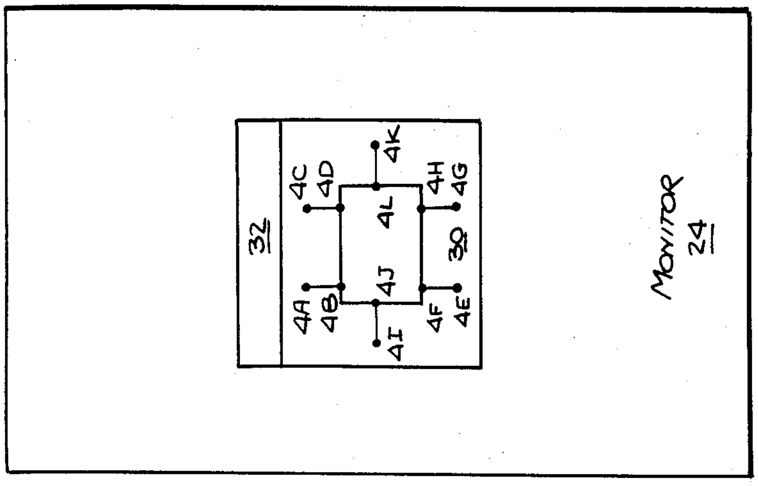
FIGS. 2, 3 and 4 are line drawings illustrating ways in which the system of FIG. 1 can be used to define various features of the package shown in FIG. 1.

Now the operator initiates the "Define Label" routine. Referring to FIG. 4, package 30 and label 34 are shown on TV monitor 24. Using joystick 26, the operator positions the cursor at point 4A, which is then stored. Next the cursor is moved to point 4B, which defines one edge of the label. An appropriate gradient threshhold is now stored for point 4B. This procedure is repeated for points 4C through 4L, all of which define the label and permit the label to be located when an image of the label is obtained as the package moves along a high speed fill line. As a result of the foregoing there are now stored in the system: (1) points 4A, 4C, 4E, 4G, 4I and 4K; (2) gradient threshholds for points 4B, 4D, 4F, 4H, 4K and 4L; (3) the difference between points 4B and 4F and/or the difference between points 4D and 4H; and (4) the difference between points 4J and 4L.

The various points and gradient threshholds for the "Define Label" routine are stored in a label offsets table. See step number 250 of the program. As with the "Define Closure" routine, the start search points for the "Define Label" routine are stored relative to the horizontal and vertical package references. Again, this permits locating the label irrespective of the location of the package in the picture. Note also that the label need not be defined using the edges of the label. It may be defined using information appearing on the label itself. Referring to FIG. 5, the operator uses joystick 26 to position the cursor at point 5A, which is then stored. Next the operator selects the horizontal and vertical distances from point 5A, which are also stored. These distances are 5B and 5C and define an area which will be searched. The operator now determines (1) whether the search will be from right to left or from left to right and (2) whether the search will be from top to bottom or from bottom to top. This information is also stored. In FIG. 5, for point 5A, the search pattern is from left to right and from top to bottom. Finally, the operator selects and stores a gradient threshhold. A similar procedure is employed for point 5D. The search area is defined by points 5E and 5F and the search pattern is from right to left and from top to bottom. This information is stored in the feature offsets table. See step number 251 of the program.

In addition to defining the label, the operator may define various features of the label and, in this way, determine not only that the label has been correctly applied to the package, but that the correct label has been applied. In the present illustrative embodiment, the label contains the letter "V." Features of this letter may be defined by the operator by initiating the "Define Feature 1" and "Define Feature 2" routines of the Teach Menu.

FIG. 6 illustrates how the present invention can accurately measure distances. Joystick 26 is used to position the cursor at point 6A, which is the starting point for locating the first edge of the feature to be measured. After point 6A is stored, the cursor is moved to point 6B, at which time the operator selects and stores a gradient threshhold. Point 6B is temporarily held. A similar procedure is followed for points 6C and 6D. The difference between points 6B and 6D is also stored. The system can now measure the distance between points 6B and 6D of the letter "V" of label 34 on package 30 as it speeds down a fill line. The unit of measure in the system is a "pixel," i.e., a picture element. The system measures distance by counting the number of pixels between, e.g., points 6B and 6D in FIG. 6.

It will be appreciated that, while the measurement of distances was illustrated in a rudimentary fashion using the letter "V," the ability to accurately measure objects or features of objects "on-the-fly" is extremely valuable and has numerous and wide-ranging applications. For example, one can use the present system to perform a 100% quality control check on the dimensions of parts, either as they are received from suppliers or as they are being used in an automated assembly operation. Also, one can use the present invention to do a 100% quality control check on the dimensions of goods as they are being manufactured and thus correct defects before the goods are shipped to customers. In addition to quality control applications, the present invention is also useful in the on-line control of manufacturing operations, for example, to measure increases or decreases in the size of features as well as increases or decreases in the distance between features.

In addition to accurately measuring distances, the present invention can also examine for line signatures.

Referring to FIG. 7, the joystick is used to locate points 7A and 7B, which are the beginning and end of the line signature, and are stored. Next a gradient threshhold is selected and stored. The line signature routine may be used to examines a label for positive and negative transitions which exceed the gradient threshholds. For example, positive (dark-to-light) transitions which exceed the gradient threshhold may be assigned a binary one while negative (light-to-dark) transitions which exceed the gradient threshhold may be assigned a binary zero. The result of the line signature operation is then a series of ones and zeroes, which may be accumulated in a shift register. This binary signature may be used, for example, to differentiate between a front label having a line signature of "1010" and a rear label having a line signature of "0101."

The present invention can also be employed to measure area gradients. Referring to FIG. 8, the center of the search area is designated by moving the cursor to point 8A, which is then stored. Next the horizontal and vertical distances from point 8A are selected and stored. These are Points 8B and 8C and define the search area. Finally, a gradient threshhold is selected and stored. In determining the area gradient, the system sums and stores the number of transitions (light/dark and/or dark/light) which occur within the area to be searched and which exceed the gradient threshhold. If, for example, the area to be searched is a solid color, then essentially no transitions should be observed. If a number of transitions are observed, this indicates that the area being searched is not a solid color and may signify that an incorrect label has been applied or that the correct label has been applied upside down.

Having completed the foregoing, the system again returns to the Teach Menu where the operator initiates the "Teach Tolerances" routine. At this point the operator selects the tolerances for labels A and/or B. To set the tolerances the operator employs the "Measure" routine in the Master Menu. Using the joystick, the operator manipulates the cursor and designates two points, for example the points 2B and 2D in FIG. 2. The system counts the number of pixels between the two points, each pixel corresponding to, for example, 1/32 of an inch. The tolerance selected for the width of package 30 may, for example, be plus or minus two pixels. After the appropriate tolerances have been entered in the tolerance table (see step number 248 of the program), the system returns to the Master Menu and is now ready to run.

It should be noted that once the various values have been determined and stored in the package offsets table, the closure offsets table, the label offsets table, the feature offsets table and the tolerance table, this data may be used so long as the package does not change. Also, in the preferred embodiment, the system has the capability of storing such data for ten differenct packages. Thus, so long as these packages do not change, they need be taught to the system only once, even if the packages are used only infrequently.

In operation, the system captures and stores an image of the package as it speeds along the fill line. The system then searches along lines 2A–2B, 2C–2D, 2E–2F and 2G–2H until the appropriate gradient threshholds are detected so as to locate the package and measure its width (See FIG. 2). The system also determines the horizontal and vertical package references and stores them in the work table. Next the system verifies that the top closure is present and properly positioned. This is done by searching along lines 3A–3B, 3C–3D, 3E–3F and 3G–3H until the appropriate gradient threshholds are detected (See FIG. 3). Next the system locates the label by searching along lines 4A–4B, 4C–4D, 4E–4F, 4G–4H, 4I–4J and 4K–4L until the appropriate gradient thresholds are detected (see FIG. 4). The horizontal and vertical package references are taken from the work table and combined with the data from the label offsets table and used to analyze the image of the label. The skew, label references and label width are now stored in the work table. Finally, the label is analyzed in a similar manner to see if the label contains the proper information (See FIGS. 5–8). Note that in all of this searching, relatively few pixels are examined. Thus, in searching along lines 2A–2B through 4K–4L, less than about five percent and preferably less than about one percent of the pixels are actually utilized.

When it is desired for any reason to stop, the operator enters the stop run code via keyboard 23. In the interim, the system has kept a count of, e.g., the number of defective labels. These totals can be requested by the operator. If an unusually large number of defective labels has been detected, it may indicate the existence of a bad batch of labels, or it may indicate that the tolerances have been set too tight. Finally, upon request the system will display the error codes for the defects detected so that the operator knows precisely what is causing the defects.

The invention disclosed and claimed herein is not limited to the preferred embodiment shown or to the exemplary application of that embodiment to the inspection of packages on high speed fill lines since modifications will undoubtedly occur to persons skilled in the art to whom this description is addressed. Therefore, departures may be made from the form of the present invention without departing from the principles thereof. For example, the sequence in which various steps are performed is ultimately a matter of choice. Thus, while the preferred sequence is define package, define closure, define label, define feature and define tolerances, these steps may be performed in a wide variety of sequences. Also, while it is preferred to define, for example, points 2A and 2C before choosing gradient threshholds for points 2B and 2D, that sequence may be reversed if desired without affecting system operation.

```
iRMX 86 PL/M-86 V2.3 COMPILATION OF MODULE MAIN_MODULE
OBJECT MODULE PLACED IN SOURCE/GENALG.OBJ
COMPILER INVOKED BY:  :LANG:PLM86 SOURCE/GENALG.PLM OPTIMIZE(3) ROM SET(TARGET=1)


                $INCLUDE(SOURCE/COPYRIGHT)
           =    /*

           =    ************************************************************************
           =    *                                                                      *
           =    *                                                                      *
           =    *                   COPYRIGHT CHESEBROUGH-POND'S INC.                  *
           =    *                                                                      *
           =    *                   (c) 1983, CHESEBROUGH-POND'S INC.                  *
           =    *                                                                      *
           =    *                                                                      *
           =    *                                                                      *
           =    *                                                                      *
           =    *     ALL RIGHTS RESERVED. NO PART OF THIS PROGRAM MAY BE REPRODUCED,  *
           =    *     TRANSMITTED, TRANSCRIBED, STORED IN A RETRIEVAL SYSTEM, OR       *
           =    *     TRANSLATED INTO ANY LANGUAGE OR COMPUTER LANGUAGE, IN ANY FORM   *
           =    *     OR BY ANY MEANS, ELECTRONIC, MECHANICAL, MAGNETIC, OPTICAL,      *
           =    *     CHEMICAL, MANUAL OR OTHERWISE, WITHOUT THE EXPRESS WRITTEN PER-  *
           =    *     MISSION OF CHESEBROUGH-POND'S INC., 33 BENEDICT PLACE, GREENWICH, *
           =    *     CONNECTICUT.                                                     *
           =    *                                                                      *
           =    *                                                                      *
           =    ************************************************************************

           =    */

                $TITLE('GENERAL LABEL INSPECTION SOFTWARE 17 NOV 83 V2.0')
  1             MAIN_MODULE:
                DO;

                /*  EXTERNAL DECLARATION STATEMENTS  */

                $INCLUDE(SOURCE/DECLARE.EXT)
  2    1   =    DECLARE      DCL      LITERALLY    'DECLARE';
  3    1   =    DECLARE      LIT.     LITERALLY    'LITERALLY';
                $INCLUDE(SOURCE/IWCONV.EXT)
           =    $SAVE
           =    $NOLIST
                $INCLUDE(SOURCE/XTERMHAND.EXT)
 25    1   =    INIT_USART: PROCEDURE EXTERNAL;
 26    2   =    END INIT_USART;
 27    1   =    WRITE: PROCEDURE(BUFFER_PTR,BLENGTH) EXTERNAL;
 28    2   =            DCL BUFFER_PTR  POINTER;
 29    2   =            DCL BLENGTH WORD;
 30    2   =    END WRITE;
 31    1   =    READ: PROCEDURE(BUFFER_PTR,BLENGTH)WORD EXTERNAL;
 32    2   =            DCL      BUFFER_PTR  POINTER;
 33    2   =            DCL      BLENGTH    WORD;
 34    2   =    END READ;

 35    1        CURSOR_ROUTINE: PROCEDURE(CURSOR_TABLE,FUNCT) EXTERNAL;
 36    2        DCL CURSOR_TABLE      POINTER;
 37    2        DCL FUNCT             BYTE;
 38    2        END CURSOR_ROUTINE;

 39    1        DEF_PACKAGE: PROCEDURE EXTERNAL;
 40    2        END DEF_PACKAGE;

 41    1        LOC_PACKAGE: PROCEDURE EXTERNAL;
 42    2        END LOC_PACKAGE;

 43    1        DEF_CLOSURE: PROCEDURE EXTERNAL;
 44    2        END DEF_CLOSURE;

 45    1        LOC_CLOSURE: PROCEDURE EXTERNAL;
 46    2        END LOC_CLOSURE;

 47    1        DEF_LABEL: PROCEDURE EXTERNAL;
 48    2        END DEF_LABEL;

 49    1        DEF_LABEL_2: PROCEDURE EXTERNAL;
 50    2        END DEF_LABEL_2;

 51    1        LOC_LABEL: PROCEDURE EXTERNAL;
 52    2        END LOC_LABEL;

 53    1        LOC_LABEL2: PROCEDURE EXTERNAL;
 54    2        END LOC_LABEL2;

 55    1        LOC_FEATURE: PROCEDURE (INDEX) EXTERNAL;
 56    2        DCL INDEX WORD;
```

```
 57   2     END LOC_FEATURE;

 58   1     DEF_DISTANCE: PROCEDURE EXTERNAL;
 59   2     END DEF_DISTANCE;

 60   1     DEF_SIGNATURE: PROCEDURE EXTERNAL;
 61   2     END DEF_SIGNATURE;

 62   1     DEF_GRAD_COUNT: PROCEDURE EXTERNAL;
 63   2     END DEF_GRAD_COUNT;

 64   1     MEASURE_DIST: PROCEDURE WORD EXTERNAL;
 65   2     END MEASURE_DIST;

 66   1     EVAL_DATA: PROCEDURE EXTERNAL;
 67   2     END EVAL_DATA;

 68   1     INIT_EJ_BUFFER: PROCEDURE EXTERNAL;
 69   2     END INIT_EJ_BUFFER;

 70   1     TALLY: PROCEDURE EXTERNAL;
 71   2     END TALLY;

 72   1     ALTER_PARAM: PROCEDURE EXTERNAL;
 73   2     END ALTER_PARAM;

 74   1     FRAMEGRAB: PROCEDURE(CAMERA) EXTERNAL;
 75   2     DCL CAMERA BYTE;
 76   2     END FRAMEGRAB;

 77   1     GRAD_PROFILE:
                PROCEDURE(CURSOR_TABLE, IMAGE_PTR, SIZE_PTR)       EXTERNAL;
 78   2     DCL CURSOR_TABLE     POINTER;
 79   2     DCL IMAGE_PTR        POINTER;
 80   2     DCL SIZE_PTR         POINTER;
 81   2     END GRAD_PROFILE;

            /*  VARIABLE DECLARATIONS PUBLIC  */
 82   1     DCL IGRAD            WORD PUBLIC;
 83   1     DCL PARAM1           INTEGER PUBLIC;
 84   1     DCL BUFFER (24)      BYTE PUBLIC;
 85   1     DCL EJ_BUFFER (42)   BYTE PUBLIC;
 86   1     DCL ER_CODE_TBL (20) WORD PUBLIC;
 87   1     DCL PKG_SUM          DWORD PUBLIC;
 88   1     DCL CURS_LOC (24)    WORD PUBLIC;
 89   1     DCL CURS_LOC_2 (24)  WORD PUBLIC;
 90   1     DCL NOBYTES          WORD PUBLIC;
 91   1     DCL PROD_NUM         WORD PUBLIC;
 92   1     DCL PROD_PTR         WORD PUBLIC;
 93   1     DCL SIZE             WORD PUBLIC;
 94   1     DCL CTABLE_OFF       WORD PUBLIC;
 95   1     DCL VERT_CL          WORD PUBLIC;
 96   1     DCL HOR_DIST         WORD PUBLIC;
 97   1     DCL VERT_DIST        WORD PUBLIC;
 98   1     DCL FEATURE_INDEX    WORD PUBLIC;
 99   1     DCL RUN_FLAG         BYTE PUBLIC;
100   1     DCL LABEL_FLAG       BYTE PUBLIC;
101   1     DCL NO_B_FLAG        BYTE PUBLIC;
102   1     DCL ER_FLAG          BYTE PUBLIC;
103   1     DCL PRINT_ENABLE     BYTE PUBLIC;
104   1     DCL CFUNC            BYTE PUBLIC;
105   1     DCL IMAGF            BYTE PUBLIC;
106   1     DCL DIR_PTR          BYTE PUBLIC;
107   1     DCL PORT_A           BYTE PUBLIC;
108   1     DCL PORT_B           BYTE PUBLIC;
109   1     DCL PORT_C           BYTE PUBLIC;
110   1     DCL PORT$A$REG       BYTE PUBLIC;

            /*  VARIABLE DECLARATIONS LOCAL  */
111   1     DCL EXP              WORD;
112   1     DCL TPROD_PTR        WORD;
113   1     DCL PROG_PTR         WORD;
114   1     DCL PROG_CALL        WORD;
115   1     DCL TEACH_PTR        WORD;
116   1     DCL TEACH_CALL       WORD;
117   1     DCL (I, J)           WORD;
118   1     DCL ITEMP_1          INTEGER;
119   1     DCL ITEMP_2          INTEGER;
120   1     DCL TEMP_1           WORD;
121   1     DCL TEMP_2           WORD;
122   1     DCL K                BYTE;
123   1     DCL ACQ_TIME         WORD;
124   1     DCL A_BASE_TIME      WORD;
125   1     DCL A_CLO_TIME       WORD;
126   1     DCL A_F1_TIME        WORD;
127   1     DCL A_F2_TIME        WORD;
128   1     DCL B_BASE_TIME      WORD;
129   1     DCL B_CLO_TIME       WORD;
```

```
130   1        DCL B_F1_TIME        WORD;
131   1        DCL B_F2_TIME        WORD;
132   1        DCL TOT_TIME         WORD;
133   1        DCL U_PER_MIN        WORD;
134   1        DCL II               INTEGER;
135   1        DCL C_RIGHT (*) BYTE DATA ('(c) 1983, CHESEBROUGH-POND',27H,'S INC.');
136   1        DCL BC_DATA          LIT      '0D8H';
137   1        DCL CAMERA_ON        LIT      '03H';
138   1        DCL CAMERA_OFF       LIT      '00H';
139   1        DCL DATA_REG         LIT      '00H';
140   1        DCL COMMD_REG        LIT      '03H';
141   1        DCL HOZ_ADD_LO       LIT      '04H';
142   1        DCL HOZ_ADD_HI       LIT      '05H';
143   1        DCL VERT_ADD         LIT      '06H';
144   1        DCL POST_INC_READ    LIT      '01H';
145   1        DCL POST_INC_WRITE   LIT      '02H';
146   1        DCL CLRSCRN          LIT      '1BH,6AH,0CH';
147   1        DCL SET_CUR          LIT      '1BH,59H';
148   1        DCL ESC              LIT      '1BH';
149   1        DCL CRLF             LIT      'CALL WRITE(@(13,10),2)';
150   1        DCL CR               LIT      '0DH';
151   1        DCL LF               LIT      '0AH';
152   1        DCL RESTC            LIT      '00H';
153   1        DCL DISC             LIT      '03H';
154   1        DCL MOVC             LIT      '02H';
155   1        DCL CUR1             LIT      '00H';
156   1        DCL CUR2             LIT      '04H';
157   1        DCL CUR3             LIT      '08H';
158   1        DCL CUR4             LIT      '0CH';
159   1        DCL HOMC             LIT      '01H';
160   1        DCL ENAX             LIT      '010H';
161   1        DCL ENAY             LIT      '020H';
162   1        DCL F_IMG            LIT      '00H';
163   1        DCL B_IMG            LIT      '040H';
               $IF TARGET = 1
164   1        DCL CMD$REG          LIT      '0CEH';
               $ELSEIF TARGET = 0
               DCL CMD$REG          LIT      '073H';
               $ENDIF
165   1        DCL IO_SET           LIT      '080H';
166   1        DCL PIP              LIT      '01H';
167   1        DCL INIT_FLAG                 BYTE;
168   1        DCL ICW1             LIT      '013H';
169   1        DCL ICW2             LIT      '020H';
170   1        DCL ICW4             LIT      '01DH';
171   1        DCL INIT$MASK        LIT      '0FEH';
172   1        DCL INIT$REG         LIT      '0C0H';
173   1        DCL INIT$CMD         LIT      '0C2H';
174   1        DCL EOI$ALL          LIT      '020H';
175   1        DCL END$INIT         LIT      'OUTPUT(INIT$REG) = EOI$ALL';
176   1        DCL TIME_ON          LIT      '040H';
177   1        DCL STROBE_OFF       LIT      '0FEH';
178   1        DCL SYS_ON           LIT      '08H';
179   1        DCL SYS_OFF          LIT      '0F7H';


               $IF TARGET = 1
180   1        INT0:
                   PROCEDURE   INTERRUPT 0;
181   2            CALL FRAME$GRAB(30H);
182   2        PKG_SUM = PKG_SUM + 1;
183   2        IF (PROD_FLAG(PROD_NUM).A_FLAG = 7FH) THEN DO;
185   3            LABEL_FLAG = 0;
186   3            PROD_PTR = ((PROD_NUM - 1) * 2);
187   3            CALL LOC_PACKAGE;
188   3            CALL LOC_CLOSURE;
189   3            IF (LABEL_OFFSETS(PROD_PTR).LAB_AXIS <> 04FH) THEN CALL LOC_LABEL;
191   3                ELSE CALL LOC_LABEL2;
192   3            CALL LOC_FEATURE(1);
193   3            CALL LOC_FEATURE(2);
194   3        END;
195   2        IF (PROD_FLAG(PROD_NUM).B_FLAG = 7FH) THEN DO;
197   3            LABEL_FLAG = 1;
198   3            PROD_PTR = ((PROD_NUM - 1) * 2) + 1;
199   3            CALL LOC_PACKAGE;
200   3            CALL LOC_CLOSURE;
201   3            IF (LABEL_OFFSETS(PROD_PTR).LAB_AXIS <> 04FH) THEN CALL LOC_LABEL;
203   3                ELSE CALL LOC_LABEL2;
204   3            CALL LOC_FEATURE(1);
205   3            CALL LOC_FEATURE(2);
206   3        END;

               /* EVALUATE LABEL DATA */

207   2        IF (PROD_FLAG(PROD_NUM).A_FLAG = 7FH) THEN DO;
209   3            LABEL_FLAG = 0;
210   3            PROD_PTR = ((PROD_NUM - 1) * 2);
211   3            CALL EVAL_DATA;
212   3        END;
```

```
IF (PROD_FLAG(PROD_NUM).B_FLAG = 7FH AND NO_B_FLAG = 0) THEN DO;
    LABEL_FLAG = 1;
    PROD_PTR = ((PROD_NUM - 1) * 2) + 1;
    CALL EVAL_DATA;
END;
    END$INIT;
    PORT$A$REG=PORT$A$REG AND STROBE_OFF;
    OUTPUT(PORT_A)=PORT$A$REG;
END INTO;
$ENDIF
/*  ADDRESS TABLES FOR LOCALLY CALLED ROUTINES  */

DCL SERV_TBL(*) WORD DATA(.SELECT_PROD,.TEACH,.PRM_ALT,.MEASURE,.RUN,
                          .STOP_RUN,.DO_TALLY);
DCL TEACH_TBL(*) WORD DATA(.ACQ_IMAGE,.TEACH_NAM,.TCH_PACKAGE,.TCH_CLOSURE,
                          .TCH_LABEL,.TCH_FEATURE_1,.TCH_FEATURE_2,
                          .TCH_TOLERANCES,.DSPL_WORK_TBL,.REST_IMAGE);


/*  MESSAGE TABLES  */
/*  MAIN LEVEL 0 MENU  */
DCL MENU (*) BYTE DATA(1BH,41H,1BH,6AH,0CH,1BH,59H,24H,2CH,' 1: SELECT PRODUCT',
                      1BH,59H,26H,2CH,' 2: TEACH',1BH,59H,28H,2CH,' 3: ALTER
                      PARAMETERS',1BH,59H,2AH,2CH,' 4: MEASURE',1BH,59H,2CH,
                      2CH,' 5: RUN',1BH,59H,2EH,2CH,' 6: STOP RUN',
                      SET_CUR,30H,2CH,' 7: TALLY');
DCL MENU_A (*) BYTE DATA(SET_CUR,33H,22H,'PRODUCT',SET_CUR,33H,2EH,'LABEL A',
                      SET_CUR,33H,38H,'LABEL B',SET_CUR,36H,20H,
                      'Copyright 1983 CHESEBROUGH-POND',27H,'S INC.',
                      SET_CUR,34H,42H,'V2.0',
                      1BH,59H,20H,20H,'ENTER SELECTION - ');

DCL CAUTION (*) BYTE DATA(CLRSCRN,'      !!!CAUTION!!!',CR,LF,LF,
                      'PRODUCT PARAMETER TABLES MAY',CR,LF,
                      'NOT BE CORRECT.  CHECK TABLES BEFORE',CR,LF,
                      'PLACING IN RUN.  ENTER RETURN.');
/*  TEACH MENU LEVEL 1  */
DCL TEACH_MENU(*) BYTE DATA(CLRSCRN,SET_CUR,22H,2CH,' 1: GET IMAGE',
                      SET_CUR,24H,2CH,' 2: TEACH PRODUCT NAME',
                      SET_CUR,26H,2CH,' 3: DEFINE PACKAGE',SET_CUR,28H,2CH,
                      ' 4: DEFINE CLOSURE',SET_CUR,2AH,2CH,' 5: DEFINE LABEL',
                      SET_CUR,2CH,2CH,' 6: DEFINE FEATURE 1',SET_CUR,2EH,2CH,
                      ' 7: DEFINE FEATURE 2',SET_CUR,30H,2CH,' 8: TEACH TOLERANCES',
                      SET_CUR,32H,2CH,' 9: DISPLAY WORK TABLE',SET_CUR,34H,2CH,
                      '10: RESTORE IMAGE',SET_CUR,36H,2CH,'11: RETURN',
                      SET_CUR,20H,20H,'ENTER SELECTION - ');


DCL TIME_MESS (*) BYTE DATA(CLRSCRN,'TIMING ANALYSIS:',SET_CUR,22H,34H,'
                      'LABEL A   LABEL B',SET_CUR,24H,22H,'ACQUIRE IMAGE',
                      SET_CUR,26H,22H,'PACKAGE/LABEL',SET_CUR,28H,22H,
                      'CLOSURE',SET_CUR,2AH,22H,'FEATURE 1',SET_CUR,2CH,22H,
                      'FEATURE 2',SET_CUR,2EH,22H,'TOTAL TIME',SET_CUR,30H,
                      22H,'MAX. UNITS/MINUTE',SET_CUR,34H,20H,'RETURN TO
                      CONTINUE -');
DCL FEATURE_MESS (*) BYTE DATA(SET_CUR,23H,20H,'ENTER SELECTION - ',SET_CUR,
                      25H,2CH,' 1: DISTANCE MEASURE.',SET_CUR,27H,2CH,
                      ' 2: LINE SIGNATURE.',SET_CUR,29H,2CH,
                      ' 3: AREA GRADIENT COUNT.',SET_CUR,23H,33H);
DCL TOL_MSG (*) BYTE DATA(CLRSCRN,'TOLERANCES FOR PRODUCT NO.',SET_CUR,22H,22H,
                      '1. PACKAGE WIDTH',SET_CUR,23H,22H,
                      '2. CLOSURE WIDTH',SET_CUR,24H,22H,'3. CLOSURE ELEVATION',
                      SET_CUR,25H,22H,'4. CLOSURE CENTER',SET_CUR,26H,22H,
                      '5. CLOSURE SKEW',SET_CUR,27H,22H,'6. LABEL WIDTH',SET_CUR,
                      28H,22H,'7. LABEL ELEVATION',SET_CUR,29H,22H,'8. LABEL
                      CENTER');
DCL TOL_MSG_A (*) BYTE DATA(SET_CUR,2AH,22H,'9. LABEL SKEW',SET_CUR,2BH,21H,'10.
                      FEATURE 1', SET_CUR,2CH,21H,'11. FEATURE 2',SET_CUR,37H,20H,
                      '(Q TO QUIT, Rn TO RESET TO NUMBER n)',
                      SET_CUR,2FH,20H,'ENTER TOLERANCE TO TEACH -');
DCL WRK_MSG (*) BYTE DATA(CLRSCRN,'WORK TABLE VALUES         ',SET_CUR,22H,22H,'
                      '1. PACKAGE WIDTH',SET_CUR,23H,22H,'2. PACKAGE ELEVATION',
                      SET_CUR,24H,22H,'3. PACKAGE CENTER',SET_CUR,25H,22H,
                      '4. CLOSURE WIDTH',SET_CUR,26H,22H,'5. CLOSURE ELEVATION';
                      SET_CUR,2EH,21H,'13. FEATURE 2',SET_CUR,30H,20H,
                      'RETURN TO CONTINUE     -');
DCL IMGE_MSG (*) BYTE DATA(CLRSCRN,'GET IMAGE:',SET_CUR,24H,28H,'1. CONTINUOUS',
                      ' IMAGE',SET_CUR,26H,28H,'2. SINGLE IMAGE',SET_CUR,28H,20H,
                      'ENTER SELECTION - ');

DCL LABEL_MESS (*) BYTE DATA(CLRSCRN,'SELECT LABEL PROCESS:',SET_CUR,23H,23H
                      ,'1. LOCATE LABEL EDGES.',SET_CUR,25H,23H,
                      '2. LOCATE LABEL FEATURES.',SET_CUR,28H,20H,
                      'ENTER SELECTION - ');
DCL     MSG4    (*)     BYTE    DATA
(CLRSCRN,'*****   MEASURE ROUTINE  ****',CR,LF);
```

```
238   1    DCL     MSG5    (*)     BYTE    DATA
           (CR,LF,'ENTER HORIZONTAL OR VERTICAL MEASUREMENT',
            CR,LF,'DIRECTION (0/1)- ');

239   1    DCL     MSG6    (*)     BYTE    DATA
           (CR,LF,'MOVE CURSOR TO STARTING MEASUREMENT',CR,LF,'POINT ');

240   1    DCL     MSG7    (*)     BYTE    DATA
           (CR,LF,'MOVE CURSOR TO ENDING MEASUREMENT POINT ');

241   1    DCL     MSG8    (*)     BYTE    DATA
           (CR,LF,'DISPLAY GRADIENT PROFILE ? (Y/N) ');

242   1    DCL     MSG9    (*)     BYTE    DATA
           (CR,LF,'    *****  SORRY   ****  ');
           /*  G E  */

           /*  TEACH NAME MESSAGE  */
243   1    DCL NAM_CHNG (*) BYTE DATA(SET_CUR,24H,20H,'*',SET_CUR,24H,35H,'*',
                               SET_CUR,24H,21H);

           /*  PRODUCT PARAMETER ARRAYS PUBLICLY DECLARED  */
244   1    DCL PROD_NAM_TBL (20) STRUCTURE(NAM_BUFFER(20) BYTE) PUBLIC;
245   1    DCL PROD_FLAG (10) STRUCTURE(A_FLAG BYTE, B_FLAG BYTE);
246   1    DCL PKG_OFFSETS (20) STRUCTURE (
                               HOZ_GRAD_LEFT       WORD,
                               HOZ_GRAD_RIGHT      WORD,
                               HOZ_ST_ELEV         WORD,
                               HOZ_ST_LEFT         WORD,
                               HOZ_ST_RIGHT        WORD,
                               VERT_GRAD_LEFT      WORD,
                               VERT_GRAD_RIGHT     WORD,
                               VERT_ST_ELER        WORD,
                               VERT_ST_ELEL        WORD,
                               VERT_ST_LEFT        INTEGER,
                               VERT_ST_RIGHT       INTEGER,
                               PKG_WIDTH           WORD,
                               PKG_ELEV            WORD) PUBLIC;

247   1    DCL WORK_TABLE(2) STRUCTURE (
                               PACKAGE_WIDTH       WORD,
                               PACKAGE_ELEV        WORD,
                               PACKAGE_CENTER      WORD,
                               CLOSURE_WIDTH       WORD,
                               CLOSURE_ELEV        WORD,
                               CLOSURE_CENTER      WORD,
                               CLOSURE_SKEW        INTEGER,
                               LABEL_WIDTH         WORD,
                               LABEL_ELEV          WORD,
                               LABEL_CENTER        WORD,
                               LABEL_SKEW          INTEGER,
                               FEATURE_1           WORD,
                               FEATURE_2           WORD) PUBLIC;
248   1    DCL TOLERANCE_TBL(20) STRUCTURE (
                               PACKAGE_WIDTH       WORD,
                               PACKAGE_ELEV        WORD,
                               PACKAGE_CENTER      WORD,
                               CLOSURE_WIDTH       WORD,
                               CLOSURE_ELEV        WORD,
                               CLOSURE_CENTER      WORD,
                               CLOSURE_SKEW        WORD,
                               LABEL_WIDTH         WORD,
                               LABEL_ELEV          WORD,
                               LABEL_CENTER        WORD,
                               LABEL_SKEW          WORD,
                               FEATURE_1           WORD,
                               FEATURE_2           WORD) PUBLIC;
249   1    DCL CLOSURE_OFFSETS (20) STRUCTURE
                       (CLOSURE_FLAG        BYTE,
                        CLOSURE_SKEW        INTEGER,
                        CLOSURE_WIDTH       WORD,
                        CLOSURE_CENTER      INTEGER,
                        CLOSURE_ELEV        INTEGER,
                        PT1_HOZ_ST          INTEGER,
                        PT1_VERT_ST         INTEGER,
                        PT1_THRESH          WORD,
                        PT1_COUNT           INTEGER,
                        PT2_HOZ_ST          INTEGER,
                        PT2_VERT_ST         INTEGER,
                        PT2_THRESH          WORD,
                        PT2_COUNT           INTEGER,
                        PT3_HOZ_ST          INTEGER,
                        PT3_VERT_ST         INTEGER,
                        PT3_THRESH          WORD,
                        PT3_COUNT           INTEGER,
                        PT4_HOZ_ST          INTEGER,
```

```
                        PT4_VERT_ST          INTEGER,
                        PT4_THRESH           WORD,
                        PT4_COUNT            INTEGER) PUBLIC;
250   1    DCL LABEL_OFFSETS (20) STRUCTURE
                       (LAB_AXIS             BYTE,
                        LABEL_SKEW           INTEGER,
                        LABEL_WIDTH          WORD,
                        LABEL_CENTER         INTEGER,
                        LABEL_ELEV           INTEGER,
                        PT1_HOZ_ST           INTEGER,
                        PT1_VERT_ST          INTEGER,
                        PT1_COUNT            INTEGER,
                        PT1_THRESH           WORD,
                        PT2_HOZ_ST.          INTEGER,
                        PT2_VERT_ST          INTEGER,
                        PT2_COUNT            INTEGER,
                        PT2_THRESH           WORD,
                        PT3_HOZ_ST           INTEGER,
                        PT3_VERT_ST          INTEGER,
                        PT3_COUNT            INTEGER,
                        PT3_THRESH           WORD,
                        PT4_HOZ_ST           INTEGER,
                        PT4_VERT_ST          INTEGER,
                        PT4_COUNT            INTEGER,
                        PT4_THRESH           WORD,
                        PT5_HOZ_ST           INTEGER,
                        PT5_VERT_ST          INTEGER,
                        PT5_COUNT            INTEGER,
                        PT5_THRESH           WORD,
                        PT6_HOZ_ST           INTEGER,
                        PT6_VERT_ST          INTEGER,
                        PT6_COUNT            INTEGER,
                        PT6_THRESH           WORD) PUBLIC;
251   1    DCL FEATURE_OFFSETS (40) STRUCTURE
                       (FEATURE_FLAG         BYTE,
                        FEATURE              WORD,
                        PT1_HOZ_ST           INTEGER,
                        PT1_VERT_ST          INTEGER,
                        PT1_THRESH           WORD,
                        PT1_COUNT            INTEGER,
                        PT2_HOZ_ST           INTEGER,
                        PT2_VERT_ST          INTEGER,
                        PT2_THRESH           WORD,
                        PT2_COUNT            INTEGER) PUBLIC;
252   1    DCL CLOSURE_EDGE (4) STRUCTURE
                       (HOZ                  WORD,
                        VERT                 WORD) PUBLIC;
253   1    DCL LABEL_EDGE (6) STRUCTURE
                       (HOZ                  WORD,
                        VERT                 WORD) PUBLIC;
           /*  MUSIC MESSAGES  */
254   1    DCL A(*) BYTE DATA(ESC,ESC,4DH,34H,30H,34H,39H);
255   1    DCL G(*) BYTE DATA(ESC,ESC,4DH,34H,38H,34H,39H);
256   1    DCL F(*) BYTE DATA(ESC,ESC,4DH,35H,31H,34H,39H);
257   1    DCL E(*) BYTE DATA(ESC,ESC,4DH,35H,36H,34H,39H);
258   1    DCL D(*) BYTE DATA(ESC,ESC,4DH,36H,31H,34H,39H);
259   1    DCL C(*) BYTE DATA(ESC,ESC,4DH,36H,44H,34H,39H);
260   1    DCL B(*) BYTE DATA(ESC,ESC,4DH,37H,34H,34H,39H);
261   1    DCL OFF(*) BYTE DATA(ESC,ESC,4DH,34H,30H,38H,30H);

           /*  TIMER FOR GENERAL DELAY USE  */
262   1    TIMER: PROCEDURE(J) PUBLIC;
263   2    DCL (I,J,K)   WORD;
264   2    DO I = 0 TO J;
265   3    END;
266   2    END TIMER;

267   1    P_MENU: PROCEDURE;
268   2        DO;      /*  PRINT MAIN MENU, PRODUCT NO. AND LABEL  */
269   3            CALL WRITE(@MENU,LENGTH(MENU));
270   3            CALL WRITE(@MENU_A,LENGTH(MENU_A));
271   3            CALL WRD$ASC(@BUFFER,@PROD_NUM);
272   3            CALL WRITE(@(SET_CUR,34H,20H),4);
273   3            CALL WRITE(@BUFFER,8);
274   3            IF (RUN_FLAG = 0) THEN CALL WRITE(@(' RUN'),4);
276   3                ELSE CALL WRITE(@(' STOP'),5);
277   3            CALL WRITE(@(SET_CUR,34H,30H),4);
278   3            IF PROD_FLAG(PROD_NUM).A_FLAG = 07FH THEN CALL WRITE(@('YES'),3);
280   3            ELSE CALL WRITE(@('NO'),2);
281   3            CALL WRITE(@(SET_CUR,34H,3AH),4);
282   3            IF PROD_FLAG(PROD_NUM).B_FLAG = 07FH THEN CALL WRITE(@('YES'),3);
284   3            ELSE CALL WRITE(@('NO'),2);
285   3            CALL WRITE(@(SET_CUR,20H,32H),4);
286   3        END;
287   2    END P_MENU;

288   1    SET_UP: PROCEDURE;
           /*  ROUTINE TO ALLOW CAMERA TUNING AND ALLIGNMENT  */
```

```
289   2      DO;
290   3          CALL WRITE(@(CLRSCRN,'PRESS USER 1 TO TERMINATE. '),29);
291   3          DO WHILE(INPUT(PORT_C) AND 010H) <> 0;
             /* RESET STROBE */
292   4          PORT$A$REG = PORT$A$REG AND STROBE_OFF;
293   4          OUTPUT(PORT_A) = PORT$A$REG;
294   4          CALL FRAMEGRAB(030H);
295   4          END;
296   3          CALL WRITE(@(07H),1);
297   3          PORT$A$REG = PORT$A$REG AND STROBE_OFF;
298   3          OUTPUT(PORT_A) = PORT$A$REG;
299   3      END;
300   2      END SET_UP;

301   1      TIME_ANAL: PROCEDURE;   /*  UNITS PER MINUTE ESTIMATION ROUTINE */
302   2      DO;
303   3          ACQ_TIME = 34;
             /* PRINT SCREEN */
304   3          CALL WRITE(@TIME_MESS,LENGTH(TIME_MESS));

             /*  CREATE TEMP PRODUCT POINTER  */
305   3          TPROD_PTR = (PROD_NUM - 1) * 2;
             /*  CHECK FOR FRONT LABEL   */
306   3          IF PROD_FLAG(PROD_NUM).A_FLAG = 07FH THEN DO;

             /*  ADD BASE TIME   */
308   4          IF (LABEL_OFFSETS(TPROD_PTR).LAB_AXIS <> 04FH) THEN
309   4          A_BASE_TIME = 35;
310   4          ELSE DO;
311   5               ITEMP_1 = IABS(LABEL_OFFSETS(TPROD_PTR).PT1_COUNT *
                                LABEL_OFFSETS(TPROD_PTR).PT3_COUNT);
312   5               ITEMP_2 = IABS(LABEL_OFFSETS(TPROD_PTR).PT2_COUNT *
                                LABEL_OFFSETS(TPROD_PTR).PT4_COUNT);
313   5               TEMP_1 = UNSIGN(ITEMP_1 + ITEMP_2);
314   5               TEMP_1 = (TEMP_1 * 10)/100;
315   5          A_BASE_TIME = 15 + TEMP_1;
316   5          END;
             /* CHECK FOR CLOSURE ALGORITHM */
317   4          IF ((CLOSURE_OFFSETS(TPROD_PTR).CLOSURE_FLAG AND OFOH) <> 0) THEN
318   4               A_CLO_TIME = 6;
319   4          ELSE A_CLO_TIME = 0;

             /*  DETERMINE FEATURE ALGORITHMS  */
320   4          K = (FEATURE_OFFSETS(TPROD_PTR + 0).FEATURE_FLAG AND OFOH);
321   4          K = SHR(K,4);

322   4          IF K > 3 THEN K = 0;
324   4          DO CASE K;
                   /* CASE 0 NO FEATURE SELECTED */
325   5            A_F1_TIME = 0;
                   /* CASE 1  DISTANCE MEASURE  */
326   5            DO;
327   6                 IF (FEATURE_OFFSETS(TPROD_PTR + 0).FEATURE_FLAG AND OFH <> 0) THEN
328   6                 ITEMP_1 = FEATURE_OFFSETS(TPROD_PTR + 0).PT2_HOZ_ST -
                                  FEATURE_OFFSETS(TPROD_PTR + 0).PT1_HOZ_ST;
329   6                 ELSE
                         ITEMP_1 = FEATURE_OFFSETS(TPROD_PTR + 0).PT2_VERT_ST -
                                  FEATURE_OFFSETS(TPROD_PTR + 0).PT1_VERT_ST;
330   6                 ITEMP_1 = IABS(ITEMP_1);
331   6                 IF (UNSIGN(ITEMP_1) > FEATURE_OFFSETS(TPROD_PTR + 0).FEATURE) THEN
332   6                     TEMP_1 = UNSIGN(ITEMP_1) - FEATURE_OFFSETS(TPROD_PTR + 0).FEATURE;
333   6                 ELSE
                             TEMP_1 = FEATURE_OFFSETS(TPROD_PTR + 0).FEATURE - UNSIGN(ITEMP_1);
334   6                 A_F1_TIME = (TEMP_1 * 10) / 100;
335   6            END; /* CASE 1 */
                   /*CASE 2 LINE SIGNATURE */
336   5            DO;
337   6                 ITEMP_1 = FEATURE_OFFSETS(TPROD_PTR + 0).PT1_COUNT;
338   6                 ITEMP_1 = IABS(ITEMP_1);
339   6                 TEMP_1 = UNSIGN(ITEMP_1);
340   6                 A_F1_TIME = (TEMP_1 * 10) / 100;
341   6            END; /*  CASE 2  */
                   /*  CASE 3 AREA GRADIENT COUNT  */
342   5            DO;
343   6                 ITEMP_1 = FEATURE_OFFSETS(TPROD_PTR + 0).PT1_COUNT *
                                FEATURE_OFFSETS(TPROD_PTR + 0).PT2_COUNT;
344   6                 TEMP_1 = UNSIGN(ITEMP_1);
345   6                 A_F1_TIME = (TEMP_1 * 10) / 100;
346   6            END;
347   5          END; /* DO CASE */

             /*  CHECK FOR FEATURE 2  */
348   4          K = (FEATURE_OFFSETS(TPROD_PTR + 20).FEATURE_FLAG AND OFOH);
349   4          K = SHR(K,4);

350   4          IF K > 3 THEN K = 0;
352   4          DO CASE K;
                   /* CASE 0 NO FEATURE SELECTED */
```

```
353    5              A_F2_TIME = 0;
                      /* CASE 1  DISTANCE MEASURE  */
354    5              DO;
355    6                  IF (FEATURE_OFFSETS(TPROD_PTR + 20).FEATURE_FLAG AND OFH <> 0) THEN
356    6                  ITEMP_1 = FEATURE_OFFSETS(TPROD_PTR + 20).PT2_HOZ_ST -
                                    FEATURE_OFFSETS(TPROD_PTR + 20).PT1_HOZ_ST;
357    6                  ELSE
                          ITEMP_1 = FEATURE_OFFSETS(TPROD_PTR + 20).PT2_VERT_ST -
                                    FEATURE_OFFSETS(TPROD_PTR + 20).PT1_VERT_ST;
358    6                  ITEMP_1 = IABS(ITEMP_1);
359    6                  IF (UNSIGN(ITEMP_1) > FEATURE_OFFSETS(TPROD_PTR + 20).FEATURE) THEN
360    6                      TEMP_1 = UNSIGN(ITEMP_1) - FEATURE_OFFSETS(TPROD_PTR + 20).FEATURE;
361    6                  ELSE
                              TEMP_1 = FEATURE_OFFSETS(TPROD_PTR + 20).FEATURE - UNSIGN(ITEMP_1);
362    6                  A_F2_TIME = (TEMP_1 * 10) / 100;
363    6              END; /* CASE 1 */
                      /*CASE 2 LINE SIGNATURE */
364    5              DO;
365    6                  ITEMP_1 = FEATURE_OFFSETS(TPROD_PTR + 20).PT1_COUNT;
366    6                  ITEMP_1 = IABS(ITEMP_1);
367    6                  TEMP_1 = UNSIGN(ITEMP_1);
368    6                  A_F2_TIME = (TEMP_1 * 10) / 100;
369    6              END; /*  CASE 2  */
                      /*  CASE 3 AREA GRADIENT COUNT  */
370    5              DO;
371    6                  ITEMP_1 = FEATURE_OFFSETS(TPROD_PTR + 20).PT1_COUNT *
                                   FEATURE_OFFSETS(TPROD_PTR + 20).PT2_COUNT;
372    6                  TEMP_1 = UNSIGN(ITEMP_1);
373    6                  A_F2_TIME = (TEMP_1 * 10) / 100;
374    6              END;
375    5          END; /* DO CASE */
376    4          END;
377    3          ELSE DO;
378    4              A_BASE_TIME = 0;
379    4              A_CLO_TIME = 0;
380    4              A_F1_TIME = 0;
381    4              A_F2_TIME = 0;
382    4          END;  /* A LABEL PROCESSING  */

        /*  PROCESS B LABEL  */

        /*  CHECK FOR B LABEL  */
383    3          IF PROD_FLAG(PROD_NUM).B_FLAG = 07FH THEN DO;

        /* ADD OFFSET TO TEMP PROD POINTER */

385    4         TPROD_PTR = TPROD_PTR + 1;

        /*  ADD BASE TIME  */
386    4          IF (LABEL_OFFSETS(TPROD_PTR).LAB_AXIS <> 04FH) THEN
387    4          B_BASE_TIME = 35;
388    4          ELSE DO;
389    5              ITEMP_1 = IABS(LABEL_OFFSETS(TPROD_PTR).PT1_COUNT *
                                     LABEL_OFFSETS(TPROD_PTR).PT3_COUNT);
390    5              ITEMP_2 = IABS(LABEL_OFFSETS(TPROD_PTR).PT2_COUNT *
                                     LABEL_OFFSETS(TPROD_PTR).PT4_COUNT);
391    5              TEMP_1 = UNSIGN(ITEMP_1 + ITEMP_2);
392    5              TEMP_1 = (TEMP_1 * 10)/100;
393    5          B_BASE_TIME = 15 + TEMP_1;
394    5          END;

        /* CHECK FOR CLOSURE ALGORITHM */
395    4          IF ((CLOSURE_OFFSETS(TPROD_PTR).CLOSURE_FLAG AND OFOH) <> 0) THEN
396    4              B_CLO_TIME = 6;
397    4          ELSE B_CLO_TIME = 0;

        /*  DETERMINE FEATURE ALGORITHMS  */
398    4          K = (FEATURE_OFFSETS(TPROD_PTR + 0).FEATURE_FLAG AND OFOH);
399    4          K = SHR(K,4);

400    4          IF K > 3 THEN K = 0;
402    4          DO CASE K;
                      /* CASE 0 NO FEATURE SELECTED */
403    5              B_F1_TIME = 0;
                      /* CASE 1  DISTANCE MEASURE  */
404    5              DO;
405    6                  IF (FEATURE_OFFSETS(TPROD_PTR + 0).FEATURE_FLAG AND OFH <> 0) THEN
406    6                  ITEMP_1 = FEATURE_OFFSETS(TPROD_PTR + 0).PT2_HOZ_ST -
                                    FEATURE_OFFSETS(TPROD_PTR + 0).PT1_HOZ_ST;
407    6                  ELSE
                          ITEMP_1 = FEATURE_OFFSETS(TPROD_PTR + 0).PT2_VERT_ST -
                                    FEATURE_OFFSETS(TPROD_PTR + 0).PT1_VERT_ST;
408    6                  ITEMP_1 = IABS(ITEMP_1);
409    6                  IF (UNSIGN(ITEMP_1) > FEATURE_OFFSETS(TPROD_PTR + 0).FEATURE). THEN
410    6                      TEMP_1 = UNSIGN(ITEMP_1) - FEATURE_OFFSETS(TPROD_PTR + 0).FEATURE;
411    6                  ELSE
                              TEMP_1 = FEATURE_OFFSETS(TPROD_PTR + 0).FEATURE - UNSIGN(ITEMP_1);
412    6                  B_F1_TIME = (TEMP_1 * 10) / 100;
```

```
413   6            END; /* CASE 1 */
                   /*CASE 2 LINE SIGNATURE */
414   5            DO;
415   6                ITEMP_1 = FEATURE_OFFSETS(TPROD_PTR + 0).PT1_COUNT;
416   6                ITEMP_1 = IABS(ITEMP_1);
417   6                TEMP_1 = UNSIGN(ITEMP_1);
418   6                B_F1_TIME = (TEMP_1 * 10) / 100;
419   6            END; /*  CASE 2  */
                   /*  CASE 3 AREA GRADIENT COUNT  */
420   5            DO;
421   6                ITEMP_1 = FEATURE_OFFSETS(TPROD_PTR + 0).PT1_COUNT *
                                FEATURE_OFFSETS(TPROD_PTR + 0).PT2_COUNT;
422   6                TEMP_1 = UNSIGN(ITEMP_1);
423   6                B_F1_TIME = (TEMP_1 * 10) / 100;
424   6            END;
425   5        END; /* DO CASE */

           /*  CHECK FOR FEATURE 2  */
426   4        K = (FEATURE_OFFSETS(TPROD_PTR + 20).FEATURE_FLAG AND OFOH);
427   4        K = SHR(K,4);

428   4        IF K > 3 THEN K = 0;
430   4        DO CASE K;
                   /* CASE 0 NO FEATURE SELECTED */
431   5            B_F2_TIME = 0;
                   /* CASE 1  DISTANCE MEASURE  */
432   5            DO;
433   6                IF (FEATURE_OFFSETS(TPROD_PTR + 20).FEATURE_FLAG AND OFH <> 0) THEN
434   6                ITEMP_1 = FEATURE_OFFSETS(TPROD_PTR + 20).PT2_HOZ_ST -
                                 FEATURE_OFFSETS(TPROD_PTR + 20).PT1_HOZ_ST;
435   6                ELSE
                       ITEMP_1 = FEATURE_OFFSETS(TPROD_PTR + 20).PT2_VERT_ST -
                                 FEATURE_OFFSETS(TPROD_PTR + 20).PT1_VERT_ST;
436   6                ITEMP_1 = IABS(ITEMP_1);
437   6                IF (UNSIGN(ITEMP_1) > FEATURE_OFFSETS(TPROD_PTR + 20).FEATURE) THEN
438   6                    TEMP_1 = UNSIGN(ITEMP_1) - FEATURE_OFFSETS(TPROD_PTR + 20).FEATURE;
439   6                ELSE
                           TEMP_1 = FEATURE_OFFSETS(TPROD_PTR + 20).FEATURE - UNSIGN(ITEMP_1);
440   6                B_F2_TIME = (TEMP_1 * 10) / 100;
441   6            END; /* CASE 1 */
                   /*CASE 2 LINE SIGNATURE */
442   5            DO;
443   6                ITEMP_1 = FEATURE_OFFSETS(TPROD_PTR + 20).PT1_COUNT;
444   6                ITEMP_1 = IABS(ITEMP_1);
445   6                TEMP_1 = UNSIGN(ITEMP_1);
446   6                B_F2_TIME = (TEMP_1 * 10) / 100;
447   6            END; /*  CASE 2  */
                   /*  CASE 3 AREA GRADIENT COUNT  */
448   5            DO;
449   6                ITEMP_1 = FEATURE_OFFSETS(TPROD_PTR + 20).PT1_COUNT *
                                 FEATURE_OFFSETS(TPROD_PTR + 20).PT2_COUNT;
450   6                TEMP_1 = UNSIGN(ITEMP_1);
451   6                B_F2_TIME = (TEMP_1 * 10) / 100;
452   6            END;
453   5        END; /* DO CASE */
454   4        END;
455   3        ELSE DO;
456   4            B_BASE_TIME = 0;
457   4            B_CLO_TIME = 0;
458   4            B_F1_TIME = 0;
459   4            B_F2_TIME = 0;
460   4        END;  /* B LABEL PROCESSING  */

           /*  SUM TIMES  */
           /*  CHECK FOR VALID FEATURE NUMBERS  */
461   3        IF A_F1_TIME > 100 THEN A_F1_TIME = 0;
463   3        IF A_F2_TIME > 100 THEN A_F2_TIME = 0;
465   3        IF B_F1_TIME > 100 THEN B_F1_TIME = 0;
467   3        IF B_F2_TIME > 100 THEN B_F2_TIME = 0;

469   3        TOT_TIME = ACQ_TIME + A_BASE_TIME + B_BASE_TIME + A_CLO_TIME + B_CLO_TIME +
                          A_F1_TIME + B_F1_TIME + A_F2_TIME + B_F2_TIME;


           /*  CALCULATE UNITS PER MINUTE  */
           /*  ALLOW FOR MIN PRODUCT SPACING  */

470   3        U_PER_MIN =  60000 / (TOT_TIME + 15);

           /*  PRINT RESULTS  */

471   3        CALL WRD$ASC(@BUFFER,@ACQ_TIME);
472   3        CALL WRITE(@(SET_CUR,24H,33H),4);
473   3        CALL WRITE(@BUFFER,8);

474   3        CALL WRD$ASC(@BUFFER,@A_BASE_TIME);
475   3        CALL WRITE(@(SET_CUR,26H,33H),4);
```

```
3          CALL WRITE(@BUFFER,8);
3          CALL WRD$ASC(@BUFFER,@B_BASE_TIME);
3          CALL WRITE(@(SET_CUR,26H,3DH),4);
3          CALL WRITE(@BUFFER,8);

3          CALL WRD$ASC(@BUFFER,@A_CLO_TIME);
3          CALL WRITE(@(SET_CUR,28H,33H),4);
3          CALL WRITE(@BUFFER,8);

3          CALL WRD$ASC(@BUFFER,@B_CLO_TIME);
3          CALL WRITE(@(SET_CUR,28H,3DH),4);
3          CALL WRITE(@BUFFER,8);

3          CALL WRD$ASC(@BUFFER,@A_F1_TIME);
3          CALL WRITE(@(SET_CUR,2AH,33H),4);
3          CALL WRITE(@BUFFER,8);

3          CALL WRD$ASC(@BUFFER,@B_F1_TIME);
3          CALL WRITE(@(SET_CUR,2AH,3DH),4);
3          CALL WRITE(@BUFFER,8);

3          CALL WRD$ASC(@BUFFER,@A_F2_TIME);
3          CALL WRITE(@(SET_CUR,2CH,33H),4);
3          CALL WRITE(@BUFFER,8);

3          CALL WRD$ASC(@BUFFER,@B_F2_TIME);
3          CALL WRITE(@(SET_CUR,2CH,3DH),4);
3          CALL WRITE(@BUFFER,8);

3          CALL WRD$ASC(@BUFFER,@TOT_TIME);
3          CALL WRITE(@(SET_CUR,2EH,33H),4);
3          CALL WRITE(@BUFFER,8);

3          CALL WRD$ASC(@BUFFER,@U_PER_MIN);
3          CALL WRITE(@(SET_CUR,30H,33H),4);
3          CALL WRITE(@BUFFER,8);

3          CALL WRITE(@(SET_CUR,34H,35H),4);

3          BUFFER(0) = ' ';
3          DO WHILE BUFFER(0) <> CR;
4          NOBYTES = READ(@BUFFER,5);
4          END;

3      END;
2      END TIME_ANAL;

          /*  TEMPORARY IMAGE ACQUISITION ROUTINE  */
       $IF TARGET = 1
1      ACQ_IMAGE: PROCEDURE;
2      DO;
3      IF (RUN_FLAG = 07FH) THEN DO;
4      BUFFER(0) = ' ';
4      DO WHILE (BUFFER(0) <> '1' AND BUFFER(0) <> '2');
5      CALL WRITE(@IMGE_MSG,LENGTH(IMGE_MSG));
5      NOBYTES = READ(@BUFFER,5);
5      END;
4      IF BUFFER(0) = '1' THEN CALL SET_UP;
4      ELSE DO;
5      BUFFER(0) = ' ';
5      DO WHILE BUFFER(0) <> 'Y';
6      CALL WRITE(@(CLRSCRN),3);
6      DO WHILE (NOT(INPUT(PORT_C)) AND PIP) = 0;
7      END;
6      DO WHILE (NOT(INPUT(PORT_C)) AND PIP) <> 0;
7      END;
6      CALL FRAMEGRAB(030H);
6      PORT$A$REG = PORT$A$REG AND STROBE_OFF;
6      OUTPUT(PORT_A) = PORT$A$REG;
6      CALL WRITE(@('IMAGES OK? Y/N - '),17);
6      NOBYTES = READ(@BUFFER,5);
6      END;
5      END;  /* ELSE DO */
4      END;
3      END;
2      END ACQ_IMAGE;
       $ELSEIF TARGET = 0
       ACQ_IMAGE: PROCEDURE;
       DO;
       BUFFER(0) = ' ';
       DO WHILE BUFFER(0) <> 'Y';
       OUTPUT(13H) = 3;
       CALL WRITE(@('IMAGES OK? Y/N - '),17);
       NOBYTES = READ(@BUFFER,5);
       OUTPUT(13H) = 0;
       END;
       END;
```

```
              END ACQ_IMAGE;
              $ENDIF

              /*  INIT CURSOR TABLE ROUTINE TO ZERO CURSOR TABLE  */
540    1      INIT_CUR: PROCEDURE(TABLE_PTR) PUBLIC;
541    2          DCL TABLE_PTR   POINTER;
542    2          DCL (TABLE BASED TABLE_PTR) (24) WORD;
543    2          DCL I WORD;
544    2      DO I = 0 TO 23;
545    3          TABLE(I) = 0;
546    3      END;
547    2      END INIT_CUR;

              /*  PROCEDURE TO TRANSFER IMAGES BETWEEN DATACUBE BOARDS  */

548    1      TRANS_IMAGE: PROCEDURE(IFLAG) PUBLIC;
549    2      DCL IFLAG              BYTE;
550    2      DCL THIS_IMAGE         BYTE;
551    2      DCL ADJ_IMAGE          BYTE;
552    2      DCL (I,J)              WORD;
553    2      DO;
              /* SET UP PROPER POINTERS TO IMAGE PLANES */
554    3          IF IFLAG = 0 THEN
555    3          DO;
556    4              THIS_IMAGE = 010H;
557    4              ADJ_IMAGE  = 020H;
558    4          END;
559    3          ELSE
                  DO;
560    4              THIS_IMAGE = 020H;
561    4              ADJ_IMAGE  = 010H;
562    4          END;
              /*  INITIALIZE DATA CUBE BOARDS  */
563    3          OUTPUT(HOZ_ADD_LO + THIS_IMAGE) = 0;
564    3          OUTPUT(HOZ_ADD_LO + ADJ_IMAGE)  = 0;
565    3          OUTPUT(HOZ_ADD_HI + THIS_IMAGE) = 0;
566    3          OUTPUT(HOZ_ADD_HI + ADJ_IMAGE)  = 0;
567    3          OUTPUT(VERT_ADD + THIS_IMAGE) = 0;
568    3          OUTPUT(VERT_ADD + ADJ_IMAGE)  = 0;
569    3          OUTPUT(COMMD_REG + THIS_IMAGE) = POST_INC_READ;
570    3          OUTPUT(COMMD_REG + ADJ_IMAGE)  = POST_INC_WRITE;

              /*  TRANSFER IMAGE  */
571    3          DO I = 1 TO 320;
572    4              DO J = 1 TO 240;
573    5              OUTPUT(DATA_REG + ADJ_IMAGE) = INPUT(DATA_REG + THIS_IMAGE);
574    5              END;
575    4          END;
576    3      END;
577    2      END TRANS_IMAGE;


              /*  MEASURE ROUTINE  */
578    1      MEASURE: PROCEDURE;
579    2      DO;
580    3          IF RUN_FLAG = 07FH THEN DO;
582    4          CALL WRITE(@MSG4,LENGTH(MSG4));

              /*      SELECT IMAGE         */

583    4                  IF LABEL_FLAG=0 THEN IMAGF=F_IMG;
585    4                              ELSE IMAGF=B_IMG;

              /*      HOME AND MOVE CURSOR TO POINT OF INTEREST   */
586    4                  CALL INIT_CUR(@CURS_LOC);
587    4                  CALL WRITE(@MSG6,LENGTH(MSG6));
588    4                  CALL WRITE(@(CR,LF,'PRESS USER 1 WHEN READY. '),26);
589    4                  CRLF;
590    4                  CFUNC=IMAGF OR CUR1 OR HOMC;
591    4                  CALL CURSOR_ROUTINE(@CURS_LOC,CFUNC);
592    4                  CFUNC=IMAGF OR CUR1 OR MOVC OR ENAX OR ENAY;
593    4                  CALL CURSOR_ROUTINE(@CURS_LOC,CFUNC);

              /*      MOVE CURSOR TO ENDING POINT         */

594    4                  CALL TIMER(15000);
595    4                  IF IMAGF=0  THEN CTABLE_OFF=0;
597    4                              ELSE CTABLE_OFF=10H;
598    4                  CALL WRITE(@MSG7,LENGTH(MSG7));
599    4                  CALL WRITE(@(CR,LF,'PRESS USER 1 WHEN READY. '),26);
600    4                  CRLF;
601    4                  CURS_LOC(2+CTABLE_OFF)=CURS_LOC(CTABLE_OFF);
602    4                  CURS_LOC(3+CTABLE_OFF)=CURS_LOC(CTABLE_OFF+1);
603    4                  CFUNC = IMAGF OR CUR2 OR ENAX OR ENAY OR MOVC;
604    4                  CALL CURSOR_ROUTINE(@CURS_LOC,CFUNC);

              /*      COMPUTE HOR AND VERT DISTANCES  */
```

```
605  4              HOR_DIST=CURS_LOC(CTABLE_OFF+1)-CURS_LOC(CTABLE_OFF+3);
606  4              PARAM1=IABS(INT(HOR_DIST));
607  4              HOR_DIST=UNSIGN(PARAM1);
608  4              VERT_DIST=CURS_LOC(2+CTABLE_OFF)-CURS_LOC(CTABLE_OFF);
609  4              PARAM1=IABS(INT(VERT_DIST));
610  4              VERT_DIST=UNSIGN(PARAM1);

611  4       IF HOR_DIST > VERT_DIST THEN
612  4       DO;
613  5               CURS_LOC(2 + CTABLE_OFF) = CURS_LOC(0 + CTABLE_OFF);
614  5               VERT_DIST = 0;
615  5       END;
616  4       ELSE
             DO;
617  5              CURS_LOC(3 + CTABLE_OFF) = CURS_LOC(1 + CTABLE_OFF);
618  5              HOR_DIST = 0;
619  5       END;
          /*      DISPLAY DISTANCE MEASURMENT      */

620  4              CALL WRITE(@(CLRSCRN,CR,LF,'HORIZONTAL MEASUREMENT ='),29);
621  4              CALL WRD$ASC(@BUFFER,@HOR_DIST);
622  4              CALL WRITE(@BUFFER,8);
623  4              CALL WRITE(@(CR,LF,'VERTICAL MEASUREMENT ='),24);
624  4              CALL WRD$ASC(@BUFFER,@VERT_DIST);
625  4              CALL WRITE(@BUFFER,8);

          /*      DETERMINE IF GRADIENT PROFILE IS WANTED      */

626  4              CALL WRITE(@MSG8,LENGTH(MSG8));
627  4              NOBYTES=READ(@BUFFER,8);
628  4              PARAM1=INT(BUFFER(0)-59H);
629  4              IF PARAM1=0 THEN
630  4              DO;
          /*  CALL WRITE(@(CR,LF,'ENTER GRADIENT SIZE -'),23);
                NOBYTES=READ(@BUFFER,8);
                PARAM1=INT(BUFFER(0)-30H);  */
631  5              SIZE=1;
632  5              J=DOUBLE(IMAGF);
633  5              CALL GRAD_PROFILE(@CURS_LOC,@J,@SIZE);
634  5              END;
635  4        END;
636  3        CALL P_MENU,
637  3        END;
638  2     END MEASURE;

639  1     DO_TALLY: PROCEDURE;
640  2     PRINT_ENABLE = OH;
641  2     CALL TALLY;
642  2         CALL P_MENU;
643  2     END DO_TALLY;

644  1     PRM_ALT: PROCEDURE;
645  2     PRINT_ENABLE = OH;
646  2     CALL ALTER_PARAM;
647  2     CALL P_MENU;
648  2     END PRM_ALT;

649  1     TCH_FEATURE_1: PROCEDURE;
650  2     DO;
651  3         IF RUN_FLAG = 07FH THEN DO;
653  4         FEATURE_INDEX = 0;
654  4         CALL WRITE(@(CLRSCRN,'DO YOU WISH TO DEFINE FEATURE 1? Y/N - '),42);
655  4         NOBYTES = READ(@BUFFER,5);
656  4         IF BUFFER(0) = 'Y' THEN
657  4         DO;
658  5             CALL DEFINE_FEATURE;
659  5             END;
660  4         ELSE
             DO;
661  5             FEATURE_OFFSETS(PROD_PTR + FEATURE_INDEX).FEATURE_FLAG =
                 0;
662  5             END;
663  4         END;
664  3         END;
665  2     END TCH_FEATURE_1;


666  1     TCH_FEATURE_2: PROCEDURE;
667  2     DO;
668  3         IF RUN_FLAG = 07FH THEN DO;
670  4         FEATURE_INDEX = 20;
671  4         CALL WRITE(@(CLRSCRN,'DO YOU WISH TO DEFINE FEATURE 2? Y/N - '),42);
672  4         NOBYTES = READ(@BUFFER,5);
673  4         IF BUFFER(0) = 'Y' THEN
674  4         DO;
675  5             CALL DEFINE_FEATURE;
676  5             END;
677  4         ELSE
```

```
          DO;
5             FEATURE_OFFSETS(PROD_PTR + FEATURE_INDEX).FEATURE_FLAG =
              0;
5             END;
4         END;
3         END;
2     END TCH_FEATURE_2;


1     DEFINE_FEATURE: PROCEDURE;
2     DO;
3         CALL WRITE(@FEATURE_MESS,LENGTH(FEATURE_MESS));
3         NOBYTES = READ(@BUFFER,5);
3         J = DOUBLE(BUFFER(0) - 31H);
3         IF J < 3 THEN DO;
4             DO CASE J;
5             DO;
6                 FEATURE_OFFSETS(PROD_PTR + FEATURE_INDEX).FEATURE_FLAG = 010H;
6                 CALL DEF_DISTANCE;
6                 END;
5             DO;
6                 FEATURE_OFFSETS(PROD_PTR + FEATURE_INDEX).FEATURE_FLAG = 020H;
6                 CALL DEF_SIGNATURE;
6                 END;
6             DO; FEATURE_OFFSETS(PROD_PTR + FEATURE_INDEX).FEATURE_FLAG = 030H;
6                 CALL DEF_GRAD_COUNT;
6                 END;
5             END;
4         END;
3     END;
2     END DEFINE_FEATURE;
      $IF TARGET = 1
      /*  RUN ROUTINE  */
1     RUN: PROCEDURE;
2     ENABLE;
2     RUN_FLAG = 0;
2     NO_B_FLAG = 0;
2     CALL INIT_EJ_BUFFER;
2     CALL P_MENU;
2     PORT$A$REG=PORT$A$REG OR SYS_ON;
2     OUTPUT(PORT_A)=PORT$A$REG;
2     END RUN;
      $ELSEIF TARGET = 0
      RUN: PROCEDURE;
      CALL ACQ_IMAGE;
      PKG_SUM = PKG_SUM + 1;
      NO_B_FLAG = 0;
      IF (PROD_FLAG(PROD_NUM).A_FLAG = 7FH) THEN DO;
      LABEL_FLAG = 0;
      PROD_PTR = ((PROD_NUM - 1) * 2);
      CALL LOC_PACKAGE;
      CALL LOC_CLOSURE;
      IF (LABEL_OFFSETS(PROD_PTR).LAB_AXIS <> 04FH) THEN CALL LOC_LABEL;
      ELSE CALL LOC_LABEL2;
      CALL LOC_FEATURE(1);
      CALL LOC_FEATURE(2);
      CALL EVAL_DATA;
      END;
      IF (PROD_FLAG(PROD_NUM).B_FLAG = 7FH) THEN DO;
      LABEL_FLAG = 1;
      PROD_PTR = ((PROD_NUM - 1) * 2) + 1;
      CALL LOC_PACKAGE;
      CALL LOC_CLOSURE;
      IF (LABEL_OFFSETS(PROD_PTR).LAB_AXIS <> 04FH) THEN CALL LOC_LABEL;
      ELSE CALL LOC_LABEL2;
      CALL LOC_FEATURE(1);
      CALL LOC_FEATURE(2);
      CALL EVAL_DATA;
      END;
      CALL WRITE(@('RETURN TO CONTINUE'),18);
      NOBYTES = READ(@BUFFER,3);

      END RUN;
      $ENDIF
2     DISABLE;
2     RUN_FLAG = 7FH;
2     CALL P_MENU;
2     PORT$A$REG=PORT$A$REG AND SYS_OFF;
2     OUTPUT(PORT_A)=PORT$A$REG;
2     END STOP_RUN;

      /*  PRODUCT SELECTION ROUTINE LEVEL 1  */
1     SELECT_PROD: PROCEDURE;
2     DCL I          WORD;
2     DO;
3     IF RUN_FLAG = 07FH THEN DO;
4     CALL WRITE(@(CLRSCRN),3);
```

```
          /* PRINT CURRENT PRODUCT NAMES */
729   4   DO I = 1 TO 10;
730   5       CALL WRD$ASC(@BUFFER,@I);
731   5       CALL WRITE(@BUFFER(4),3);
732   5       CALL WRITE(@(' = '),3);
733   5       CALL WRITE(@PROD_NAM_TBL(I-1).NAM_BUFFER(0),20);
734   5       CRLF;
735   5   END;
736   4   PROD_NUM = 1;
737   4   TEMP_1 = 0;
738   4   DO WHILE (TEMP_1 < 1 OR TEMP_1 > 10);
739   5   CALL WRITE(@(SET_CUR,2BH,22H),4);
740   5   CALL WRITE(@('SELECT PRODUCT NO. -      '),25);
741   5   CALL WRITE(@(SET_CUR,2BH,37H),4);

          /* GET SELECTION */
742   5   NOBYTES = READ(@BUFFER,6);

          /* CONVERT FROM ASCII TO WORD VALUE */
743   5   CALL ASC$WRD(@BUFFER,@TEMP_1);
744   5   END;  /* DO WHILE */
745   4   PROD_NUM = TEMP_1;
746   4   END;
747   3   CALL P_MENU;
748   3   END;
749   2   END SELECT_PROD;


          /* MAIN ROUTINE FOR TEACHING PRODUCT PARAMETERS */
750   1   TEACH: PROCEDURE;
751   2   DO WHILE 1;

752   3   PRINT_ENABLE = 0H;
          /* DISPLAY TEACH MENU */
753   3   CALL WRITE(@TEACH_MENU,LENGTH(TEACH_MENU));

          /* GET MENU SELECTION */
754   3   NOBYTES = READ(@BUFFER,5);
755   3   CRLF;

          /* LOOK FOR CR */

756   3   IF BUFFER(0) <> CR THEN DO;
          /* CONVERT TO NUMBER */
758   4   CALL ASC$WRD(@BUFFER,@TEACH_PTR);
759   4   TEACH_PTR=TEACH_PTR - 1;

          /* MAKE SURE NUMBER IS VALID */
760   4   IF TEACH_PTR < 10 THEN
761   4   DO;

          /* SET UP INDIRECT POINTER FOR CALL */
762   5   TEACH_CALL = TEACH_TBL(TEACH_PTR);
          /* CALL PROPER SERVICE ROUTINE */
763   5   CALL TEACH_CALL;
764   5   IF (BUFFER(0) = 'Q' AND RUN_FLAG = 07FH) THEN DO;
766   6       IF LABEL_FLAG = 0 THEN CALL TRANS_IMAGE(1);
768   6       ELSE CALL TRANS_IMAGE(0);
769   6       END;
770   5   END;
771   4   ELSE DO;
772   5   CALL P_MENU;
773   5       RETURN;
774   5       END;
775   4   END;
776   3   END; /* DO WHILE 1*/
777   2   END TEACH;


          /* PROCEDURE TO ALLOW TEACHING PRODUCT NAME AND SELECTING IMAGE FOR TEACH */

778   1   TEACH_NAM: PROCEDURE;
779   2   DCL I WORD;
780   2   DO;
781   3   IF RUN_FLAG = 07FH THEN DO;
783   4   CALL WRITE(@(CLRSCRN),3);
          /* DISPLAY CURRENT PRODUCT NAME */
784   4   CALL WRITE(@('PRODUCT NAME NOW IS '),20);
785   4   CALL WRITE(@PROD_NAM_TBL(PROD_NUM - 1).NAM_BUFFER(0),20);
786   4   CRLF;
787   4   CALL WRITE(@('DO YOU WISH TO CHANGE THIS NAME Y/N - '),37);
788   4   NOBYTES = READ(@BUFFER,5);
789   4   IF BUFFER(0) = 'Y' THEN
790   4   DO;

          /* IF NAME IS TO BE CHANGED, BLANK OUT OLD NAME */
791   5   DO I = 0 TO 19;
792   6   PROD_NAM_TBL(PROD_NUM - 1).NAM_BUFFER(I) = ' ';
```

```
793   6      BUFFER(I) = ' ';
794   6      END;
795   5      CRLF;
796   5      CALL WRITE(@('ENTER NEW PRODUCT NAME 1 TO 20 CHARS'),36);

             /*  DISPLAY 20 CHARACTER DELIMITERS  */
797   5      CALL WRITE(@NAM_CHNG,LENGTH(NAM_CHNG));

             /* GET NEW NAME */
798   5      NOBYTES = READ(@BUFFER,24);

             /* STORE NEW NAME IN NAME TABLE WITHOUT CARRIAGE RETURN */
799   5      DO I = 0 TO 19;
800   6          IF BUFFER(I) <> ODH AND BUFFER(I) <> OAH THEN
801   6          PROD_NAM_TBL(PROD_NUM - 1).NAM_BUFFER(I) = BUFFER(I);
802   6          END;
803   5      END;
804   4      CRLF;
             /*  SET LABEL FLAG IN PROD_FLAG TABLE  */
805   4      BUFFER(O) = ' ';
806   4      DO WHILE (BUFFER(O) <> 'Y' AND BUFFER(O) <> 'N');
807   5      CALL WRITE(@(CR,LF,'ENABLE LABEL A? Y/N - '),24);
808   5      NOBYTES = READ(@BUFFER,5);
809   5      END;
810   4      IF BUFFER(O) = 'Y' THEN PROD_FLAG(PROD_NUM).A_FLAG = 7FH;
812   4          ELSE PROD_FLAG(PROD_NUM).A_FLAG = O;
813   4      BUFFER(O) = ' ';
814   4      DO WHILE (BUFFER(O) <> 'Y' AND BUFFER(O) <> 'N');
815   5      CALL WRITE(@(CR,LF,LF,'ENABLE LABEL B? Y/N - '),25);
816   5      NOBYTES = READ(@BUFFER,5);
817   5      END;
818   4      IF BUFFER(O) = 'Y' THEN PROD_FLAG(PROD_NUM).B_FLAG = 7FH;
820   4          ELSE PROD_FLAG(PROD_NUM).B_FLAG = O;

             /* SELECT A OR B LABEL TO TEACH  */
821   4      CRLF;
822   4      CALL WRITE(@('ENTER LABEL IMAGE A OR B - '),27);
823   4      NOBYTES = READ(@BUFFER,5);
824   4      LABEL_FLAG = BUFFER(O) - 'A';

             /* DETERIMINE PRODUCT POINTER */
825   4      PROD_PTR = (PROD_NUM - 1) * 2 + DOUBLE(LABEL_FLAG);
826   4      CRLF;

             /* STORE IMAGE BEING TAUGHT ON OPPOSITE IMAGE PLANE */
827   4      CALL TRANS_IMAGE(LABEL_FLAG);
828   4      END;
829   3      END;
830   2      END TEACH_NAM;

             /*  PROCEDURE TO TEACH TOLERANCES  */

831   1      TCH_TOLERANCES: PROCEDURE;
832   2      DCL TPROD_PTR   WORD;
833   2      DCL TLABEL_FLAG BYTE;

834   2      DO;

835   3      CALL WRITE(@(CLRSCRN,'ENTER LABEL A OR B. - '),25);
836   3      BUFFER(O) = ' ';
837   3      DO WHILE (BUFFER(O) <> 'A' AND BUFFER(O) <> 'B');
838   4      NOBYTES = READ(@BUFFER,5);
839   4      END;

840   3      TLABEL_FLAG = BUFFER(O) - 'A';

841   3      CALL WRITE(@TOL_MSG,LENGTH(TOL_MSG));
842   3      CALL WRITE(@TOL_MSG_A,LENGTH(TOL_MSG_A));
843   3      CALL WRD$ASC(@BUFFER,@PROD_NUM);
844   3      CALL WRITE(@(SET_CUR,20H,3CH),4);
845   3      IF TLABEL_FLAG = O THEN BUFFER(8) = 'A';
847   3          ELSE BUFFER(8) = 'B';
848   3      CALL WRITE(@BUFFER,9);
849   3      TPROD_PTR = ((PROD_NUM - 1) * 2) + DOUBLE(TLABEL_FLAG);
850   3      I = TOLERANCE_TBL(TPROD_PTR).PACKAGE_WIDTH;
851   3      CALL WRD$ASC(@BUFFER,@I);
852   3      CALL WRITE(@(SET_CUR,22H,38H),4);
853   3      CALL WRITE(@BUFFER,8);
854   3      I = TOLERANCE_TBL(TPROD_PTR).CLOSURE_WIDTH;
855   3      CALL WRD$ASC(@BUFFER,@I);
856   3      CALL WRITE(@(SET_CUR,23H,38H),4);
857   3      CALL WRITE(@BUFFER,8);
858   3      I = TOLERANCE_TBL(TPROD_PTR).CLOSURE_ELEV;
859   3      CALL WRD$ASC(@BUFFER,@I);
860   3      CALL WRITE(@(SET_CUR,24H,38H),4);
861   3      CALL WRITE(@BUFFER,8);
862   3      I = TOLERANCE_TBL(TPROD_PTR).CLOSURE_CENTER;
863   3      CALL WRD$ASC(@BUFFER,@I);
```

```
864   3      CALL WRITE(@(SET_CUR,25H,38H),4);
865   3      CALL WRITE(@BUFFER,8);
866   3      I = TOLERANCE_TBL(TPROD_PTR).CLOSURE_SKEW;
867   3      CALL WRD$ASC(@BUFFER,@I);
868   3      CALL WRITE(@(SET_CUR,26H,38H),4);
869   3      CALL WRITE(@BUFFER,8);
870   3      I = TOLERANCE_TBL(TPROD_PTR).LABEL_WIDTH;
871   3      CALL WRD$ASC(@BUFFER,@I);
872   3      CALL WRITE(@(SET_CUR,27H,38H),4);
873   3      CALL WRITE(@BUFFER,8);
874   3      I = TOLERANCE_TBL(TPROD_PTR).LABEL_ELEV;
875   3      CALL WRD$ASC(@BUFFER,@I);
876   3      CALL WRITE(@(SET_CUR,28H,38H),4);
877   3      CALL WRITE(@BUFFER,8);
878   3      I = TOLERANCE_TBL(TPROD_PTR).LABEL_CENTER;
879   3      CALL WRD$ASC(@BUFFER,@I);
880   3      CALL WRITE(@(SET_CUR,29H,38H),4);
881   3      CALL WRITE(@BUFFER,8);
882   3      I = TOLERANCE_TBL(TPROD_PTR).LABEL_SKEW;
883   3      CALL WRD$ASC(@BUFFER,@I);
884   3      CALL WRITE(@(SET_CUR,2AH,38H),4);
885   3      CALL WRITE(@BUFFER,8);
886   3      I = TOLERANCE_TBL(TPROD_PTR).FEATURE_1;
887   3      CALL WRD$ASC(@BUFFER,@I);
888   3      CALL WRITE(@(SET_CUR,2BH,38H),4);
889   3      CALL WRITE(@BUFFER,8);
890   3      I = TOLERANCE_TBL(TPROD_PTR).FEATURE_2;
891   3      CALL WRD$ASC(@BUFFER,@I);
892   3      CALL WRITE(@(SET_CUR,2CH,38H),4);
893   3      CALL WRITE(@BUFFER,8);

894   3      CALL WRITE(@(SET_CUR,2FH,3CH),4);
895   3      I = 0;
896   3      BUFFER(0) = ' ';
897   3      DO WHILE BUFFER(0) <> 'Q';
898   4      NOBYTES = READ(@BUFFER,5);
899   4      IF (BUFFER(0) <> 'Q' AND BUFFER(0) <> CR) THEN DO;
901   5      IF (BUFFER(0) = 'R') THEN DO;
903   6          IF (BUFFER(1) >= '0' AND BUFFER(1) <= '9')THEN DO;
905   7          BUFFER(0) = '0';
906   7          CALL ASC$WRD(@BUFFER,@I);
907   7          END;
908   6          ELSE I = 0;
909   6          TOLERANCE_TBL(TPROD_PTR).PACKAGE_WIDTH = I;
910   6          TOLERANCE_TBL(TPROD_PTR).CLOSURE_WIDTH = I;
911   6          TOLERANCE_TBL(TPROD_PTR).CLOSURE_ELEV = I;
912   6          TOLERANCE_TBL(TPROD_PTR).CLOSURE_CENTER = I;
913   6          TOLERANCE_TBL(TPROD_PTR).CLOSURE_SKEW = I;
914   6          TOLERANCE_TBL(TPROD_PTR).LABEL_WIDTH = I;
915   6          TOLERANCE_TBL(TPROD_PTR).LABEL_ELEV = I;
916   6          TOLERANCE_TBL(TPROD_PTR).LABEL_CENTER = I;
917   6          TOLERANCE_TBL(TPROD_PTR).LABEL_SKEW = I;
918   6          TOLERANCE_TBL(TPROD_PTR).FEATURE_1 = I;'
919   6          TOLERANCE_TBL(TPROD_PTR).FEATURE_2 = I;
920   6      I = TOLERANCE_TBL(TPROD_PTR).PACKAGE_WIDTH;
921   6      CALL WRD$ASC(@BUFFER,@I);
922   6      CALL WRITE(@(SET_CUR,22H,38H),4);
923   6      CALL WRITE(@BUFFER,8);
924   6      I = TOLERANCE_TBL(TPROD_PTR).CLOSURE_WIDTH;
925   6      CALL WRD$ASC(@BUFFER,@I);
926   6      CALL WRITE(@(SET_CUR,23H,38H),4);
927   6      CALL WRITE(@BUFFER,8);
928   6      I = TOLERANCE_TBL(TPROD_PTR).CLOSURE_ELEV;
929   6      CALL WRD$ASC(@BUFFER,@I);
930   6      CALL WRITE(@(SET_CUR,24H,38H),4);
931   6      CALL WRITE(@BUFFER,8);
932   6      I = TOLERANCE_TBL(TPROD_PTR).CLOSURE_CENTER;
933   6      CALL WRD$ASC(@BUFFER,@I);
934   6      CALL WRITE(@(SET_CUR,25H,38H),4);
935   6      CALL WRITE(@BUFFER,8);
936   6      I = TOLERANCE_TBL(TPROD_PTR).CLOSURE_SKEW;
937   6      CALL WRD$ASC(@BUFFER,@I);
938   6      CALL WRITE(@(SET_CUR,26H,38H),4);
939   6      CALL WRITE(@BUFFER,8);
940   6      I = TOLERANCE_TBL(TPROD_PTR).LABEL_WIDTH; ,
941   6      CALL WRD$ASC(@BUFFER,@I);
942   6      CALL WRITE(@(SET_CUR,27H,38H),4);
943   6      CALL WRITE(@BUFFER,8);
944   6      I = TOLERANCE_TBL(TPROD_PTR).LABEL_ELEV;
945   6      CALL WRD$ASC(@BUFFER,@I);
946   6      CALL WRITE(@(SET_CUR,28H,38H),4);
947   6      CALL WRITE(@BUFFER,8);
948   6      I = TOLERANCE_TBL(TPROD_PTR).LABEL_CENTER;
949   6      CALL WRD$ASC(@BUFFER,@I);
950   6      CALL WRITE(@(SET_CUR,29H,38H),4);
951   6      CALL WRITE(@BUFFER,8);
952   6      I = TOLERANCE_TBL(TPROD_PTR).LABEL_SKEW;
953   6      CALL WRD$ASC(@BUFFER,@I);
```

```
6       CALL WRITE(@(SET_CUR,2AH,38H),4);
6       CALL WRITE(@BUFFER,8);
6       I = TOLERANCE_TBL(TPROD_PTR).FEATURE_1;
6       CALL WRD$ASC(@BUFFER,@I);
6       CALL WRITE(@(SET_CUR,2BH,38H),4);
6       CALL WRITE(@BUFFER,8);
6       I = TOLERANCE_TBL(TPROD_PTR).FEATURE_2;
6       CALL WRD$ASC(@BUFFER,@I);
6       CALL WRITE(@(SET_CUR,2CH,38H),4);
6       CALL WRITE(@BUFFER,8);
6       CALL WRITE(@(SET_CUR,2FH,3CH,'         '),12);
6       CALL WRITE(@(SET_CUR,2FH,3CH),4);
6       END;
5       ELSE DO;
6       CALL ASC$WRD(@BUFFER,@I);
6       IF (I > 0 AND I < 12) THEN DO;
7       I = I - 1;
7       J = 0;
7       BUFFER(0) = CR;
7       DO WHILE BUFFER(0) = CR;
8       CALL WRITE(@(SET_CUR,32H,20H,'ENTER NEW VALUE - '),22);
8       NOBYTES = READ(@BUFFER,8);
8       IF BUFFER(0) <> CR THEN DO;
9       CALL ASC$WRD(@BUFFER,@J);
9       DO CASE I;
10          DO;
11          TOLERANCE_TBL(TPROD_PTR).PACKAGE_WIDTH = J;
11          CALL WRD$ASC(@BUFFER,@J);
11          CALL WRITE(@(SET_CUR,22H,38H),4);
11          CALL WRITE(@BUFFER,8);
11          CALL WRITE(@(SET_CUR,2FH,3CH,'         '),12);
11          CALL WRITE(@(SET_CUR,32H,20H,'                         '),30);
11          CALL WRITE(@(SET_CUR,2FH,3CH),4);
11          END;
10          DO;
11          TOLERANCE_TBL(TPROD_PTR).CLOSURE_WIDTH = J;
11          CALL WRD$ASC(@BUFFER,@J);
11          CALL WRITE(@(SET_CUR,23H,38H),4);
11          CALL WRITE(@BUFFER,8);
11          CALL WRITE(@(SET_CUR,2FH,3CH,'         '),12);
11          CALL WRITE(@(SET_CUR,32H,20H,'                         '),30);
11          CALL WRITE(@(SET_CUR,2FH,3CH),4);
11          END;
10          DO;
11          TOLERANCE_TBL(TPROD_PTR).CLOSURE_ELEV = J;
11          CALL WRD$ASC(@BUFFER,@J);
11          CALL WRITE(@(SET_CUR,24H,38H),4);
11          CALL WRITE(@BUFFER,8);
11          CALL WRITE(@(SET_CUR,2FH,3CH,'         '),12);
11          CALL WRITE(@(SET_CUR,32H,20H,'                         '),30);
11          CALL WRITE(@(SET_CUR,2FH,3CH),4);
11          END;
10          DO;
11          TOLERANCE_TBL(TPROD_PTR).CLOSURE_CENTER = J;
11          CALL WRD$ASC(@BUFFER,@J);
11          CALL WRITE(@(SET_CUR,25H,38H),4);
11          CALL WRITE(@BUFFER,8);
11          CALL WRITE(@(SET_CUR,2FH,3CH,'         '),12);
11          CALL WRITE(@(SET_CUR,32H,20H,'                         '),30);
11          CALL WRITE(@(SET_CUR,2FH,3CH),4);
11          END;
10          DO;
11          TOLERANCE_TBL(TPROD_PTR).CLOSURE_SKEW = J;
11          CALL WRD$ASC(@BUFFER,@J);
11          CALL WRITE(@(SET_CUR,26H,38H),4);
11          CALL WRITE(@BUFFER,8);
11          CALL WRITE(@(SET_CUR,2FH,3CH,'         '),12);
11          CALL WRITE(@(SET_CUR,32H,20H,'                         '),30);
11          CALL WRITE(@(SET_CUR,2FH,3CH),4);
11          END;
10          DO;
11          TOLERANCE_TBL(TPROD_PTR).LABEL_WIDTH = J;
11          CALL WRD$ASC(@BUFFER,@J);
11          CALL WRITE(@(SET_CUR,27H,38H),4);
11          CALL WRITE(@BUFFER,8);
11          CALL WRITE(@(SET_CUR,2FH,3CH,'         '),12);
11          CALL WRITE(@(SET_CUR,32H,20H,'                         '),30);
11          CALL WRITE(@(SET_CUR,2FH,3CH),4);
11          END;
10          DO;
11          TOLERANCE_TBL(TPROD_PTR).LABEL_ELEV = J;
11          CALL WRD$ASC(@BUFFER,@J);
11          CALL WRITE(@(SET_CUR,28H,38H),4);
11          CALL WRITE(@BUFFER,8);
11          CALL WRITE(@(SET_CUR,2FH,3CH,'         '),12);
11          CALL WRITE(@(SET_CUR,32H,20H,'                         '),30);
11          CALL WRITE(@(SET_CUR,2FH,3CH),4);
11          END;
```

```
1044  10        DO;
1045  11        TOLERANCE_TBL(TPROD_PTR).LABEL_CENTER = J;
1046  11        CALL WRD$ASC(@BUFFER,@J);
1047  11        CALL WRITE(@(SET_CUR,29H,38H),4);
1048  11        CALL WRITE(@BUFFER,8);
1049  11        CALL WRITE(@(SET_CUR,2FH,3CH,'          '),12);
1050  11        CALL WRITE(@(SET_CUR,32H,20H,'                          '),30);
1051  11        CALL WRITE(@(SET_CUR,2FH,3CH),4);
1052  11        END;
1053  10        DO;
1054  11        TOLERANCE_TBL(TPROD_PTR).LABEL_SKEW = J;
1055  11        CALL WRD$ASC(@BUFFER,@J);
1056  11        CALL WRITE(@(SET_CUR,2AH,38H),4);
1057  11        CALL WRITE(@BUFFER,8);
1058  11        CALL WRITE(@(SET_CUR,2FH,3CH,'          '),12);
1059  11        CALL WRITE(@(SET_CUR,32H,20H,'                          '),30);
1060  11        CALL WRITE(@(SET_CUR,2FH,3CH),4);
1061  11        END;
1062  10        DO;
1063  11        TOLERANCE_TBL(TPROD_PTR).FEATURE_1 = J;
1064  11        CALL WRD$ASC(@BUFFER,@J);
1065  11        CALL WRITE(@(SET_CUR,2BH,38H),4);
1066  11        CALL WRITE(@BUFFER,8);
1067  11        CALL WRITE(@(SET_CUR,2FH,3CH,'          '),12);
1068  11        CALL WRITE(@(SET_CUR,32H,20H,'                          '),30);
1069  11        CALL WRITE(@(SET_CUR,2FH,3CH),4);
1070  11        END;
1071  10        DO;
1072  11        TOLERANCE_TBL(TPROD_PTR).FEATURE_2 = J;
1073  11        CALL WRD$ASC(@BUFFER,@J);
1074  11        CALL WRITE(@(SET_CUR,2CH,38H),4);
1075  11        CALL WRITE(@BUFFER,8);
1076  11        CALL WRITE(@(SET_CUR,2FH,3CH,'          '),12);
1077  11        CALL WRITE(@(SET_CUR,32H,20H,'                          '),30);
1078  11        CALL WRITE(@(SET_CUR,2FH,3CH),4);
1079  11        END;
1080  10    END; /* DO CASE */
1081   9    END;
1082   8    END;
1083   7    END;
1084   6    END;
1085   5    END;
1086   4    END; /* DO WHILE */
1087   3    END;
1088   2    END TCH_TOLERANCES;

1089   1    DSPL_WORK_TBL: PROCEDURE;

1090   2    DO;
1091   3    DCL L_FLAG      BYTE;

1092   3    BUFFER(0) = ' ';
1093   3    DO WHILE (BUFFER(0) <> '1' AND BUFFER(0) <> '2');
1094   4    CALL WRITE(@(CLRSCRN,'DISPLAY TIMING ANALYSIS  1',CR,LF,'OR WORK TABLE  2 '),48);
1095   4    NOBYTES = READ(@BUFFER,5);
1096   4    END;

1097   3    IF BUFFER(0) = '2' THEN DO;

1099   4    CALL WRITE(@(CLRSCRN,'ENTER LABEL A OR B - '),24);
1100   4    NOBYTES = READ(@BUFFER,5);

1101   4    IF (BUFFER(0) = 'A') THEN L_FLAG = 0;
1103   4        ELSE L_FLAG = 1;
1104   4    CALL WRITE(@WRK_MSG,LENGTH(WRK_MSG));
1105   4    CALL WRITE(@WRK_MSG_A,LENGTH(WRK_MSG_A));
1106   4    CALL WRD$ASC(@BUFFER,@PROD_NUM);
1107   4    CALL WRITE(@(SET_CUR,20H,3CH),4);
1108   4    IF L_FLAG = 0 THEN BUFFER(8) = 'A';
1110   4        ELSE BUFFER(8) = 'B';
1111   4    CALL WRITE(@BUFFER,9);
1112   4    I = WORK_TABLE(L_FLAG).PACKAGE_WIDTH;
1113   4    CALL WRD$ASC(@BUFFER,@I);
1114   4    CALL WRITE(@(SET_CUR,22H,36H),4);
1115   4    CALL WRITE(@BUFFER,8);
1116   4    I = WORK_TABLE(L_FLAG).PACKAGE_ELEV;
1117   4    CALL WRD$ASC(@BUFFER,@I);
1118   4    CALL WRITE(@(SET_CUR,23H,36H),4);
1119   4    CALL WRITE(@BUFFER,8);
1120   4    I = WORK_TABLE(L_FLAG).PACKAGE_CENTER;
1121   4    CALL WRD$ASC(@BUFFER,@I);
1122   4    CALL WRITE(@(SET_CUR,24H,36H),4);
1123   4    CALL WRITE(@BUFFER,8);
1124   4    I = WORK_TABLE(L_FLAG).CLOSURE_WIDTH;
1125   4    CALL WRD$ASC(@BUFFER,@I);
1126   4    CALL WRITE(@(SET_CUR,25H,36H),4);
1127   4    CALL WRITE(@BUFFER,8);
1128   4    I = WORK_TABLE(L_FLAG).CLOSURE_ELEV;
```

```
1129   4      CALL WRD$ASC(@BUFFER,@I);
1130   4      CALL WRITE(@(SET_CUR,26H,36H),4);
1131   4      CALL WRITE(@BUFFER,8);
1132   4      I = WORK_TABLE(L_FLAG).CLOSURE_CENTER;
1133   4      CALL WRD$ASC(@BUFFER,@I);
1134   4      CALL WRITE(@(SET_CUR,27H,36H),4);
1135   4      CALL WRITE(@BUFFER,8);
1136   4      II = WORK_TABLE(L_FLAG).CLOSURE_SKEW;
1137   4      CALL INT$ASC(@BUFFER,@II);
1138   4      CALL WRITE(@(SET_CUR,28H,36H),4);
1139   4      CALL WRITE(@BUFFER,8);
1140   4      I = WORK_TABLE(L_FLAG).LABEL_WIDTH;
1141   4      CALL WRD$ASC(@BUFFER,@I);
1142   4      CALL WRITE(@(SET_CUR,29H,36H),4);
1143   4      CALL WRITE(@BUFFER,8);
1144   4      I = WORK_TABLE(L_FLAG).LABEL_ELEV;
1145   4      CALL WRD$ASC(@BUFFER,@I);
1146   4      CALL WRITE(@(SET_CUR,2AH,36H),4);
1147   4      CALL WRITE(@BUFFER,8);
1148   4      I = WORK_TABLE(L_FLAG).LABEL_CENTER;
1149   4      CALL WRD$ASC(@BUFFER,@I);
1150   4      CALL WRITE(@(SET_CUR,2BH,36H),4);
1151   4      CALL WRITE(@BUFFER,8);
1152   4      II = WORK_TABLE(L_FLAG).LABEL_SKEW;
1153   4      CALL INT$ASC(@BUFFER,@II);
1154   4      CALL WRITE(@(SET_CUR,2CH,36H),4);
1155   4      CALL WRITE(@BUFFER,8);
1156   4      I = WORK_TABLE(L_FLAG).FEATURE_1;
1157   4      CALL WRD$ASC(@BUFFER,@I);
1158   4      CALL WRITE(@(SET_CUR,2DH,36H),4);
1159   4      CALL WRITE(@BUFFER,8);
1160   4      I = WORK_TABLE(L_FLAG).FEATURE_2;
1161   4      CALL WRD$ASC(@BUFFER,@I);
1162   4      CALL WRITE(@(SET_CUR,2EH,36H),4);
1163   4      CALL WRITE(@BUFFER,8);

1164   4      CALL WRITE(@(SET_CUR,30H,3CH),4);
1165   4      I = 0;
1166   4      NOBYTES = READ(@BUFFER,5);
1167   4      END;
1168   3      ELSE CALL TIME_ANAL;
1169   3      END;
1170   2      END DSPL_WORK_TBL;


              /*  PROCEDURE TO TEACH PACKAGE PHYSICAL DATA  */
1171   1      TCH_PACKAGE: PROCEDURE;
1172   2      DO;
1173   3      IF RUN_FLAG = 07FH  THEN CALL DEF_PACKAGE;
1175   3      END;
1176   2      END TCH_PACKAGE;

              /*   PROCEDURE TO DEFINE PACKAGE CLOSURE PHYSICAL DATA  */

1177   1      TCH_CLOSURE: PROCEDURE;

1178   2      DO;
1179   3      IF RUN_FLAG = 07FH THEN CALL DEF_CLOSURE;
1181   3      END;
1182   2      END TCH_CLOSURE;

1183   1      TCH_LABEL: PROCEDURE;
1184   2      DO;
1185   3      IF RUN_FLAG = 07FH THEN DO;
1187   4      BUFFER(0) = ' ';
1188   4      DO WHILE(BUFFER(0) <> '1' AND BUFFER(0) <> '2');
1189   5      CALL WRITE(@LABEL_MESS,LENGTH(LABEL_MESS));
1190   5      NOBYTES = READ(@BUFFER,5);
1191   5      END;
1192   4      IF (BUFFER(0) = '1') THEN CALL DEF_LABEL;
1194   4      ELSE CALL DEF_LABEL_2;
1195   4      END;
1196   3      END;
1197   2      END TCH_LABEL;

1198   1      REST_IMAGE: PROCEDURE;
1199   2      DO;
1200   3      IF RUN_FLAG = 07FH THEN DO;
1202   4          IF LABEL_FLAG = 0 THEN CALL TRANS_IMAGE(1);
1204   4              ELSE CALL TRANS_IMAGE(0);
1205   4          END;
1206   3      END;
1207   2      END REST_IMAGE;

              /*  MAIN PROGRAM STARTS HERE  */
1208   1      DO;
1209   2      CALL INIT_USART;
```

```
                $IF TARGET = 1
1210    2       PORT_A = 0C8H;
1211    2       PORT_B = 0CAH;
1212    2       PORT_C = 0CCH;
1213    2       OUTPUT(CMD$REG) = IO_SET;
1214    2       DISABLE;
1215    2       OUTPUT(INIT$REG) = ICW1;
1216    2       OUTPUT(INIT$CMD) = ICW2;
1217    2       OUTPUT(INIT$CMD) = ICW4;
1218    2       OUTPUT(INIT$CMD) = INIT$MASK;
1219    2       CALL SET$INTERRUPT(32,INT0);
                /* INITIALIZE DATA CUBES */
1220    2       OUTPUT(13H) = 3;
1221    2       OUTPUT(23H) = 3;
1222    2       OUTPUT(13H) = 0;
1223    2       OUTPUT(23H) = 0;
                $ELSEIF TARGET = 0
                PORT_A = 070H;
                PORT_B = 071H;
                PORT_C = 072H;
                OUTPUT(CMD$REG) = IO_SET;
                $ENDIF
1224    2       IF (INIT_FLAG <> 0A5H OR PROD_NUM > 10 OR PROD_NUM < 1) THEN DO;
1226    3           INIT_FLAG = 0A5H;
1227    3       CALL WRITE(@CAUTION,LENGTH(CAUTION));
1228    3       NOBYTES = READ(@BUFFER,5);
1229    3       PROD_NUM = 1;
1230    3       DO I = 0 TO 19;
1231    4           DO J = 0 TO 19;
1232    5               PROD_NAM_TBL(I) NAM_BUFFER(J) = ' ';
1233    5           END;
1234    4       END;
1235    3       END;

1236    2       RUN_FLAG = 07FH;
1237    2       CALL INIT_EJ_BUFFER;
1238    2       NO_B_FLAG = 0;
1239    2       CALL P_MENU;


1240    2       DO WHILE 1;

                /*  READ CHARACTER FROM KEY BOARD  */
1241    3       BUFFER(0) = (07FH AND INPUT(BC_DATA));

                /*  CHECK FOR PROPER CHARACTER RANGE  */
1242    3       IF (BUFFER(0) > '0' AND BUFFER(0) < '8') THEN DO;
                /*  ECHO CHARACTER  */
1244    4       CALL WRITE(@BUFFER,1);

                /*  WAIT FOR CARRIAGE RETURN TO EMULATE READ PROCEDURE  */
1245    4       BUFFER(1) = ' ';
1246    4       DO WHILE (BUFFER(1) <> CR);
1247    5           BUFFER(1) = (07FH AND INPUT(BC_DATA));
1248    5           END;

                /*  CALCULATE PROPER CALL VECTOR  */
1249    4       PROG_PTR = BUFFER(0) - 31H;
1250    4           PROG_CALL = SERV_TBL(PROG_PTR);
1251    4           CALL PROG_CALL;
1252    4           END;

                /*  CHECK FOR NEW ERRORS  */
1253    3       IF ER_FLAG = 07FH THEN DO;

                /*  PRINT ERROR CODE BUFFER  */
1255    4           CALL WRITE(@(SET_CUR,37H,20H),4);
1256    4           CALL WRITE(@EJ_BUFFER,39);
1257    4           CALL WRITE(@(SET_CUR,20H,32H),4);
1258    4           ER_FLAG = 0;
1259    4           END;
1260    3       END;
1261    2       END;
1262    1       END MAIN_MODULE;


MODULE INFORMATION:

     CODE AREA SIZE     = 2160H   8544D
     CONSTANT AREA SIZE = 0D95H   3477D
     VARIABLE AREA SIZE = 11E6H   4582D
     MAXIMUM STACK SIZE = 0030H     48D
     1784 LINES READ
     0 PROGRAM WARNINGS

     0 PROGRAM ERRORS
```

```
DICTIONARY SUMMARY:

     47KB MEMORY AVAILABLE
     24KB MEMORY USED   (51%)
     0KB DISK SPACE USED

END OF PL/M-86 COMPILATION


iRMX 86 PL/M-86 V2.3 COMPILATION OF MODULE DEF_LINE_SIG
OBJECT MODULE PLACED IN SOURCE/LINE_SIG.OBJ
COMPILER INVOKED BY:  :LANG:PLM86 SOURCE/LINE_SIG.PLM OPTIMIZE(3) ROM SET(TARGET=1)


               $INCLUDE(SOURCE/COPYRIGHT)
          =    /*

          =    *************************************************************************
          =    *                                                                       *
          =    *                                                                       *
          =    *                    COPYRIGHT CHESEBROUGH-POND'S INC.                  *
          =    *                                                                       *
          =    *                    (c) 1983, CHESEBROUGH-POND'S INC.                  *
          =    *                                                                       *
          =    *                                                                       *
          =    *                                                                       *
          =    *                                                                       *
          =    *      ALL RIGHTS RESERVED. NO PART OF THIS PROGRAM MAY BE REPRODUCED,  *
          =    *      TRANSMITTED, TRANSCRIBED, STORED IN A RETRIEVAL SYSTEM, OR       *
          =    *      TRANSLATED INTO ANY LANGUAGE OR COMPUTER LANGUAGE, IN ANY FORM   *
          =    *      OR BY ANY MEANS, ELECTRONIC, MECHANICAL, MAGNETIC, OPTICAL,      *
          =    *      CHEMICAL, MANUAL OR OTHERWISE, WITHOUT THE EXPRESS WRITTEN PER-  *
          =    *      MISSION OF CHESEBROUGH-POND'S INC., 33 BENEDICT PLACE, GREENWICH, *
          =    *      CONNECTICUT.                                                     *
          =    *                                                                       *
          =    *                                                                       *
          =    *************************************************************************

          =    */

               $TITLE(' DEFINE LINE SIG MODULE')
  1            DEF_LINE_SIG:
               DO;
               $INCLUDE(SOURCE/DECLARE.EXT)
  2   1   =    DECLARE      DCL      LITERALLY    'DECLARE';
  3   1   =    DECLARE      LIT      LITERALLY    'LITERALLY';
               $INCLUDE(SOURCE/XTERMHAND.EXT)
  4   1   =    INIT_USART: PROCEDURE EXTERNAL;
  5   2   =    END INIT_USART;
  6   1   =    WRITE: PROCEDURE(BUFFER_PTR,BLENGTH) EXTERNAL;
  7   2   =            DCL BUFFER_PTR  POINTER;
  8   2   =            DCL BLENGTH WORD;
  9   2   =    END WRITE;
 10   1   =    READ: PROCEDURE(BUFFER_PTR,BLENGTH)WORD EXTERNAL;
 11   2   =            DCL     BUFFER_PTR  POINTER;
 12   2   =            DCL     BLENGTH    WORD;
 13   2   =    END READ;
               $INCLUDE(SOURCE/IWCONV.EXT)
          =    $SAVE
          =    $NOLIST

               /*  VARIABLE DECLARATIONS PUBLIC  */
 35   1        DCL IGRAD             WORD EXTERNAL;
 36   1        DCL PARAM1            INTEGER EXTERNAL;
 37   1        DCL BUFFER (24)       BYTE EXTERNAL;
 38   1        DCL CURS_LOC (24)     WORD EXTERNAL;
 39   1        DCL CURS_LOC_2 (24)   WORD EXTERNAL;
 40   1        DCL NOBYTES           WORD EXTERNAL;
 41   1        DCL PROD_NUM          WORD EXTERNAL;
 42   1        DCL PROD_PTR          WORD EXTERNAL;
 43   1        DCL SIZE              WORD EXTERNAL;
 44   1        DCL CTABLE_OFF        WORD EXTERNAL;
 45   1        DCL VERT_CL           WORD EXTERNAL;
 46   1        DCL HOR_DIST          WORD EXTERNAL;
 47   1        DCL VERT_DIST         WORD EXTERNAL;
 48   1        DCL FEATURE_INDEX     WORD EXTERNAL;
 49   1        DCL LABEL_FLAG        BYTE EXTERNAL;
 50   1        DCL CFUNC             BYTE EXTERNAL;
 51   1        DCL IMAGF             BYTE EXTERNAL;
 52   1        DCL DIR_PTR           BYTE EXTERNAL;

               /* LOCAL VARIABLE DECLARATIONS */
 53   1        DCL (I,J,TTHRESH)     WORD;
 54   1        DCL CENTER1           WORD;
 55   1        DCL CENTER2           WORD;
```

```
        /* LITERALL DECLARATIONS  */
1       DCL CAMERA_ON        LIT     '03H';
1       DCL CAMERA_OFF       LIT     '00H';
1       DCL DATA_REG         LIT     '00H';
1       DCL COMMD_REG        LIT     '03H';
1       DCL HOZ_ADD_LO       LIT     '04H';
1       DCL HOZ_ADD_HI       LIT     '05H';
1       DCL VERT_ADD         LIT     '06H';
1       DCL POST_INC_READ    LIT     '01H';
1       DCL POST_INC_WRITE   LIT     '02H';
1       DCL CLRSCRN          LIT     '1BH,6AH,0CH';
1       DCL SET_CUR          LIT     '1BH,59H';
1       DCL ESC              LIT     '1BH';
1       DCL CRLF             LIT     'CALL WRITE(@(13,10),2)';
1       DCL CR               LIT     '0DH';
1       DCL LF               LIT     '0AH';
1       DCL RESTC            LIT     '00H';
1       DCL DISC             LIT     '03H';
1       DCL MOVC             LIT     '02H';
1       DCL CUR1             LIT     '00H';
1       DCL CUR2             LIT     '04H';
1       DCL CUR3             LIT     '08H';
1       DCL CUR4             LIT     '0CH';
1       DCL HOMC             LIT     '01H';
1       DCL ENAX             LIT     '010H';
1       DCL ENAY             LIT     '020H';
1       DCL F_IMG            LIT     '00H';
1       DCL B_IMG            LIT     '040H';

1       DCL PROD_NAM_TBL (20) STRUCTURE(NAM_BUFFER(20) BYTE) EXTERNAL;

        $INCLUDE(SOURCE/OFFSETS.LIB)
     =  $SAVE
     =  $NOLIST
        /* EXTERNAL PROCEDURE DECLARATIONS  */

1       CURSOR_ROUTINE: PROCEDURE(CURSOR_TABLE,FUNCT) EXTERNAL;
2           DCL CURSOR_TABLE     POINTER;
2           DCL FUNCT            BYTE;
2       END CURSOR_ROUTINE;

1       GRAD_PROFILE: PROCEDURE(CURSOR_TABLE,IMAGE_PTR,SIZE_PTR) EXTERNAL;
2           DCL CURSOR_TABLE     POINTER;
2           DCL IMAGE_PTR        POINTER;
2           DCL SIZE_PTR         POINTER;
2       END GRAD_PROFILE;

1       TIMER: PROCEDURE(J) EXTERNAL;
2           DCL J                WORD;
2       END TIMER;

1       TRANS_IMAGE: PROCEDURE(IFLAG) EXTERNAL;
2           DCL IFLAG            BYTE;
2       END TRANS_IMAGE;

1       INIT_CUR: PROCEDURE(TABLE_PTR) EXTERNAL;
2           DCL TABLE_PTR        POINTER;
2       END INIT_CUR;

1.      LOC_CLOSURE: PROCEDURE EXTERNAL;
2       END LOC_CLOSURE;

1       MEASURE_DIST: PROCEDURE WORD EXTERNAL;
2       END MEASURE_DIST;

1       GRAD_SIGNATURE: PROCEDURE WORD EXTERNAL;
2       END GRAD_SIGNATURE;

1       DEF_SIGNATURE: PROCEDURE PUBLIC;

2       DO;

3       BUFFER(0) = ' ';
3       DO WHILE BUFFER(0) <> 'Y';
        /* DETERMINE ORIENTATION OF THE DISTANCE TO BE MEASURED  */

4           CALL WRITE(@(CLRSCRN,LF,'ENTER DIRECTION OF MEASUREMENT',CR,LF,'H/V - '),41);
4           NOBYTES = READ(@BUFFER,5);
4           IF (BUFFER(0) = 'Q') THEN RETURN;
4           IF BUFFER(0) = 'H' THEN DIR_PTR = 0FH;
4           ELSE DIR_PTR = 00H;
4           FEATURE_OFFSETS(PROD_PTR + FEATURE_INDEX).FEATURE_FLAG = FEATURE_OFFSETS(PROD_PTR
               + FEATURE_INDEX).FEATURE_FLAG
                OR DIR_PTR;

        /* DETERMINE IMAGE POINTER  */
```

```
128  4        IF LABEL_FLAG = 0 THEN IMAGF = F_IMG;
130  4            ELSE IMAGF = B_IMG;
131  4        BUFFER(0) = ' ';
132  4        DO WHILE BUFFER(0) <> 'Y';

         /*   CLEAR CURSOR TABLE   */

133  5        CALL INIT_CUR(@CURS_LOC);
134  5        CALL INIT_CUR(@CURS_LOC_2);
         /*   HOME CURSOR 1   */
135  5        CFUNC = IMAGF OR CUR1 OR HOMC;
136  5        CALL CURSOR_ROUTINE(@CURS_LOC,CFUNC);

         /*   LOCATE POINT 1   */

137  5        CALL WRITE(@(CR,LF,'MOVE CURSOR TO START FOR LOCATING',CR,LF,
              'LINE SIGNATURE TOP(V) OR LEFT(H) END.   '),76);
138  5        CALL WRITE(@(CR,LF,LF,'HIT USER1 WHEN READY -'),25);

         /*   SET UP CFUNC   */
139  5        CFUNC = IMAGF OR CUR1 OR ENAX OR ENAY OR MOVC;
140  5        CALL CURSOR_ROUTINE(@CURS_LOC,CFUNC);
141  5        CALL TIMER(15000);

         /*   LOCATE LEFT OR TOP END OF SIGNATURE */

142  5        CALL WRITE(@(CR,LF,LF,'MOVE CURSOR TO START FOR LOCATING',CR,LF,
              'LINE SIGNATURE BOTTOM(V) OR ',CR,LF,'RIGHT(H) END.'),81);
143  5        CALL WRITE(@(CR,LF,LF,'HIT USER1 WHEN READY -'),25);

         /*   DETERMINE DIRECTION OF MOTION FOR CURSOR   */

144  5        IF DIR_PTR = 0FH THEN CFUNC = IMAGF OR CUR2 OR ENAX OR MOVC;
146  5        ELSE CFUNC = IMAGF OR CUR2 OR ENAY OR MOVC;
147  5        CURS_LOC(2 + CTABLE_OFF) = CURS_LOC(0 + CTABLE_OFF);
148  5        CURS_LOC(3 + CTABLE_OFF) = CURS_LOC(1 + CTABLE_OFF);
149  5        CALL CURSOR_ROUTINE(@CURS_LOC,CFUNC);
150  5        CALL TIMER(15000);

         /*   GET EDGE GRADIENT FOR THIS LOCATION   */
151  5        BUFFER(0) = 'M';
152  5        DO WHILE BUFFER(0) = 'M';
153  6        CRLF;
154  6        CALL WRITE(@('ENTER GRADIENT THRESHOLD FOR THIS LINE'),38);
155  6        CALL WRITE(@(CR,LF,'(Q - quit, M - measure) - '),28);
156  6        NOBYTES = READ(@BUFFER,5);
157  6        IF (BUFFER(0) <> CR) THEN DO;
159  7        IF BUFFER(0) = 'M' THEN
160  7        DO;

         /*   TRANSFER CURSOR COORDINATES TO CURS_LOC_2   */

161  8        CURS_LOC_2(0 + CTABLE_OFF) = CURS_LOC(0 + CTABLE_OFF);
162  8        CURS_LOC_2(1 + CTABLE_OFF) = CURS_LOC(1 + CTABLE_OFF);
163  8        CURS_LOC_2(2 + CTABLE_OFF) = CURS_LOC(2 + CTABLE_OFF);
164  8        CURS_LOC_2(3 + CTABLE_OFF) = CURS_LOC(3 + CTABLE_OFF);

         /*   ERASE CURSORS FROM SCREEN   */
165  8        CFUNC = IMAGF OR DISC;
166  8        CALL CURSOR_ROUTINE(@CURS_LOC,CFUNC);

         /*   ENABLE NEW CURSOR DISPLAY   */
167  8        CFUNC = IMAGF OR RESTC;
168  8        CALL CURSOR_ROUTINE(@CURS_LOC_2,CFUNC);
169  8        J = DOUBLE(IMAGF);
170  8        SIZE = 1;
171  8        CALL GRAD_PROFILE(@CURS_LOC_2,@J,@SIZE);
172  8        CALL WRITE(@(CR,LF,'dark to light is +, light to dark is -'),40);
173  8        CALL WRITE(@(CR,LF,'+ or - is \'),13);
174  8        CALL WRITE(@(CR,LF,'READY TO PROCEDE ? Y/N - '),27);
175  8        NOBYTES = READ(@BUFFER,5);
176  8        BUFFER(0) = 'M';
177  8        IF LABEL_FLAG = 0 THEN CALL TRANS_IMAGE(1);
179  8        ELSE CALL TRANS_IMAGE(0);

         /*   RESTORE ORIGINAL CURSORS   */
180  8        CALL CURSOR_ROUTINE(@CURS_LOC,CFUNC);
181  8        END;

182  7        ELSE DO;
183  8        IF (BUFFER(0) = 'Q') THEN RETURN;
185  8        IF (BUFFER(0) = '-' OR BUFFER(0) = '\') THEN DO;
187  9        TTHRESH = DOUBLE(BUFFER(0));
188  9        TTHRESH = SHL(TTHRESH,8);
189  9        BUFFER(0) = ' ';
190  9        END;
191  8        ELSE DO;
```

```
192   9          TTHRESH = 02B00H;
193   9          END;
194   8          CALL ASC$WRD(@BUFFER,@IGRAD);
195   8          IF (IGRAD > 0 AND IGRAD < 64) THEN DO;
197   9          IGRAD = IGRAD OR TTHRESH;
198   9          FEATURE_OFFSETS(PROD_PTR + FEATURE_INDEX).PT1_THRESH = IGRAD;
199   9          END;
200   8          ELSE BUFFER(0) = 'M';
201   8          END;
202   7          END;
203   6          ELSE BUFFER(0) = 'M';
204   6          END;

             /*  STORE OFFSETS IN TABLE  */

             /*  CALCULATE COUNTER FOR LOCATE FEATURE  */
205   5          FEATURE_OFFSETS(PROD_PTR + FEATURE_INDEX).PT1_HOZ_ST =
                     INT(WORK_TABLE(LABEL_FLAG).LABEL_CENTER) - INT(CURS_LOC(1 + CTABLE_OFF));
206   5          FEATURE_OFFSETS(PROD_PTR + FEATURE_INDEX).PT1_VERT_ST =
                     INT(WORK_TABLE(LABEL_FLAG).LABEL_ELEV) - INT(CURS_LOC(0 + CTABLE_OFF));
207   5          IF DIR_PTR = 0FH THEN FEATURE_OFFSETS(PROD_PTR + FEATURE_INDEX).PT1_COUNT =
208   5              (INT(CURS_LOC(3 + CTABLE_OFF)) - INT(CURS_LOC(1 + CTABLE_OFF)));
209   5              ELSE FEATURE_OFFSETS(PROD_PTR + FEATURE_INDEX).PT1_COUNT =
                     (INT(CURS_LOC(2 + CTABLE_OFF)) - INT(CURS_LOC(0 + CTABLE_OFF)));


210   5          CALL WRITE(@(CR,LF,'ARE THESE POINTS OK? Y/N -'),28);
211   5          NOBYTES = READ(@BUFFER,5);

             /*  RESTORE IMAGE  */
212   5          IF LABEL_FLAG = 0 THEN CALL TRANS_IMAGE(1);
214   5              ELSE CALL TRANS_IMAGE(0);
215   5      END;

             /*  GET LINE SIGNATURE  */
216   4          J = GRAD_SIGNATURE;
217   4          CALL WRD$ASC(@BUFFER,@J);
218   4          CALL WRITE(@(CR,LF,'LINE SIGNATURE IS '),20);
219   4          CALL WRITE(@BUFFER,8);
220   4          CALL WRITE(@(CR,LF,'IS THE LINE SIGNATURE  OK ? Y/N - '),36);
221   4          NOBYTES = READ(@BUFFER,5);
222   4          FEATURE_OFFSETS(PROD_PTR + FEATURE_INDEX).FEATURE = J;
             /*  RESTORE IMAGE  */
223   4          IF LABEL_FLAG = 0 THEN CALL TRANS_IMAGE(1);
225   4              ELSE CALL TRANS_IMAGE(0);

226   4          END;
227   3      END;
228   2      END DEF_SIGNATURE;
229   1      END DEF_LINE_SIG;


MODULE INFORMATION:

     CODE AREA SIZE     = 0415H   1045D
     CONSTANT AREA SIZE = 01E1H    481D
     VARIABLE AREA SIZE = 000AH     10D
     MAXIMUM STACK SIZE = 0010H     16D
     448 LINES READ
     0 PROGRAM WARNINGS
     0 PROGRAM ERRORS

DICTIONARY SUMMARY:

     47KB MEMORY AVAILABLE
     12KB MEMORY USED   (25%)
     0KB DISK SPACE USED

END OF PL/M-86 COMPILATION
```

```
iRMX 86 PL/M-86 V2.3 COMPILATION OF MODULE DEF_AREA_GRAD
OBJECT MODULE PLACED IN SOURCE/AREA_GRAD.OBJ
COMPILER INVOKED BY:  :LANG:PLM86 SOURCE/AREA_GRAD.PLM OPTIMIZE(3) ROM SET(TARGET=1)


             $INCLUDE(SOURCE/COPYRIGHT)
         =   /*

         =   ************************************************************************
         =   *                                                                      *
         =   *                                                                      *
         =   *                  COPYRIGHT CHESEBROUGH-POND'S INC.                   *
         =   *                                                                      *
         =   *                  (c) 1983, CHESEBROUGH-POND'S INC.                   *
         =   *                                                                      *
         =   *                                                                      *
         =   *                                                                      *
         =   *                                                                      *
         =   *     ALL RIGHTS RESERVED. NO PART OF THIS PROGRAM MAY BE REPRODUCED,  *
         =   *     TRANSMITTED, TRANSCRIBED, STORED IN A RETRIEVAL SYSTEM, OR       *
         =   *     TRANSLATED INTO ANY LANGUAGE OR COMPUTER LANGUAGE, IN ANY FORM   *
         =   *     OR BY ANY MEANS, ELECTRONIC, MECHANICAL, MAGNETIC, OPTICAL,      *
         =   *     CHEMICAL, MANUAL OR OTHERWISE, WITHOUT THE EXPRESS WRITTEN PER-  *
         =   *     MISSION OF CHESEBROUGH-POND'S INC., 33 BENEDICT PLACE, GREENWICH, *
         =   *     CONNECTICUT.                                                     *
         =   *                                                                      *
         =   *                                                                      *
         =   ************************************************************************


         =   */

             $TITLE(' DEFINE AREA GRAD MODULE')
  1          DEF_AREA_GRAD:
             DO;
             $INCLUDE(SOURCE/DECLARE.EXT)
  2    1 =   DECLARE      DCL      LITERALLY    'DECLARE';
  3    1 =   DECLARE      LIT      LITERALLY    'LITERALLY';
             $INCLUDE(SOURCE/XTERMHAND.EXT)
  4    1 =   INIT_USART: PROCEDURE EXTERNAL;
  5    2 =   END INIT_USART;
  6    1 =   WRITE: PROCEDURE(BUFFER_PTR,BLENGTH) EXTERNAL;
  7    2 =           DCL BUFFER_PTR  POINTER;
  8    2 =           DCL BLENGTH WORD;
  9    2 =   END WRITE;
 10    1 =   READ: PROCEDURE(BUFFER_PTR,BLENGTH)WORD EXTERNAL;
 11    2 =           DCL      BUFFER_PTR  POINTER;
 12    2 =           DCL      BLENGTH    WORD;
 13    2 =   END READ;
             $INCLUDE(SOURCE/IWCONV.EXT)
         =   $SAVE
         =   $NOLIST

             /*  VARIABLE DECLARATIONS PUBLIC  */
 35    1     DCL IGRAD              WORD EXTERNAL;
 36    1     DCL PARAM1             INTEGER EXTERNAL;
 37    1     DCL BUFFER (24)        BYTE EXTERNAL;
 38    1     DCL CURS_LOC (24)      WORD EXTERNAL;
 39    1     DCL CURS_LOC_2 (24)    WORD EXTERNAL;
 40    1     DCL NOBYTES            WORD EXTERNAL;
 41    1     DCL PROD_NUM           WORD EXTERNAL;
 42    1     DCL PROD_PTR           WORD EXTERNAL;
 43    1     DCL SIZE               WORD EXTERNAL;
 44    1     DCL CTABLE_OFF         WORD EXTERNAL;
 45    1     DCL VERT_CL            WORD EXTERNAL;
 46    1     DCL HOR_DIST           WORD EXTERNAL;
 47    1     DCL VERT_DIST          WORD EXTERNAL;
 48    1     DCL FEATURE_INDEX      WORD EXTERNAL;
 49    1     DCL LABEL_FLAG         BYTE EXTERNAL;
 50    1     DCL CFUNC              BYTE EXTERNAL;
 51    1     DCL IMAGF              BYTE EXTERNAL;
 52    1     DCL DIR_PTR            BYTE EXTERNAL;

             /* LOCAL VARIABLE DECLARATIONS */
 53    1     DCL (I,J,TTHRESH)      WORD;
 54    1     DCL (HZ,VRT)           WORD;
 55    1     DCL CENTER1            WORD;
 56    1     DCL CENTER2            WORD;

             /* LITERALL DECLARATIONS  */
 57    1     DCL CAMERA_ON          LIT      '03H';
 58    1     DCL CAMERA_OFF         LIT      '00H';
 59    1     DCL DATA_REG           LIT      '00H';
 60    1     DCL COMMD_REG          LIT      '03H';
 61    1     DCL HOZ_ADD_LO         LIT      '04H';
 62    1     DCL HOZ_ADD_HI         LIT      '05H';
 63    1     DCL VERT_ADD           LIT      '06H';
```

```
 64   1      DCL POST_INC_READ    LIT      '01H';
 65   1      DCL POST_INC_WRITE   LIT      '02H';
 66   1      DCL CLRSCRN          LIT      '1BH,6AH,0CH';
 67   1      DCL SET_CUR          LIT      '1BH,59H';
 68   1      DCL ESC              LIT      '1BH';
 69   1      DCL CRLF             LIT      'CALL WRITE(@(13,10),2)';
 70   1      DCL CR               LIT      '0DH';
 71   1      DCL LF               LIT      '0AH';
 72   1      DCL RESTC            LIT      '00H';
 73   1      DCL DISC             LIT      '03H';
 74   1      DCL MOVC             LIT      '02H';
 75   1      DCL CUR1             LIT      '00H';
 76   1      DCL CUR2             LIT      '04H';
 77   1      DCL CUR3             LIT      '08H';
 78   1      DCL CUR4             LIT      '0CH';
 79   1      DCL HOMC             LIT      '01H';
 80   1      DCL ENAX             LIT      '010H';
 81   1      DCL ENAY             LIT      '020H';
 82   1      DCL F_IMG            LIT      '00H';
 83   1      DCL B_IMG            LIT      '040H';

 84   1      DCL PROD_NAM_TBL (20) STRUCTURE(NAM_BUFFER(20) BYTE) EXTERNAL;

             $INCLUDE(SOURCE/OFFSETS.LIB)
          =  $SAVE
          =  $NOLIST

             /*  EXTERNAL PROCEDURE DECLARATIONS  */

 93   1      CURSOR_ROUTINE: PROCEDURE(CURSOR_TABLE,FUNCT) EXTERNAL;
 94   2          DCL CURSOR_TABLE      POINTER;
 95   2          DCL FUNCT             BYTE;
 96   2      END CURSOR_ROUTINE;

 97   1      GRAD_PROFILE: PROCEDURE(CURSOR_TABLE,IMAGE_PTR,SIZE_PTR) EXTERNAL;
 98   2          DCL CURSOR_TABLE      POINTER;
 99   2          DCL IMAGE_PTR         POINTER;
100   2          DCL SIZE_PTR          POINTER;
101   2      END GRAD_PROFILE;

102   1      TIMER: PROCEDURE(J) EXTERNAL;
103   2          DCL J                 WORD;
104   2      END TIMER;

105   1      TRANS_IMAGE: PROCEDURE(IFLAG) EXTERNAL;
106   2          DCL IFLAG             BYTE;
107   2      END TRANS_IMAGE;

108   1      INIT_CUR: PROCEDURE(TABLE_PTR) EXTERNAL;
109   2          DCL TABLE_PTR         POINTER;
110   2      END INIT_CUR;

111   1      LOC_CLOSURE: PROCEDURE EXTERNAL;
112   2      END LOC_CLOSURE;

113   1      MEASURE_DIST: PROCEDURE WORD EXTERNAL;
114   2      END MEASURE_DIST;

115   1      GRAD_SIGNATURE: PROCEDURE WORD EXTERNAL;
116   2      END GRAD_SIGNATURE;

117   1      AREA_GRAD_COUNT: PROCEDURE WORD EXTERNAL;
118   2      END AREA_GRAD_COUNT;

119   1      DEF_GRAD_COUNT: PROCEDURE PUBLIC;

120   2      DO;

121   3      BUFFER(0) = ' ';
122   3      DO WHILE BUFFER(0) <> 'Y';
             /*  DETERMINE ORIENTATION OF THE DISTANCE TO BE MEASURED  */


123   4          CALL WRITE(@(CLRSCRN,LF,'ENTER DIRECTION OF MEASUREMENT',CR,LF,'H/V - '),41);
124   4          NOBYTES = READ(@BUFFER,5);
125   4          IF (BUFFER(0) = 'Q') THEN RETURN;
127   4          IF BUFFER(0) = 'H' THEN DIR_PTR = 0FH;
129   4          ELSE DIR_PTR = 00H;
130   4          FEATURE_OFFSETS(PROD_PTR + FEATURE_INDEX).FEATURE_FLAG = FEATURE_OFFSETS(PROD_PTR
               + FEATURE_INDEX).FEATURE_FLAG
                 OR DIR_PTR;

             /*  DETERMINE IMAGE POINTER  */

131   4          IF LABEL_FLAG = 0 THEN IMAGF = F_IMG;
133   4              ELSE IMAGF = B_IMG;
134   4          BUFFER(0) = ' ';
135   4          DO WHILE BUFFER(0) <> 'Y';
```

```
/*  CLEAR CURSOR TABLE  */

    CALL INIT_CUR(@CURS_LOC);
    CALL INIT_CUR(@CURS_LOC_2);
/*  HOME CURSOR 1  */
    CFUNC = IMAGF OR CUR1 OR HOMC;
    CALL CURSOR_ROUTINE(@CURS_LOC,CFUNC);

/*  LOCATE POINT 1  */

    CALL WRITE(@(CR,LF,'MOVE CURSOR TO CENTER OF AREA TO ',CR,LF,
    'BE SEARCHED FOR GRADIENTS.        '),70);
    CALL WRITE(@(CR,LF,LF,'HIT USER1 WHEN READY -'),25);

/*  SET UP CFUNC  */
    CFUNC = IMAGF OR CUR1 OR ENAX OR ENAY OR MOVC;
    CALL CURSOR_ROUTINE(@CURS_LOC,CFUNC);
    CALL TIMER(15000);

/*  GET SIZE OF RECTANGLE TO BE SEARCHED  */

    BUFFER(0) = ' ';
    DO WHILE BUFFER(0) < 30H;
    CALL WRITE(@(CR,LF,'ENTER HORIZONTAL DISTANCE FROM CENTER. ',CR,LF,'- '),44);
    NOBYTES = READ(@BUFFER,5);
    END;
    CALL ASC$WRD(@BUFFER,@HZ);
    BUFFER(0) = ' ';
    DO WHILE BUFFER(0) < 30H;
    CALL WRITE(@(CR,LF,'ENTER VERTICAL DISTANCE FROM CENTER. ',CR,LF,'- '),42);
    NOBYTES = READ(@BUFFER,5);
    END;
    CALL ASC$WRD(@BUFFER,@VRT);

/*  GET EDGE GRADIENT FOR THIS LOCATION  */
    BUFFER(0) = 'M';
    DO WHILE BUFFER(0) = 'M';
    CRLF;
    CALL WRITE(@('ENTER GRADIENT THRESHOLD FOR THIS AREA'),38);
    CALL WRITE(@(CR,LF,'(Q - quit, M - measure) - '),28);
    NOBYTES = READ(@BUFFER,5);
    IF (BUFFER(0) <> CR) THEN DO;
    IF BUFFER(0) = 'M' THEN
    DO;

/*  GET DISTANCE AND DIRECTION FOR GRAD PROFILE  */

    IF DIR_PTR = 0FH THEN DO;
    HOR_DIST = HZ * 2;
    VERT_DIST = 0;
    END;
    ELSE DO;
    HOR_DIST = 0;
    VERT_DIST = VRT * 2;
    END;

/*  TRANSFER CURSOR COORDINATES TO CURS_LOC_2  */

    CURS_LOC_2(0 + CTABLE_OFF) = CURS_LOC(0 + CTABLE_OFF) - VERT_DIST;
    CURS_LOC_2(1 + CTABLE_OFF) = CURS_LOC(1 + CTABLE_OFF) - HOR_DIST;
    CURS_LOC_2(2 + CTABLE_OFF) = CURS_LOC(0 + CTABLE_OFF) + VERT_DIST;
    CURS_LOC_2(3 + CTABLE_OFF) = CURS_LOC(1 + CTABLE_OFF) + HOR_DIST;

/*  ERASE CURSORS FROM SCREEN  */
    CFUNC = IMAGF OR DISC;
    CALL CURSOR_ROUTINE(@CURS_LOC,CFUNC);

/*  ENABLE NEW CURSOR DISPLAY  */
    CFUNC = IMAGF OR RESTC;
    CALL CURSOR_ROUTINE(@CURS_LOC_2,CFUNC);
    J = DOUBLE(IMAGF);
    SIZE = 1;
    CALL GRAD_PROFILE(@CURS_LOC_2,@J,@SIZE);
    CALL WRITE(@(CR,LF,'READY TO PROCEDE ? Y/N - '),27);
    NOBYTES = READ(@BUFFER,5);
    BUFFER(0) = 'M';
    IF LABEL_FLAG = 0 THEN CALL TRANS_IMAGE(1);
    ELSE CALL TRANS_IMAGE(0);

/*  RESTORE ORIGINAL CURSORS  */
    CALL CURSOR_ROUTINE(@CURS_LOC,CFUNC);
    END;

    ELSE DO;
    IF (BUFFER(0) = 'Q') THEN RETURN;
    IF (BUFFER(0) = '-' OR BUFFER(0) = '\') THEN DO;
    TTHRESH = DOUBLE(BUFFER(0));
    TTHRESH = SHL(TTHRESH,8);
```

```
202   9         BUFFER(0) = ' ';
203   9         END;
204   8         ELSE DO;
205   9         TTHRESH = 02B00H;
206   9         END;
207   8         CALL ASC$WRD(@BUFFER,@IGRAD);
208   8         IF (IGRAD > 0 AND IGRAD < 64) THEN DO;
210   9         IGRAD = IGRAD OR TTHRESH;
211   9         FEATURE_OFFSETS(PROD_PTR + FEATURE_INDEX).PT1_THRESH = IGRAD;
212   9         END;
213   8         ELSE BUFFER(0) = 'M';
214   8         END;
215   7         END;
216   6         ELSE BUFFER(0) = 'M';
217   6         END;

            /*  STORE OFFSETS IN TABLE  */

            /*  CALCULATE COUNTER FOR LOCATE FEATURE  */
218   5         CENTER1 = CURS_LOC(1 + CTABLE_OFF) - HZ;
219   5         CENTER2 = CURS_LOC(0 + CTABLE_OFF) - VRT;
220   5         FEATURE_OFFSETS(PROD_PTR + FEATURE_INDEX).PT1_HOZ_ST =
                    INT(WORK_TABLE(LABEL_FLAG).LABEL_CENTER) - INT(CENTER1);
221   5         FEATURE_OFFSETS(PROD_PTR + FEATURE_INDEX).PT1_VERT_ST =
                    INT(WORK_TABLE(LABEL_FLAG).LABEL_ELEV) - INT(CENTER2);
            /* STORE HORIZONTAL AND VERTICAL DIMENSIONS IN PT1_COUNT */
222   5         HZ = HZ * 2;
223   5         FEATURE_OFFSETS(PROD_PTR + FEATURE_INDEX).PT1_COUNT = INT(HZ);
224   5         VRT = VRT * 2;
225   5         FEATURE_OFFSETS(PROD_PTR + FEATURE_INDEX).PT2_COUNT = INT(VRT);



226   5         CALL WRITE(@(CR,LF,'ARE THESE POINTS OK? Y/N -'),28);
227   5         NOBYTES = READ(@BUFFER,5);

            /*  RESTORE IMAGE  */
228   5         IF LABEL_FLAG = 0 THEN CALL TRANS_IMAGE(1);
230   5             ELSE CALL TRANS_IMAGE(0);
231   5     END;

            /*  GET LINE SIGNATURE  */
232   4         J = AREA_GRAD_COUNT;
233   4         CALL WRD$ASC(@BUFFER,@J);
234   4         CALL WRITE(@(CR,LF,' NO. OF GRADIENT POINTS IS - '),31);
235   4         CALL WRITE(@BUFFER,8);
236   4         CRLF;

237   4         CALL WRITE(@(CR,LF,'IS THE AREA COUNT OK ? Y/N - '),30);
238   4         NOBYTES = READ(@BUFFER,5);
239   4         FEATURE_OFFSETS(PROD_PTR + FEATURE_INDEX).FEATURE = J;
            /*  RESTORE IMAGE  */
240   4         IF LABEL_FLAG = 0 THEN CALL TRANS_IMAGE(1);
242   4             ELSE CALL TRANS_IMAGE(0);

243   4         END;
244   3     END;
245   2     END DEF_GRAD_COUNT;
246   1     END DEF_AREA_GRAD;
```

```
MODULE INFORMATION:

     CODE AREA SIZE     = 0409H   1033D
     CONSTANT AREA SIZE = 019AH    410D
     VARIABLE AREA SIZE = 000EH     14D
     MAXIMUM STACK SIZE = 0010H     16D
     465 LINES READ
     0 PROGRAM WARNINGS
     0 PROGRAM ERRORS

DICTIONARY SUMMARY:

     47KB MEMORY AVAILABLE
     12KB MEMORY USED   (25%)

     0KB DISK SPACE USED

END OF PL/M-86 COMPILATION
```

```
iRMX 86 PL/M-86 V2.3 COMPILATION OF MODULE DEF_PACK_MODULE
OBJECT MODULE PLACED IN SOURCE/PACKAGE.OBJ
COMPILER INVOKED BY:  :LANG:PLM86 SOURCE/PACKAGE.PLM OPTIMIZE(3) ROM SET(TARGET=1)


              $INCLUDE(SOURCE/COPYRIGHT)
          =   /*

          =   ****************************************************************************
          =   *                                                                          *
          =   *                                                                          *
          =   *                    COPYRIGHT CHESEBROUGH-POND'S INC.                     *
          =   *                                                                          *
          =   *                    (c) 1983, CHESEBROUGH-POND'S INC.                     *
          =   *                                                                          *
          =   *                                                                          *
          =   *                                                                          *
          =   *                                                                          *
          =   *      ALL RIGHTS RESERVED. NO PART OF THIS PROGRAM MAY BE REPRODUCED,     *
          =   *      TRANSMITTED, TRANSCRIBED, STORED IN A RETRIEVAL SYSTEM, OR          *
          =   *      TRANSLATED INTO ANY LANGUAGE OR COMPUTER LANGUAGE, IN ANY FORM      *
          =   *      OR BY ANY MEANS, ELECTRONIC, MECHANICAL, MAGNETIC, OPTICAL,         *
          =   *      CHEMICAL, MANUAL OR OTHERWISE, WITHOUT THE EXPRESS WRITTEN PER-     *
          =   *      MISSION OF CHESEBROUGH-POND'S INC., 33 BENEDICT PLACE, GREENWICH,   *
          =   *      CONNECTICUT.                                                        *
          =   *                                                                          *
          =   *                                                                          *
          =   ****************************************************************************


          =   */

              $TITLE(' DEFINE PACKAGE ROUTINE ')
  1           DEF_PACK_MODULE:
              DO;
              $INCLUDE(SOURCE/DECLARE.EXT)
  2   1   =   DECLARE     DCL      LITERALLY   'DECLARE';
  3   1   =   DECLARE     LIT      LITERALLY   'LITERALLY';
              $INCLUDE(SOURCE/XTERMHAND.EXT)
  4   1   =   INIT_USART: PROCEDURE EXTERNAL;
  5   2   =   END INIT_USART;
  6   1   =   WRITE: PROCEDURE(BUFFER_PTR,BLENGTH) EXTERNAL;
  7   2   =           DCL BUFFER_PTR  POINTER;
  8   2   =           DCL BLENGTH WORD;
  9   2   =   END WRITE;
 10   1   =   READ: PROCEDURE(BUFFER_PTR,BLENGTH)WORD EXTERNAL;
 11   2   =           DCL      BUFFER_PTR  POINTER;
 12   2   =           DCL      BLENGTH     WORD;
 13   2   =   END READ;
              $INCLUDE(SOURCE/IWCONV.EXT)
          =   $SAVE
          =   $NOLIST

              /*  VARIABLE DECLARATIONS PUBLIC  */
 35   1       DCL IGRAD              WORD EXTERNAL;
 36   1       DCL PARAM1             INTEGER EXTERNAL;
 37   1       DCL BUFFER (24)        BYTE EXTERNAL;
 38   1       DCL CURS_LOC (24)      WORD EXTERNAL;
 39   1       DCL CURS_LOC_2 (24)    WORD EXTERNAL;
 40   1       DCL NOBYTES            WORD EXTERNAL;
 41   1       DCL PROD_NUM           WORD EXTERNAL;
 42   1       DCL PROD_PTR           WORD EXTERNAL;
 43   1       DCL SIZE               WORD EXTERNAL;
 44   1       DCL CTABLE_OFF         WORD EXTERNAL;
 45   1       DCL VERT_CL            WORD EXTERNAL;
 46   1       DCL HOR_DIST           WORD EXTERNAL;
 47   1       DCL VERT_DIST          WORD EXTERNAL;
 48   1       DCL LABEL_FLAG         BYTE EXTERNAL;
 49   1       DCL CFUNC              BYTE EXTERNAL;
 50   1       DCL IMAGF              BYTE EXTERNAL;
 51   1       DCL DIR_PTR            BYTE EXTERNAL;

              /* LOCAL VARIABLE DECLARATIONS */
 52   1       DCL (I,J,TTHRESH)      WORD;
 53   1       DCL CENTER1            WORD;
 54   1       DCL CENTER2            WORD;

              /* LITERALL DECLARATIONS  */
 55   1       DCL CAMERA_ON          LIT      '03H';
 56   1       DCL CAMERA_OFF         LIT      '00H';
 57   1       DCL DATA_REG           LIT      '00H';
 58   1       DCL COMMD_REG          LIT      '03H';
 59   1       DCL HOZ_ADD_LO         LIT      '04H';
 60   1       DCL HOZ_ADD_HI         LIT      '05H';
 61   1       DCL VERT_ADD           LIT      '06H';
 62   1       DCL POST_INC_READ      LIT      '01H';
 63   1       DCL POST_INC_WRITE     LIT      '02H';
```

```
 64   1        DCL CLRSCRN          LIT      '1BH,6AH,0CH';
 65   1        DCL SET_CUR          LIT      '1BH,59H';
 66   1        DCL ESC              LIT      '1BH';
 67   1        DCL CRLF             LIT      'CALL WRITE(@(13,10),2)';
 68   1        DCL CR               LIT      '0DH';
 69   1        DCL LF               LIT      '0AH';
 70   1        DCL RESTC            LIT      '00H';
 71   1        DCL DISC             LIT      '03H';
 72   1        DCL MOVC             LIT      '02H';
 73   1        DCL CUR1             LIT      '00H';
 74   1        DCL CUR2             LIT      '04H';
 75   1        DCL CUR3             LIT      '08H';
 76   1        DCL CUR4             LIT      '0CH';
 77   1        DCL HOMC             LIT      '01H';
 78   1        DCL ENAX             LIT      '010H';
 79   1        DCL ENAY             LIT      '020H';
 80   1        DCL F_IMG            LIT      '00H';
 81   1        DCL B_IMG            LIT      '040H';

 82   1        DCL PROD_NAM_TBL (20) STRUCTURE(NAM_BUFFER(20) BYTE) EXTERNAL;

               $INCLUDE(SOURCE/OFFSETS.LIB)
          =    $SAVE
          =    $NOLIST

               /*  EXTERNAL PROCEDURE DECLARATIONS  */
 91   1        CURSOR_ROUTINE: PROCEDURE(CURSOR_TABLE,FUNCT) EXTERNAL;
 92   2            DCL CURSOR_TABLE     POINTER;
 93   2            DCL FUNCT            BYTE;
 94   2        END CURSOR_ROUTINE;

 95   1        GRAD_PROFILE: PROCEDURE(CURSOR_TABLE,IMAGE_PTR,SIZE_PTR) EXTERNAL;
 96   2            DCL CURSOR_TABLE     POINTER;
 97   2            DCL IMAGE_PTR        POINTER;
 98   2            DCL SIZE_PTR         POINTER;
 99   2        END GRAD_PROFILE;

100   1        TIMER: PROCEDURE(J) EXTERNAL;
101   2            DCL J                WORD;
102   2        END TIMER;

103   1        TRANS_IMAGE: PROCEDURE(IFLAG) EXTERNAL;
104   2            DCL IFLAG            BYTE;
105   2        END TRANS_IMAGE;

106   1        INIT_CUR: PROCEDURE(TABLE_PTR) EXTERNAL;
107   2            DCL TABLE_PTR        POINTER;
108   2        END INIT_CUR;

109   1        LOC_CLOSURE: PROCEDURE EXTERNAL;
110   2        END LOC_CLOSURE;

111   1        LOC_PACKAGE: PROCEDURE EXTERNAL;
112   2        END LOC_PACKAGE;


               /*  MESSAGES USED IN DEFINE PACKAGE  */
113   1        DCL DEF_PAK_1(*) BYTE DATA(CLRSCRN,SET_CUR,20H,20H,'MOVE CURSOR TO START POINT',
                                     CR,LF,'FOR LOCATING LEFT PACKAGE EDGE. ',
                                     CR,LF,LF,'HIT USER 1 WHEN READY - ');
114   1        DCL DEF_PAK_2(*) BYTE DATA(CR,LF,LF,'MOVE CURSOR TO LEFT PACKAGE',
                                     CR,LF,'EDGE. ',CR,LF,LF,
                                     'HIT USER 1 WHEN READY - ');
115   1        DCL DEF_PAK_3(*) BYTE DATA(CR,LF,LF,'MOVE CURSOR TO RIGHT PACKAGE',
                                     CR,LF,'EDGE. ',CR,LF,LF,
                                     'HIT USER 1 WHEN READY - ');
116   1        DCL DEF_PAK_4(*) BYTE DATA(CR,LF,LF,'MOVE CURSOR TO START POINT',
                                     CR,LF,'FOR LOCATING RIGHT PACKAGE EDGE. ',
                                     CR,LF,LF,'HIT USER 1 WHEN READY - ');
117   1        DCL DEF_PAK_6(*) BYTE DATA(CLRSCRN,SET_CUR,20H,20H,'MOVE CURSOR TO START POINT',
                                     CR,LF,'FOR LOCATING THE VERTICAL REFERENCE EDGE. ',
                                     CR,LF,LF,'HIT USER 1 WHEN READY - ');
118   1        DCL DEF_PAK_7(*) BYTE DATA(CR,LF,LF,'MOVE CURSOR TO VERTICAL REFERENCE',
                                         CR,LF,'EDGE. ',
                                     CR,LF,LF,'HIT USER 1 WHEN READY - ');
119   1        DCL DEF_PAK_8(*) BYTE DATA(CLRSCRN,SET_CUR,20H,20H,'MOVE CURSOR TO START POINT FOR',
                                     CR,LF,'LOCATING LEFT VERTICAL REFERENCE EDGE. ',
                                     CR,LF,LF,'HIT USER 1 WHEN READY - ');
120   1        DCL DEF_PAK_9(*) BYTE DATA(CR,LF,LF,'MOVE CURSOR TO LEFT VERTICAL REFERENCE',
                                     CR,LF,'EDGE. ',
                                     CR,LF,LF,'HIT USER 1 WHEN READY -');
121   1        DCL DEF_PAK_A(*) BYTE DATA(CLRSCRN,SET_CUR,20H,20H,'MOVE CURSOR TO START POINT FOR',
                                     CR,LF,'LOCATING RIGHT VERTICAL REFERENCE EDGE. ',
                                     CR,LF,LF,'HIT USER 1 WHEN READY -');
122   1        DCL DEF_PAK_B(*) BYTE DATA(CR,LF,LF,'MOVE CURSOR TO RIGHT VERTICAL REFERENCE',
                                     CR,LF,'EDGE. ',
                                     CR,LF,LF,'HIT USER 1 WHEN READY -');
```

```
123   1      DEF_PACKAGE: PROCEDURE PUBLIC;
124   2      DO;

125   3      BUFFER(O) = O;
126   3      DO WHILE BUFFER(O) <> 'Y';
             /* DETERMINE POINTERS TO PROPER IMAGE AND CURSOR TABLE LOCATIONS */
127   4          IF LABEL_FLAG = O THEN
128   4          DO;
129   5              CTABLE_OFF = O;
130   5              IMAGF = F_IMG;
131   5          END;
132   4          ELSE
                 DO;
133   5              CTABLE_OFF = O1OH;
134   5              IMAGF = B_IMG;
135   5          END;
136   4      BUFFER(O) = ' ';

             /*  LOCATE PACKAGE HORIZONTALLY IN IMAGE PLANE  */

137   4      DO WHILE BUFFER(O) <> 'Y';

             /* INITIALIZE CURSOR TABLE */
138   5      CALL INIT_CUR(@CURS_LOC);

             /* HOME CURSORS */
139   5      CFUNC = IMAGF OR CUR1 OR HOMC;
140   5      CALL CURSOR_ROUTINE(@CURS_LOC,CFUNC);

             /*  MOVE CURSOR 1 TO STARTING LOCATION FOR FINDING LEFT PACKAGE EDGE  */
141   5      CALL WRITE(@DEF_PAK_1,LENGTH(DEF_PAK_1));
142   5      CFUNC = IMAGF OR CUR1 OR ENAX OR ENAY OR MOVC;
143   5      CALL CURSOR_ROUTINE(@CURS_LOC,CFUNC);

             /*  MOVE CURSOR 2 TO LEFT PACKAGE EDGE  */
144   5      CURS_LOC(2 + CTABLE_OFF) = CURS_LOC(O + CTABLE_OFF);
145   5      CURS_LOC(3 + CTABLE_OFF) = CURS_LOC(1 + CTABLE_OFF);

             /* TIMER FOR TEMPORARY DEBOUNCING */
146   5      CALL TIMER(15000);
147   5      CALL WRITE(@DEF_PAK_2,LENGTH(DEF_PAK_2));
148   5      CFUNC = IMAGF OR CUR2 OR ENAX OR MOVC;
149   5      CALL CURSOR_ROUTINE(@CURS_LOC,CFUNC);

             /*  GET GRADIENT THRESHOLD  */
150   5      BUFFER(O) = 'M';
151   5      DO WHILE BUFFER(O) = 'M';
152   6      CRLF;
153   6      CALL WRITE(@('ENTER GRADIENT THRESHOLD FOR THIS EDGE'),38);
154   6      CALL WRITE(@(CR,LF,'(Q - quit, M - measure) - '),28);
155   6      NOBYTES = READ(@BUFFER,5);
156   6      IF (BUFFER(O) <> CR) THEN DO;
158   7      IF BUFFER(O) = 'M' THEN
159   7      DO;
             /*  TRANSFER CURSOR COORDINATES TO CURS_LOC_2  */
160   8          DO I = O TO 23;
161   9              CURS_LOC_2(I) = CURS_LOC(I);
162   9          END;
             /*  ERASE CURSORS FROM SCREEN  */
163   8      CFUNC = IMAGF OR DISC;
164   8      CALL CURSOR_ROUTINE(@CURS_LOC,CFUNC);
             /* CALCULATE NEW CURSOR 2 FOR GRAD_PROF */
165   8      HOR_DIST = CURS_LOC(3 + CTABLE_OFF) - CURS_LOC(1 + CTABLE_OFF);
166   8      CURS_LOC_2(3 + CTABLE_OFF) = CURS_LOC_2(3 + CTABLE_OFF) + HOR_DIST;
             /*  ENABLE NEW CURSOR DISPLAY  */
167   8      CFUNC = IMAGF OR RESTC;
168   8      CALL CURSOR_ROUTINE(@CURS_LOC_2,CFUNC);
169   8      J = DOUBLE(IMAGF);
170   8      SIZE = 1;
171   8      CALL GRAD_PROFILE(@CURS_LOC_2,@J,@SIZE);
172   8      CALL WRITE(@(CR,LF,'dark to light is +, light to dark is -'),40);
173   8      CALL WRITE(@(CR,LF,'+ or - is \'),13);
174   8      CALL WRITE(@(CR,LF,'READY TO PROCEDE ? Y/N - '),27);
175   8      NOBYTES = READ(@BUFFER,5);
176   8      BUFFER(O) = 'M';
177   8      IF LABEL_FLAG = O THEN CALL TRANS_IMAGE(1);
179   8          ELSE CALL TRANS_IMAGE(O);
             /*  RESTORE ORIGINAL CURSORS  */
180   8      CALL CURSOR_ROUTINE(@CURS_LOC,CFUNC);
181   8      END;

182   7      ELSE DO;
183   8      IF (BUFFER(O) = 'Q') THEN RETURN;
185   8      IF (BUFFER(O) = '-' OR BUFFER(O) = '\') THEN DO;
187   9      TTHRESH = DOUBLE(BUFFER(O));
188   9      TTHRESH = SHL(TTHRESH,8);
189   9      BUFFER(O) = ' ';
190   9      END;
```

```
191  8    ELSE DO;
192  9    TTHRESH = 02B00H;
193  9    END;
194  8    CALL ASC$WRD(@BUFFER,@IGRAD);
195  8    IF (IGRAD > 0 AND IGRAD < 64) THEN DO;
197  9    IGRAD = IGRAD OR TTHRESH;
198  9    PKG_OFFSETS(PROD_PTR).HOZ_GRAD_LEFT = IGRAD;
199  9    END;
200  8    ELSE BUFFER(0) = 'M';
201  8    END;
202  7    END;
203  6    ELSE BUFFER(0) = 'M';
204  6    END;
          /*  MOVE CURSOR 3 TO RIGHT PACKAGE EDGE  */
205  5    CURS_LOC(4 + CTABLE_OFF) = CURS_LOC(2 + CTABLE_OFF);
206  5    CURS_LOC(5 + CTABLE_OFF) = CURS_LOC(3 + CTABLE_OFF);
207  5    CALL TIMER(15000);
208  5    CALL WRITE(@DEF_PAK_3,LENGTH(DEF_PAK_3));
209  5    CFUNC = IMAGF OR CUR3 OR ENAX OR MOVC;
210  5    CALL CURSOR_ROUTINE(@CURS_LOC,CFUNC);
          /* GET GRADIENT THRESHOLD FOR THIS EDGE */
211  5    BUFFER(0) = 'M';
212  5    DO WHILE BUFFER(0) = 'M';
213  6    CRLF;
214  6    CALL WRITE(@('ENTER GRADIENT THRESHOLD FOR THIS EDGE'),38);
215  6    CALL WRITE(@(CR,LF,'(Q - quit, M - measure) - '),28);
216  6    NOBYTES = READ(@BUFFER,5);
217  6    IF (BUFFER(0) <> CR) THEN DO;
219  7    IF BUFFER(0) = 'M' THEN
220  7    DO;
          /*  TRANSFER CURSOR COORDINATES TO CURS_LOC_2  */
221  8    HOR_DIST = (CURS_LOC(3 + CTABLE_OFF) - CURS_LOC(1 + CTABLE_OFF));
222  8    CURS_LOC_2(1 + CTABLE_OFF) = CURS_LOC(5 + CTABLE_OFF) - HOR_DIST;
223  8    CURS_LOC_2(3 + CTABLE_OFF) = CURS_LOC(5 + CTABLE_OFF) + HOR_DIST;
224  8    CURS_LOC_2(0 + CTABLE_OFF) = CURS_LOC(0 + CTABLE_OFF);
225  8    CURS_LOC_2(2 + CTABLE_OFF) = CURS_LOC(0 + CTABLE_OFF);
          /*  ERASE CURSORS FROM SCREEN  */
226  8    CFUNC = IMAGF OR DISC;
227  8    CALL CURSOR_ROUTINE(@CURS_LOC,CFUNC);
          /*  ENABLE NEW CURSOR DISPLAY  */
228  8    CFUNC = IMAGF OR RESTC;
229  8    CALL CURSOR_ROUTINE(@CURS_LOC_2,CFUNC);
230  8    J = DOUBLE(IMAGF);
231  8    SIZE = 1;
232  8    CALL GRAD_PROFILE(@CURS_LOC_2,@J,@SIZE);
233  8    CALL WRITE(@(CR,LF,'dark to light is +, light to dark is -'),40);
234  8    CALL WRITE(@(CR,LF,'+ or - is \'),13);
235  8    CALL WRITE(@(CR,LF,'READY TO PROCEDE ? Y/N - '),27);
236  8    NOBYTES = READ(@BUFFER,5);
237  8    BUFFER(0) = 'M';
238  8    IF LABEL_FLAG = 0 THEN CALL TRANS_IMAGE(1);
240  8        ELSE CALL TRANS_IMAGE(0);
          /*  RESTORE ORIGINAL CURSORS  */
241  8    CALL CURSOR_ROUTINE(@CURS_LOC,CFUNC);
242  8    END;

243  7    ELSE DO;
244  8    IF (BUFFER(0) = 'Q') THEN RETURN;
246  8    IF (BUFFER(0) = '-' OR BUFFER(0) = '\') THEN DO;
248  9    TTHRESH = DOUBLE(BUFFER(0));
249  9    TTHRESH = SHL(TTHRESH,8);
250  9    BUFFER(0) = ' ';
251  9    END;
252  8    ELSE DO;
253  9    TTHRESH = 02B00H;
254  9    END;
255  8    CALL ASC$WRD(@BUFFER,@IGRAD);
256  8    IF (IGRAD > 0 AND IGRAD < 64) THEN DO;
258  9    IGRAD = IGRAD OR TTHRESH;
259  9    PKG_OFFSETS(PROD_PTR).HOZ_GRAD_RIGHT = IGRAD;
260  9    END;
261  8    ELSE BUFFER(0) = 'M';
262  8    END;
263  7    END;
264  6    ELSE BUFFER(0) = 'M';
265  6    END;
          /* MOVE CURSOR 4 TO STARTING POINT FOR LOCATING RIGHT PACKAGE EDGE  */
266  5    CURS_LOC(6 + CTABLE_OFF) = CURS_LOC(4 + CTABLE_OFF);
267  5    CURS_LOC(7 + CTABLE_OFF) = CURS_LOC(5 + CTABLE_OFF);
268  5    CALL TIMER(15000);
269  5    CALL WRITE(@DEF_PAK_4,LENGTH(DEF_PAK_4));
270  5    CFUNC = IMAGF OR CUR4 OR ENAX OR MOVC;
271  5    CALL CURSOR_ROUTINE(@CURS_LOC,CFUNC);
272  5    CRLF;

          /* CHECK TO SEE IF POINTS ARE POSITIONED OK  */
273  5    CALL WRITE(@('ARE THESE POINTS OK ? Y/N - '),28);
274  5    NOBYTES = READ(@BUFFER,5);
```

```
          /* CLEAR POINTERS FROM IMAGE */
275   5   IF LABEL_FLAG = 0 THEN CALL TRANS_IMAGE(1);
277   5       ELSE CALL TRANS_IMAGE(0);
278   5   END;
          /*  CALCULATE PKG OFFSETS  */
279   4   PKG_OFFSETS(PROD_PTR).HOZ_ST_ELEV = CURS_LOC(0 + CTABLE_OFF);
280   4   PKG_OFFSETS(PROD_PTR).HOZ_ST_LEFT = CURS_LOC(1 + CTABLE_OFF);
281   4   PKG_OFFSETS(PROD_PTR).HOZ_ST_RIGHT = CURS_LOC(7 + CTABLE_OFF);
282   4   VERT_CL = CURS_LOC(5 + CTABLE_OFF) + CURS_LOC(3 + CTABLE_OFF);
283   4   VERT_CL = VERT_CL / 2;
284   4   PKG_OFFSETS(PROD_PTR).PKG_WIDTH = CURS_LOC(5 + CTABLE_OFF) -
                                            CURS_LOC(3 + CTABLE_OFF);
285   4   BUFFER(0) = ' ';

          /*  LOCATE VERTICAL REFERENCE EDGE OF PACKAGE  */
286   4   DO WHILE BUFFER(0) = ' ';

          /* INITIALIZE CURSOR TABLE */
287   5   CALL INIT_CUR(@CURS_LOC);

          /* SET STARTING POINT FOR CURSOR 1 ON VERTICAL CENTERLINE AT ROW 40 */
288   5   CURS_LOC(0 + CTABLE_OFF) = 40;
289   5   CURS_LOC(1 + CTABLE_OFF) = VERT_CL;
290   5   CURS_LOC(4 + CTABLE_OFF) = 40;
291   5   CURS_LOC(5 + CTABLE_OFF) = VERT_CL;

          /* MOVE CURSOR 1 TO STARTING POINT FOR LOCATING CENTER OF VERTICAL REFERENCE EDGE */
292   5   CALL WRITE(@DEF_PAK_8,LENGTH(DEF_PAK_8));
293   5   CFUNC = IMAGF OR CUR1 OR ENAY OR ENAX OR MOVC;
294   5   CALL CURSOR_ROUTINE(@CURS_LOC,CFUNC);
295   5   CALL TIMER(15000);

          /* MOVE CURSOR 2 TO CENTER REFERENCE EDGE */
296   5   CURS_LOC(2 + CTABLE_OFF) = CURS_LOC(0 + CTABLE_OFF);
297   5   CURS_LOC(3 + CTABLE_OFF) = CURS_LOC(1 + CTABLE_OFF);
298   5   CFUNC = IMAGF OR CUR2 OR ENAY OR MOVC;
299   5   CALL WRITE(@DEF_PAK_9,LENGTH(DEF_PAK_9));
300   5   CALL CURSOR_ROUTINE(@CURS_LOC,CFUNC);

          /* GET GRADIENT THRESHOLD FOR THIS EDGE */
301   5   BUFFER(0) = 'M';
302   5   DO WHILE BUFFER(0) = 'M';
303   6   CRLF;
304   6   CALL WRITE(@('ENTER GRADIENT THRESHOLD FOR THIS EDGE'),38);
305   6   CALL WRITE(@(CR,LF,'(Q - quit, M - measure) - '),28);
306   6   NOBYTES = READ(@BUFFER,5);
307   6   IF (BUFFER(0) <> CR) THEN DO;
309   7   IF BUFFER(0) = 'M' THEN
310   7   DO;
          /*  TRANSFER CURSOR COORDINATES TO CURS_LOC_2  */
311   8   VERT_DIST = CURS_LOC(2 + CTABLE_OFF) - CURS_LOC(0 + CTABLE_OFF);
312   8   CURS_LOC_2(1 + CTABLE_OFF) = CURS_LOC(1 + CTABLE_OFF);
313   8   CURS_LOC_2(3 + CTABLE_OFF) = CURS_LOC(3 + CTABLE_OFF);
314   8   CURS_LOC_2(0 + CTABLE_OFF) = CURS_LOC(0 + CTABLE_OFF);
315   8   CURS_LOC_2(2 + CTABLE_OFF) = CURS_LOC(2 + CTABLE_OFF) + VERT_DIST;
          /*  ERASE CURSORS FROM SCREEN  */
316   8   CFUNC = IMAGF OR DISC;
317   8   CALL CURSOR_ROUTINE(@CURS_LOC,CFUNC);
          /*  ENABLE NEW CURSOR DISPLAY  */
318   8   CFUNC = IMAGF OR RESTC;
319   8   CALL CURSOR_ROUTINE(@CURS_LOC_2,CFUNC);
320   8   J = DOUBLE(IMAGF);
321   8   SIZE = 1;
322   8   CALL GRAD_PROFILE(@CURS_LOC_2,@J,@SIZE);
323   8   CALL WRITE(@(CR,LF,'dark to light is +, light to dark is -'),40);
324   8   CALL WRITE(@(CR,LF,'+ or - is \'),13);
325   8   CALL WRITE(@(CR,LF,'READY TO PROCEDE ? Y/N - '),27);
326   8   NOBYTES = READ(@BUFFER,5);
327   8   BUFFER(0) = 'M';
328   8   IF LABEL_FLAG = 0 THEN CALL TRANS_IMAGE(1);
330   8       ELSE CALL TRANS_IMAGE(0);
          /*  RESTORE ORIGINAL CURSORS  */
331   8   CALL CURSOR_ROUTINE(@CURS_LOC,CFUNC);
332   8   END;

333   7   ELSE DO;
334   8   IF (BUFFER(0) = 'Q') THEN RETURN;
336   8   IF (BUFFER(0) = '-' OR BUFFER(0) = '\') THEN DO;
338   9   TTHRESH = DOUBLE(BUFFER(0));
339   9   TTHRESH = SHL(TTHRESH,8);
340   9   BUFFER(0) = ' ';
341   9   END;
342   8   ELSE DO;
343   9   TTHRESH = 02B00H;
344   9   END;
345   8   CALL ASC$WRD(@BUFFER,@IGRAD);
346   8   IF (IGRAD > 0 AND IGRAD <64) THEN DO;
348   9   IGRAD = IGRAD OR TTHRESH;
```

```
349   9    PKG_OFFSETS(PROD_PTR).VERT_GRAD_LEFT  = IGRAD;
350   9    END;
351   8    ELSE BUFFER(0) = 'M';
352   8    END;
353   7    END;
354   6    ELSE BUFFER(0) = 'M';
355   6    END;
356   5    CALL TIMER(15000);
357   5    CALL WRITE(@DEF_PAK_A,LENGTH(DEF_PAK_A));
358   5    CFUNC = IMAGF OR CUR3 OR ENAX OR ENAY OR MOVC;
359   5    CALL CURSOR_ROUTINE(@CURS_LOC,CFUNC);

           /* MOVE CURSOR 4 TO RIGHT END OF REFERENCE EDGE */
360   5    CALL TIMER(15000);
361   5    CURS_LOC(6 + CTABLE_OFF) = CURS_LOC(4 + CTABLE_OFF);
362   5    CURS_LOC(7 + CTABLE_OFF) = CURS_LOC(5 + CTABLE_OFF);
363   5    CALL WRITE(@DEF_PAK_B,LENGTH(DEF_PAK_B));
364   5    CFUNC = IMAGF OR CUR4 OR ENAY OR MOVC;
365   5    CALL CURSOR_ROUTINE(@CURS_LOC,CFUNC);

           /* GET GRADIENT THRESHOLD FOR THIS EDGE */
366   5    BUFFER(0) = 'M';
367   5    DO WHILE BUFFER(0) = 'M';
368   6    CRLF;
369   6    CALL WRITE(@('ENTER GRADIENT THRESHOLD FOR THIS EDGE'),38);
370   6    CALL WRITE(@(CR,LF,'(Q - quit, M - measure) - '),28);
371   6    NOBYTES = READ(@BUFFER,5);
372   6    IF (BUFFER(0) <> CR) THEN DO;
374   7    IF BUFFER(0) = 'M' THEN
375   7    DO;
           /*  TRANSFER CURSOR COORDINATES TO CURS_LOC_2  */
376   8    VERT_DIST = CURS_LOC(6 + CTABLE_OFF) - CURS_LOC(4 + CTABLE_OFF);
377   8    CURS_LOC_2(1 + CTABLE_OFF) = CURS_LOC(5 + CTABLE_OFF);
378   8    CURS_LOC_2(3 + CTABLE_OFF) = CURS_LOC(5 + CTABLE_OFF);
379   8    CURS_LOC_2(0 + CTABLE_OFF) = CURS_LOC(4 + CTABLE_OFF);
380   8    CURS_LOC_2(2 + CTABLE_OFF) = CURS_LOC(6 + CTABLE_OFF) + VERT_DIST;
           /*  ERASE CURSORS FROM SCREEN  */
381   8    CFUNC = IMAGF OR DISC;
382   8    CALL CURSOR_ROUTINE(@CURS_LOC,CFUNC);
           /*  ENABLE NEW CURSOR DISPLAY  */
383   8    CFUNC = IMAGF OR RESTC;
384   8    CALL CURSOR_ROUTINE(@CURS_LOC_2,CFUNC);
385   8    J = DOUBLE(IMAGF);
386   8    SIZE = 1;
387   8    CALL GRAD_PROFILE(@CURS_LOC_2,@J,@SIZE);
388   8    CALL WRITE(@(CR,LF,'dark to light is +, light to dark is -'),40);
389   8    CALL WRITE(@(CR,LF,'+ or - is \'),13);
390   8    CALL WRITE(@(CR,LF,'READY TO PROCEDE ? Y/N - '),27);
391   8    NOBYTES = READ(@BUFFER,5);
392   8    BUFFER(0) = 'M';
393   8    IF LABEL_FLAG = 0 THEN CALL TRANS_IMAGE(1);
395   8        ELSE CALL TRANS_IMAGE(0);
           /*  RESTORE ORIGINAL CURSORS  */
396   8    CALL CURSOR_ROUTINE(@CURS_LOC,CFUNC);
397   8    END;

398   7    ELSE DO;
399   8    IF (BUFFER(0) = 'Q') THEN RETURN;
401   8    IF (BUFFER(0) = '-' OR BUFFER(0) = '\') THEN DO;
403   9    TTHRESH = DOUBLE(BUFFER(0));
404   9    TTHRESH = SHL(TTHRESH,8);
405   9    BUFFER(0) = ' ';
406   9    END;
407   8    ELSE DO;
408   9    TTHRESH = 02B00H;
409   9    END;
410   8    CALL ASC$WRD(@BUFFER,@IGRAD);
411   8    IF (IGRAD > 0 AND IGRAD <64) THEN DO;
413   9    IGRAD = IGRAD OR TTHRESH;
414   9    PKG_OFFSETS(PROD_PTR).VERT_GRAD_RIGHT = IGRAD;
415   9    END;
416   8    ELSE BUFFER(0) = 'M';
417   8    END;
418   7    END;
419   6    ELSE BUFFER(0) = 'M';
420   6    END;
           /* COMPUTE PACKAGE OFFSETS */
421   5    PKG_OFFSETS(PROD_PTR).VERT_ST_ELEL = CURS_LOC(0 + CTABLE_OFF);
422   5    PKG_OFFSETS(PROD_PTR).VERT_ST_ELER = CURS_LOC(4 + CTABLE_OFF);
423   5    PKG_OFFSETS(PROD_PTR).VERT_ST_LEFT = INT(VERT_CL) -
                                                INT(CURS_LOC(1 + CTABLE_OFF));
424   5    PKG_OFFSETS(PROD_PTR).VERT_ST_RIGHT = INT(VERT_CL) -
                                                 INT(CURS_LOC(5 + CTABLE_OFF));
425   5    CRLF;

           /* CHECK TO SEE IF POINTS ARE OK */
426   5    CALL WRITE(@('ARE THESE POINTS OK ? Y/N - '),28);
427   5    NOBYTES = READ(@BUFFER,5);
```

```
                /*  RESTORE IMAGE  */
 428   5        IF LABEL_FLAG = 0 THEN CALL TRANS_IMAGE(1);
 430   5            ELSE CALL TRANS_IMAGE(0);
 431   5        CALL LOC_PACKAGE;
 432   5        CALL WRITE(@('IS THE PACKAGE LOCATED OK ? Y/N - '),34);
 433   5        NOBYTES = READ(@BUFFER,5);
                /*  RESTORE IMAGE  */
 434   5        IF LABEL_FLAG = 0 THEN CALL TRANS_IMAGE(1);
 436   5            ELSE CALL TRANS_IMAGE(0);
 437   5        END;
 438   4        END;
 439   3        END;
 440   2        END DEF_PACKAGE;
 441   1        END DEF_PACK_MODULE;


MODULE INFORMATION:

     CODE AREA SIZE     = 0ABEH   2750D
     CONSTANT AREA SIZE = 05F8H   1528D
     VARIABLE AREA SIZE = 000AH     10D
     MAXIMUM STACK SIZE = 0010H     16D
     687 LINES READ
     0 PROGRAM WARNINGS
     0 PROGRAM ERRORS

DICTIONARY SUMMARY:

     47KB MEMORY AVAILABLE
     14KB MEMORY USED   (29%)
     0KB DISK SPACE USED

END OF PL/M-86 COMPILATION


iRMX 86 PL/M-86 V2.3 COMPILATION OF MODULE DEF_CLOS_MODULE
OBJECT MODULE PLACED IN SOURCE/CLOSURE.OBJ
COMPILER INVOKED BY:  :LANG:PLM86 SOURCE/CLOSURE.PLM OPTIMIZE(3) ROM SET(TARGET=1)


                $INCLUDE(SOURCE/COPYRIGHT)
           =    /*

           =    ****************************************************************************
           =    *                                                                          *
           =    *                                                                          *
           =    *                    COPYRIGHT CHESEBROUGH-POND'S INC.                     *
           =    *                                                                          *
           =    *                    (c) 1983, CHESEBROUGH-POND'S INC.                     *
           =    *                                                                          *
           =    *                                                                          *
           =    *                                                                          *
           =    *                                                                          *
           =    *     ALL RIGHTS RESERVED. NO PART OF THIS PROGRAM MAY BE REPRODUCED,      *
           =    *     TRANSMITTED, TRANSCRIBED, STORED IN A RETRIEVAL SYSTEM, OR           *
           =    *     TRANSLATED INTO ANY LANGUAGE OR COMPUTER LANGUAGE, IN ANY FORM       *
           =    *     OR BY ANY MEANS, ELECTRONIC, MECHANICAL, MAGNETIC, OPTICAL,          *
           =    *     CHEMICAL, MANUAL OR OTHERWISE, WITHOUT THE EXPRESS WRITTEN PER-      *
           =    *     MISSION OF CHESEBROUGH-POND'S INC., 33 BENEDICT PLACE, GREENWICH,    *
           =    *     CONNECTICUT.                                                         *
           =    *                                                                          *
           =    *                                                                          *
           =    ****************************************************************************


           =    */

                $TITLE(' DEFINE CLOSURE MODULE')
   1            DEF_CLOS_MODULE:
                DO;
                $INCLUDE(SOURCE/DECLARE.EXT)
   2    1  =    DECLARE      DCL      LITERALLY    'DECLARE';
   3    1  =    DECLARE      LIT      LITERALLY    'LITERALLY';
                $INCLUDE(SOURCE/XTERMHAND.EXT)
   4    1  =    INIT_USART: PROCEDURE EXTERNAL;
   5    2  =    END INIT_USART;
   6    1  =    WRITE: PROCEDURE(BUFFER_PTR,BLENGTH) EXTERNAL;
   7    2  =            DCL BUFFER_PTR  POINTER;
   8    2  =            DCL BLENGTH WORD;
   9    2  =    END WRITE;
  10    1  =    READ: PROCEDURE(BUFFER_PTR,BLENGTH)WORD EXTERNAL;
  11    2  =            DCL      BUFFER_PTR  POINTER;
  12    2  =            DCL      BLENGTH   WORD;
  13    2  =    END READ;
                $INCLUDE(SOURCE/IWCONV.EXT)
```

```
          =    $SAVE
          =    $NOLIST

               /*  VARIABLE DECLARATIONS PUBLIC  */
35    1        DCL IGRAD              WORD EXTERNAL;
36    1        DCL PARAM1             INTEGER EXTERNAL;
37    1        DCL BUFFER (24)        BYTE EXTERNAL;
38    1        DCL CURS_LOC (24)      WORD EXTERNAL;
39    1        DCL CURS_LOC_2 (24)    WORD EXTERNAL;
40    1        DCL NOBYTES            WORD EXTERNAL;
41    1        DCL PROD_NUM           WORD EXTERNAL;
42    1        DCL PROD_PTR           WORD EXTERNAL;
43    1        DCL SIZE               WORD EXTERNAL;
44    1        DCL CTABLE_OFF         WORD EXTERNAL;
45    1        DCL VERT_CL            WORD EXTERNAL;
46    1        DCL HOR_DIST           WORD EXTERNAL;
47    1        DCL VERT_DIST          WORD EXTERNAL;
48    1        DCL LABEL_FLAG         BYTE EXTERNAL;
49    1        DCL CFUNC              BYTE EXTERNAL;
50    1        DCL IMAGF              BYTE EXTERNAL;
51    1        DCL DIR_PTR            BYTE EXTERNAL;

               /* LOCAL VARIABLE DECLARATIONS */
52    1        DCL (I, J, TTHRESH)    WORD;
53    1        DCL CENTER1            WORD;
54    1        DCL CENTER2            WORD;

               /* LITERALL DECLARATIONS  */
55    1        DCL CAMERA_ON          LIT      '03H';
56    1        DCL CAMERA_OFF         LIT      '00H';
57    1        DCL DATA_REG           LIT      '00H';
58    1        DCL COMMD_REG          LIT      '03H';
59    1        DCL HOZ_ADD_LO         LIT      '04H';
60    1        DCL HOZ_ADD_HI         LIT      '05H';
61    1        DCL VERT_ADD           LIT      '06H';
62    1        DCL POST_INC_READ      LIT      '01H';
63    1        DCL POST_INC_WRITE     LIT      '02H';
64    1        DCL CLRSCRN            LIT      '1BH, 6AH, 0CH';
65    1        DCL SET_CUR            LIT      '1BH, 59H';
66    1        DCL ESC                LIT      '1BH';
67    1        DCL CRLF               LIT      'CALL WRITE(@(13, 10), 2)';
68    1        DCL CR                 LIT      '0DH';
69    1        DCL LF                 LIT      '0AH';
70    1        DCL RESTC              LIT      '00H';
71    1        DCL DISC               LIT      '03H';
72    1        DCL MOVC               LIT      '02H';
73    1        DCL CUR1               LIT      '00H';
74    1        DCL CUR2               LIT      '04H';
75    1        DCL CUR3               LIT      '08H';
76    1        DCL CUR4               LIT      '0CH';
77    1        DCL HOMC               LIT      '01H';
78    1        DCL ENAX               LIT      '010H';
79    1        DCL ENAY               LIT      '020H';
80    1        DCL F_IMG              LIT      '00H';
81    1        DCL B_IMG              LIT      '040H';

82    1        DCL PROD_NAM_TBL (20) STRUCTURE(NAM_BUFFER(20) BYTE) EXTERNAL;

               $INCLUDE(SOURCE/OFFSETS.LIB)
          =    $SAVE
          =    $NOLIST

               /*  EXTERNAL PROCEDURE DECLARATIONS  */
91    1        CURSOR_ROUTINE: PROCEDURE(CURSOR_TABLE, FUNCT) EXTERNAL;
92    2            DCL CURSOR_TABLE     POINTER;
93    2            DCL FUNCT            BYTE;
94    2        END CURSOR_ROUTINE;

95    1        GRAD_PROFILE: PROCEDURE(CURSOR_TABLE, IMAGE_PTR, SIZE_PTR) EXTERNAL;
96    2            DCL CURSOR_TABLE     POINTER;
97    2            DCL IMAGE_PTR        POINTER;
98    2            DCL SIZE_PTR         POINTER;
99    2        END GRAD_PROFILE;

100   1        TIMER: PROCEDURE(J) EXTERNAL;
101   2            DCL J                WORD;
102   2        END TIMER;

103   1        TRANS_IMAGE: PROCEDURE(IFLAG) EXTERNAL;
104   2            DCL IFLAG            BYTE;
105   2        END TRANS_IMAGE;

106   1        INIT_CUR: PROCEDURE(TABLE_PTR) EXTERNAL;
107   2            DCL TABLE_PTR        POINTER;
108   2        END INIT_CUR;

109   1        LOC_CLOSURE: PROCEDURE EXTERNAL;
110   2        END LOC_CLOSURE;
```

```
111   1    DEF_CLOSURE: PROCEDURE PUBLIC;

112   2    DO;

           /*  DETERMINE IF A CLOSURE TEST IS REQUIRED  */

113   3        CALL WRITE(@(CLRSCRN,CR,LF,'IS A CLOSURE TEST NEEDED ? Y/N - '),38);
114   3        NOBYTES = READ(@BUFFER,5);
115   3        IF BUFFER(0) = 'Y' THEN
116   3    DO;
117   4        CLOSURE_OFFSETS(PROD_PTR).CLOSURE_FLAG = OFOH;

118   4    BUFFER(0) = ' ';
119   4    DO WHILE BUFFER(0) <> 'Y';
           /*  DETERMINE ORIENTATION OF THE CLOSURE  */

           /*  CLEAR OLD DIRECTION POINTER  */
120   5        CLOSURE_OFFSETS(PROD_PTR).CLOSURE_FLAG = (CLOSURE_OFFSETS(PROD_PTR).CLOSURE_FLAG
                   AND OFOH);

121   5        CALL WRITE(@(CR,LF,'ENTER DIRECTION OF REFERENCE EDGE',CR,LF,'H/V - '),43);
122   5        NOBYTES = READ(@BUFFER,5);
123   5        IF (BUFFER(0) = 'Q') THEN RETURN;
125   5        IF BUFFER(0) = 'H' THEN DIR_PTR = OFH;
127   5        ELSE DIR_PTR = OOH;
128   5        CLOSURE_OFFSETS(PROD_PTR).CLOSURE_FLAG = (CLOSURE_OFFSETS(PROD_PTR).CLOSURE_FLAG
                   OR DIR_PTR);

           /*  DETERMINE IMAGE POINTER  */
129   5        IF LABEL_FLAG = 0 THEN IMAGF = F_IMG;
131   5            ELSE IMAGF = B_IMG;
132   5        BUFFER(0) = ' ';
133   5        DO WHILE BUFFER(0) <> 'Y';

           /*  CLEAR CURSOR TABLE  */

134   6        CALL INIT_CUR(@CURS_LOC);
135   6        CALL INIT_CUR(@CURS_LOC_2);
           /*  HOME CURSOR 1  */
136   6        CFUNC = IMAGF OR CUR1 OR HOMC;
137   6        CALL CURSOR_ROUTINE(@CURS_LOC,CFUNC);

           /*  LOCATE POINT 1  */

138   6        CALL WRITE(@(CR,LF,'MOVE CURSOR TO START FOR LOCATING',CR,LF,
               'LEFT(H) OR TOP(V) EDGE OF CLOSURE'),70);
139   6        CALL WRITE(@(CR,LF,LF,'HIT USER1 WHEN READY -'),25);

           /*  SET UP CFUNC  */
140   6        CFUNC = IMAGF OR CUR1 OR ENAX OR ENAY OR MOVC;
141   6        CALL CURSOR_ROUTINE(@CURS_LOC,CFUNC);
142   6        CALL TIMER(15000);

           /*  LOCATE LEFT OR TOP EDGE OF CLOSURE  */

143   6        CALL WRITE(@(CR,LF,'MOVE CURSOR TO EDGE.'),22);
144   6        CALL WRITE(@(CR,LF,LF,'HIT USER1 WHEN READY -'),25);

           /*  DETERMINE DIRECTION OF MOTION FOR CURSOR  */

145   6        IF DIR_PTR = OFH THEN CFUNC = IMAGF OR CUR2 OR ENAY OR MOVC;
147   6        ELSE CFUNC = IMAGF OR CUR2 OR ENAX OR MOVC;
148   6        CURS_LOC(2 + CTABLE_OFF) = CURS_LOC(0 + CTABLE_OFF);
149   6        CURS_LOC(3 + CTABLE_OFF) = CURS_LOC(1 + CTABLE_OFF);
150   6        CALL CURSOR_ROUTINE(@CURS_LOC,CFUNC);
151   6        CALL TIMER(15000);


           /*  GET EDGE GRADIENT FOR THIS LOCATION  */
152   6        BUFFER(0) = 'M';
153   6        DO WHILE BUFFER(0) = 'M';
154   7        CRLF;
155   7        CALL WRITE(@('ENTER GRADIENT THRESHOLD FOR THIS EDGE'),38);
156   7        CALL WRITE(@(CR,LF,'(Q - quit, M - measure) - '),28);
157   7        NOBYTES = READ(@BUFFER,5);
158   7        IF (BUFFER(0) <> CR) THEN DO;
160   8        IF BUFFER(0) = 'M' THEN
161   8        DO;

           /*  TRANSFER CURSOR COORDINATES TO CURS_LOC_2  */

162   9        CURS_LOC_2(0 + CTABLE_OFF) = CURS_LOC(0 + CTABLE_OFF);
163   9        CURS_LOC_2(1 + CTABLE_OFF) = CURS_LOC(1 + CTABLE_OFF);
164   9        IF DIR_PTR = OFH THEN
165   9        DO;    /*  HORIZONTAL ORIENTATION  */
           /*  UPDATE CURS_LOC_2 TABLE  */
166  10            CURS_LOC_2(3 + CTABLE_OFF) = CURS_LOC(1 + CTABLE_OFF);
167  10            IF CURS_LOC(2 + CTABLE_OFF) > CURS_LOC(0 + CTABLE_OFF)
```

```
168  10              THEN DO;
          /*  CALCULATE VERTICAL DISTANCE FOR GRAD_PROF  */
169  11              VERT_DIST = CURS_LOC(2 + CTABLE_OFF) - CURS_LOC(0 + CTABLE_OFF);
170  11              CURS_LOC_2(2 + CTABLE_OFF) = CURS_LOC(2 + CTABLE_OFF) + VERT_DIST;
171  11              END;
172  10              ELSE DO;
173  11              VERT_DIST = CURS_LOC(0 + CTABLE_OFF) - CURS_LOC(2 + CTABLE_OFF);
174  11              CURS_LOC_2(2 + CTABLE_OFF) = CURS_LOC(2 + CTABLE_OFF) - VERT_DIST;
175  11              END;
176  10          END;
177   9          ELSE DO;   /*  VERTICAL ORIENTATION  */
          /*  UPDATE CURS_LOC_2  */
178  10              CURS_LOC_2(2 + CTABLE_OFF) = CURS_LOC(0 + CTABLE_OFF);
179  10              IF CURS_LOC(3 + CTABLE_OFF) > CURS_LOC(1 + CTABLE_OFF)
180  10              THEN DO;
          /*  CALCULATE HORIZONTAL DISTANCE FOR GRAD_PROF  */
181  11              HOR_DIST = CURS_LOC(3 + CTABLE_OFF) - CURS_LOC(1 + CTABLE_OFF);
182  11              CURS_LOC_2(3 + CTABLE_OFF) = CURS_LOC(3 + CTABLE_OFF) + HOR_DIST;
183  11              END;
184  10              ELSE DO;
185  11              HOR_DIST = CURS_LOC(1 + CTABLE_OFF) - CURS_LOC(3 + CTABLE_OFF);
186  11              CURS_LOC_2(3 + CTABLE_OFF) = CURS_LOC(3 + CTABLE_OFF) - HOR_DIST;
187  11              END;
188  10          END;

          /*  ERASE CURSORS FROM SCREEN  */
189   9          CFUNC = IMAGF OR DISC;
190   9          CALL CURSOR_ROUTINE(@CURS_LOC,CFUNC);

          /*  ENABLE NEW CURSOR DISPLAY  */
191   9          CFUNC = IMAGF OR RESTC;
192   9          CALL CURSOR_ROUTINE(@CURS_LOC_2,CFUNC);
193   9          J = DOUBLE(IMAGF);
194   9          SIZE = 1;
195   9          CALL GRAD_PROFILE(@CURS_LOC_2,@J,@SIZE);
196   9          CALL WRITE(@(CR,LF,'dark to light is +, light to dark is -'),40);
197   9          CALL WRITE(@(CR,LF,'+ or - is \'),13);
198   9          CALL WRITE(@(CR,LF,'READY TO PROCEDE ? Y/N - '),27);
199   9          NOBYTES = READ(@BUFFER,5);
200   9          BUFFER(0) = 'M';
201   9          IF LABEL_FLAG = 0 THEN CALL TRANS_IMAGE(1);
203   9          ELSE CALL TRANS_IMAGE(0);

          /*  RESTORE ORIGINAL CURSORS  */
204   9          CALL CURSOR_ROUTINE(@CURS_LOC,CFUNC);
205   9          END;

206   8          ELSE DO;
207   9          IF (BUFFER(0) = 'Q') THEN RETURN;
209   9          IF (BUFFER(0) = '-' OR BUFFER(0) = '\') THEN DO;
211  10          TTHRESH = DOUBLE(BUFFER(0));
212  10          TTHRESH = SHL(TTHRESH,8);
213  10          BUFFER(0) = ' ';
214  10          END;
215   9          ELSE DO;
216  10          TTHRESH = 02B00H;
217  10          END;
218   9          CALL ASC$WRD(@BUFFER,@IGRAD);
219   9          IF (IGRAD > 0 AND IGRAD < 64) THEN DO;
221  10          IGRAD = IGRAD OR TTHRESH;
222  10          CLOSURE_OFFSETS(PROD_PTR).PT1_THRESH = IGRAD;
223  10          END;
224   9          ELSE BUFFER(0) = 'M';
225   9          END;
226   8          END;
227   7          ELSE BUFFER(0) = 'M';
228   7          END;

          /*  STORE OFFSETS IN TABLE  */

          /*  CALCULATE COUNTER FOR LOCATE CLOSURE  */
229   6          IF DIR_PTR = 0FH THEN CLOSURE_OFFSETS(PROD_PTR).PT1_COUNT =
230   6              4 * (INT(CURS_LOC(2 + CTABLE_OFF)) - INT(CURS_LOC(0 + CTABLE_OFF)));
231   6              ELSE CLOSURE_OFFSETS(PROD_PTR).PT1_COUNT =
                     4 * (INT(CURS_LOC(3 + CTABLE_OFF)) - INT(CURS_LOC(1 + CTABLE_OFF)));
232   6          CLOSURE_OFFSETS(PROD_PTR).PT1_HOZ_ST =
                 INT(WORK_TABLE(LABEL_FLAG).PACKAGE_CENTER) - INT(CURS_LOC(1 + CTABLE_OFF));
233   6          CLOSURE_OFFSETS(PROD_PTR).PT1_VERT_ST =
                 INT(WORK_TABLE(LABEL_FLAG).PACKAGE_ELEV) - INT(CURS_LOC(0 + CTABLE_OFF));
          /*  STORE EDGE LOCATION TEMPORARILY  */
234   6   CLOSURE_EDGE(0).HOZ = CURS_LOC(3 + CTABLE_OFF);
235   6   CLOSURE_EDGE(0).VERT = CURS_LOC(2 + CTABLE_OFF);

          /*  LOCATE OPPOSITE EDGE OF CLOSURE  */

          /*  SET UP NEXT CURSOR MOVE  */
236   6   CURS_LOC(4 + CTABLE_OFF) = CURS_LOC(2 + CTABLE_OFF);
237   6   CURS_LOC(5 + CTABLE_OFF) = CURS_LOC(3 + CTABLE_OFF);
```

```
238   6      CALL WRITE(@(CR,LF,'MOVE CURSOR TO OPPOSITE EDGE.'),31);
239   6      CALL WRITE(@(CR,LF,LF,'HIT USER1 WHEN READY -'),25);

             /* CHECK FOR DIRECTION OF MOVE */
240   6      IF DIR_PTR = OFH THEN CFUNC = IMAGF OR CUR3 OR ENAY OR MOVC;
242   6      ELSE CFUNC = IMAGF OR CUR3 OR ENAX OR MOVC;
243   6      CALL CURSOR_ROUTINE(@CURS_LOC,CFUNC);
244   6      CALL TIMER(15000);

             /* STORE EDGE LOCATION */

245   6      CLOSURE_EDGE(1).HOZ = CURS_LOC(5 + CTABLE_OFF);
246   6      CLOSURE_EDGE(1).VERT = CURS_LOC(4 + CTABLE_OFF);

             /* GET GRADIENT INFORMATION FOR THIS POINT */

247   6          BUFFER(0) = 'M';
248   6          DO WHILE BUFFER(0) = 'M';
249   7          CRLF;
250   7          CALL WRITE(@('ENTER GRADIENT THRESHOLD FOR THIS EDGE'),38);
251   7          CALL WRITE(@(CR,LF,'(Q - quit, M - measure) - '),28);
252   7          NOBYTES = READ(@BUFFER,5);
253   7          IF (BUFFER(0) <> CR) THEN DO;
255   8          IF BUFFER(0) = 'M' THEN
256   8          DO;


257   9          IF DIR_PTR = OFH THEN
258   9          DO;    /* HORIZONTAL ORIENTATION */
259  10              IF CURS_LOC(2 + CTABLE_OFF) > CURS_LOC(0 + CTABLE_OFF)
260  10              THEN DO;
261  11              VERT_DIST = CURS_LOC(2 + CTABLE_OFF) - CURS_LOC(0 + CTABLE_OFF);
262  11              END;
263  10              ELSE DO;
264  11              VERT_DIST = CURS_LOC(0 + CTABLE_OFF) - CURS_LOC(2 + CTABLE_OFF);
265  11              END;

             /* UPDATE CURS_LOC_2 TABLE */
266  10              CURS_LOC_2(1 + CTABLE_OFF) = CURS_LOC(5 + CTABLE_OFF);
267  10              CURS_LOC_2(3 + CTABLE_OFF) = CURS_LOC(5 + CTABLE_OFF);
268  10              CURS_LOC_2(2 + CTABLE_OFF) = CURS_LOC(4 + CTABLE_OFF) + VERT_DIST;
269  10              CURS_LOC_2(0 + CTABLE_OFF) = CURS_LOC(4 + CTABLE_OFF) - VERT_DIST;
270  10          END;
271   9          ELSE DO;   /* VERTICAL ORIENTATION */
             /* CALCULATE HORIZONTAL DISTANCE FOR GRAD_PROF */
272  10              IF CURS_LOC(3 + CTABLE_OFF) > CURS_LOC(1 + CTABLE_OFF)
273  10              THEN DO;
274  11              HOR_DIST = CURS_LOC(3 + CTABLE_OFF) - CURS_LOC(1 + CTABLE_OFF);
275  11              END;
276  10              ELSE DO;
277  11              HOR_DIST = CURS_LOC(1 + CTABLE_OFF) - CURS_LOC(3 + CTABLE_OFF);
278  11              END;
279  10              CURS_LOC_2(0 + CTABLE_OFF) = CURS_LOC(4 + CTABLE_OFF);
280  10              CURS_LOC_2(2 + CTABLE_OFF) = CURS_LOC(4 + CTABLE_OFF);
281  10              CURS_LOC_2(3 + CTABLE_OFF) = CURS_LOC(5 + CTABLE_OFF) + HOR_DIST;
282  10              CURS_LOC_2(1 + CTABLE_OFF) = CURS_LOC(5 + CTABLE_OFF) - HOR_DIST;
283  10          END;

             /* ERASE CURSORS FROM SCREEN */
284   9          CFUNC = IMAGF OR DISC;
285   9          CALL CURSOR_ROUTINE(@CURS_LOC,CFUNC);

             /* ENABLE NEW CURSOR DISPLAY */
286   9          CFUNC = IMAGF OR RESTC;
287   9          CALL CURSOR_ROUTINE(@CURS_LOC_2,CFUNC);
288   9          J = DOUBLE(IMAGF);
289   9          SIZE = 1;
290   9          CALL GRAD_PROFILE(@CURS_LOC_2,@J,@SIZE);
291   9          CALL WRITE(@(CR,LF,'dark to light is +, light to dark is -'),40);
292   9          CALL WRITE(@(CR,LF,'+ or - is \'),13);
293   9          CALL WRITE(@(CR,LF,'READY TO PROCEDE ? Y/N - '),27);
294   9          NOBYTES = READ(@BUFFER,5);
295   9          BUFFER(0) = 'M';
296   9          IF LABEL_FLAG = 0 THEN CALL TRANS_IMAGE(1);
298   9          ELSE CALL TRANS_IMAGE(0);

             /* RESTORE ORIGINAL CURSORS */
299   9          CALL CURSOR_ROUTINE(@CURS_LOC,CFUNC);
300   9          END;
301   8          ELSE DO;
302   9          IF (BUFFER(0) = 'Q') THEN RETURN;
304   9          IF (BUFFER(0) = '-' OR BUFFER(0) = '\') THEN DO;
306  10          TTHRESH = DOUBLE(BUFFER(0));
307  10          TTHRESH = SHL(TTHRESH,8);
308  10          BUFFER(0) = ' ';
309  10          END;
310   9          ELSE DO;
311  10          TTHRESH = 02B00H;
```

```
312  10        END;
313   9        CALL ASC$WRD(@BUFFER,@IGRAD);
314   9        IF (IGRAD > 0 AND IGRAD < 64) THEN DO;
316  10        IGRAD = IGRAD OR TTHRESH;
317  10        CLOSURE_OFFSETS(PROD_PTR).PT2_THRESH = IGRAD;
318  10        END;
319   9        ELSE BUFFER(0) = 'M';
320   9        END;
321   8        END;
322   7        ELSE BUFFER(0) = 'M';
323   7        END;
          /*   LOCATE POINT 2 STARTING LOCATIONS   */

324   6        CALL WRITE(@(CR,LF,'MOVE CURSOR TO START POINT FOR LOCATING',
                            CR,LF,'THIS EDGE. '),53);
325   6        CALL WRITE(@(CR,LF,LF,'HIT USER 1 WHEN READY -'),26);

          /*   SET UP CURSOR TABLE FOR MOVE   */

326   6        CURS_LOC(6 + CTABLE_OFF) = CURS_LOC(4 + CTABLE_OFF);
327   6        CURS_LOC(7 + CTABLE_OFF) = CURS_LOC(5 + CTABLE_OFF);

328   6        IF DIR_PTR = 0FH THEN CFUNC = IMAGF OR CUR4 OR ENAY OR MOVC;
330   6            ELSE CFUNC = IMAGF OR CUR4 OR ENAX OR MOVC;
331   6        CALL CURSOR_ROUTINE(@CURS_LOC,CFUNC);

          /*   CALCULATE AND STORE OFFSET TERMS   */

332   6        CLOSURE_OFFSETS(PROD_PTR).PT2_HOZ_ST =
                   INT(WORK_TABLE(LABEL_FLAG).PACKAGE_CENTER) - INT(CURS_LOC(7 + CTABLE_OFF));
333   6        CLOSURE_OFFSETS(PROD_PTR).PT2_VERT_ST =
                   INT(WORK_TABLE(LABEL_FLAG).PACKAGE_ELEV) - INT(CURS_LOC(6 + CTABLE_OFF));
334   6        IF DIR_PTR = 0FH THEN
335   6        CLOSURE_OFFSETS(PROD_PTR).PT2_COUNT = 4 * (INT(CURS_LOC(6 + CTABLE_OFF)) -
                        INT(CURS_LOC(4 + CTABLE_OFF)));
336   6        ELSE
               CLOSURE_OFFSETS(PROD_PTR).PT2_COUNT = 4 * (INT(CURS_LOC(7 + CTABLE_OFF)) -
                        INT(CURS_LOC(5 + CTABLE_OFF)));

337   6   CALL TIMER(15000);
          /*   CLEAR CURSOR TABLE   */

338   6        CALL INIT_CUR(@CURS_LOC);
339   6        CALL INIT_CUR(@CURS_LOC_2);
          /*   HOME CURSOR 1   */
340   6        CFUNC = IMAGF OR CUR1 OR HOMC;
341   6        CALL CURSOR_ROUTINE(@CURS_LOC,CFUNC);

          /*   LOCATE POINT 3   */

342   6        CALL WRITE(@(CLRSCRN,CR,LF,'MOVE CURSOR TO START FOR LOCATING',CR,LF,
               'RIGHT(H) OR BOTTOM(V) EDGE OF CLOSURE'),77);
343   6        CALL WRITE(@(CR,LF,LF,'HIT USER1 WHEN READY -'),25);

          /*   SET UP CFUNC   */
344   6        CFUNC = IMAGF OR CUR1 OR ENAX OR ENAY OR MOVC;
345   6        CALL CURSOR_ROUTINE(@CURS_LOC,CFUNC);
346   6        CALL TIMER(15000);

          /*   LOCATE LEFT OR TOP EDGE OF CLOSURE   */

347   6        CALL WRITE(@(CR,LF,'MOVE CURSOR TO EDGE. '),22);
348   6        CALL WRITE(@(CR,LF,LF,'HIT USER1 WHEN READY -'),25);

          /*   DETERMINE DIRECTION OF MOTION FOR CURSOR   */

349   6        IF DIR_PTR = 0FH THEN CFUNC = IMAGF OR CUR2 OR ENAY OR MOVC;
351   6        ELSE CFUNC = IMAGF OR CUR2 OR ENAX OR MOVC;
352   6        CURS_LOC(2 + CTABLE_OFF) = CURS_LOC(0 + CTABLE_OFF);
353   6        CURS_LOC(3 + CTABLE_OFF) = CURS_LOC(1 + CTABLE_OFF);
354   6        CALL CURSOR_ROUTINE(@CURS_LOC,CFUNC);
355   6        CALL TIMER(15000);


          /*   GET EDGE GRADIENT FOR THIS LOCATION   */
356   6        BUFFER(0) = 'M';
357   6        DO WHILE BUFFER(0) = 'M';
358   7        CRLF;
359   7        CALL WRITE(@('ENTER GRADIENT THRESHOLD FOR THIS EDGE'),38);
360   7        CALL WRITE(@(CR,LF,'(Q - quit, M - measure) - '),28);
361   7        NOBYTES = READ(@BUFFER,5);
362   7        IF (BUFFER(0) <> CR) THEN DO;
364   8        IF BUFFER(0) = 'M' THEN
365   8        DO;

          /*   TRANSFER CURSOR COORDINATES TO CURS_LOC_2   */

366   9        CURS_LOC_2(0 + CTABLE_OFF) = CURS_LOC(0 + CTABLE_OFF);
367   9        CURS_LOC_2(1 + CTABLE_OFF) = CURS_LOC(1 + CTABLE_OFF);
```

```
368   9         IF DIR_PTR = OFH THEN
369   9         DO;   /*  HORIZONTAL ORIENTATION  */

              /*  UPDATE CURS_LOC_2 TABLE  */
370  10             CURS_LOC_2(3 + CTABLE_OFF) = CURS_LOC(1 + CTABLE_OFF);
371  10             IF CURS_LOC(2 + CTABLE_OFF) > CURS_LOC(0 + CTABLE_OFF)
372  10             THEN DO;
              /*  CALCULATE VERTICAL DISTANCE FOR GRAD_PROF  */
373  11             VERT_DIST = CURS_LOC(2 + CTABLE_OFF) - CURS_LOC(0 + CTABLE_OFF);
374  11             CURS_LOC_2(2 + CTABLE_OFF) = CURS_LOC(2 + CTABLE_OFF) + VERT_DIST;
375  11             END;
376  10             ELSE DO;
377  11             VERT_DIST = CURS_LOC(0 + CTABLE_OFF) - CURS_LOC(2 + CTABLE_OFF);
378  11             CURS_LOC_2(2 + CTABLE_OFF) = CURS_LOC(2 + CTABLE_OFF) - VERT_DIST;
379  11             END;
380  10         END;
381   9         ELSE DO;   /*  VERTICAL ORIENTATION  */
              /*  UPDATE CURS_LOC_2  */
382  10             CURS_LOC_2(2 + CTABLE_OFF) = CURS_LOC(0 + CTABLE_OFF);
383  10             IF CURS_LOC(3 + CTABLE_OFF) > CURS_LOC(1 + CTABLE_OFF)
384  10             THEN DO;
              /*  CALCULATE HORIZONTAL DISTANCE FOR GRAD_PROF  */
385  11             HOR_DIST = CURS_LOC(3 + CTABLE_OFF) - CURS_LOC(1 + CTABLE_OFF);
386  11             CURS_LOC_2(3 + CTABLE_OFF) = CURS_LOC(3 + CTABLE_OFF) + HOR_DIST;
387  11             END;
388  10             ELSE DO;
389  11             HOR_DIST = CURS_LOC(1 + CTABLE_OFF) - CURS_LOC(3 + CTABLE_OFF);
390  11             CURS_LOC_2(3 + CTABLE_OFF) = CURS_LOC(3 + CTABLE_OFF) - HOR_DIST;
391  11             END;
392  10         END;

              /*  ERASE CURSORS FROM SCREEN  */
393   9         CFUNC = IMAGF OR DISC;
394   9         CALL CURSOR_ROUTINE(@CURS_LOC,CFUNC);

              /*  ENABLE NEW CURSOR DISPLAY  */
395   9         CFUNC = IMAGF OR RESTC;
396   9         CALL CURSOR_ROUTINE(@CURS_LOC_2,CFUNC);
397   9         J = DOUBLE(IMAGF);
398   9         SIZE = 1;
399   9         CALL GRAD_PROFILE(@CURS_LOC_2,@J,@SIZE);
400   9         CALL WRITE(@(CR,LF,'dark to light is +, light to dark is -'),40);
401   9         CALL WRITE(@(CR,LF,'+ or - is \'),13);
402   9         CALL WRITE(@(CR,LF,'READY TO PROCEDE ? Y/N - '),27);
403   9         NOBYTES = READ(@BUFFER,5);
404   9         BUFFER(0) = 'M';
405   9         IF LABEL_FLAG = 0 THEN CALL TRANS_IMAGE(1);
407   9         ELSE CALL TRANS_IMAGE(0);

              /*  RESTORE ORIGINAL CURSORS  */
408   9         CALL CURSOR_ROUTINE(@CURS_LOC,CFUNC);
409   9         END;

410   8         ELSE DO;
411   9         IF (BUFFER(0) = 'Q') THEN RETURN;
413   9         IF (BUFFER(0) = '-' OR BUFFER(0) = '\') THEN DO;
415  10         TTHRESH = DOUBLE(BUFFER(0));
416  10         TTHRESH = SHL(TTHRESH,8);
417  10         BUFFER(0) = ' ';
418  10         END;
419   9         ELSE DO;
420  10         TTHRESH = 02B00H;
421  10         END;
422   9         CALL ASC$WRD(@BUFFER,@IGRAD);
423   9         IF (IGRAD > 0 AND IGRAD < 64) THEN DO;
425  10         IGRAD = IGRAD OR TTHRESH;
426  10         CLOSURE_OFFSETS(PROD_PTR).PT3_THRESH = IGRAD;
427  10         END;
428   9         ELSE BUFFER(0) = 'M';
429   9         END;
430   8         END;
431   7         ELSE BUFFER(0) = 'M';
432   7         END;
              /*  STORE OFFSETS IN TABLE  */

              /*  CALCULATE COUNTER FOR LOCATE CLOSURE  */
433   6         IF DIR_PTR = OFH THEN CLOSURE_OFFSETS(PROD_PTR).PT3_COUNT =
434   6             4 * (INT(CURS_LOC(2 + CTABLE_OFF)) - INT(CURS_LOC(0 + CTABLE_OFF)));
435   6             ELSE CLOSURE_OFFSETS(PROD_PTR).PT3_COUNT =
                    4 * (INT(CURS_LOC(3 + CTABLE_OFF)) - INT(CURS_LOC(1 + CTABLE_OFF)));
436   6         CLOSURE_OFFSETS(PROD_PTR).PT3_HOZ_ST =
                    INT(WORK_TABLE(LABEL_FLAG).PACKAGE_CENTER) - INT(CURS_LOC(1 + CTABLE_OFF));
437   6         CLOSURE_OFFSETS(PROD_PTR).PT3_VERT_ST =
                    INT(WORK_TABLE(LABEL_FLAG).PACKAGE_ELEV) - INT(CURS_LOC(0 + CTABLE_OFF));
              /*  STORE EDGE LOCATION TEMPORARILY  */
438   6       CLOSURE_EDGE(2).HOZ = CURS_LOC(3 + CTABLE_OFF);
439   6       CLOSURE_EDGE(2).VERT = CURS_LOC(2 + CTABLE_OFF);
```

```
               /*  LOCATE OPPOSITE EDGE OF CLOSURE  */

               /*  SET UP NEXT CURSOR MOVE  */
440   6        CURS_LOC(4 + CTABLE_OFF) = CURS_LOC(2 + CTABLE_OFF);
441   6        CURS_LOC(5 + CTABLE_OFF) = CURS_LOC(3 + CTABLE_OFF);
442   6        CALL WRITE(@(CR,LF,'MOVE CURSOR TO OPPOSITE EDGE. '),31);
443   6        CALL WRITE(@(CR,LF,LF,'HIT USER1 WHEN READY -'),25);

               /*  CHECK FOR DIRECTION OF MOVE  */
444   6        IF DIR_PTR = OFH THEN CFUNC = IMAGF OR CUR3 OR ENAY OR MOVC;
446   6        ELSE CFUNC = IMAGF OR CUR3 OR ENAX OR MOVC;
447   6        CALL CURSOR_ROUTINE(@CURS_LOC,CFUNC);
448   6        CALL TIMER(15000);

               /*  STORE EDGE LOCATION  */

449   6        CLOSURE_EDGE(3).HOZ = CURS_LOC(5 + CTABLE_OFF);
450   6        CLOSURE_EDGE(3).VERT = CURS_LOC(4 + CTABLE_OFF);

               /*  GET GRADIENT INFORMATION FOR THIS POINT  */

451   6            BUFFER(0) = 'M';
452   6            DO WHILE BUFFER(0) = 'M';
453   7            CRLF;
454   7            CALL WRITE(@('ENTER GRADIENT THRESHOLD FOR THIS EDGE'),38);
455   7            CALL WRITE(@(CR,LF,'(Q - quit, M - measure) - '),28);
456   7            NOBYTES = READ(@BUFFER,5);
457   7            IF (BUFFER(0) <> CR) THEN DO;
459   8            IF BUFFER(0) = 'M' THEN
460   8            DO;


461   9            IF DIR_PTR = OFH THEN
462   9            DO;    /*  HORIZONTAL ORIENTATION  */
463  10                IF CURS_LOC(2 + CTABLE_OFF) > CURS_LOC(0 + CTABLE_OFF)
464  10                THEN DO;
465  11                VERT_DIST = CURS_LOC(2 + CTABLE_OFF) - CURS_LOC(0 + CTABLE_OFF);
466  11                END;
467  10                ELSE DO;
468  11                VERT_DIST = CURS_LOC(0 + CTABLE_OFF) - CURS_LOC(2 + CTABLE_OFF);
469  11                END;
               /*  UPDATE CURS_LOC_2 TABLE  */
470  10                CURS_LOC_2(1 + CTABLE_OFF) = CURS_LOC(5 + CTABLE_OFF);
471  10                CURS_LOC_2(3 + CTABLE_OFF) = CURS_LOC(5 + CTABLE_OFF);
472  10                CURS_LOC_2(2 + CTABLE_OFF) = CURS_LOC(4 + CTABLE_OFF) + VERT_DIST;
473  10                CURS_LOC_2(0 + CTABLE_OFF) = CURS_LOC(4 + CTABLE_OFF) - VERT_DIST;
474  10            END;
475   9            ELSE DO;   /*  VERTICAL ORIENTATION  */
476  10                IF CURS_LOC(3 + CTABLE_OFF) > CURS_LOC(1 + CTABLE_OFF)
477  10                THEN DO;
478  11                HOR_DIST = CURS_LOC(3 + CTABLE_OFF) - CURS_LOC(1 + CTABLE_OFF);
479  11                END;
480  10                ELSE DO;
481  11                HOR_DIST = CURS_LOC(1 + CTABLE_OFF) - CURS_LOC(3 + CTABLE_OFF);
482  11                END;
               /*  CALCULATE HORIZONTAL DISTANCE FOR GRAD_PROF  */
483  10                CURS_LOC_2(0 + CTABLE_OFF) = CURS_LOC(4 + CTABLE_OFF);
484  10                CURS_LOC_2(2 + CTABLE_OFF) = CURS_LOC(4 + CTABLE_OFF);
485  10                CURS_LOC_2(3 + CTABLE_OFF) = CURS_LOC(5 + CTABLE_OFF) + HOR_DIST;
486  10                CURS_LOC_2(1 + CTABLE_OFF) = CURS_LOC(5 + CTABLE_OFF) - HOR_DIST;
487  10            END;

               /*  ERASE CURSORS FROM SCREEN  */
488   9            CFUNC = IMAGF OR DISC;
489   9            CALL CURSOR_ROUTINE(@CURS_LOC,CFUNC);

               /*  ENABLE NEW CURSOR DISPLAY  */
490   9            CFUNC = IMAGF OR RESTC;
491   9            CALL CURSOR_ROUTINE(@CURS_LOC_2,CFUNC);
492   9            J = DOUBLE(IMAGF);
493   9            SIZE = 1;
494   9            CALL GRAD_PROFILE(@CURS_LOC_2,@J,@SIZE);
495   9            CALL WRITE(@(CR,LF,'dark to light is +, light to dark is -'),40);
496   9            CALL WRITE(@(CR,LF,'+ or - is \'),13);
497   9            CALL WRITE(@(CR,LF,'READY TO PROCEDE ? Y/N - '),27);
498   9            NOBYTES = READ(@BUFFER,5);
499   9            BUFFER(0) = 'M';
500   9            IF LABEL_FLAG = 0 THEN CALL TRANS_IMAGE(1);
502   9            ELSE CALL TRANS_IMAGE(0);

               /*  RESTORE ORIGINAL CURSORS  */
503   9            CALL CURSOR_ROUTINE(@CURS_LOC,CFUNC);
504   9            END;

505   8            ELSE DO;
506   9            IF (BUFFER(0) = 'Q') THEN RETURN;
508   9            IF (BUFFER(0) = '-' OR BUFFER(0) = '\') THEN DO;
510  10            TTHRESH = DOUBLE(BUFFER(0));
```

```
511  10          TTHRESH = SHL(TTHRESH, 8);
512  10          BUFFER(0) = ' ';
513  10          END;
514   9          ELSE DO;
515  10          TTHRESH = 02B00H;
516  10          END;
517   9          CALL ASC$WRD(@BUFFER, @IGRAD);
518   9          IF (IGRAD > 0 AND IGRAD < 64) THEN DO;
520  10          IGRAD = IGRAD OR TTHRESH;
521  10          CLOSURE_OFFSETS(PROD_PTR).PT4_THRESH = IGRAD;
522  10          END;
523   9          ELSE BUFFER(0) = 'M';
524   9          END;
525   8          END;
526   7          ELSE BUFFER(0) = 'M';
527   7          END;
              /* LOCATE POINT 4 STARTING LOCATIONS */

528   6          CALL WRITE(@(CR,LF,'MOVE CURSOR TO START POINT FOR LOCATING',
                         CR,LF,'THIS EDGE. '),53);
529   6          CALL WRITE(@(CR,LF,LF,'HIT USER 1 WHEN READY -'),26);

              /* SET UP CURSOR TABLE FOR MOVE */

530   6          CURS_LOC(6 + CTABLE_OFF) = CURS_LOC(4 + CTABLE_OFF);
531   6          CURS_LOC(7 + CTABLE_OFF) = CURS_LOC(5 + CTABLE_OFF);

532   6          IF DIR_PTR = 0FH THEN CFUNC = IMAGF OR CUR4 OR ENAY OR MOVC;
534   6              ELSE CFUNC = IMAGF OR CUR4 OR ENAX OR MOVC;
535   6          CALL CURSOR_ROUTINE(@CURS_LOC,CFUNC);

              /* CALCULATE AND STORE OFFSET TERMS */

536   6          CLOSURE_OFFSETS(PROD_PTR).PT4_HOZ_ST =
                     INT(WORK_TABLE(LABEL_FLAG).PACKAGE_CENTER) - INT(CURS_LOC(7 + CTABLE_OFF));
537   6          CLOSURE_OFFSETS(PROD_PTR).PT4_VERT_ST =
                     INT(WORK_TABLE(LABEL_FLAG).PACKAGE_ELEV) - INT(CURS_LOC(6 + CTABLE_OFF));
538   6          IF DIR_PTR = 0FH THEN
539   6          CLOSURE_OFFSETS(PROD_PTR).PT4_COUNT = 4 * (INT(CURS_LOC(6 + CTABLE_OFF)) -
                         INT(CURS_LOC(4 + CTABLE_OFF)));
540   6          ELSE
                 CLOSURE_OFFSETS(PROD_PTR).PT4_COUNT = 4 * (INT(CURS_LOC(7 + CTABLE_OFF)) -
                         INT(CURS_LOC(5 + CTABLE_OFF)));
541   6          IF DIR_PTR = 0FH THEN
542   6          DO;

              /* CALCULATE SKEW */

543   7          CENTER1 = (CLOSURE_EDGE(0).VERT + CLOSURE_EDGE(1).VERT) / 2;
544   7          CENTER2 = (CLOSURE_EDGE(2).VERT + CLOSURE_EDGE(3).VERT) / 2;
545   7          CLOSURE_OFFSETS(PROD_PTR).CLOSURE_SKEW = (INT(CENTER2) - INT(CENTER1));

              /* CALCULATE ELEVATION */

546   7          CENTER1 = (CENTER1 + CENTER2) / 2;
547   7          CLOSURE_OFFSETS(PROD_PTR).CLOSURE_ELEV = (INT(WORK_TABLE(LABEL_FLAG).
                         PACKAGE_ELEV) - INT(CENTER1));

              /* CALCULATE WIDTH */

548   7          CENTER1 = CLOSURE_EDGE(1).VERT - CLOSURE_EDGE(0).VERT;
549   7          CENTER2 = CLOSURE_EDGE(3).VERT - CLOSURE_EDGE(2).VERT;
550   7          CLOSURE_OFFSETS(PROD_PTR).CLOSURE_WIDTH = (CENTER1 + CENTER2) / 2;
551   7          END;
552   6          ELSE
                 DO;

              /* CALCULATE SKEW */

553   7          CENTER1 = (CLOSURE_EDGE(0).HOZ + CLOSURE_EDGE(1).HOZ) / 2;
554   7          CENTER2 = (CLOSURE_EDGE(2).HOZ + CLOSURE_EDGE(3).HOZ) / 2;
555   7          CLOSURE_OFFSETS(PROD_PTR).CLOSURE_SKEW = (INT(CENTER2) - INT(CENTER1));

              /* CALCULATE CENTER */

556   7          CENTER1 = (CENTER1 + CENTER2) / 2;
557   7          CLOSURE_OFFSETS(PROD_PTR).CLOSURE_CENTER = (INT(WORK_TABLE(LABEL_FLAG).
                         PACKAGE_CENTER) - INT(CENTER1));

              /* CALCULATE WIDTH */

558   7          CENTER1 = CLOSURE_EDGE(1).HOZ - CLOSURE_EDGE(0).HOZ;
559   7          CENTER2 = CLOSURE_EDGE(3).HOZ - CLOSURE_EDGE(2).HOZ;
560   7          CLOSURE_OFFSETS(PROD_PTR).CLOSURE_WIDTH = (CENTER1 + CENTER2) / 2;
561   7          END;

562   6          CALL WRITE(@(CR,LF,'ARE THESE POINTS OK? Y/N -'),28);
563   6          NOBYTES = READ(@BUFFER,5);
```

```
                /*  RESTORE IMAGE  */
564   6              IF LABEL_FLAG = 0 THEN CALL TRANS_IMAGE(1);
566   6                  ELSE CALL TRANS_IMAGE(0);
567   6          END;
                /*  TEST LOCATE CLOSURE ALGORITHM  */
568   5              CALL LOC_CLOSURE;
569   5              CALL WRITE(@(CR,LF,'IS THE CLOSURE LOCATED OK ? Y/N - '),36);
570   5              NOBYTES = READ(@BUFFER,5);
                /*  RESTORE IMAGE  */
571   5              IF LABEL_FLAG = 0 THEN CALL TRANS_IMAGE(1);
573   5                  ELSE CALL TRANS_IMAGE(0);

574   5          END;
575   4          END;
576   3          ELSE CLOSURE_OFFSETS(PROD_PTR).CLOSURE_FLAG = 00H;
577   3          END;
578   2          END DEF_CLOSURE;
579   1          END DEF_CLOS_MODULE;


MODULE INFORMATION:

     CODE AREA SIZE     = 118FH   4495D
     CONSTANT AREA SIZE = 0512H   1298D
     VARIABLE AREA SIZE = 000AH     10D
     MAXIMUM STACK SIZE = 0010H     16D
     923 LINES READ
     0 PROGRAM WARNINGS
     0 PROGRAM ERRORS

DICTIONARY SUMMARY:

     47KB MEMORY AVAILABLE
     13KB MEMORY USED   (27%)
     0KB DISK SPACE USED

END OF PL/M-86 COMPILATION


iRMX 86 PL/M-86 V2.3 COMPILATION OF MODULE DEF_LABL_MODULE
OBJECT MODULE PLACED IN SOURCE/LABEL.OBJ
COMPILER INVOKED BY:  :LANG:PLM86 SOURCE/LABEL.PLM OPTIMIZE(3) ROM SET(TARGET=1)


                $INCLUDE(SOURCE/COPYRIGHT)
           =    /*

           =    ******************************************************************************
           =    *                                                                            *
           =    *                                                                            *
           =    *                    COPYRIGHT CHESEBROUGH-POND'S INC.                       *
           =    *                                                                            *
           =    *                    (c) 1983, CHESEBROUGH-POND'S INC.                       *
           =    *                                                                            *
           =    *                                                                            *
           =    *                                                                            *
           =    *                                                                            *
           =    *      ALL RIGHTS RESERVED. NO PART OF THIS PROGRAM MAY BE REPRODUCED,       *
           =    *      TRANSMITTED, TRANSCRIBED, STORED IN A RETRIEVAL SYSTEM, OR            *
           =    *      TRANSLATED INTO ANY LANGUAGE OR COMPUTER LANGUAGE, IN ANY FORM        *
           =    *      OR BY ANY MEANS, ELECTRONIC, MECHANICAL, MAGNETIC, OPTICAL,           *
           =    *      CHEMICAL, MANUAL OR OTHERWISE, WITHOUT THE EXPRESS WRITTEN PER-       *
           =    *      MISSION OF CHESEBROUGH-POND'S INC., 33 BENEDICT PLACE, GREENWICH,     *
           =    *      CONNECTICUT.                                                          *
           =    *                                                                            *
           =    *                                                                            *
           =    ******************************************************************************

           =    */

                $TITLE(' DEFINE LABEL MODULE')
 1              DEF_LABL_MODULE:
                DO;
                $INCLUDE(SOURCE/DECLARE.EXT)
 2    1    =    DECLARE      DCL      LITERALLY    'DECLARE';
 3    1    =    DECLARE      LIT      LITERALLY    'LITERALLY';
                $INCLUDE(SOURCE/XTERMHAND.EXT)
 4    1    =    INIT_USART: PROCEDURE EXTERNAL;
 5    2    =    END INIT_USART;
 6    1    =    WRITE: PROCEDURE(BUFFER_PTR,BLENGTH) EXTERNAL;
 7    2    =            DCL BUFFER_PTR  POINTER;
 8    2    =            DCL BLENGTH WORD;
 9    2    =    END WRITE;
10    1    =    READ: PROCEDURE(BUFFER_PTR,BLENGTH)WORD EXTERNAL;
```

```
 11   2  =          DCL     BUFFER_PTR  POINTER;
 12   2  =          DCL     BLENGTH    WORD;
 13   2  =     END READ;
                $INCLUDE(SOURCE/IWCONV.EXT)
         =      $SAVE
         =      $NOLIST

                /*  VARIABLE DECLARATIONS PUBLIC  */
 35   1        DCL IGRAD               WORD EXTERNAL;
 36   1        DCL PARAM1              INTEGER EXTERNAL;
 37   1        DCL BUFFER (24)         BYTE EXTERNAL;
 38   1        DCL CURS_LOC (24)       WORD EXTERNAL;
 39   1        DCL CURS_LOC_2 (24)     WORD EXTERNAL;
 40   1        DCL NOBYTES             WORD EXTERNAL;
 41   1        DCL PROD_NUM            WORD EXTERNAL;
 42   1        DCL PROD_PTR            WORD EXTERNAL;
 43   1        DCL SIZE                WORD EXTERNAL;
 44   1        DCL CTABLE_OFF          WORD EXTERNAL;
 45   1        DCL VERT_CL             WORD EXTERNAL;
 46   1        DCL HOR_DIST            WORD EXTERNAL;
 47   1        DCL VERT_DIST           WORD EXTERNAL;
 48   1        DCL LABEL_FLAG          BYTE EXTERNAL;
 49   1        DCL CFUNC               BYTE EXTERNAL;
 50   1        DCL IMAGF               BYTE EXTERNAL;
 51   1        DCL DIR_PTR             BYTE EXTERNAL;

               /* LOCAL VARIABLE DECLARATIONS */
 52   1        DCL (I,J,TTHRESH)       WORD;
 53   1        DCL CENTER1             WORD;
 54   1        DCL CENTER2             WORD;

               /* LITERALL DECLARATIONS  */
 55   1        DCL CAMERA_ON           LIT      '03H';
 56   1        DCL CAMERA_OFF          LIT      '00H';
 57   1        DCL DATA_REG            LIT      '00H';
 58   1        DCL COMMD_REG           LIT      '03H';
 59   1        DCL HOZ_ADD_LO          LIT      '04H';
 60   1        DCL HOZ_ADD_HI          LIT      '05H';
 61   1        DCL VERT_ADD            LIT      '06H';
 62   1        DCL POST_INC_READ       LIT      '01H';
 63   1        DCL POST_INC_WRITE      LIT      '02H';
 64   1        DCL CLRSCRN             LIT      '1BH,6AH,0CH';
 65   1        DCL SET_CUR             LIT      '1BH,59H';
 66   1        DCL ESC                 LIT      '1BH';
 67   1        DCL CRLF                LIT      'CALL WRITE(@(13,10),2)';
 68   1        DCL CR                  LIT      '0DH';
 69   1        DCL LF                  LIT      '0AH';
 70   1        DCL RESTC               LIT      '00H';
 71   1        DCL DISC                LIT      '03H';
 72   1        DCL MOVC                LIT      '02H';
 73   1        DCL CUR1                LIT      '00H';
 74   1        DCL CUR2                LIT      '04H';
 75   1        DCL CUR3                LIT      '08H';
 76   1        DCL CUR4                LIT      '0CH';
 77   1        DCL HOMC                LIT      '01H';
 78   1        DCL ENAX                LIT      '010H';
 79   1        DCL ENAY                LIT      '020H';
 80   1        DCL F_IMG               LIT      '00H';
 81   1        DCL B_IMG               LIT      '040H';

 82   1        DCL PROD_NAM_TBL (20) STRUCTURE(NAM_BUFFER(20) BYTE) EXTERNAL;

               $INCLUDE(SOURCE/OFFSETS.LIB)
         =     $SAVE
         =     $NOLIST

               /*  EXTERNAL PROCEDURE DECLARATIONS  */
 91   1        CURSOR_ROUTINE: PROCEDURE(CURSOR_TABLE,FUNCT) EXTERNAL;
 92   2            DCL CURSOR_TABLE     POINTER;
 93   2            DCL FUNCT            BYTE;
 94   2        END CURSOR_ROUTINE;

 95   1        GRAD_PROFILE: PROCEDURE(CURSOR_TABLE,IMAGE_PTR,SIZE_PTR) EXTERNAL;
 96   2            DCL CURSOR_TABLE     POINTER;
 97   2            DCL IMAGE_PTR        POINTER;
 98   2            DCL SIZE_PTR         POINTER;
 99   2        END GRAD_PROFILE;

100   1        TIMER: PROCEDURE(J) EXTERNAL;
101   2            DCL J                WORD;
102   2        END TIMER;

103   1        TRANS_IMAGE: PROCEDURE(IFLAG) EXTERNAL;
104   2            DCL IFLAG            BYTE;
105   2        END TRANS_IMAGE;

106   1        INIT_CUR: PROCEDURE(TABLE_PTR) EXTERNAL;
107   2            DCL TABLE_PTR        POINTER;
108   2        END INIT_CUR;
```

```
109   1    LOC_CLOSURE: PROCEDURE EXTERNAL;
110   2    END LOC_CLOSURE;

111   1    LOC_LABEL: PROCEDURE EXTERNAL;
112   2    END LOC_LABEL;

           /*  MESSAGE DECLARATIONS  */

113   1    DCL MESS_1 (*) BYTE DATA(CLRSCRN, 'ENTER LABEL ORIENTATION H/V. - ');
114   1    DCL EDGE_MESS_1 (*) BYTE DATA(CLRSCRN, 'LOCATE LEFT AND RIGHT LABEL EDGES. ');
115   1    DCL EDGE_MESS_2 (*) BYTE DATA(CR, LF, LF, 'MOVE CURSOR TO STARTING POINT FOR',
                                       CR, LF, 'LOCATING TOP OF LEFT EDGE. ');
116   1    DCL HIT_MESS (*) BYTE DATA(CR, LF, LF, 'HIT USER 1 WHEN READY. ');
117   1    DCL EDGE_MESS_3 (*) BYTE DATA(CR, LF, LF, 'MOVE CURSOR TO EDGE. ');
118   1    DCL EDGE_MESS_4 (*) BYTE DATA(CR, LF, LF, 'MOVE CURSOR TO OPPOSITE EDGE. ');
119   1    DCL EDGE_MESS_5 (*) BYTE DATA(CR, LF, LF, 'MOVE CURSOR TO STARTING POINT FOR',
                                       CR, LF, 'LOCATING TOP OF RIGHT EDGE. ');
120   1    DCL EDGE_MESS_6 (*) BYTE DATA(CLRSCRN, 'MOVE CURSOR TO STARTING POINT FOR',
                                       CR, LF, 'LOCATING BOTTOM OF LEFT EDGE. ');
121   1    DCL EDGE_MESS_7 (*) BYTE DATA(CR, LF, LF, 'MOVE CURSOR TO STARTING POINT FOR',
                                       CR, LF, 'LOCATING BOTTOM OF RIGHT EDGE. ');
122   1    DCL EDGE_MESS_8 (*) BYTE DATA(CR, LF, LF, 'MOVE CURSOR TO STARTING POINT FOR',
                                       CR, LF, 'LOCATING LEFT EDGE. ');
123   1    DCL EDGE_MESS_9 (*) BYTE DATA(CR, LF, LF, 'MOVE CURSOR TO STARTING POINT FOR'
                                      , CR, LF, 'LOCATING RIGHT EDGE. ');
124   1    DCL TOP_MESS_1  (*) BYTE DATA(CLRSCRN, 'LOCATE TOP AND BOTTOM EDGES. ');
125   1    DCL TOP_MESS_2  (*) BYTE DATA(CR, LF, LF, 'MOVE CURSOR TO STARTING POINT FOR',
                                       CR, LF, 'LOCATING LEFT SIDE OF TOP EDGE. ');
126   1    DCL TOP_MESS_3  (*) BYTE DATA(CR, LF, LF, 'MOVE CURSOR TO STARTING POINT FOR',
                                       CR, LF, 'LOCATING RIGHT SIDE OF TOP EDGE. ');
127   1    DCL TOP_MESS_4  (*) BYTE DATA(CR, LF, LF, 'MOVE CURSOR TO STARTING POINT FOR',
                                       CR, LF, 'LOCATING LEFT SIDE OF BOTTOM EDGE. ');
128   1    DCL TOP_MESS_5  (*) BYTE DATA(CR, LF, LF, 'MOVE CURSOR TO STARTING POINT FOR',
                                       CR, LF, 'LOCATING RIGHT SIDE OF BOTTOM EDGE. ');
129   1    DCL TOP_MESS_6  (*) BYTE DATA(CR, LF, LF, 'MOVE CURSOR TO STARTING POINT FOR',
                                       CR, LF, 'LOCATING TOP EDGE. ');
130   1    DCL TOP_MESS_7  (*) BYTE DATA(CR, LF, LF, 'MOVE CURSOR TO STARTING POINT FOR',
                                       CR, LF, 'LOCATING BOTTOM EDGE. ');

131   1    DEF_LABEL: PROCEDURE PUBLIC;
132   2    DO;

133   3    BUFFER(0) = ' ';
134   3    DO WHILE BUFFER(0) <> 'Y';
           /*  DETERMINE ORIENTATION OF THE LABEL  */

135   4        CALL WRITE(@MESS_1, LENGTH(MESS_1));
136   4        NOBYTES = READ(@BUFFER, 5);
137   4        IF (BUFFER(0) = 'Q') THEN RETURN;
139   4        IF BUFFER(0) = 'H' THEN LABEL_OFFSETS(PROD_PTR).LAB_AXIS = 0FH;
141   4        ELSE LABEL_OFFSETS(PROD_PTR).LAB_AXIS = 00H;

           /*  DETERMINE IMAGE POINTER  */

142   4        IF LABEL_FLAG = 0 THEN IMAGF = F_IMG;
144   4            ELSE IMAGF = B_IMG;
145   4        BUFFER(0) = ' ';
146   4        DO WHILE BUFFER(0) <> 'Y';

           /*  CLEAR CURSOR TABLE  */

147   5        CALL INIT_CUR(@CURS_LOC);
148   5        CALL INIT_CUR(@CURS_LOC_2);
           /*  HOME CURSOR 1  */
149   5        CFUNC = IMAGF OR CUR1 OR HOMC;
150   5        CALL CURSOR_ROUTINE(@CURS_LOC, CFUNC);

           /*  LOCATE POINT 1  */

151   5        IF LABEL_OFFSETS(PROD_PTR).LAB_AXIS = 0FH THEN
152   5        DO;
153   6        CALL WRITE(@TOP_MESS_1, LENGTH(TOP_MESS_1));
154   6        CALL WRITE(@TOP_MESS_2, LENGTH(TOP_MESS_2));
155   6        END;
156   5        ELSE
               DO;
157   6        CALL WRITE(@EDGE_MESS_1, LENGTH(EDGE_MESS_1));
158   6        CALL WRITE(@EDGE_MESS_2, LENGTH(EDGE_MESS_2));
159   6        END;
160   5        CALL WRITE(@HIT_MESS, LENGTH(HIT_MESS));

           /*  SET UP CFUNC  */
161   5        CFUNC = IMAGF OR CUR1 OR ENAX OR ENAY OR MOVC;
162   5        CALL CURSOR_ROUTINE(@CURS_LOC, CFUNC);
163   5        CALL TIMER(15000);

           /*  LOCATE LEFT OR TOP EDGE OF LABEL  */
```

```
164  5      CALL WRITE(@EDGE_MESS_3,LENGTH(EDGE_MESS_3));
165  5      CALL WRITE(@HIT_MESS,LENGTH(HIT_MESS));

        /*  DETERMINE DIRECTION OF MOTION FOR CURSOR  */

166  5      IF LABEL_OFFSETS(PROD_PTR).LAB_AXIS=OFH THEN CFUNC=IMAGF OR CUR2 OR ENAY OR MOVC;
168  5      ELSE CFUNC = IMAGF OR CUR2 OR ENAX OR MOVC;
169  5      CURS_LOC(2 + CTABLE_OFF) = CURS_LOC(0 + CTABLE_OFF);
170  5      CURS_LOC(3 + CTABLE_OFF) = CURS_LOC(1 + CTABLE_OFF);
171  5      CALL CURSOR_ROUTINE(@CURS_LOC,CFUNC);
172  5      CALL TIMER(15000);

        /*  GET EDGE GRADIENT FOR THIS LOCATION  */
173  5      BUFFER(0) = 'M';
174  5      DO WHILE BUFFER(0) = 'M';
175  6      CRLF;
176  6      CALL WRITE(@('ENTER GRADIENT THRESHOLD FOR THIS EDGE'),38);
177  6      CALL WRITE(@(CR,LF,'(Q - quit, M - measure) - '),28);
178  6      NOBYTES = READ(@BUFFER,5);
179  6      IF (BUFFER(0) <> CR) THEN DO;
181  7      IF BUFFER(0) = 'M' THEN
182  7      DO;

        /*  TRANSFER CURSOR COORDINATES TO CURS_LOC_2  */

183  8      CURS_LOC_2(0 + CTABLE_OFF) = CURS_LOC(0 + CTABLE_OFF);
184  8      CURS_LOC_2(1 + CTABLE_OFF) = CURS_LOC(1 + CTABLE_OFF);
185  8      IF LABEL_OFFSETS(PROD_PTR).LAB_AXIS = OFH THEN
186  8      DO;    /*  HORIZONTAL ORIENTATION  */

        /*  UPDATE CURS_LOC_2 TABLE  */
187  9          CURS_LOC_2(3 + CTABLE_OFF) = CURS_LOC(1 + CTABLE_OFF);
188  9          IF (CURS_LOC(2 + CTABLE_OFF) > CURS_LOC(0 + CTABLE_OFF))
189  9          THEN DO;
        /*  CALCULATE VERTICAL DISTANCE FOR GRAD_PROF  */
190  10         VERT_DIST = CURS_LOC(2 + CTABLE_OFF) - CURS_LOC(0 + CTABLE_OFF);
191  10         CURS_LOC_2(2 + CTABLE_OFF) = CURS_LOC(2 + CTABLE_OFF) + VERT_DIST;
192  10         END;
193  9          ELSE DO;
194  10         VERT_DIST = CURS_LOC(0 + CTABLE_OFF) - CURS_LOC(2 + CTABLE_OFF);
195  10         CURS_LOC_2(2 + CTABLE_OFF) = CURS_LOC(2 + CTABLE_OFF) - VERT_DIST;
196  10         END;
197  9      END;
198  8      ELSE DO;   /*  VERTICAL ORIENTATION  */
        /*  UPDATE CURS_LOC_2  */
199  9          CURS_LOC_2(2 + CTABLE_OFF) = CURS_LOC(0 + CTABLE_OFF);
200  9          IF (CURS_LOC(3 + CTABLE_OFF) > CURS_LOC(1 + CTABLE_OFF))
201  9          THEN DO;
        /*  CALCULATE HORIZONTAL DISTANCE FOR GRAD_PROF  */
202  10         HOR_DIST = CURS_LOC(3 + CTABLE_OFF) - CURS_LOC(1 + CTABLE_OFF);
203  10         CURS_LOC_2(3 + CTABLE_OFF) = CURS_LOC(3 + CTABLE_OFF) + HOR_DIST;
204  10         END;
205  9          ELSE DO;
206  10         HOR_DIST = CURS_LOC(1 + CTABLE_OFF) - CURS_LOC(3 + CTABLE_OFF);
207  10         CURS_LOC_2(3 + CTABLE_OFF) = CURS_LOC(3 + CTABLE_OFF) - HOR_DIST;
208  10         END;
209  9      END;

        /*  ERASE CURSORS FROM SCREEN  */
210  8      CFUNC = IMAGF OR DISC;
211  8      CALL CURSOR_ROUTINE(@CURS_LOC,CFUNC);

        /*  ENABLE NEW CURSOR DISPLAY  */
212  8      CFUNC = IMAGF OR RESTC;
213  8      CALL CURSOR_ROUTINE(@CURS_LOC_2,CFUNC);
214  8      J = DOUBLE(IMAGF);
215  8      SIZE = 1;
216  8      CALL GRAD_PROFILE(@CURS_LOC_2,@J,@SIZE);
217  8      CALL WRITE(@(CR,LF,'dark to light is +, light to dark is -'),40);
218  8      CALL WRITE(@(CR,LF,'+ or - is \'),13);
219  8      CALL WRITE(@(CR,LF,'READY TO PROCEDE ? Y/N - '),27);
220  8      NOBYTES = READ(@BUFFER,5);
221  8      BUFFER(0) = 'M';
222  8      IF LABEL_FLAG = 0 THEN CALL TRANS_IMAGE(1);
224  8      ELSE CALL TRANS_IMAGE(0);

        /*  RESTORE ORIGINAL CURSORS  */
225  8      CALL CURSOR_ROUTINE(@CURS_LOC,CFUNC);
226  8      END;

227  7      ELSE DO;
228  8      IF (BUFFER(0) = 'Q') THEN RETURN;
230  8      IF (BUFFER(0) = '-' OR BUFFER(0) = '\') THEN DO;
232  9      TTHRESH = DOUBLE(BUFFER(0));
233  9      TTHRESH = SHL(TTHRESH,8);
234  9      BUFFER(0) = ' ';
235  9      END;
236  8      ELSE DO;
```

```
237   9      TTHRESH = 02B00H;
238   9      END;
239   8      CALL ASC$WRD(@BUFFER,@IGRAD);
240   8      IF (IGRAD > 0 AND IGRAD < 64) THEN DO;
242   9      IGRAD = IGRAD OR TTHRESH;
243   9      LABEL_OFFSETS(PROD_PTR).PT1_THRESH = IGRAD;
244   9      END;
245   8      ELSE BUFFER(0) = 'M';
246   8      END;
247   7      END;
248   6      ELSE BUFFER(0) = 'M';
249   6      END;

          /*  STORE OFFSETS IN TABLE  */

          /*  CALCULATE COUNTER FOR LOCATE LABEL  */
250   5      IF LABEL_OFFSETS(PROD_PTR).LAB_AXIS = OFH THEN LABEL_OFFSETS(PROD_PTR).PT1_COUNT =
251   5           4 * (INT(CURS_LOC(2 + CTABLE_OFF)) - INT(CURS_LOC(0 + CTABLE_OFF)));
252   5           ELSE LABEL_OFFSETS(PROD_PTR).PT1_COUNT =
                  4 * (INT(CURS_LOC(3 + CTABLE_OFF)) - INT(CURS_LOC(1 + CTABLE_OFF)));
253   5      LABEL_OFFSETS(PROD_PTR).PT1_HOZ_ST =
                  INT(WORK_TABLE(LABEL_FLAG).PACKAGE_CENTER) - INT(CURS_LOC(1 + CTABLE_OFF));
254   5      LABEL_OFFSETS(PROD_PTR).PT1_VERT_ST =
                  INT(WORK_TABLE(LABEL_FLAG).PACKAGE_ELEV) - INT(CURS_LOC(0 + CTABLE_OFF));
          /*  STORE EDGE LOCATION TEMPORARILY  */
255   5   LABEL_EDGE(0).HOZ = CURS_LOC(3 + CTABLE_OFF);
256   5   LABEL_EDGE(0).VERT = CURS_LOC(2 + CTABLE_OFF);

          /*  LOCATE OPPOSITE EDGE OF LABEL  */

257   5      CALL WRITE(@EDGE_MESS_4,LENGTH(EDGE_MESS_4));
258   5      CALL WRITE(@HIT_MESS,LENGTH(HIT_MESS));

          /*  SET UP NEXT CURSOR MOVE  */
259   5   CURS_LOC(4 + CTABLE_OFF) = CURS_LOC(2 + CTABLE_OFF);
260   5   CURS_LOC(5 + CTABLE_OFF) = CURS_LOC(3 + CTABLE_OFF);
          /*  CHECK FOR DIRECTION OF MOVE  */
261   5   IF LABEL_OFFSETS(PROD_PTR).LAB_AXIS = OFH THEN CFUNC = IMAGF OR CUR3 OR ENAY OR MOVC;
263   5   ELSE CFUNC = IMAGF OR CUR3 OR ENAX OR MOVC;
264   5   CALL CURSOR_ROUTINE(@CURS_LOC,CFUNC);
265   5   CALL TIMER(15000);

          /*  STORE EDGE LOCATION  */

266   5   LABEL_EDGE(1).HOZ = CURS_LOC(5 + CTABLE_OFF);
267   5   LABEL_EDGE(1).VERT = CURS_LOC(4 + CTABLE_OFF);

          /*  GET GRADIENT INFORMATION FOR THIS POINT  */

268   5      BUFFER(0) = 'M';
269   5      DO WHILE BUFFER(0) = 'M';
270   6      CRLF;
271   6      CALL WRITE(@('ENTER GRADIENT THRESHOLD FOR THIS EDGE'),38);
272   6      CALL WRITE(@(CR,LF,'(Q - quit, M - measure) - '),28);
273   6      NOBYTES = READ(@BUFFER,5);
274   6      IF (BUFFER(0) <> CR) THEN DO;
276   7      IF BUFFER(0) = 'M' THEN
277   7      DO;


278   8      IF LABEL_OFFSETS(PROD_PTR).LAB_AXIS = OFH THEN
279   8      DO;    /*  HORIZONTAL ORIENTATION  */

          /*  UPDATE CURS_LOC_2 TABLE  */
280   9           IF (CURS_LOC(2 + CTABLE_OFF) > CURS_LOC(0 + CTABLE_OFF)) THEN
281   9                VERT_DIST = CURS_LOC(2 + CTABLE_OFF) - CURS_LOC(0 + CTABLE_OFF);
282   9                ELSE VERT_DIST = CURS_LOC(0 + CTABLE_OFF) - CURS_LOC(2 + CTABLE_OFF);
283   9           CURS_LOC_2(1 + CTABLE_OFF) = CURS_LOC(5 + CTABLE_OFF);
284   9           CURS_LOC_2(3 + CTABLE_OFF) = CURS_LOC(5 + CTABLE_OFF);
285   9           CURS_LOC_2(2 + CTABLE_OFF) = CURS_LOC(4 + CTABLE_OFF) + VERT_DIST;
286   9           CURS_LOC_2(0 + CTABLE_OFF) = CURS_LOC(4 + CTABLE_OFF) - VERT_DIST;
287   9      END;
288   8      ELSE DO;   /*  VERTICAL ORIENTATION  */
          /*  CALCULATE HORIZONTAL DISTANCE FOR GRAD_PROF  */
289   9           IF (CURS_LOC(3 + CTABLE_OFF) > CURS_LOC(1 + CTABLE_OFF)) THEN
290   9                HOR_DIST = CURS_LOC(3 + CTABLE_OFF) - CURS_LOC(1 + CTABLE_OFF);
291   9                ELSE HOR_DIST = CURS_LOC(1 + CTABLE_OFF) - CURS_LOC(3 + CTABLE_OFF);
292   9           CURS_LOC_2(0 + CTABLE_OFF) = CURS_LOC(4 + CTABLE_OFF);
293   9           CURS_LOC_2(2 + CTABLE_OFF) = CURS_LOC(4 + CTABLE_OFF);
294   9           CURS_LOC_2(3 + CTABLE_OFF) = CURS_LOC(5 + CTABLE_OFF) + HOR_DIST;
295   9           CURS_LOC_2(1 + CTABLE_OFF) = CURS_LOC(5 + CTABLE_OFF) - HOR_DIST;
296   9      END;
          /*  ERASE CURSORS FROM SCREEN  */
297   8      CFUNC = IMAGF OR DISC;
298   8      CALL CURSOR_ROUTINE(@CURS_LOC,CFUNC);

          /*  ENABLE NEW CURSOR DISPLAY  */
299   8      CFUNC = IMAGF OR RESTC;
```

```
300  8         CALL CURSOR_ROUTINE(@CURS_LOC_2,CFUNC);
301  8         J = DOUBLE(IMAGF);
302  8         SIZE = 1;
303  8         CALL GRAD_PROFILE(@CURS_LOC_2,@J,@SIZE);
304  8         CALL WRITE(@(CR,LF,'dark to light is +, light to dark is -'),40);
305  8         CALL WRITE(@(CR,LF,'+ or - is \'),13);
306  8         CALL WRITE(@(CR,LF,'READY TO PROCEDE ? Y/N - '),27);
307  8         NOBYTES = READ(@BUFFER,5);
308  8         BUFFER(0) = 'M';
309  8         IF LABEL_FLAG = 0 THEN CALL TRANS_IMAGE(1);
311  8         ELSE CALL TRANS_IMAGE(0);

          /*   RESTORE ORIGINAL CURSORS  */
312  8         CALL CURSOR_ROUTINE(@CURS_LOC,CFUNC);
313  8         END;

314  7         ELSE DO;
315  8         IF (BUFFER(0) = 'Q') THEN RETURN;
317  8         IF (BUFFER(0) = '-' OR BUFFER(0) = '\') THEN DO;
319  9         TTHRESH = DOUBLE(BUFFER(0));
320  9         TTHRESH = SHL(TTHRESH,8);
321  9         BUFFER(0) = ' ';
322  9         END;
323  8         ELSE DO;
324  9         TTHRESH = 02B00H;
325  9         END;
326  8         CALL ASC$WRD(@BUFFER,@IGRAD);
327  8         IF (IGRAD > 0 AND IGRAD < 64) THEN DO;
329  9         IGRAD = IGRAD OR TTHRESH;
330  9         LABEL_OFFSETS(PROD_PTR).PT2_THRESH = IGRAD;
331  9         END;
332  8         ELSE BUFFER(0) = 'M';
333  8         END;
334  7         END;
335  6         ELSE BUFFER(0) = 'M';
336  6         END;
          /*   LOCATE POINT 2 STARTING LOCATIONS  */

337  5         IF LABEL_OFFSETS(PROD_PTR).LAB_AXIS = 0FH THEN
338  5         DO;
339  6         CALL WRITE(@TOP_MESS_1,LENGTH(TOP_MESS_1));
340  6         CALL WRITE(@TOP_MESS_4,LENGTH(TOP_MESS_4));
341  6         END;
342  5         ELSE
               DO;
343  6         CALL WRITE(@EDGE_MESS_1,LENGTH(EDGE_MESS_1));
344  6         CALL WRITE(@EDGE_MESS_5,LENGTH(EDGE_MESS_5));
345  6         END;
346  5         CALL WRITE(@HIT_MESS,LENGTH(HIT_MESS));

          /*   SET UP CURSOR TABLE FOR MOVE  */

347  5         CURS_LOC(6 + CTABLE_OFF) = CURS_LOC(4 + CTABLE_OFF);
348  5         CURS_LOC(7 + CTABLE_OFF) = CURS_LOC(5 + CTABLE_OFF);

349  5         IF LABEL_OFFSETS(PROD_PTR).LAB_AXIS = 0FH THEN CFUNC = IMAGF OR CUR4 OR ENAY OR
351  5             MOVC; ELSE CFUNC = IMAGF OR CUR4 OR ENAX OR MOVC;
352  5         CALL CURSOR_ROUTINE(@CURS_LOC,CFUNC);

          /*   CALCULATE AND STORE OFFSET TERMS  */

353  5         LABEL_OFFSETS(PROD_PTR).PT2_HOZ_ST =
                   INT(WORK_TABLE(LABEL_FLAG).PACKAGE_CENTER) - INT(CURS_LOC(7 + CTABLE_OFF));
354  5         LABEL_OFFSETS(PROD_PTR).PT2_VERT_ST =
                   INT(WORK_TABLE(LABEL_FLAG).PACKAGE_ELEV) - INT(CURS_LOC(6 + CTABLE_OFF));
355  5         IF LABEL_OFFSETS(PROD_PTR).LAB_AXIS = 0FH THEN
356  5         LABEL_OFFSETS(PROD_PTR).PT2_COUNT = 4 * (INT(CURS_LOC(6 + CTABLE_OFF)) -
                       INT(CURS_LOC(4 + CTABLE_OFF)));
357  5         ELSE
               LABEL_OFFSETS(PROD_PTR).PT2_COUNT = 4 * (INT(CURS_LOC(7 + CTABLE_OFF)) -
                       INT(CURS_LOC(5 + CTABLE_OFF)));

358  5    CALL TIMER(15000);
          /*   CLEAR CURSOR TABLE  */

359  5         CALL INIT_CUR(@CURS_LOC);
360  5         CALL INIT_CUR(@CURS_LOC_2);
          /*   HOME CURSOR 1  */
361  5         CFUNC = IMAGF OR CUR1 OR HOMC;
362  5         CALL CURSOR_ROUTINE(@CURS_LOC,CFUNC);

          /*   LOCATE POINT 3  */

363  5         IF LABEL_OFFSETS(PROD_PTR).LAB_AXIS = 0FH THEN
364  5         DO;
365  6         CALL WRITE(@TOP_MESS_1,LENGTH(TOP_MESS_1));
366  6         CALL WRITE(@TOP_MESS_3,LENGTH(TOP_MESS_3));
367  6         END;
368  5         ELSE
```

```
        DO;
        CALL WRITE(@EDGE_MESS_1,LENGTH(EDGE_MESS_1));
        CALL WRITE(@EDGE_MESS_6,LENGTH(EDGE_MESS_6));
        END;
        CALL WRITE(@HIT_MESS,LENGTH(HIT_MESS));

    /*  SET UP CFUNC  */
        CFUNC = IMAGF OR CUR1 OR ENAX OR ENAY OR MOVC;
        CALL CURSOR_ROUTINE(@CURS_LOC,CFUNC);
        CALL TIMER(15000);

    /*  LOCATE LEFT OR TOP EDGE OF LABEL  */

        CALL WRITE(@EDGE_MESS_3,LENGTH(EDGE_MESS_3));
        CALL WRITE(@HIT_MESS,LENGTH(HIT_MESS));

    /*  DETERMINE DIRECTION OF MOTION FOR CURSOR  */
        IF LABEL_OFFSETS(PROD_PTR).LAB_AXIS=OFH THEN CFUNC=IMAGF OR CUR2 OR ENAY OR MOVC;
        ELSE CFUNC = IMAGF OR CUR2 OR ENAX OR MOVC;
        CURS_LOC(2 + CTABLE_OFF) = CURS_LOC(0 + CTABLE_OFF);
        CURS_LOC(3 + CTABLE_OFF) = CURS_LOC(1 + CTABLE_OFF);
        CALL CURSOR_ROUTINE(@CURS_LOC,CFUNC);
        CALL TIMER(15000);

    /*  GET EDGE GRADIENT FOR THIS LOCATION  */
        BUFFER(0) = 'M';
        DO WHILE BUFFER(0) = 'M';
        CRLF;
        CALL WRITE(@('ENTER GRADIENT THRESHOLD FOR THIS EDGE'),38);
        CALL WRITE(@(CR,LF,'(Q - quit, M - measure) - '),28);
        NOBYTES = READ(@BUFFER,5);
        IF (BUFFER(0) <> CR) THEN DO;
        IF BUFFER(0) = 'M' THEN
        DO;

    /*  TRANSFER CURSOR COORDINATES TO CURS_LOC_2  */

        CURS_LOC_2(0 + CTABLE_OFF) = CURS_LOC(0 + CTABLE_OFF);
        CURS_LOC_2(1 + CTABLE_OFF) = CURS_LOC(1 + CTABLE_OFF);
        IF LABEL_OFFSETS(PROD_PTR).LAB_AXIS = OFH THEN
        DO;   /*  HORIZONTAL ORIENTATION  */

    /*  UPDATE CURS_LOC_2 TABLE  */
            CURS_LOC_2(3 + CTABLE_OFF) = CURS_LOC(1 + CTABLE_OFF);
            IF (CURS_LOC(2 + CTABLE_OFF) > CURS_LOC(0 + CTABLE_OFF))
            THEN DO;
    /*  CALCULATE VERTICAL DISTANCE FOR GRAD_PROF  */
            VERT_DIST = CURS_LOC(2 + CTABLE_OFF) - CURS_LOC(0 + CTABLE_OFF);
            CURS_LOC_2(2 + CTABLE_OFF) = CURS_LOC(2 + CTABLE_OFF) + VERT_DIST;
            END;
            ELSE DO;
            VERT_DIST = CURS_LOC(0 + CTABLE_OFF) - CURS_LOC(2 + CTABLE_OFF);
            CURS_LOC_2(2 + CTABLE_OFF) = CURS_LOC(2 + CTABLE_OFF) - VERT_DIST;
            END;
        END;
        ELSE DO;   /*  VERTICAL ORIENTATION  */
    /*  UPDATE CURS_LOC_2  */
            CURS_LOC_2(2 + CTABLE_OFF) = CURS_LOC(0 + CTABLE_OFF);
            IF (CURS_LOC(3 + CTABLE_OFF) > CURS_LOC(1 + CTABLE_OFF))
            THEN DO;
    /*  CALCULATE HORIZONTAL DISTANCE FOR GRAD_PROF  */
            HOR_DIST = CURS_LOC(3 + CTABLE_OFF) - CURS_LOC(1 + CTABLE_OFF);
            CURS_LOC_2(3 + CTABLE_OFF) = CURS_LOC(3 + CTABLE_OFF) + HOR_DIST;
            END;
            ELSE DO;
            HOR_DIST = CURS_LOC(1 + CTABLE_OFF) - CURS_LOC(3 + CTABLE_OFF);
            CURS_LOC_2(3 + CTABLE_OFF) = CURS_LOC(3 + CTABLE_OFF) - HOR_DIST;
            END;
        END;

    /*  ERASE CURSORS FROM SCREEN  */
        CFUNC = IMAGF OR DISC;
        CALL CURSOR_ROUTINE(@CURS_LOC,CFUNC);
    /*  ENABLE NEW CURSOR DISPLAY  */
        CFUNC = IMAGF OR RESTC;
        CALL CURSOR_ROUTINE(@CURS_LOC_2,CFUNC);
        J = DOUBLE(IMAGF);
        SIZE = 1;
        CALL GRAD_PROFILE(@CURS_LOC_2,@J,@SIZE);
        CALL WRITE(@(CR,LF,'dark to light is +, light to dark is -'),40);
        CALL WRITE(@(CR,LF,'+ or - is \'),13);
        CALL WRITE(@(CR,LF,'READY TO PROCEDE ? Y/N - '),27);
        NOBYTES = READ(@BUFFER,5);
        BUFFER(0) = 'M';
        IF LABEL_FLAG = 0 THEN CALL TRANS_IMAGE(1);
        ELSE CALL TRANS_IMAGE(0);
```

```
                /*  RESTORE ORIGINAL CURSORS  */
437   8             CALL CURSOR_ROUTINE(@CURS_LOC,CFUNC);
438   8             END;

439   7             ELSE DO;
440   8             IF (BUFFER(0) = 'Q')THEN RETURN;
442   8             IF (BUFFER(0) = '-' OR BUFFER(0) = '\') THEN DO;
444   9             TTHRESH = DOUBLE(BUFFER(0));
445   9             TTHRESH = SHL(TTHRESH,8);
446   9             BUFFER(0) = ' ';
447   9             END;
448   8             ELSE DO;
449   9             TTHRESH = 02B00H;
450   9             END;
451   8             CALL ASC$WRD(@BUFFER,@IGRAD);
452   8             IF (IGRAD > 0 AND IGRAD < 64) THEN DO;
454   9             IGRAD = IGRAD OR TTHRESH;
455   9             LABEL_OFFSETS(PROD_PTR).PT3_THRESH = IGRAD;
456   9             END;
457   8             ELSE BUFFER(0) = 'M';
458   8             END;
459   7             END;
460   6             ELSE BUFFER(0) = 'M';
461   6             END;

                /*  STORE OFFSETS IN TABLE  */

                /*  CALCULATE COUNTER FOR LOCATE LABEL  */
462   5             IF LABEL_OFFSETS(PROD_PTR).LAB_AXIS = OFH THEN LABEL_OFFSETS(PROD_PTR).PT3_COUNT =
463   5                 4 * (INT(CURS_LOC(2 + CTABLE_OFF)) - INT(CURS_LOC(0 + CTABLE_OFF)));
464   5                 ELSE LABEL_OFFSETS(PROD_PTR).PT3_COUNT =
                        4 * (INT(CURS_LOC(3 + CTABLE_OFF)) - INT(CURS_LOC(1 + CTABLE_OFF)));
465   5             LABEL_OFFSETS(PROD_PTR).PT3_HOZ_ST =
                        INT(WORK_TABLE(LABEL_FLAG).PACKAGE_CENTER) - INT(CURS_LOC(1 + CTABLE_OFF));
466   5             LABEL_OFFSETS(PROD_PTR).PT3_VERT_ST =
                        INT(WORK_TABLE(LABEL_FLAG).PACKAGE_ELEV) - INT(CURS_LOC(0 + CTABLE_OFF));
                /*  STORE EDGE LOCATION TEMPORARILY  */
467   5         LABEL_EDGE(2).HOZ = CURS_LOC(3 + CTABLE_OFF);
468   5         LABEL_EDGE(2).VERT = CURS_LOC(2 + CTABLE_OFF);

                /*  LOCATE OPPOSITE EDGE OF LABEL  */

                /*  SET UP NEXT CURSOR MOVE  */
469   5         CURS_LOC(4 + CTABLE_OFF) = CURS_LOC(2 + CTABLE_OFF);
470   5         CURS_LOC(5 + CTABLE_OFF) = CURS_LOC(3 + CTABLE_OFF);
471   5         CALL WRITE(@EDGE_MESS_4,LENGTH(EDGE_MESS_4));
472   5         CALL WRITE(@HIT_MESS,LENGTH(HIT_MESS));

                /*  CHECK FOR DIRECTION OF MOVE  */
473   5         IF LABEL_OFFSETS(PROD_PTR).LAB_AXIS = OFH THEN CFUNC = IMAGF OR CUR3 OR ENAY OR MOVC;
475   5         ELSE CFUNC = IMAGF OR CUR3 OR ENAX OR MOVC;
476   5         CALL CURSOR_ROUTINE(@CURS_LOC,CFUNC);
477   5         CALL TIMER(15000);

                /*  STORE EDGE LOCATION  */

478   5         LABEL_EDGE(3).HOZ = CURS_LOC(5 + CTABLE_OFF);
479   5         LABEL_EDGE(3).VERT = CURS_LOC(4 + CTABLE_OFF);

                /*  GET GRADIENT INFORMATION FOR THIS POINT  */

480   5             BUFFER(0) = 'M';
481   5             DO WHILE BUFFER(0) = 'M';
482   6             CRLF;
483   6             CALL WRITE(@('ENTER GRADIENT THRESHOLD FOR THIS EDGE'),38);
484   6             CALL WRITE(@(CR,LF,'(Q - quit, M - measure) - '),28);
485   6             NOBYTES = READ(@BUFFER,5);
486   6             IF (BUFFER(0) <> CR) THEN DO;
488   7             IF BUFFER(0) = 'M' THEN
489   7             DO;


490   8             IF LABEL_OFFSETS(PROD_PTR).LAB_AXIS = OFH THEN
491   8             DO;    /*  HORIZONTAL ORIENTATION  */

                /*  UPDATE CURS_LOC_2 TABLE  */
492   9                 IF (CURS_LOC(2 + CTABLE_OFF) > CURS_LOC(0 + CTABLE_OFF)) THEN
493   9                     VERT_DIST = CURS_LOC(2 + CTABLE_OFF) - CURS_LOC(0 + CTABLE_OFF);
494   9                     ELSE VERT_DIST = CURS_LOC(0 + CTABLE_OFF) - CURS_LOC(2 + CTABLE_OFF);
495   9                 CURS_LOC_2(1 + CTABLE_OFF) = CURS_LOC(5 + CTABLE_OFF);
496   9                 CURS_LOC_2(3 + CTABLE_OFF) = CURS_LOC(5 + CTABLE_OFF);
497   9                 CURS_LOC_2(2 + CTABLE_OFF) = CURS_LOC(4 + CTABLE_OFF) + VERT_DIST;
498   9                 CURS_LOC_2(0 + CTABLE_OFF) = CURS_LOC(4 + CTABLE_OFF) - VERT_DIST;
499   9             END;
500   8             ELSE DO;   /*  VERTICAL ORIENTATION  */
                /*  CALCULATE HORIZONTAL DISTANCE FOR GRAD_PROF  */
501   9                 IF (CURS_LOC(3 + CTABLE_OFF) > CURS_LOC(1 + CTABLE_OFF)) THEN
502   9                     HOR_DIST = CURS_LOC(3 + CTABLE_OFF) - CURS_LOC(1 + CTABLE_OFF);
503   9                     ELSE HOR_DIST = CURS_LOC(1 + CTABLE_OFF) - CURS_LOC(3 + CTABLE_OFF);
```

```
504   9           CURS_LOC_2(0 + CTABLE_OFF) = CURS_LOC(4 + CTABLE_OFF);
505   9           CURS_LOC_2(2 + CTABLE_OFF) = CURS_LOC(4 + CTABLE_OFF);
506   9           CURS_LOC_2(3 + CTABLE_OFF) = CURS_LOC(5 + CTABLE_OFF) + HOR_DIST;
507   9           CURS_LOC_2(1 + CTABLE_OFF) = CURS_LOC(5 + CTABLE_OFF) - HOR_DIST;
508   9        END;

          /*   ERASE CURSORS FROM SCREEN  */
509   8        CFUNC = IMAGF OR DISC;
510   8        CALL CURSOR_ROUTINE(@CURS_LOC,CFUNC);

          /*   ENABLE NEW CURSOR DISPLAY  */
511   8        CFUNC = IMAGF OR RESTC;
512   8        CALL CURSOR_ROUTINE(@CURS_LOC_2,CFUNC);
513   8        J = DOUBLE(IMAGF);
514   8        SIZE = 1;
515   8        CALL GRAD_PROFILE(@CURS_LOC_2,@J,@SIZE);
516   8        CALL WRITE(@(CR,LF,'dark to light is +, light to dark is -'),40);
517   8        CALL WRITE(@(CR,LF,'+ or - is \'),13);
518   8        CALL WRITE(@(CR,LF,'READY TO PROCEDE ? Y/N - '),27);
519   8        NOBYTES = READ(@BUFFER,5);
520   8        BUFFER(0) = 'M';
521   8        IF LABEL_FLAG = 0 THEN CALL TRANS_IMAGE(1);
523   8        ELSE CALL TRANS_IMAGE(0);

          /*   RESTORE ORIGINAL CURSORS  */
524   8        CALL CURSOR_ROUTINE(@CURS_LOC,CFUNC);
525   8        END;

526   7        ELSE DO;
527   8        IF (BUFFER(0) = 'Q') THEN RETURN;
529   8        IF (BUFFER(0) = '-' OR BUFFER(0) = '\') THEN DO;
531   9        TTHRESH = DOUBLE(BUFFER(0));
532   9        TTHRESH = SHL(TTHRESH,8);
533   9        BUFFER(0) = ' ';
534   9        END;
535   8        ELSE DO;
536   9        TTHRESH = 02B00H;
537   9        END;
538   8        CALL ASC$WRD(@BUFFER,@IGRAD);
539   8        IF (IGRAD > 0 AND IGRAD < 64) THEN DO;
541   9        IGRAD = IGRAD OR TTHRESH;
542   9        LABEL_OFFSETS(PROD_PTR).PT4_THRESH = IGRAD;
543   9        END;
544   8        ELSE BUFFER(0) = 'M';
545   8        END;
546   7        END;
547   6        ELSE BUFFER(0) = 'M';
548   6        END;
          /*   LOCATE POINT 4 STARTING LOCATIONS  */

549   5        IF LABEL_OFFSETS(PROD_PTR).LAB_AXIS = 0FH THEN
550   5        DO;
551   6        CALL WRITE(@TOP_MESS_1,LENGTH(TOP_MESS_1));
552   6        CALL WRITE(@TOP_MESS_5,LENGTH(TOP_MESS_5));
553   6        END;
554   5        ELSE
               DO;
555   6        CALL WRITE(@EDGE_MESS_1,LENGTH(EDGE_MESS_1));
556   6        CALL WRITE(@EDGE_MESS_7,LENGTH(EDGE_MESS_7));
557   6        END;
558   5        CALL WRITE(@HIT_MESS,LENGTH(HIT_MESS));

          /*   SET UP CURSOR TABLE FOR MOVE  */

559   5        CURS_LOC(6 + CTABLE_OFF) = CURS_LOC(4 + CTABLE_OFF);
560   5        CURS_LOC(7 + CTABLE_OFF) = CURS_LOC(5 + CTABLE_OFF);
561   5        IF LABEL_OFFSETS(PROD_PTR).LAB_AXIS = 0FH THEN CFUNC = IMAGF OR CUR4 OR ENAY OR MOVC;
563   5           ELSE CFUNC = IMAGF OR CUR4 OR ENAX OR MOVC;
564   5        CALL CURSOR_ROUTINE(@CURS_LOC,CFUNC);

565   5        CALL TIMER(15000);
          /*   CALCULATE AND STORE OFFSET TERMS  */

566   5        LABEL_OFFSETS(PROD_PTR).PT4_HOZ_ST =
                  INT(WORK_TABLE(LABEL_FLAG).PACKAGE_CENTER) - INT(CURS_LOC(7 + CTABLE_OFF));
567   5        LABEL_OFFSETS(PROD_PTR).PT4_VERT_ST =
                  INT(WORK_TABLE(LABEL_FLAG).PACKAGE_ELEV) - INT(CURS_LOC(6 + CTABLE_OFF));
568   5        IF LABEL_OFFSETS(PROD_PTR).LAB_AXIS = 0FH THEN
569   5        LABEL_OFFSETS(PROD_PTR).PT4_COUNT = 4 * (INT(CURS_LOC(6 + CTABLE_OFF)) -
                        INT(CURS_LOC(4 + CTABLE_OFF)));
570   5        ELSE
               LABEL_OFFSETS(PROD_PTR).PT4_COUNT = 4 * (INT(CURS_LOC(7 + CTABLE_OFF)) -
                        INT(CURS_LOC(5 + CTABLE_OFF)));

          /*   LOCATE POINT 6  */
          /*   CLEAR CURSOR TABLE  */
```

```
571   5          CALL INIT_CUR(@CURS_LOC);
572   5          CALL INIT_CUR(@CURS_LOC_2);
           /*    HOME CURSOR 1  */
573   5          CFUNC = IMAGF OR CUR1 OR HOMC;
574   5          CALL CURSOR_ROUTINE(@CURS_LOC,CFUNC);


575   5          IF LABEL_OFFSETS(PROD_PTR).LAB_AXIS = OFH THEN
576   5          DO;
577   6          CALL WRITE(@EDGE_MESS_1,LENGTH(EDGE_MESS_1));
578   6          CALL WRITE(@EDGE_MESS_8,LENGTH(EDGE_MESS_8));
579   6          END;
580   5          ELSE
                 DO;
581   6          CALL WRITE(@TOP_MESS_1,LENGTH(TOP_MESS_1));
582   6          CALL WRITE(@TOP_MESS_6,LENGTH(TOP_MESS_6));
583   6          END;
584   5          CALL WRITE(@HIT_MESS,LENGTH(HIT_MESS));

           /*    SET UP CFUNC  */
585   5          CFUNC = IMAGF OR CUR1 OR ENAX OR ENAY OR MOVC;
586   5          CALL CURSOR_ROUTINE(@CURS_LOC,CFUNC);
587   5          CALL TIMER(15000);

           /*    LOCATE LEFT OR TOP EDGE OF LABEL  */

588   5          CALL WRITE(@EDGE_MESS_3,LENGTH(EDGE_MESS_3));
589   5          CALL WRITE(@HIT_MESS,LENGTH(HIT_MESS));

           /*    DETERMINE DIRECTION OF MOTION FOR CURSOR  */

590   5          IF LABEL_OFFSETS(PROD_PTR).LAB_AXIS=OFH THEN CFUNC=IMAGF OR CUR2 OR ENAX OR MOVC;
592   5          ELSE CFUNC = IMAGF OR CUR2 OR ENAY OR MOVC;
593   5          CURS_LOC(2 + CTABLE_OFF) = CURS_LOC(0 + CTABLE_OFF);
594   5          CURS_LOC(3 + CTABLE_OFF) = CURS_LOC(1 + CTABLE_OFF);
595   5          CALL CURSOR_ROUTINE(@CURS_LOC,CFUNC);
596   5          CALL TIMER(15000);


           /*    GET EDGE GRADIENT FOR THIS LOCATION  */
597   5          BUFFER(0) = 'M';
598   5          DO WHILE BUFFER(0) = 'M';
599   6          CRLF;
600   6          CALL WRITE(@('ENTER GRADIENT THRESHOLD FOR THIS EDGE'),38);
601   6          CALL WRITE(@(CR,LF,'(Q - quit, M - measure) - '),28);
602   6          NOBYTES = READ(@BUFFER,5);
603   6          IF (BUFFER(0) <> CR) THEN DO;
605   7          IF BUFFER(0) = 'M' THEN
606   7          DO;

           /*    TRANSFER CURSOR COORDINATES TO CURS_LOC_2  */

607   8          CURS_LOC_2(0 + CTABLE_OFF) = CURS_LOC(0 + CTABLE_OFF);
608   8          CURS_LOC_2(1 + CTABLE_OFF) = CURS_LOC(1 + CTABLE_OFF);
609   8          IF LABEL_OFFSETS(PROD_PTR).LAB_AXIS = OFH THEN
610   8          DO;   /*  HORIZONTAL ORIENTATION  */

           /*    UPDATE CURS_LOC_2 TABLE  */
611   9               CURS_LOC_2(2 + CTABLE_OFF) = CURS_LOC(0 + CTABLE_OFF);
612   9               IF (CURS_LOC(3 + CTABLE_OFF) > CURS_LOC(1 + CTABLE_OFF))
613   9               THEN DO;
           /*    CALCULATE HORIZONTAL DISTANCE FOR GRAD_PROF  */
614  10               HOR_DIST = CURS_LOC(3 + CTABLE_OFF) - CURS_LOC(1 + CTABLE_OFF);
615  10               CURS_LOC_2(3 + CTABLE_OFF) = CURS_LOC(3 + CTABLE_OFF) + HOR_DIST;
616  10               END;
617   9               ELSE DO;
618  10               HOR_DIST = CURS_LOC(1 + CTABLE_OFF) - CURS_LOC(3 + CTABLE_OFF);
619  10               CURS_LOC_2(3 + CTABLE_OFF) = CURS_LOC(3 + CTABLE_OFF) - HOR_DIST;
620  10               END;
621   9          END;
622   8          ELSE DO;   /*  VERTICAL ORIENTATION  */
           /*    UPDATE CURS_LOC_2  */
623   9               CURS_LOC_2(3 + CTABLE_OFF) = CURS_LOC(1 + CTABLE_OFF);
624   9               IF (CURS_LOC(2 + CTABLE_OFF) > CURS_LOC(0 + CTABLE_OFF))
625   9               THEN DO;
           /*    CALCULATE VERTICAL DISTANCE FOR GRAD_PROF  */
626  10               VERT_DIST = CURS_LOC(2 + CTABLE_OFF) - CURS_LOC(0 + CTABLE_OFF);
627  10               CURS_LOC_2(2 + CTABLE_OFF) = CURS_LOC(2 + CTABLE_OFF) + VERT_DIST;
628  10               END;
629   9               ELSE DO;
630  10               VERT_DIST = CURS_LOC(0 + CTABLE_OFF) - CURS_LOC(2 + CTABLE_OFF);
631  10               CURS_LOC_2(2 + CTABLE_OFF) = CURS_LOC(2 + CTABLE_OFF) - VERT_DIST;
632  10               END;
633   9          END;

           /*    ERASE CURSORS FROM SCREEN  */
634   8          CFUNC = IMAGF OR DISC;
635   8          CALL CURSOR_ROUTINE(@CURS_LOC,CFUNC);
```

```
                /*  ENABLE NEW CURSOR DISPLAY  */
636   8             CFUNC = IMAGE OR RESTC;
637   8             CALL CURSOR_ROUTINE(@CURS_LOC_2,CFUNC);
638   8             J = DOUBLE(IMAGE);
639   8             SIZE = 1;
640   8             CALL GRAD_PROFILE(@CURS_LOC_2,@J,@SIZE);
641   8             CALL WRITE(@(CR,LF,'dark to light is +, light to dark is -'),40);
642   8             CALL WRITE(@(CR,LF,'+ or - is \'),13);
643   8             CALL WRITE(@(CR,LF,'READY TO PROCEDE ? Y/N - '),27);
644   8             NOBYTES = READ(@BUFFER,5);
645   8             BUFFER(0) = 'M';
646   8             IF LABEL_FLAG = 0 THEN CALL TRANS_IMAGE(1);
648   8             ELSE CALL TRANS_IMAGE(0);

                /*  RESTORE ORIGINAL CURSORS  */
649   8             CALL CURSOR_ROUTINE(@CURS_LOC,CFUNC);
650   8             END;

651   7             ELSE DO;
652   8             IF (BUFFER(0) = 'Q') THEN RETURN;
654   8             IF (BUFFER(0) = '-' OR BUFFER(0) = '\') THEN DO;
656   9             TTHRESH = DOUBLE(BUFFER(0));
657   9             TTHRESH = SHL(TTHRESH,8);
658   9             BUFFER(0) = ' ';
659   9             END;
660   8             ELSE DO;
661   9             TTHRESH = 02B00H;
662   9             END;
663   8             CALL ASC$WRD(@BUFFER,@IGRAD);
664   8             IF (IGRAD > 0 AND IGRAD < 64) THEN DO;
666   9             IGRAD = IGRAD OR TTHRESH;
667   9             LABEL_OFFSETS(PROD_PTR).PT5_THRESH = IGRAD;
668   9             END;
669   8             ELSE BUFFER(0) = 'M';
670   8             END;
671   7             END;
672   6             ELSE BUFFER(0) = 'M';
673   6             END;

                /*  STORE OFFSETS IN TABLE  */

                /*  CALCULATE COUNTER FOR LOCATE LABEL  */
674   5             IF LABEL_OFFSETS(PROD_PTR).LAB_AXIS = OFH THEN LABEL_OFFSETS(PROD_PTR).PT5_COUNT =
675   5                 4 * (INT(CURS_LOC(3 + CTABLE_OFF)) - INT(CURS_LOC(1 + CTABLE_OFF)));
676   5                 ELSE LABEL_OFFSETS(PROD_PTR).PT5_COUNT =
                        4 * (INT(CURS_LOC(2 + CTABLE_OFF)) - INT(CURS_LOC(0 + CTABLE_OFF)));
677   5             LABEL_OFFSETS(PROD_PTR).PT5_HOZ_ST =
                        INT(WORK_TABLE(LABEL_FLAG).PACKAGE_CENTER) - INT(CURS_LOC(1 + CTABLE_OFF));
678   5             LABEL_OFFSETS(PROD_PTR).PT5_VERT_ST =
                        INT(WORK_TABLE(LABEL_FLAG).PACKAGE_ELEV) - INT(CURS_LOC(0 + CTABLE_OFF));
                /*  STORE EDGE LOCATION TEMPORARILY  */
679   5         LABEL_EDGE(4).HOZ = CURS_LOC(3 + CTABLE_OFF);
680   5         LABEL_EDGE(4).VERT = CURS_LOC(2 + CTABLE_OFF);

                /*  LOCATE OPPOSITE EDGE OF LABEL  */

                /*  SET UP NEXT CURSOR MOVE  */
681   5         CURS_LOC(4 + CTABLE_OFF) = CURS_LOC(2 + CTABLE_OFF);
682   5         CURS_LOC(5 + CTABLE_OFF) = CURS_LOC(3 + CTABLE_OFF);
683   5         CALL WRITE(@EDGE_MESS_4,LENGTH(EDGE_MESS_4));
684   5         CALL WRITE(@HIT_MESS,LENGTH(HIT_MESS));

                /*  CHECK FOR DIRECTION OF MOVE  */
685   5         CFUNC = IMAGE OR CUR3 OR ENAX OR ENAY OR MOVC;
686   5         CALL CURSOR_ROUTINE(@CURS_LOC,CFUNC);
687   5         CALL TIMER(15000);

                /*  STORE EDGE LOCATION  */

688   5         LABEL_EDGE(5).HOZ = CURS_LOC(5 + CTABLE_OFF);
689   5         LABEL_EDGE(5).VERT = CURS_LOC(4 + CTABLE_OFF);

                /*  GET GRADIENT INFORMATION FOR THIS POINT  */

690   5             BUFFER(0) = 'M';
691   5             DO WHILE BUFFER(0) = 'M';
692   6             CRLF;
693   6             CALL WRITE(@('ENTER GRADIENT THRESHOLD FOR THIS EDGE'),38);
694   6             CALL WRITE(@(CR,LF,'(Q - quit, M - measure) - '),28);
695   6             NOBYTES = READ(@BUFFER,5);
696   6             IF (BUFFER(0) <> CR) THEN DO;
698   7             IF BUFFER(0) = 'M' THEN
699   7             DO;
```

```
8           IF LABEL_OFFSETS(PROD_PTR).LAB_AXIS = OFH THEN
8           DO;   /*  HORIZONTAL ORIENTATION  */

        /*  UPDATE CURS_LOC_2 TABLE  */
9               IF (CURS_LOC(3 + CTABLE_OFF) > CURS_LOC(1 + CTABLE_OFF)) THEN
9                   HOR_DIST = CURS_LOC(3 + CTABLE_OFF) - CURS_LOC(1 + CTABLE_OFF);
9                   ELSE HOR_DIST = CURS_LOC(1 + CTABLE_OFF) - CURS_LOC(3 + CTABLE_OFF);
9               CURS_LOC_2(0 + CTABLE_OFF) = CURS_LOC(4 + CTABLE_OFF);
9               CURS_LOC_2(2 + CTABLE_OFF) = CURS_LOC(4 + CTABLE_OFF);
9               CURS_LOC_2(3 + CTABLE_OFF) = CURS_LOC(5 + CTABLE_OFF) + HOR_DIST;
9               CURS_LOC_2(1 + CTABLE_OFF) = CURS_LOC(5 + CTABLE_OFF) - HOR_DIST;
9           END;
8           ELSE DO;  /*  VERTICAL ORIENTATION  */
9               IF (CURS_LOC(2 + CTABLE_OFF) > CURS_LOC(0 + CTABLE_OFF)) THEN
9                   VERT_DIST = CURS_LOC(2 + CTABLE_OFF) - CURS_LOC(0 + CTABLE_OFF);
9                   ELSE VERT_DIST = CURS_LOC(0 + CTABLE_OFF) - CURS_LOC(2 + CTABLE_OFF);
9               CURS_LOC_2(1 + CTABLE_OFF) = CURS_LOC(5 + CTABLE_OFF);
9               CURS_LOC_2(3 + CTABLE_OFF) = CURS_LOC(5 + CTABLE_OFF);
9               CURS_LOC_2(2 + CTABLE_OFF) = CURS_LOC(4 + CTABLE_OFF) + VERT_DIST;
9               CURS_LOC_2(0 + CTABLE_OFF) = CURS_LOC(4 + CTABLE_OFF) - VERT_DIST;
9           END;

        /*  ERASE CURSORS FROM SCREEN  */
8           CFUNC = IMAGF OR DISC;
8           CALL CURSOR_ROUTINE(@CURS_LOC,CFUNC);

        /*  ENABLE NEW CURSOR DISPLAY  */
8           CFUNC = IMAGF OR RESTC;
8           CALL CURSOR_ROUTINE(@CURS_LOC_2,CFUNC);
8           J = DOUBLE(IMAGF);
8           SIZE = 1;
8           CALL GRAD_PROFILE(@CURS_LOC_2,@J,@SIZE);
8           CALL WRITE(@(CR,LF,'dark to light is +, light to dark is -'),40);
8           CALL WRITE(@(CR,LF,'+ or - is \'),13);
8           CALL WRITE(@(CR,LF,'READY TO PROCEDE ? Y/N - '),27);
8           NOBYTES = READ(@BUFFER,5);
8           BUFFER(0) = 'M';
8           IF LABEL_FLAG = 0 THEN CALL TRANS_IMAGE(1);
8           ELSE CALL TRANS_IMAGE(0);

        /*  RESTORE ORIGINAL CURSORS  */
8           CALL CURSOR_ROUTINE(@CURS_LOC,CFUNC);
8           END;

7           ELSE DO;
8           IF (BUFFER(0) = 'Q') THEN RETURN;
8           IF (BUFFER(0) = '-' OR BUFFER(0) = '\') THEN DO;
9           TTHRESH = DOUBLE(BUFFER(0));
9           TTHRESH = SHL(TTHRESH,8);
9           BUFFER(0) = ' ';
9           END;
8           ELSE DO;
9           TTHRESH = 02B00H;
9           END;
8           CALL ASC$WRD(@BUFFER,@IGRAD);
8           IF (IGRAD > 0 AND IGRAD < 64) THEN DO;
9           IGRAD = IGRAD OR TTHRESH;
9           LABEL_OFFSETS(PROD_PTR).PT6_THRESH = IGRAD;
9           END;
8           ELSE BUFFER(0) = 'M';
8           END;
7           END;
6           ELSE BUFFER(0) = 'M';
6           END;
        /*  LOCATE POINT 6 STARTING LOCATIONS  */

5           IF LABEL_OFFSETS(PROD_PTR).LAB_AXIS = OFH THEN
5           DO;
6           CALL WRITE(@EDGE_MESS_1,LENGTH(EDGE_MESS_1));
6           CALL WRITE(@EDGE_MESS_9,LENGTH(EDGE_MESS_9));
6           END;
5           ELSE
            DO;
6           CALL WRITE(@TOP_MESS_1,LENGTH(TOP_MESS_1));
6           CALL WRITE(@TOP_MESS_7,LENGTH(TOP_MESS_7));
6           END;
5           CALL WRITE(@HIT_MESS,LENGTH(HIT_MESS));

        /*  SET UP CURSOR TABLE FOR MOVE  */

5           CURS_LOC(6 + CTABLE_OFF) = CURS_LOC(4 + CTABLE_OFF);
5           CURS_LOC(7 + CTABLE_OFF) = CURS_LOC(5 + CTABLE_OFF);

5           IF LABEL_OFFSETS(PROD_PTR).LAB_AXIS = OFH THEN CFUNC = IMAGF OR CUR4 OR ENAX OR MOVC;
5               ELSE CFUNC = IMAGF OR CUR4 OR ENAY OR MOVC;
5           CALL CURSOR_ROUTINE(@CURS_LOC,CFUNC);

        /*  CALCULATE AND STORE OFFSET TERMS  */
```

```
775   5       LABEL_OFFSETS(PROD_PTR).PT6_HOZ_ST =
                  INT(WORK_TABLE(LABEL_FLAG).PACKAGE_CENTER) - INT(CURS_LOC(7 + CTABLE_OFF));
776   5       LABEL_OFFSETS(PROD_PTR).PT6_VERT_ST =
                  INT(WORK_TABLE(LABEL_FLAG).PACKAGE_ELEV) - INT(CURS_LOC(6 + CTABLE_OFF));
777   5       IF LABEL_OFFSETS(PROD_PTR).LAB_AXIS = OFH THEN
778   5       LABEL_OFFSETS(PROD_PTR).PT6_COUNT =4 * ( INT(CURS_LOC(7 + CTABLE_OFF)) -
                      INT(CURS_LOC(5 + CTABLE_OFF)));
779   5       ELSE
              LABEL_OFFSETS(PROD_PTR).PT6_COUNT = 4 * (INT(CURS_LOC(6 + CTABLE_OFF)) -
                      INT(CURS_LOC(4 + CTABLE_OFF)));
780   5       IF LABEL_OFFSETS(PROD_PTR).LAB_AXIS = OFH THEN
781   5       DO;

          /*  CALCULATE SKEW  */

782   6       CENTER1 = (LABEL_EDGE(0).VERT + LABEL_EDGE(1).VERT) / 2;
783   6       CENTER2 = (LABEL_EDGE(2).VERT + LABEL_EDGE(3).VERT) / 2;
784   6       LABEL_OFFSETS(PROD_PTR).LABEL_SKEW = (INT(CENTER2) - INT(CENTER1));

          /*  CALCULATE ELEVATION  */

785   6       CENTER1 = (CENTER1 + CENTER2) / 2;
786   6       LABEL_OFFSETS(PROD_PTR).LABEL_ELEV = (INT(WORK_TABLE(LABEL_FLAG).
                      PACKAGE_ELEV) - INT(CENTER1));

          /*  CALCULATE WIDTH  */

787   6       CENTER1 = LABEL_EDGE(1).VERT - LABEL_EDGE(0).VERT;
788   6       CENTER2 = LABEL_EDGE(3).VERT - LABEL_EDGE(2).VERT;
789   6       LABEL_OFFSETS(PROD_PTR).LABEL_WIDTH = (CENTER1 + CENTER2) / 2;
          /*  CALCULATE CENTER  */

790   6       CENTER1 = ((LABEL_EDGE(5).HOZ + LABEL_EDGE(4).HOZ) / 2);
791   6       LABEL_OFFSETS(PROD_PTR).LABEL_CENTER = INT(WORK_TABLE(LABEL_FLAG).
                      PACKAGE_CENTER) - INT(CENTER1);
792   6       END;
793   5       ELSE
              DO;

          /*  CALCULATE SKEW  */

794   6       CENTER1 = (LABEL_EDGE(0).HOZ + LABEL_EDGE(1).HOZ) / 2;
795   6       CENTER2 = (LABEL_EDGE(2).HOZ + LABEL_EDGE(3).HOZ) / 2;
796   6       LABEL_OFFSETS(PROD_PTR).LABEL_SKEW = (INT(CENTER2) - INT(CENTER1));

          /*  CALCULATE CENTER  */

797   6       CENTER1 = (CENTER1 + CENTER2) / 2;
798   6       LABEL_OFFSETS(PROD_PTR).LABEL_CENTER = (INT(WORK_TABLE(LABEL_FLAG).
                      PACKAGE_CENTER) - INT(CENTER1));

          /*  CALCULATE WIDTH  */

799   6       CENTER1 = LABEL_EDGE(1).HOZ - LABEL_EDGE(0).HOZ;
800   6       CENTER2 = LABEL_EDGE(3).HOZ - LABEL_EDGE(2).HOZ;
801   6       LABEL_OFFSETS(PROD_PTR).LABEL_WIDTH = (CENTER1 + CENTER2) / 2;

          /*  CALCULATE ELEVATION  */

802   6       CENTER1 = (LABEL_EDGE(5).VERT + LABEL_EDGE(4).VERT) / 2;
803   6       LABEL_OFFSETS(PROD_PTR).LABEL_ELEV = INT(WORK_TABLE(LABEL_FLAG).PACKAGE_ELEV)
                                          - INT(CENTER1);
804   6       END;

805   5       CALL WRITE(@(CR,LF,'ARE THESE POINTS OK? Y/N -'),28);
806   5       NOBYTES = READ(@BUFFER,5);

          /*  RESTORE IMAGE  */
807   5       IF LABEL_FLAG = 0 THEN CALL TRANS_IMAGE(1);
809   5           ELSE CALL TRANS_IMAGE(0);
810   5   END;

811   4       CALL LOC_LABEL;
812.  4   BUFFER(0) = ' ';
813   4   CALL WRITE(@(CR,LF,'IS LABEL LOCATED OK ? Y/N - '),30);
814   4   NOBYTES = READ(@BUFFER,5);
          /*  RESTORE IMAGE  */
815   4       IF LABEL_FLAG = 0 THEN CALL TRANS_IMAGE(1);
817   4           ELSE CALL TRANS_IMAGE(0);
818   4   END;
819   3   END;
820   2   END DEF_LABEL;
821   1   END DEF_LABL_MODULE;
```

```
MODULE INFORMATION:

     CODE AREA SIZE     = 1B6DH   7021D
     CONSTANT AREA SIZE = 0772H   1906D
     VARIABLE AREA SIZE = 000AH     10D
     MAXIMUM STACK SIZE = 0010H     16D
     1248 LINES READ
     0 PROGRAM WARNINGS
     0 PROGRAM ERRORS

DICTIONARY SUMMARY:

     48KB MEMORY AVAILABLE
     15KB MEMORY USED   (31%)
     0KB DISK SPACE USED

END OF PL/M-86 COMPILATION

iRMX 86 PL/M-86 V2.3 COMPILATION OF MODULE DEF_LABL_MODULE
OBJECT MODULE PLACED IN SOURCE/LABEL2.OBJ
COMPILER INVOKED BY:  :LANG:PLM86 SOURCE/LABEL2.PLM OPTIMIZE(3) ROM SET(TARGET=1)


              $INCLUDE(SOURCE/COPYRIGHT)
          =   /*

          =   ***********************************************************************
          =   *                                                                     *
          =   *                                                                     *
          =   *                   COPYRIGHT CHESEBROUGH-POND'S INC.                 *
          =   *                                                                     *
          =   *                   (c) 1983, CHESEBROUGH-POND'S INC.                 *
          =   *                                                                     *
          =   *                                                                     *
          =   *                                                                     *
          =   *                                                                     *
          =   *      ALL RIGHTS RESERVED. NO PART OF THIS PROGRAM MAY BE REPRODUCED, *
          =   *      TRANSMITTED, TRANSCRIBED, STORED IN A RETRIEVAL SYSTEM, OR     *
          =   *      TRANSLATED INTO ANY LANGUAGE OR COMPUTER LANGUAGE, IN ANY FORM *
          =   *      OR BY ANY MEANS, ELECTRONIC, MECHANICAL, MAGNETIC, OPTICAL,    *
          =   *      CHEMICAL, MANUAL OR OTHERWISE, WITHOUT THE EXPRESS WRITTEN PER- *
          =   *      MISSION OF CHESEBROUGH-POND'S INC., 33 BENEDICT PLACE, GREENWICH, *
          =   *      CONNECTICUT.                                                   *
          =   *                                                                     *
          =   *                                                                     *
          =   ***********************************************************************

          =   */

              $TITLE(' DEFINE LABEL MODULE')
  1           DEF_LABL_MODULE:
              DO;
              $INCLUDE(SOURCE/DECLARE.EXT)
  2    1  =   DECLARE      DCL      LITERALLY   'DECLARE';
  3    1  =   DECLARE      LIT      LITERALLY   'LITERALLY';
              $INCLUDE(SOURCE/XTERMHAND.EXT)
  4    1  =   INIT_USART: PROCEDURE EXTERNAL;
  5    2  =   END INIT_USART;
  6    1  =   WRITE: PROCEDURE(BUFFER_PTR,BLENGTH) EXTERNAL;
  7    2  =           DCL BUFFER_PTR  POINTER;
  8    2  =           DCL BLENGTH WORD;
  9    2  =   END WRITE;
 10    1  =   READ: PROCEDURE(BUFFER_PTR,BLENGTH)WORD EXTERNAL;
 11    2  =           DCL      BUFFER_PTR  POINTER;
 12    2  =           DCL      BLENGTH    WORD;
 13    2  =   END READ;
              $INCLUDE(SOURCE/IWCONV.EXT)
          =   $SAVE
          =   $NOLIST

              /*  VARIABLE DECLARATIONS PUBLIC  */
 35    1      DCL IGRAD               WORD EXTERNAL;
 36    1      DCL PARAM1              INTEGER EXTERNAL;
 37    1      DCL BUFFER (24)         BYTE EXTERNAL;
 38    1      DCL CURS_LOC (24)       WORD EXTERNAL;
 39    1      DCL CURS_LOC_2 (24)     WORD EXTERNAL;
 40    1      DCL NOBYTES             WORD EXTERNAL;
 41    1      DCL PROD_NUM            WORD EXTERNAL;
 42    1      DCL PROD_PTR            WORD EXTERNAL;
 43    1      DCL SIZE                WORD EXTERNAL;
 44    1      DCL CTABLE_OFF          WORD EXTERNAL;
 45    1      DCL VERT_CL             WORD EXTERNAL;
 46    1      DCL HOR_DIST            WORD EXTERNAL;
 47    1      DCL VERT_DIST           WORD EXTERNAL;
 48    1      DCL LABEL_FLAG          BYTE EXTERNAL;
 49    1      DCL CFUNC               BYTE EXTERNAL;
 50    1      DCL IMAGF               BYTE EXTERNAL;
 51    1      DCL DIR_PTR             BYTE EXTERNAL;
```

```
                /* LOCAL VARIABLE DECLARATIONS */
52    1         DCL (I,J,TTHRESH)    WORD;
53    1         DCL CENTER1          WORD;
54    1         DCL CENTER2          WORD;
55    1         DCL TEMP_H           WORD;
56    1         DCL TEMP_V           WORD;

                /* LITERALL DECLARATIONS  */
57    1         DCL CAMERA_ON        LIT      '03H';
58    1         DCL CAMERA_OFF       LIT      '00H';
59    1         DCL DATA_REG         LIT      '00H';
60    1         DCL COMMD_REG        LIT      '03H';
61    1         DCL HOZ_ADD_LO       LIT      '04H';
62    1         DCL HOZ_ADD_HI       LIT      '05H';
63    1         DCL VERT_ADD         LIT      '06H';
64    1         DCL POST_INC_READ    LIT      '01H';
65    1         DCL POST_INC_WRITE   LIT      '02H';
66    1         DCL CLRSCRN          LIT      '1BH,6AH,0CH';
67    1         DCL SET_CUR          LIT      '1BH,59H';
68    1         DCL ESC              LIT      '1BH';
69    1         DCL CRLF             LIT      'CALL WRITE(@(13,10),2)';
70    1         DCL CR               LIT      '0DH';
71    1         DCL LF               LIT      '0AH';
72    1         DCL RESTC            LIT      '00H';
73    1         DCL DISC             LIT      '03H';
74    1         DCL MOVC             LIT      '02H';
75    1         DCL CUR1             LIT      '00H';
76    1         DCL CUR2             LIT      '04H';
77    1         DCL CUR3             LIT      '08H';
78    1         DCL CUR4             LIT      '0CH';
79    1         DCL HOMC             LIT      '01H';
80    1         DCL ENAX             LIT      '010H';
81    1         DCL ENAY             LIT      '020H';
82    1         DCL F_IMG            LIT      '00H';
83    1         DCL B_IMG            LIT      '040H';

84    1         DCL PROD_NAM_TBL (20) STRUCTURE(NAM_BUFFER(20) BYTE) EXTERNAL;

                $INCLUDE(SOURCE/OFFSETS.LIB)
           =    $SAVE
           =    $NOLIST
                /*  EXTERNAL PROCEDURE DECLARATIONS  */

93    1         CURSOR_ROUTINE: PROCEDURE(CURSOR_TABLE,FUNCT) EXTERNAL;
94    2             DCL CURSOR_TABLE     POINTER;
95    2             DCL FUNCT            BYTE;
96    2         END CURSOR_ROUTINE;

97    1         GRAD_PROFILE: PROCEDURE(CURSOR_TABLE,IMAGE_PTR,SIZE_PTR) EXTERNAL;
98    2             DCL CURSOR_TABLE     POINTER;
99    2             DCL IMAGE_PTR        POINTER;
100   2             DCL SIZE_PTR         POINTER;
101   2         END GRAD_PROFILE;

102   1         TIMER: PROCEDURE(J) EXTERNAL;
103   2             DCL J                WORD;
104   2         END TIMER;

105   1         TRANS_IMAGE: PROCEDURE(IFLAG) EXTERNAL;
106   2             DCL IFLAG            BYTE;
107   2         END TRANS_IMAGE;

108   1         INIT_CUR: PROCEDURE(TABLE_PTR) EXTERNAL;
109   2             DCL TABLE_PTR        POINTER;
110   2         END INIT_CUR;

111   1         LOC_CLOSURE: PROCEDURE EXTERNAL;
112   2         END LOC_CLOSURE;

113   1         LOC_LABEL: PROCEDURE EXTERNAL;
114   2         END LOC_LABEL;

115   1         LOC_LABEL2: PROCEDURE EXTERNAL;
116   2         END LOC_LABEL2;

                /*  MESSAGE DECLARATIONS  */

117   1         DCL PT1_MESS_1 (*) BYTE DATA(CLRSCRN,'MOVE CURSOR TO PT 1 FEATURE POINT.');
118   1         DCL PT2_MESS_2 (*) BYTE DATA(CLRSCRN,'MOVE CURSOR TO PT 2 FEATURE POINT.');
119   1         DCL MESS_1 (*) BYTE DATA(CR,LF,LF,'ENTER HORIZONTAL DISTANCE FROM CENTER.',
                                         CR,LF,'- ');
120   1         DCL MESS_2 (*) BYTE DATA(CR,LF,'ENTER VERTICAL DISTANCE FROM CENTER.',
                                         CR,LF,'- ');
121   1         DCL MESS_3 (*) BYTE DATA(CR,LF,'ENTER SEARCH DIRECTION H OR V - ');
122   1         DCL MESS_4 (*) BYTE DATA(CR,LF,'SEARCH FROM RIGHT TO LEFT (R)',CR,LF,
                                        'OR LEFT TO RIGHT (L)? - ');
```

```
123   1      DCL MESS_5 (*) BYTE DATA(CR,LF,'SEARCH FROM TOP TO BOTTOM (T)',CR,LF,
                                        'OR BOTTOM TO TOP (B)? - ');
124   1      DCL HIT_MESS   (*) BYTE DATA(CR,LF,'PRESS USER 1 WHEN READY. -');

125   1      DEF_LABEL_2: PROCEDURE PUBLIC;
126   2      DO;

127   3      BUFFER(0) = ' ';
128   3      DO WHILE BUFFER(0) <> 'Y';
             /*  SET POINT LOCATE FLAG  */
129   4          LABEL_OFFSETS(PROD_PTR).LAB_AXIS = 04FH;

             /*  DETERMINE IMAGE POINTER  */

130   4          IF LABEL_FLAG = 0 THEN IMAGF = F_IMG;
132   4              ELSE IMAGF = B_IMG;
133   4          BUFFER(0) = ' ';
134   4          DO WHILE BUFFER(0) <> 'Y';

             /*  CLEAR CURSOR TABLE  */

135   5          CALL INIT_CUR(@CURS_LOC);
136   5          CALL INIT_CUR(@CURS_LOC_2);
             /*  HOME CURSOR 1  */
137   5          CFUNC = IMAGF OR CUR1 OR HOMC;
138   5          CALL CURSOR_ROUTINE(@CURS_LOC,CFUNC);

             /*  LOCATE POINT 1  */

139   5          CALL WRITE(@PT1_MESS_1,LENGTH(PT1_MESS_1));
140   5          CALL WRITE(@HIT_MESS,LENGTH(HIT_MESS));

             /*  SET UP CFUNC  */
141   5          CFUNC = IMAGF OR CUR1 OR ENAX OR ENAY OR MOVC;
142   5          CALL CURSOR_ROUTINE(@CURS_LOC,CFUNC);
143   5          CALL TIMER(15000);

             /*  GET AREA DIMENSIONS  FOR PT 1  */
144   5          CALL WRITE(@MESS_1,LENGTH(MESS_1));
145   5          NOBYTES = READ(@BUFFER,5);
146   5          CALL ASC$WRD(@BUFFER,@TEMP_H);
147   5          CALL WRITE(@MESS_2,LENGTH(MESS_2));
148   5          NOBYTES = READ(@BUFFER,5);
149   5          CALL ASC$WRD(@BUFFER,@TEMP_V);


             /*  STORE DIMENSIONS  */
150   5          LABEL_OFFSETS(PROD_PTR).PT1_COUNT = INT(2 * TEMP_H);
151   5          LABEL_OFFSETS(PROD_PTR).PT3_COUNT = INT(2 * TEMP_V);
             /*  GET SEARCH DIRECTION FOR POINT 1  */
152   5          BUFFER(0) = ' ';

153   5          DO WHILE (BUFFER(0) <> 'H' AND BUFFER(0) <> 'V');
154   6          CALL WRITE(@MESS_3,LENGTH(MESS_3));
155   6          NOBYTES = READ(@BUFFER,5);
156   6          END;

157   5          IF (BUFFER(0) = 'H') THEN DO;
159   6              BUFFER(0) = ' ';
160   6              DO WHILE (BUFFER(0) <> 'R' AND BUFFER(0) <> 'L');
161   7              CALL WRITE(@MESS_4,LENGTH(MESS_4));
162   7              NOBYTES = READ(@BUFFER,5);
163   7              END;
164   6              IF (BUFFER(0) = 'L') THEN LABEL_OFFSETS(PROD_PTR).PT5_COUNT = 1;
166   6              ELSE LABEL_OFFSETS(PROD_PTR).PT5_COUNT = (-1);
167   6              BUFFER(0) = ' ';
168   6              DO WHILE (BUFFER(0) <> 'T' AND BUFFER(0) <> 'B');
169   7              CALL WRITE(@MESS_5,LENGTH(MESS_5));
170   7              NOBYTES = READ(@BUFFER,5);
171   7              END;
172   6              IF (BUFFER(0) = 'B') THEN LABEL_OFFSETS(PROD_PTR).PT3_COUNT =
173   6                              -(LABEL_OFFSETS(PROD_PTR).PT3_COUNT);
174   6          END;
175   5          ELSE DO;
176   6              BUFFER(0) = ' ';
177   6              DO WHILE (BUFFER(0) <> 'T' AND BUFFER(0) <> 'B');
178   7              CALL WRITE(@MESS_5,LENGTH(MESS_5));
179   7              NOBYTES = READ(@BUFFER,5);
180   7              END;
181   6              IF (BUFFER(0) = 'T') THEN LABEL_OFFSETS(PROD_PTR).PT5_COUNT = 2;
183   6              ELSE LABEL_OFFSETS(PROD_PTR).PT5_COUNT = (-2);
184   6              BUFFER(0) = ' ';
185   6              DO WHILE (BUFFER(0) <> 'L' AND BUFFER(0) <> 'R');
186   7              CALL WRITE(@MESS_4,LENGTH(MESS_4));
187   7              NOBYTES = READ(@BUFFER,5);
188   7              END;
189   6              IF (BUFFER(0) = 'R') THEN LABEL_OFFSETS(PROD_PTR).PT1_COUNT =
190   6                              -(LABEL_OFFSETS(PROD_PTR).PT1_COUNT);
191   6          END;
```

```
                /*  GET EDGE GRADIENT FOR THIS LOCATION  */
192   5             BUFFER(0) = 'M';
193   5             DO WHILE BUFFER(0) = 'M';
194   6             CRLF;
195   6             CALL WRITE(@('ENTER GRADIENT THRESHOLD FOR THIS POINT'),39);
196   6             CALL WRITE(@(CR,LF,'(Q - quit, M - measure) - '),28);
197   6             NOBYTES = READ(@BUFFER,5);
198   6             IF (BUFFER(0) <> CR) THEN DO;
200   7             IF BUFFER(0) = 'M' THEN
201   7             DO;

                /*  TRANSFER CURSOR COORDINATES TO CURS_LOC_2  */

                /*  DETERMINE DIRECTION OF SEARCH  */
202   8             IF IABS(LABEL_OFFSETS(PROD_PTR).PT5_COUNT) > 1 THEN DO; /* VERTICAL */

204   9             CURS_LOC_2(3 + CTABLE_OFF) = CURS_LOC(1 + CTABLE_OFF);
205   9             CURS_LOC_2(1 + CTABLE_OFF) = CURS_LOC(1 + CTABLE_OFF);
206   9             CURS_LOC_2(0 + CTABLE_OFF) = CURS_LOC(0 + CTABLE_OFF) - (2 * TEMP_V);
207   9             CURS_LOC_2(2 + CTABLE_OFF) = CURS_LOC(0 + CTABLE_OFF) + (2 * TEMP_V);
208   9             END;
209   8             ELSE DO;  /* HORIZONTAL */
210   9             CURS_LOC_2(0 + CTABLE_OFF) = CURS_LOC(0 + CTABLE_OFF);
211   9             CURS_LOC_2(2 + CTABLE_OFF) = CURS_LOC(0 + CTABLE_OFF);
212   9             CURS_LOC_2(1 + CTABLE_OFF) = CURS_LOC(1 + CTABLE_OFF) - (2 * TEMP_H);
213   9             CURS_LOC_2(3 + CTABLE_OFF) = CURS_LOC(1 + CTABLE_OFF) + (2 * TEMP_H);
214   9             END;

                /*  ERASE CURSORS FROM SCREEN  */
215   8             CFUNC = IMAGF OR DISC;
216   8             CALL CURSOR_ROUTINE(@CURS_LOC,CFUNC);

                /*  ENABLE NEW CURSOR DISPLAY  */
217   8             CFUNC = IMAGF OR RESTC;
218   8             CALL CURSOR_ROUTINE(@CURS_LOC_2,CFUNC);
219   8             J = DOUBLE(IMAGF);
220   8             SIZE = 1;
221   8             CALL GRAD_PROFILE(@CURS_LOC_2,@J,@SIZE);
222   8             CALL WRITE(@(CR,LF,'dark to light is +, light to dark is -'),40);
223   8             CALL WRITE(@(CR,LF,'+ or - is \'),13);
224   8             CALL WRITE(@(CR,LF,'READY TO PROCEDE ? Y/N - '),27);
225   8             NOBYTES = READ(@BUFFER,5);
226   8             BUFFER(0) = 'M';
227   8             IF LABEL_FLAG = 0 THEN CALL TRANS_IMAGE(1);
229   8             ELSE CALL TRANS_IMAGE(0);

                /*  RESTORE ORIGINAL CURSORS  */
230   8             CALL CURSOR_ROUTINE(@CURS_LOC,CFUNC);
231   8             END;

232   7             ELSE DO;
233   8             IF (BUFFER(0) = 'Q') THEN RETURN;
235   8             IF (BUFFER(0) = '-' OR BUFFER(0) = '\') THEN DO;
237   9             TTHRESH = DOUBLE(BUFFER(0));
238   9             TTHRESH = SHL(TTHRESH,8);
239   9             BUFFER(0) = ' ';
240   9             END;
241   8             ELSE DO;
242   9             TTHRESH = 02B00H;
243   9             END;
244   8             CALL ASC$WRD(@BUFFER,@IGRAD);
245   8             IF (IGRAD > 0 AND IGRAD < 64) THEN DO;
247   9             IGRAD = IGRAD OR TTHRESH;
248   9             LABEL_OFFSETS(PROD_PTR).PT1_THRESH = IGRAD;
249   9             END;
250   8             ELSE BUFFER(0) = 'M';
251   8             END;
252   7             END;
253   6             ELSE BUFFER(0) = 'M';
254   6             END;

                /*  STORE OFFSETS IN TABLE  */
                /*  CALCULATE STARTING POINT ON IMAGE PLANE  */
255   5             IF IABS(LABEL_OFFSETS(PROD_PTR).PT5_COUNT) > 1 THEN DO; /* VERTICAL */

257   6             IF (LABEL_OFFSETS(PROD_PTR).PT1_COUNT > 0) THEN
258   6             LABEL_EDGE(0).HOZ = CURS_LOC(1 + CTABLE_OFF) - TEMP_H;
259   6             ELSE
                    LABEL_EDGE(0).HOZ = CURS_LOC(1 + CTABLE_OFF) + TEMP_H;

260   6             IF LABEL_OFFSETS(PROD_PTR).PT5_COUNT = 2 THEN
261   6             LABEL_EDGE(0).VERT = CURS_LOC(0 + CTABLE_OFF) - TEMP_V;
262   6             ELSE
                    LABEL_EDGE(0).VERT = CURS_LOC(0 + CTABLE_OFF) + TEMP_V;
263   6             END;

264   5             ELSE DO;  /* HORIZONTAL */
```

```
265   6        IF (LABEL_OFFSETS(PROD_PTR).PT3_COUNT > 0) THEN
266   6        LABEL_EDGE(0).VERT = CURS_LOC(0 + CTABLE_OFF) - TEMP_V;
267   6        ELSE
               LABEL_EDGE(0).VERT = CURS_LOC(0 + CTABLE_OFF) + TEMP_V;

268   6        IF LABEL_OFFSETS(PROD_PTR).PT5_COUNT = 1 THEN
269   6        LABEL_EDGE(0).HOZ = CURS_LOC(1 + CTABLE_OFF) - TEMP_H;
270   6        ELSE
               LABEL_EDGE(0).HOZ = CURS_LOC(1 + CTABLE_OFF) + TEMP_H;
271   6        END;

272   5        LABEL_OFFSETS(PROD_PTR).PT1_HOZ_ST =
                   INT(WORK_TABLE(LABEL_FLAG).PACKAGE_CENTER) - INT(LABEL_EDGE(0).HOZ);
273   5        LABEL_OFFSETS(PROD_PTR).PT1_VERT_ST =
                   INT(WORK_TABLE(LABEL_FLAG).PACKAGE_ELEV) - INT(LABEL_EDGE(0).VERT);

          /*   LOCATE POINT 2 STARTING LOCATIONS  */

274   5        CALL WRITE(@PT2_MESS_2,LENGTH(PT2_MESS_2));
275   5        CALL WRITE(@HIT_MESS,LENGTH(HIT_MESS));

          /*   SET UP CURSOR TABLE FOR MOVE  */

276   5        CURS_LOC(2 + CTABLE_OFF) = CURS_LOC(0 + CTABLE_OFF);
277   5        CURS_LOC(3 + CTABLE_OFF) = CURS_LOC(1 + CTABLE_OFF);
278   5        CFUNC = IMAGE OR CUR2 OR ENAX OR ENAY OR MOVC;

279   5        CALL CURSOR_ROUTINE(@CURS_LOC,CFUNC);

280   5   CALL TIMER(15000);
          /*   GET SIZE FOR THIS AREA  */
281   5        CALL WRITE(@MESS_1,LENGTH(MESS_1));
282   5        NOBYTES = READ(@BUFFER,5);
283   5        CALL ASC$WRD(@BUFFER,@TEMP_H);
284   5        CALL WRITE(@MESS_2,LENGTH(MESS_2));
285   5        NOBYTES = READ(@BUFFER,5);
286   5        CALL ASC$WRD(@BUFFER,@TEMP_V);


          /*   STORE DIMENSIONS  */
287   5        LABEL_OFFSETS(PROD_PTR).PT2_COUNT = INT(2 * TEMP_H);
288   5        LABEL_OFFSETS(PROD_PTR).PT4_COUNT = INT(2 * TEMP_V);
          /*   GET SEARCH DIRECTION FOR POINT 2  */
289   5        BUFFER(0) = ' ';

290   5        DO WHILE (BUFFER(0) <> 'H' AND BUFFER(0) <> 'V');
291   6        CALL WRITE(@MESS_3,LENGTH(MESS_3));
292   6        NOBYTES = READ(@BUFFER,5);
293   6        END;

294   5        IF (BUFFER(0) = 'H') THEN DO;
296   6            BUFFER(0) = ' ';
297   6            DO WHILE (BUFFER(0) <> 'R' AND BUFFER(0) <> 'L');
298   7            CALL WRITE(@MESS_4,LENGTH(MESS_4));
299   7            NOBYTES = READ(@BUFFER,5);
300   7            END;
301   6            IF (BUFFER(0) = 'L') THEN LABEL_OFFSETS(PROD_PTR).PT6_COUNT = 1;
303   6            ELSE LABEL_OFFSETS(PROD_PTR).PT6_COUNT = (-1);
304   6            BUFFER(0) = ' ';
305   6            DO WHILE (BUFFER(0) <> 'T' AND BUFFER(0) <> 'B');
306   7            CALL WRITE(@MESS_5,LENGTH(MESS_5));
307   7            NOBYTES = READ(@BUFFER,5);
308   7            END;
309   6            IF (BUFFER(0) = 'B') THEN LABEL_OFFSETS(PROD_PTR).PT4_COUNT =
310   6                                  -(LABEL_OFFSETS(PROD_PTR).PT4_COUNT);
311   6        END;
312   5        ELSE DO;
313   6            BUFFER(0) = ' ';
314   6            DO WHILE (BUFFER(0) <> 'T' AND BUFFER(0) <> 'B');
315   7            CALL WRITE(@MESS_5,LENGTH(MESS_5));
316   7            NOBYTES = READ(@BUFFER,5);
317   7            END;
318   6            IF (BUFFER(0) = 'T') THEN LABEL_OFFSETS(PROD_PTR).PT6_COUNT = 2;
320   6            ELSE LABEL_OFFSETS(PROD_PTR).PT6_COUNT = (-2);
321   6            BUFFER(0) = ' ';
322   6            DO WHILE (BUFFER(0) <> 'L' AND BUFFER(0) <> 'R');
323   7            CALL WRITE(@MESS_4,LENGTH(MESS_4));
324   7            NOBYTES = READ(@BUFFER,5);
325   7            END;
326   6            IF (BUFFER(0) = 'R') THEN LABEL_OFFSETS(PROD_PTR).PT2_COUNT =
327   6                                  -(LABEL_OFFSETS(PROD_PTR).PT2_COUNT);
328   6        END;


          /*   GET EDGE GRADIENT FOR THIS LOCATION  */
329   5        BUFFER(0) = 'M';
330   5        DO WHILE BUFFER(0) = 'M';
331   6        CRLF;
```

```
332  6      CALL WRITE(@('ENTER GRADIENT THRESHOLD FOR THIS EDGE'),38);
333  6      CALL WRITE(@(CR,LF,'(Q - quit, M - measure) - '),28);
334  6      NOBYTES = READ(@BUFFER,5);
335  6      IF (BUFFER(0) <> CR) THEN DO;
337  7      IF BUFFER(0) = 'M' THEN
338  7      DO;

     /*  TRANSFER CURSOR COORDINATES TO CURS_LOC_2  */

     /*  DETERMINE DIRECTION OF SEARCH  */
339  8      IF IABS(LABEL_OFFSETS(PROD_PTR).PT6_COUNT) > 1 THEN DO; /* VERTICAL */

341  9      CURS_LOC_2(3 + CTABLE_OFF) = CURS_LOC(3 + CTABLE_OFF);
342  9      CURS_LOC_2(1 + CTABLE_OFF) = CURS_LOC(3 + CTABLE_OFF);
343  9      CURS_LOC_2(0 + CTABLE_OFF) = CURS_LOC(2 + CTABLE_OFF) - (2 * TEMP_V);
344  9      CURS_LOC_2(2 + CTABLE_OFF) = CURS_LOC(2 + CTABLE_OFF) + (2 * TEMP_V);
345  9      END;
346  8      ELSE DO;  /* HORIZONTAL */
347  9      CURS_LOC_2(0 + CTABLE_OFF) = CURS_LOC(2 + CTABLE_OFF);
348  9      CURS_LOC_2(2 + CTABLE_OFF) = CURS_LOC(2 + CTABLE_OFF);
349  9      CURS_LOC_2(1 + CTABLE_OFF) = CURS_LOC(3 + CTABLE_OFF) - (2 * TEMP_H);
350  9      CURS_LOC_2(3 + CTABLE_OFF) = CURS_LOC(3 + CTABLE_OFF) + (2 * TEMP_H);
351  9      END;

     /*  ERASE CURSORS FROM SCREEN  */
352  8      CFUNC = IMAGF OR DISC;
353  8      CALL CURSOR_ROUTINE(@CURS_LOC,CFUNC);

     /*  ENABLE NEW CURSOR DISPLAY  */
354  8      CFUNC = IMAGF OR RESTC;
355  8      CALL CURSOR_ROUTINE(@CURS_LOC_2,CFUNC);
356  8      J = DOUBLE(IMAGF);
357  8      SIZE = 1;
358  8      CALL GRAD_PROFILE(@CURS_LOC_2,@J,@SIZE);
359  8      CALL WRITE(@(CR,LF,'dark to light is +, light to dark is -'),40);
360  8      CALL WRITE(@(CR,LF,'+ or - is \'),13);
361  8      CALL WRITE(@(CR,LF,'READY TO PROCEDE ? Y/N - '),27);
362  8      NOBYTES = READ(@BUFFER,5);
363  8      BUFFER(0) = 'M';
364  8      IF LABEL_FLAG = 0 THEN CALL TRANS_IMAGE(1);
366  8      ELSE CALL TRANS_IMAGE(0);

     /*  RESTORE ORIGINAL CURSORS  */
367  8      CALL CURSOR_ROUTINE(@CURS_LOC,CFUNC);
368  8      END;

369  7      ELSE DO;
370  8      IF (BUFFER(0) = 'Q')THEN RETURN;
372  8      IF (BUFFER(0) = '-' OR BUFFER(0) = '\') THEN DO;
374  9      TTHRESH = DOUBLE(BUFFER(0));
375  9      TTHRESH = SHL(TTHRESH,8);
376  9      BUFFER(0) = ' ';
377  9      END;
378  8      ELSE DO;
379  9      TTHRESH = 02B00H;
380  9      END;
381  8      CALL ASC$WRD(@BUFFER,@IGRAD);
382  8      IF (IGRAD > 0 AND IGRAD < 64) THEN DO;
384  9      IGRAD = IGRAD OR TTHRESH;
385  9      LABEL_OFFSETS(PROD_PTR).PT2_THRESH = IGRAD;
386  9      END;
387  8      ELSE BUFFER(0) = 'M';
388  8      END;
389  7      END;
390  6      ELSE BUFFER(0) = 'M';
391. 6      END;

     /*  STORE OFFSETS IN TABLE  */
     /*  CALCULATE STARTING POINT ON IMAGE PLANE  */
392  5      IF IABS(LABEL_OFFSETS(PROD_PTR).PT6_COUNT) > 1 THEN DO; /* VERTICAL */

394  6      IF (LABEL_OFFSETS(PROD_PTR).PT2_COUNT > 0) THEN
395  6      LABEL_EDGE(1).HOZ = CURS_LOC(3 + CTABLE_OFF) - TEMP_H;
396  6      ELSE
            LABEL_EDGE(1).HOZ = CURS_LOC(3 + CTABLE_OFF) + TEMP_H;

397  6      IF LABEL_OFFSETS(PROD_PTR).PT6_COUNT = 2 THEN
398  6      LABEL_EDGE(1).VERT = CURS_LOC(2 + CTABLE_OFF) - TEMP_V;
399  6      ELSE
            LABEL_EDGE(1).VERT = CURS_LOC(2 + CTABLE_OFF) + TEMP_V;
400  6      END;

401  5      ELSE DO;

402  6      IF (LABEL_OFFSETS(PROD_PTR).PT4_COUNT > 0) THEN
403  6      LABEL_EDGE(1).VERT = CURS_LOC(2 + CTABLE_OFF) - TEMP_V;
404  6      ELSE
            LABEL_EDGE(1).VERT = CURS_LOC(2 + CTABLE_OFF) + TEMP_V;
```

```
405   6          IF LABEL_OFFSETS(PROD_PTR).PT6_COUNT = 1 THEN
406   6          LABEL_EDGE(1).HOZ = CURS_LOC(3 + CTABLE_OFF) - TEMP_H;
407   6          ELSE
                 LABEL_EDGE(1).HOZ = CURS_LOC(3 + CTABLE_OFF) + TEMP_H;
408   6          END;

409   5          LABEL_OFFSETS(PROD_PTR).PT2_HOZ_ST =
                     INT(WORK_TABLE(LABEL_FLAG).PACKAGE_CENTER) - INT(LABEL_EDGE(1).HOZ);
410   5          LABEL_OFFSETS(PROD_PTR).PT2_VERT_ST =
                     INT(WORK_TABLE(LABEL_FLAG).PACKAGE_ELEV) - INT(LABEL_EDGE(1).VERT);

             /*  CALCULATE SKEW  */

411   5          LABEL_OFFSETS(PROD_PTR).LABEL_SKEW = (INT(CURS_LOC(2 + CTABLE_OFF)) -
                                                      INT(CURS_LOC(0 + CTABLE_OFF)));

             /*  CALCULATE ELEVATION  */

412   5          CENTER1 = ((CURS_LOC(2 + CTABLE_OFF) + CURS_LOC(0 + CTABLE_OFF)) / 2);
413   5          LABEL_OFFSETS(PROD_PTR).LABEL_ELEV = (INT(WORK_TABLE(LABEL_FLAG).PACKAGE_ELEV) -
                     INT(CENTER1));

             /*  CALCULATE WIDTH  */

414   5          LABEL_OFFSETS(PROD_PTR).LABEL_WIDTH = CURS_LOC(3 + CTABLE_OFF) -
                                                      CURS_LOC(1 + CTABLE_OFF);

             /*  CALCULATE CENTER  */

415   5          CENTER1 = (CURS_LOC(3 + CTABLE_OFF) + CURS_LOC(1 + CTABLE_OFF)) / 2;
416   5          LABEL_OFFSETS(PROD_PTR).LABEL_CENTER = INT(WORK_TABLE(LABEL_FLAG).
                         PACKAGE_CENTER) - INT(CENTER1);
             /*  RESTORE IMAGE  */
417   5          IF LABEL_FLAG = 0 THEN CALL TRANS_IMAGE(1);
419   5              ELSE CALL TRANS_IMAGE(0);
420   5          CALL LOC_LABEL2;
421   5      BUFFER(0) = ' ';
422   5      CALL WRITE(@(CR,LF,'IS LABEL LOCATED OK ? Y/N - '),30);
423   5      NOBYTES = READ(@BUFFER,5);
             /*  RESTORE IMAGE  */
424   5          IF LABEL_FLAG = 0 THEN CALL TRANS_IMAGE(1);
426   5              ELSE CALL TRANS_IMAGE(0);
427   5      END;
428   4      END;
429   3      END;
430   2      END DEF_LABEL_2;
431   1      END DEF_LABL_MODULE;


MODULE INFORMATION:

     CODE AREA SIZE     = 0B49H   2889D
     CONSTANT AREA SIZE = 0298H    664D
     VARIABLE AREA SIZE = 000EH     14D
     MAXIMUM STACK SIZE = 0010H     16D
     704 LINES READ
     0 PROGRAM WARNINGS
     0 PROGRAM ERRORS

DICTIONARY SUMMARY:

     47KB MEMORY AVAILABLE
     13KB MEMORY USED   (27%)
     0KB DISK SPACE USED

END OF PL/M-86 COMPILATION
```

```
iRMX 86 PL/M-86 V2.3 COMPILATION OF MODULE DEF_FEAT_MODULE
OBJECT MODULE PLACED IN SOURCE/FEATURE.OBJ
COMPILER INVOKED BY:  :LANG:PLM86 SOURCE/FEATURE.PLM OPTIMIZE(3) ROM SET(TARGET=1)


              $INCLUDE(SOURCE/COPYRIGHT)
          =   /*

          =   ************************************************************************
          =   *                                                                      *
          =   *                                                                      *
          =   *                    COPYRIGHT CHESEBROUGH-POND'S INC.                 *
          =   *                                                                      *
          =   *                    (c) 1983, CHESEBROUGH-POND'S INC.                 *
          =   *                                                                      *
          =   *                                                                      *
          =   *                                                                      *
          =   *                                                                      *
          =   *      ALL RIGHTS RESERVED. NO PART OF THIS PROGRAM MAY BE REPRODUCED, *
          =   *      TRANSMITTED, TRANSCRIBED, STORED IN A RETRIEVAL SYSTEM, OR      *
          =   *      TRANSLATED INTO ANY LANGUAGE OR COMPUTER LANGUAGE, IN ANY FORM  *
          =   *      OR BY ANY MEANS, ELECTRONIC, MECHANICAL, MAGNETIC, OPTICAL,     *
          =   *      CHEMICAL, MANUAL OR OTHERWISE, WITHOUT THE EXPRESS WRITTEN PER- *
          =   *      MISSION OF CHESEBROUGH-POND'S INC., 33 BENEDICT PLACE, GREENWICH, *
          =   *      CONNECTICUT.                                                    *
          =   *                                                                      *
          =   *                                                                      *
          =   ************************************************************************


          =   */

              $TITLE(' DEFINE FEATURE MODULE')
  1           DEF_FEAT_MODULE:
              DO;
              $INCLUDE(SOURCE/DECLARE.EXT)
  2     1 =   DECLARE      DCL      LITERALLY    'DECLARE';
  3     1 =   DECLARE      LIT      LITERALLY    'LITERALLY';
              $INCLUDE(SOURCE/XTERMHAND.EXT)
  4     1 =   INIT_USART: PROCEDURE EXTERNAL;
  5     2 =   END INIT_USART;
  6     1 =   WRITE: PROCEDURE(BUFFER_PTR,BLENGTH) EXTERNAL;
  7     2 =           DCL BUFFER_PTR  POINTER;
  8     2 =           DCL BLENGTH WORD;
  9     2 =   END WRITE;
 10     1 =   READ: PROCEDURE(BUFFER_PTR,BLENGTH)WORD EXTERNAL;
 11     2 =           DCL      BUFFER_PTR  POINTER;
 12     2 =           DCL      BLENGTH    WORD;
 13     2 =   END READ;
              $INCLUDE(SOURCE/IWCONV.EXT)
          =   $SAVE
          =   $NOLIST

              /*  VARIABLE DECLARATIONS PUBLIC  */
 35     1     DCL IGRAD              WORD EXTERNAL;
 36     1     DCL PARAM1             INTEGER EXTERNAL;
 37     1     DCL BUFFER (24)        BYTE EXTERNAL;
 38     1     DCL CURS_LOC (24)      WORD EXTERNAL;
 39     1     DCL CURS_LOC_2 (24)    WORD EXTERNAL;
 40     1     DCL NOBYTES            WORD EXTERNAL;
 41     1     DCL PROD_NUM           WORD EXTERNAL;
 42     1     DCL PROD_PTR           WORD EXTERNAL;
 43     1     DCL SIZE               WORD EXTERNAL;
 44     1     DCL CTABLE_OFF         WORD EXTERNAL;
 45     1     DCL VERT_CL            WORD EXTERNAL;
 46     1     DCL HOR_DIST           WORD EXTERNAL;
 47     1     DCL VERT_DIST          WORD EXTERNAL;
 48     1     DCL FEATURE_INDEX      WORD EXTERNAL;
 49     1     DCL LABEL_FLAG         BYTE EXTERNAL;
 50     1     DCL CFUNC              BYTE EXTERNAL;
 51     1     DCL IMAGF              BYTE EXTERNAL;
 52     1     DCL DIR_PTR            BYTE EXTERNAL;

              /* LOCAL VARIABLE DECLARATIONS */
 53     1     DCL (I,J,TTHRESH)      WORD;
 54     1     DCL CENTER1            WORD;
 55     1     DCL CENTER2            WORD;

              /* LITERALL DECLARATIONS  */
 56     1     DCL CAMERA_ON          LIT      '03H';
 57     1     DCL CAMERA_OFF         LIT      '00H';
 58     1     DCL DATA_REG           LIT      '00H';
 59     1     DCL COMMD_REG          LIT      '03H';
 60     1     DCL HOZ_ADD_LO         LIT      '04H';
 61     1     DCL HOZ_ADD_HI         LIT      '05H';
 62     1     DCL VERT_ADD           LIT      '06H';
 63     1     DCL POST_INC_READ      LIT      '01H';
```

```
 64   1    DCL POST_INC_WRITE  LIT      '02H';
 65   1    DCL CLRSCRN         LIT      '1BH,6AH,0CH';
 66   1    DCL SET_CUR         LIT      '1BH,59H';
 67   1    DCL ESC             LIT      '1BH';
 68   1    DCL CRLF            LIT      'CALL WRITE(@(13,10),2)';
 69   1    DCL CR              LIT      '0DH';
 70   1    DCL LF              LIT      '0AH';
 71   1    DCL RESTC           LIT      '00H';
 72   1    DCL DISC            LIT      '03H';
 73   1    DCL MOVC            LIT      '02H';
 74   1    DCL CUR1            LIT      '00H';
 75   1    DCL CUR2            LIT      '04H';
 76   1    DCL CUR3            LIT      '08H';
 77   1    DCL CUR4            LIT      '0CH';
 78   1    DCL HOMC            LIT      '01H';
 79   1    DCL ENAX            LIT      '010H';
 80   1    DCL ENAY            LIT      '020H';
 81   1    DCL F_IMG           LIT      '00H';
 82   1    DCL B_IMG           LIT      '040H';

 83   1    DCL PROD_NAM_TBL (20) STRUCTURE(NAM_BUFFER(20) BYTE) EXTERNAL;

           $INCLUDE(SOURCE/OFFSETS.LIB)
        =  $SAVE
        =  $NOLIST

           /*  EXTERNAL PROCEDURE DECLARATIONS  */

 92   1    CURSOR_ROUTINE: PROCEDURE(CURSOR_TABLE,FUNCT) EXTERNAL;
 93   2        DCL CURSOR_TABLE     POINTER;
 94   2        DCL FUNCT            BYTE;
 95   2    END CURSOR_ROUTINE;

 96   1    GRAD_PROFILE: PROCEDURE(CURSOR_TABLE,IMAGE_PTR,SIZE_PTR) EXTERNAL;
 97   2        DCL CURSOR_TABLE     POINTER;
 98   2        DCL IMAGE_PTR        POINTER;
 99   2        DCL SIZE_PTR         POINTER;
100   2    END GRAD_PROFILE;

101   1    TIMER: PROCEDURE(J) EXTERNAL;
102   2        DCL J                WORD;
103   2    END TIMER;

104   1    TRANS_IMAGE: PROCEDURE(IFLAG) EXTERNAL;
105   2        DCL IFLAG            BYTE;
106   2    END TRANS_IMAGE;

107   1    INIT_CUR: PROCEDURE(TABLE_PTR) EXTERNAL;
108   2        DCL TABLE_PTR        POINTER;
109   2    END INIT_CUR;

110   1    LOC_CLOSURE: PROCEDURE EXTERNAL;
111   2    END LOC_CLOSURE;

112   1    MEASURE_DIST: PROCEDURE WORD EXTERNAL;
113   2    END MEASURE_DIST;

114   1    DEF_DISTANCE: PROCEDURE PUBLIC;

115   2    DO;

116   3    BUFFER(0) = ' ';
117   3    DO WHILE BUFFER(0) <> 'Y';
           /*  DETERMINE ORIENTATION OF THE DISTANCE TO BE MEASURED  */

           /*CLEAR OLD FEATURE DIRECTION FLAG  */
118   4      FEATURE_OFFSETS(PROD_PTR + FEATURE_INDEX).FEATURE_FLAG = (FEATURE_OFFSETS(PROD_PTR
               + FEATURE_INDEX).FEATURE_FLAG
                 AND 0F0H);

119   4      CALL WRITE(@(CLRSCRN,LF,'ENTER DIRECTION OF MEASUREMENT',CR,LF,'H/V - '),41);
120   4      NOBYTES =.READ(@BUFFER,5);
121   4      IF (BUFFER(0) = 'Q') THEN RETURN;
123   4      IF BUFFER(0) = 'H' THEN DIR_PTR = 0FH;
125   4      ELSE DIR_PTR = 00H;
126   4      FEATURE_OFFSETS(PROD_PTR + FEATURE_INDEX).FEATURE_FLAG = (FEATURE_OFFSETS(PROD_PTR
               + FEATURE_INDEX).FEATURE_FLAG
                 OR DIR_PTR);

           /*DETERMINE IMAGE POINTER  */

127   4      IF LABEL_FLAG = 0 THEN IMAGF = F_IMG;
129   4          ELSE IMAGF = B_IMG;
130   4      BUFFER(0) = ' ';
131   4      DO WHILE BUFFER(0) <> 'Y';

           /*CLEAR CURSOR TABLE  */

132   5      CALL INIT_CUR(@CURS_LOC);
```

```
133   5        CALL INIT_CUR(@CURS_LOC_2);
          /*   HOME CURSOR 1  */
134   5        CFUNC = IMAGF OR CUR1 OR HOMC;
135   5        CALL CURSOR_ROUTINE(@CURS_LOC,CFUNC);

          /*   LOCATE POINT 1  */

136   5        CALL WRITE(@(CR,LF,'MOVE CURSOR TO START FOR LOCATING',CR,LF,
               'LEFT(H) OR TOP(V) END OF FEATURE. '),70);
137   5        CALL WRITE(@(CR,LF,LF,'HIT USER1 WHEN READY -'),25);

          /*   SET UP CFUNC  */
138   5        CFUNC = IMAGF OR CUR1 OR ENAX OR ENAY OR MOVC;
139   5        CALL CURSOR_ROUTINE(@CURS_LOC,CFUNC);
140   5        CALL TIMER(15000);

          /*   LOCATE LEFT OR TOP EDGE OF FEATURE  */

141   5        CALL WRITE(@(CR,LF,'MOVE CURSOR TO EDGE. '),22);
142   5        CALL WRITE(@(CR,LF,LF,'HIT USER1 WHEN READY -'),25);

          /*   DETERMINE DIRECTION OF MOTION FOR CURSOR  */

143   5        IF DIR_PTR = OFH THEN CFUNC = IMAGF OR CUR2 OR ENAX OR MOVC;
145   5        ELSE CFUNC = IMAGF OR CUR2 OR ENAY OR MOVC;
146   5        CURS_LOC(2 + CTABLE_OFF) = CURS_LOC(0 + CTABLE_OFF);
147   5        CURS_LOC(3 + CTABLE_OFF) = CURS_LOC(1 + CTABLE_OFF);
148   5        CALL CURSOR_ROUTINE(@CURS_LOC,CFUNC);
149   5        CALL TIMER(15000);

          /*   GET EDGE GRADIENT FOR THIS LOCATION  */
150   5        BUFFER(0) = 'M';
151   5        DO WHILE BUFFER(0) = 'M';
152   6        CRLF;
153   6        CALL WRITE(@('ENTER GRADIENT THRESHOLD FOR THIS EDGE'),38);
154   6        CALL WRITE(@(CR,LF,'(Q - quit, M - measure) - '),28);
155   6        NOBYTES = READ(@BUFFER,5);
156   6        IF (BUFFER(0) <> CR) THEN DO;
158   7        IF BUFFER(0) = 'M' THEN
159   7        DO;

          /*   TRANSFER CURSOR COORDINATES TO CURS_LOC_2  */

160   8        CURS_LOC_2(0 + CTABLE_OFF) = CURS_LOC(0 + CTABLE_OFF);
161   8        CURS_LOC_2(1 + CTABLE_OFF) = CURS_LOC(1 + CTABLE_OFF);
162   8        IF DIR_PTR = OFH THEN
163   8        DO;    /*  HORIZONTAL ORIENTATION  */

          /*   UPDATE CURS_LOC_2 TABLE  */
164   9            CURS_LOC_2(2 + CTABLE_OFF) = CURS_LOC(0 + CTABLE_OFF);
165   9            IF CURS_LOC(3 + CTABLE_OFF) > CURS_LOC(1 + CTABLE_OFF)
166   9            THEN DO;
          /*   CALCULATE HORIZONTAL DISTANCE FOR GRAD_PROF  */
167  10            HOR_DIST = CURS_LOC(3 + CTABLE_OFF) - CURS_LOC(1 + CTABLE_OFF);
168  10            CURS_LOC_2(3 + CTABLE_OFF) = CURS_LOC(3 + CTABLE_OFF) + HOR_DIST;
169  10            END;
170   9            ELSE DO;
171  10            HOR_DIST = CURS_LOC(1 + CTABLE_OFF) - CURS_LOC(3 + CTABLE_OFF);
172  10            CURS_LOC_2(3 + CTABLE_OFF) = CURS_LOC(3 + CTABLE_OFF) - HOR_DIST;
173  10            END;
174   9        END;
175   8        ELSE DO;  /*  VERTICAL ORIENTATION  */
          /*   UPDATE CURS_LOC_2  */
176   9            CURS_LOC_2(0 + CTABLE_OFF) = CURS_LOC(0 + CTABLE_OFF);
177   9            CURS_LOC_2(1 + CTABLE_OFF) = CURS_LOC(1 + CTABLE_OFF);
178   9            CURS_LOC_2(3 + CTABLE_OFF) = CURS_LOC(1 + CTABLE_OFF);
          /*   CALCULATE VERTICAL DISTANCE FOR GRAD_PROF  */
179   9            IF CURS_LOC(2 + CTABLE_OFF) > CURS_LOC(0 + CTABLE_OFF)
180   9            THEN DO;
181  10            VERT_DIST = CURS_LOC(2 + CTABLE_OFF) - CURS_LOC(0 + CTABLE_OFF);
182  10            CURS_LOC_2(3 + CTABLE_OFF) = CURS_LOC(2 + CTABLE_OFF) + VERT_DIST;
183  10            END;
184   9            ELSE DO;
185  10            VERT_DIST = CURS_LOC(0 + CTABLE_OFF) - CURS_LOC(2 + CTABLE_OFF);
186  10            CURS_LOC_2(2 + CTABLE_OFF) = CURS_LOC(2 + CTABLE_OFF) - VERT_DIST;
187  10            END;
188   9        END;

          /*   ERASE CURSORS FROM SCREEN  */
189   8        CFUNC = IMAGF OR DISC;
190   8        CALL CURSOR_ROUTINE(@CURS_LOC,CFUNC);

          /*   ENABLE NEW CURSOR DISPLAY  */
191   8        CFUNC = IMAGF OR RESTC;
192   8        CALL CURSOR_ROUTINE(@CURS_LOC_2,CFUNC);
193   8        J = DOUBLE(IMAGF);
194   8        SIZE = 1;
```

```
        CALL GRAD_PROFILE(@CURS_LOC_2,@J,@SIZE);
        CALL WRITE(@(CR,LF,'dark to light is +, light to dark is -'),40);
        CALL WRITE(@(CR,LF,'+ or - is \'),13);
        CALL WRITE(@(CR,LF,'READY TO PROCEDE ? Y/N - '),27);
        NOBYTES = READ(@BUFFER,5);
        BUFFER(0) = 'M';
        IF LABEL_FLAG = 0 THEN CALL TRANS_IMAGE(1);
        ELSE CALL TRANS_IMAGE(0);

    /*  RESTORE ORIGINAL CURSORS  */
        CALL CURSOR_ROUTINE(@CURS_LOC,CFUNC);
        END;

        ELSE DO;
        IF (BUFFER(0) = 'Q') THEN RETURN;
        IF (BUFFER(0) = '-' OR BUFFER(0) = '\') THEN DO;
        TTHRESH = DOUBLE(BUFFER(0));
        TTHRESH = SHL(TTHRESH,8);
        BUFFER(0) = ' ';
        END;
        ELSE DO;
        TTHRESH = 02B00H;
        END;
        CALL ASC$WRD(@BUFFER,@IGRAD);
        IF (IGRAD > 0 AND IGRAD < 64) THEN DO;
        IGRAD = IGRAD OR TTHRESH;
        FEATURE_OFFSETS(PROD_PTR + FEATURE_INDEX).PT1_THRESH = IGRAD;
        END;
        ELSE BUFFER(0) = 'M';
        END;
        END;
        ELSE BUFFER(0) = 'M';
        END;

    /*  STORE OFFSETS IN TABLE  */

    /*  CALCULATE COUNTER FOR LOCATE FEATURE  */
        IF DIR_PTR = OFH THEN FEATURE_OFFSETS(PROD_PTR + FEATURE_INDEX).PT1_COUNT =
            4 * (INT(CURS_LOC(3 + CTABLE_OFF)) - INT(CURS_LOC(1 + CTABLE_OFF)));
            ELSE FEATURE_OFFSETS(PROD_PTR + FEATURE_INDEX).PT1_COUNT =
            4 * (INT(CURS_LOC(2 + CTABLE_OFF)) - INT(CURS_LOC(0 + CTABLE_OFF)));
        FEATURE_OFFSETS(PROD_PTR + FEATURE_INDEX).PT1_HOZ_ST =
            INT(WORK_TABLE(LABEL_FLAG).LABEL_CENTER) - INT(CURS_LOC(1 + CTABLE_OFF));
        FEATURE_OFFSETS(PROD_PTR + FEATURE_INDEX).PT1_VERT_ST =
            INT(WORK_TABLE(LABEL_FLAG).LABEL_ELEV) - INT(CURS_LOC(0 + CTABLE_OFF));


    /*  LOCATE OPPOSITE EDGE OF FEATURE  */

    /*  SET UP NEXT CURSOR MOVE  */
    CURS_LOC(4 + CTABLE_OFF) = CURS_LOC(2 + CTABLE_OFF);
    CURS_LOC(5 + CTABLE_OFF) = CURS_LOC(3 + CTABLE_OFF);
    CALL WRITE(@(CR,LF,'MOVE CURSOR TO OPPOSITE EDGE.'),31);
    CALL WRITE(@(CR,LF,LF,'HIT USER1 WHEN READY -'),25);

    /*  CHECK FOR DIRECTION OF MOVE  */
    IF DIR_PTR = OFH THEN CFUNC = IMAGF OR CUR3 OR ENAX OR MOVC;
    ELSE CFUNC = IMAGF OR CUR3 OR ENAY OR MOVC;
    CALL CURSOR_ROUTINE(@CURS_LOC,CFUNC);
    CALL TIMER(15000);

    /*  GET GRADIENT INFORMATION FOR THIS POINT  */

        BUFFER(0) = 'M';
        DO WHILE BUFFER(0) = 'M';
        CRLF;
        CALL WRITE(@('ENTER GRADIENT THRESHOLD FOR THIS EDGE'),38);
        CALL WRITE(@(CR,LF,'(Q - quit, M - measure) ? '),28);
        NOBYTES = READ(@BUFFER,5);
        IF (BUFFER(0) <> CR) THEN DO;
        IF BUFFER(0) = 'M' THEN
        DO;


        IF DIR_PTR = OFH THEN
        DO;    /*  HORIZONTAL ORIENTATION  */
    /*  UPDATE CURS_LOC_2 TABLE  */
            CURS_LOC_2(0 + CTABLE_OFF) = CURS_LOC(4 + CTABLE_OFF);
            CURS_LOC_2(2 + CTABLE_OFF) = CURS_LOC(4 + CTABLE_OFF);
            CURS_LOC_2(3 + CTABLE_OFF) = CURS_LOC(5 + CTABLE_OFF) + HOR_DIST;
            CURS_LOC_2(1 + CTABLE_OFF) = CURS_LOC(5 + CTABLE_OFF) - HOR_DIST;
        END;
        ELSE DO;  /*  VERTICAL ORIENTATION  */
            CURS_LOC_2(1 + CTABLE_OFF) = CURS_LOC(5 + CTABLE_OFF);
            CURS_LOC_2(3 + CTABLE_OFF) = CURS_LOC(5 + CTABLE_OFF);
            CURS_LOC_2(2 + CTABLE_OFF) = CURS_LOC(4 + CTABLE_OFF) + VERT_DIST;
            CURS_LOC_2(0 + CTABLE_OFF) = CURS_LOC(4 + CTABLE_OFF) - VERT_DIST;
        END;
```

```
/*  ERASE CURSORS FROM SCREEN  */
    CFUNC = IMAGF OR DISC;
    CALL CURSOR_ROUTINE(@CURS_LOC,CFUNC);

/*  ENABLE NEW CURSOR DISPLAY  */
    CFUNC = IMAGF OR RESTC;
    CALL CURSOR_ROUTINE(@CURS_LOC_2,CFUNC);
    J = DOUBLE(IMAGF);
    SIZE = 1;
    CALL GRAD_PROFILE(@CURS_LOC_2,@J,@SIZE);
    CALL WRITE(@(CR,LF,'dark to light is +, light to dark is -'),40);
    CALL WRITE(@(CR,LF,'+ or - is \'),13);
    CALL WRITE(@(CR,LF,'READY TO PROCEDE ? Y/N - '),27);
    NOBYTES = READ(@BUFFER,5);
    BUFFER(0) = 'M';
    IF LABEL_FLAG = 0 THEN CALL TRANS_IMAGE(1);
    ELSE CALL TRANS_IMAGE(0);

/*  RESTORE ORIGINAL CURSORS  */
    CALL CURSOR_ROUTINE(@CURS_LOC,CFUNC);
    END;

    ELSE DO;
    IF (BUFFER(0) = 'Q') THEN RETURN;
    IF (BUFFER(0) = '-' OR BUFFER(0) = '\') THEN DO;
    TTHRESH = DOUBLE(BUFFER(0));
    TTHRESH = SHL(TTHRESH,8);
    BUFFER(0) = ' ';
    END;
    ELSE DO;
    TTHRESH = 02B00H;
    END;
    CALL ASC$WRD(@BUFFER,@IGRAD);
    IF (IGRAD > 0 OR IGRAD < 64) THEN DO;
    IGRAD = IGRAD OR TTHRESH;
    FEATURE_OFFSETS(PROD_PTR + FEATURE_INDEX).PT2_THRESH = IGRAD;
    END;
    ELSE BUFFER(0) = 'M';
    END;
    END;
    ELSE BUFFER(0) = 'M';
    END;
/*  LOCATE POINT 2 STARTING LOCATIONS  */
    CALL WRITE(@(CR,LF,'MOVE CURSOR TO START POINT FOR LOCATING',
                CR,LF,'THIS EDGE.'),53);
    CALL WRITE(@(CR,LF,LF,'HIT USER 1 WHEN READY -'),26);

/*  SET UP CURSOR TABLE FOR MOVE  */

    CURS_LOC(6 + CTABLE_OFF) = CURS_LOC(4 + CTABLE_OFF);
    CURS_LOC(7 + CTABLE_OFF) = CURS_LOC(5 + CTABLE_OFF);

    IF DIR_PTR = 0FH THEN CFUNC = IMAGF OR CUR4 OR ENAX OR MOVC;
        ELSE CFUNC = IMAGF OR CUR4 OR ENAY OR MOVC;
    CALL CURSOR_ROUTINE(@CURS_LOC,CFUNC);

/*  CALCULATE AND STORE OFFSET TERMS  */

    FEATURE_OFFSETS(PROD_PTR + FEATURE_INDEX).PT2_HOZ_ST =
        INT(WORK_TABLE(LABEL_FLAG).LABEL_CENTER) - INT(CURS_LOC(7 + CTABLE_OFF));
    FEATURE_OFFSETS(PROD_PTR + FEATURE_INDEX).PT2_VERT_ST =
        INT(WORK_TABLE(LABEL_FLAG).LABEL_ELEV) - INT(CURS_LOC(6 + CTABLE_OFF));
    IF DIR_PTR = 0FH THEN
    FEATURE_OFFSETS(PROD_PTR + FEATURE_INDEX).PT2_COUNT =( 4 * ( INT(CURS_LOC(7 +
            CTABLE_OFF)) - INT(CURS_LOC(5 + CTABLE_OFF))));
    ELSE
    FEATURE_OFFSETS(PROD_PTR + FEATURE_INDEX).PT2_COUNT = (4 * (INT(CURS_LOC(6 +
            CTABLE_OFF)) -INT(CURS_LOC(4 + CTABLE_OFF))));

CALL TIMER(15000);
    IF DIR_PTR = 0FH THEN
    DO;

/*  CALCULATE HORIZONTAL DISTANCE  */
    FEATURE_OFFSETS(PROD_PTR + FEATURE_INDEX).FEATURE = CURS_LOC(5 + CTABLE_OFF) -
                                                        CURS_LOC(3 + CTABLE_OFF);
    END;
    ELSE
    DO;

/*  CALCULATE VERTICAL DISTANCE  */
    FEATURE_OFFSETS(PROD_PTR + FEATURE_INDEX).FEATURE = CURS_LOC(4 + CTABLE_OFF) -
                                                        CURS_LOC(2 + CTABLE_OFF);
    END;

    CALL WRITE(@(CR,LF,'ARE THESE POINTS OK? Y/N -'),28);
    NOBYTES = READ(@BUFFER,5);
```

```
                /*  RESTORE IMAGE '*/
 329    5           IF LABEL_FLAG = 0 THEN CALL TRANS_IMAGE(1);
 331    5               ELSE CALL TRANS_IMAGE(0);
 332    5       END;
                /*  TEST DISTANCE MEASURE ALGORITHM  */
 333    4           J = MEASURE_DIST;
 334    4           CALL WRD$ASC(@BUFFER,@J);
 335    4           CALL WRITE(@(CR,LF,'DISTANCE MEASURED IS '),23);
 336    4           CALL WRITE(@BUFFER,8);
 337    4           CRLF;
 338    4           CALL WRITE(@(CR,LF,'IS THE FEATURE LOCATED OK ? Y/N - '),36);
 339    4           NOBYTES = READ(@BUFFER,5);
                /*  RESTORE IMAGE  */
 340    4           IF LABEL_FLAG = 0 THEN CALL TRANS_IMAGE(1);
 342    4               ELSE CALL TRANS_IMAGE(0);

 343    4       END;
 344    3       END;
 345    2       END DEF_DISTANCE;
 346    1       END DEF_FEAT_MODULE;


MODULE INFORMATION:

     CODE AREA SIZE     = 08B5H   2229D
     CONSTANT AREA SIZE = 02C0H    704D
     VARIABLE AREA SIZE = 000AH     10D
     MAXIMUM STACK SIZE = 0010H     16D
     604 LINES READ
     0 PROGRAM WARNINGS
     0 PROGRAM ERRORS

DICTIONARY SUMMARY:

     47KB MEMORY AVAILABLE
     12KB MEMORY USED   (25%)
     0KB DISK SPACE USED

END OF PL/M-86 COMPILATION

iRMX 86 PL/M-86 V2.3 COMPILATION OF MODULE EVAL_DATA_MODULE
OBJECT MODULE PLACED IN SOURCE/EVAL.OBJ
COMPILER INVOKED BY:  :LANG:PLM86 SOURCE/EVAL.PLM OPTIMIZE(3) ROM SET(TARGET=1)


                $INCLUDE(SOURCE/COPYRIGHT)
           =    /*

           =    ***********************************************************************
           =    *                                                                     *
           =    *                                                                     *
           =    *                    COPYRIGHT CHESEBROUGH-POND'S INC.                *
           =    *                                                                     *
           =    *                    (c) 1983, CHESEBROUGH-POND'S INC.                *
           =    *                                                                     *
           =    *                                                                     *
           =    *                                                                     *
           =    *                                                                     *
           =    *      ALL RIGHTS RESERVED. NO PART OF THIS PROGRAM MAY BE REPRODUCED, *
           =    *      TRANSMITTED, TRANSCRIBED, STORED IN A RETRIEVAL SYSTEM, OR     *
           =    *      TRANSLATED INTO ANY LANGUAGE OR COMPUTER LANGUAGE, IN ANY FORM *
           =    *      OR BY ANY MEANS, ELECTRONIC, MECHANICAL, MAGNETIC, OPTICAL,    *
           =    *      CHEMICAL, MANUAL OR OTHERWISE, WITHOUT THE EXPRESS WRITTEN PER- *
           =    *      MISSION OF CHESEBROUGH-POND'S INC., 33 BENEDICT PLACE, GREENWICH, *
           =    *      CONNECTICUT.                                                   *
           =    *                                                                     *
           =    *                                                                     *
           =    ***********************************************************************

           =    */

                $TITLE(' EVALUATE DATA MODULE')
   1            EVAL_DATA_MODULE:
                DO;
                $INCLUDE(SOURCE/DECLARE.EXT)
   2    1  =    DECLARE     DCL      LITERALLY    'DECLARE';
   3    1  =    DECLARE     LIT      LITERALLY    'LITERALLY';
                $INCLUDE(SOURCE/XTERMHAND.EXT)
   4    1  =    INIT_USART: PROCEDURE EXTERNAL;
   5    2  =    END INIT_USART;
   6    1  =    WRITE: PROCEDURE(BUFFER_PTR,BLENGTH) EXTERNAL;
   7    2  =            DCL BUFFER_PTR  POINTER;
   8    2  =            DCL BLENGTH WORD;
   9    2  =    END WRITE;
  10    1  =    READ: PROCEDURE(BUFFER_PTR,BLENGTH)WORD EXTERNAL;
```

```
11   2  =          DCL      BUFFER_PTR  POINTER;
12   2  =          DCL      BLENGTH   WORD;
13   2  =   END READ;
            $INCLUDE(SOURCE/IWCONV.EXT)
        =   $SAVE
        =   $NOLIST

            /*  VARIABLE DECLARATIONS PUBLIC  */
35   1      DCL IGRAD             WORD EXTERNAL;
36   1      DCL PARAM1            INTEGER EXTERNAL;
37   1      DCL BUFFER (24)       BYTE EXTERNAL;
38   1      DCL ER_CODE_TBL (20) WORD EXTERNAL;
39   1      DCL CURS_LOC (24)    WORD EXTERNAL;
40   1      DCL CURS_LOC_2 (24) WORD EXTERNAL;
41   1      DCL NOBYTES           WORD EXTERNAL;
42   1      DCL PROD_NUM          WORD EXTERNAL;
43   1      DCL PROD_PTR          WORD EXTERNAL;
44   1      DCL SIZE              WORD EXTERNAL;
45   1      DCL CTABLE_OFF        WORD EXTERNAL;
46   1      DCL VERT_CL           WORD EXTERNAL;
47   1      DCL HOR_DIST          WORD EXTERNAL;
48   1      DCL VERT_DIST         WORD EXTERNAL;
49   1      DCL EJ_BUFFER (42)   BYTE EXTERNAL;
50   1      DCL ER_FLAG           BYTE EXTERNAL;
51   1      DCL LABEL_FLAG        BYTE EXTERNAL;
52   1      DCL NO_B_FLAG         BYTE EXTERNAL;
53   1      DCL PRINT_ENABLE      BYTE EXTERNAL;
54   1      DCL CFUNC             BYTE EXTERNAL;
55   1      DCL IMAGF             BYTE EXTERNAL;
56   1      DCL DIR_PTR           BYTE EXTERNAL;
57   1      DCL PORT_A            BYTE EXTERNAL;
58   1      DCL PORT_B            BYTE EXTERNAL;
59   1      DCL PORT_C            BYTE EXTERNAL;
60   1      DCL PORT$A$REG        BYTE EXTERNAL;

            /* LOCAL VARIABLE DECLARATIONS */
61   1      DCL BUFFER_FLAG       BYTE;
62   1      DCL (I,J,TTHRESH)     WORD;
63   1      DCL CENTER1           WORD;
64   1      DCL CENTER2           WORD;
65   1      DCL DELTA             INTEGER;
66   1      DCL ER_CODE           BYTE;
67   1      DCL POSE              INTEGER;
68   1      DCL LAB_INDEX         WORD;
            /* LITERALL DECLARATIONS  */
69   1      DCL CAMERA_ON         LIT      '03H';
70   1      DCL CAMERA_OFF        LIT      '00H';
71   1      DCL DATA_REG          LIT      '00H';
72   1      DCL COMMD_REG         LIT      '03H';
73   1      DCL HOZ_ADD_LO        LIT      '04H';
74   1      DCL HOZ_ADD_HI        LIT      '05H';
75   1      DCL VERT_ADD          LIT      '06H';
76   1      DCL POST_INC_READ     LIT      '01H';
77   1      DCL POST_INC_WRITE    LIT      '02H';
78   1      DCL CLRSCRN           LIT      '1BH,6AH,0CH';
79   1      DCL SET_CUR           LIT      '1BH,59H';
80   1      DCL ESC               LIT      '1BH';
81   1      DCL CRLF              LIT      'CALL WRITE(@(13,10),2)';
82   1      DCL CR                LIT      '0DH';
83   1      DCL LF                LIT      '0AH';
84   1      DCL RESTC             LIT      '00H';
85   1      DCL DISC              LIT      '03H';
86   1      DCL MOVC              LIT      '02H';
87   1      DCL CUR1              LIT      '00H';
88   1      DCL CUR2              LIT      '04H';
89   1      DCL CUR3              LIT      '08H';
90   1      DCL CUR4              LIT      '0CH';
91   1      DCL HOMC              LIT      '01H';
92   1      DCL ENAX              LIT      '010H';
93   1      DCL ENAY              LIT      '020H';
94   1      DCL F_IMG             LIT      '00H';
95   1      DCL B_IMG             LIT      '040H';
96   1      DCL P_EJECT_ON        LIT      '02H';
97   1      DCL P_EJECT_OFF       LIT      '0FDH';

98   1      DCL PROD_NAM_TBL (20) STRUCTURE(NAM_BUFFER(20) BYTE) EXTERNAL;

            $INCLUDE(SOURCE/OFFSETS.LIB)
        =   $SAVE
        =   $NOLIST

            /*  EXTERNAL PROCEDURE DECLARATIONS  */

107  1      CURSOR_ROUTINE: PROCEDURE(CURSOR_TABLE,FUNCT) EXTERNAL;
108  2          DCL CURSOR_TABLE      POINTER;
109  2          DCL FUNCT             BYTE;
110  2      END CURSOR_ROUTINE;

111  1      GRAD_PROFILE: PROCEDURE(CURSOR_TABLE,IMAGE_PTR,SIZE_PTR) EXTERNAL;
112  2          DCL CURSOR_TABLE      POINTER;
```

```
113   2        DCL IMAGE_PTR         POINTER;
114   2        DCL SIZE_PTR          POINTER;
115   2    END GRAD_PROFILE;

116   1    TIMER: PROCEDURE(J) EXTERNAL;
117   2        DCL J                 WORD;
118   2    END TIMER;

119   1    TRANS_IMAGE: PROCEDURE(IFLAG) EXTERNAL;
120   2        DCL IFLAG             BYTE;
121   2    END TRANS_IMAGE;

122   1    INIT_CUR: PROCEDURE(TABLE_PTR) EXTERNAL;
123   2        DCL TABLE_PTR         POINTER;
124   2    END INIT_CUR;

125   1    LOC_CLOSURE: PROCEDURE EXTERNAL;
126   2    END LOC_CLOSURE;

127   1    EVAL_DATA: PROCEDURE PUBLIC;

128   2    DO;
           /*  CHECK FOR A OR B LABEL AND CLEAR NO_B_FLAG  */
129   3        IF (LABEL_FLAG = 0) THEN NO_B_FLAG = 0;

           /*  TURN PRODUCT EJECT LINE OFF  */
131   3    PORT$A$REG = PORT$A$REG AND P_EJECT_OFF;
132   3    OUTPUT(PORT_A) = PORT$A$REG;

           /*  EVALUATE PACKAGE DATA  */

133   3    DELTA = (INT(PKG_OFFSETS(PROD_PTR).PKG_WIDTH) -
                   INT(WORK_TABLE(LABEL_FLAG).PACKAGE_WIDTH));
134   3    IF (TOLERANCE_TBL(PROD_PTR).PACKAGE_WIDTH < UNSIGN(IABS(DELTA)))
135   3        THEN DO;
136   4        ER_CODE = 'P';
137   4        CALL PROD_EJECT(0);
138   4        RETURN;
139   4    END;

           /*  EVALUATE CLOSURE DATA  */

140   3    IF ((CLOSURE_OFFSETS(PROD_PTR).CLOSURE_FLAG AND OFOH) <> 0) THEN DO;

               /*  EVALUATE CLOSURE POSITION  */
142   4        IF ((CLOSURE_OFFSETS(PROD_PTR).CLOSURE_FLAG AND OFH)) <> 0 THEN DO;
144   5        POSE = (INT(WORK_TABLE(LABEL_FLAG).PACKAGE_ELEV)
                      - INT(WORK_TABLE(LABEL_FLAG).CLOSURE_ELEV));

145   5        DELTA = (CLOSURE_OFFSETS(PROD_PTR).CLOSURE_ELEV - POSE);
146   5        IF (TOLERANCE_TBL(PROD_PTR).CLOSURE_ELEV < UNSIGN(IABS(DELTA))) THEN DO;
148   6            ER_CODE = 'C';
149   6            CALL PROD_EJECT(1);
150   6            RETURN;
151   6            END;
152   5        END;
153   4        ELSE DO;
154   5        POSE = (INT(WORK_TABLE(LABEL_FLAG).PACKAGE_CENTER)
                      - INT(WORK_TABLE(LABEL_FLAG).CLOSURE_CENTER));

155   5        DELTA = (CLOSURE_OFFSETS(PROD_PTR).CLOSURE_CENTER - POSE);
156   5        IF (TOLERANCE_TBL(PROD_PTR).CLOSURE_CENTER < UNSIGN(IABS(DELTA))) THEN DO;
158   6            ER_CODE = 'C';
159   6            CALL PROD_EJECT(1);
160   6            RETURN;
161   6            END;
162   5        END;

           /*  EVALUATE CLOSURE SKEW  */

163   4        DELTA = (CLOSURE_OFFSETS(PROD_PTR).CLOSURE_SKEW
                       - WORK_TABLE(LABEL_FLAG).CLOSURE_SKEW);

164   4        IF (TOLERANCE_TBL(PROD_PTR).CLOSURE_SKEW < UNSIGN(IABS(DELTA))) THEN DO;
166   5            ER_CODE = 'C';
167   5            CALL PROD_EJECT(1);
168   5            RETURN;
169   5            END;

           /*  EVALUATE CLOSURE WIDTH  */

170   4        DELTA = (INT(CLOSURE_OFFSETS(PROD_PTR).CLOSURE_WIDTH)
                       - INT(WORK_TABLE(LABEL_FLAG).CLOSURE_WIDTH));

171   4        IF (TOLERANCE_TBL(PROD_PTR).CLOSURE_WIDTH < UNSIGN(IABS(DELTA))) THEN DO;
173   5            ER_CODE = 'C';
174   5            CALL PROD_EJECT(1);
175   5            RETURN;
176   5            END;

177   4    END;  /* EVALUATE CLOSURE DATA  */
```

```
                /*  EVALUATE LABEL DATA  */

                /*  CHECK HORIZONTAL POSITION  */
178   3             POSE = (INT(WORK_TABLE(LABEL_FLAG).PACKAGE_CENTER)
                          - INT(WORK_TABLE(LABEL_FLAG).LABEL_CENTER));

179   3             DELTA = (LABEL_OFFSETS(PROD_PTR).LABEL_CENTER - POSE);
180   3             IF (DELTA > INT(TOLERANCE_TBL(PROD_PTR).LABEL_CENTER)) THEN DO;
182   4                 ER_CODE = '2';
183   4                 CALL PROD_EJECT(3);
184   4                 RETURN;
185   4                 END;
186   3             IF (DELTA < -(INT(TOLERANCE_TBL(PROD_PTR).LABEL_CENTER))) THEN DO;
188   4                 ER_CODE = '1';
189   4                 CALL PROD_EJECT(2);
190   4                 RETURN;
191   4                 END;
                /*  CHECK VERTICAL POSITION  */
192   3             POSE = (INT(WORK_TABLE(LABEL_FLAG).PACKAGE_ELEV)
                         - INT(WORK_TABLE(LABEL_FLAG).LABEL_ELEV));

193   3             DELTA = (LABEL_OFFSETS(PROD_PTR).LABEL_ELEV - POSE);
194   3             IF (DELTA > INT(TOLERANCE_TBL(PROD_PTR).LABEL_ELEV)) THEN DO;
196   4                 ER_CODE = '4';
197   4                 CALL PROD_EJECT(5);
198   4                 RETURN;
199   4                 END;
200   3             IF (DELTA < -(INT(TOLERANCE_TBL(PROD_PTR).LABEL_ELEV))) THEN DO;
202   4                 ER_CODE = '3';
203   4                 CALL PROD_EJECT(4);
204   4                 RETURN;
205   4                 END;

                /*  EVALUATE LABEL WIDTH  */

206   3             DELTA = (INT(LABEL_OFFSETS(PROD_PTR).LABEL_WIDTH)
                           - INT(WORK_TABLE(LABEL_FLAG).LABEL_WIDTH));

207   3             IF (TOLERANCE_TBL(PROD_PTR).LABEL_WIDTH < UNSIGN(IABS(DELTA))) THEN DO;
209   4                 ER_CODE = '5';
210   4                 CALL PROD_EJECT(6);
211   4                 RETURN;
212   4                 END;

                /*  EVALUATE LABEL SKEW  */

213   3             DELTA = (LABEL_OFFSETS(PROD_PTR).LABEL_SKEW
                           - WORK_TABLE(LABEL_FLAG).LABEL_SKEW);

214   3             IF (TOLERANCE_TBL(PROD_PTR).LABEL_SKEW < UNSIGN(IABS(DELTA))) THEN DO;
216   4                 ER_CODE = '6';
217   4                 CALL PROD_EJECT(7);
218   4                 RETURN;
219   4                 END;

                /*  EVALUATE FEATURE 1  */
220   3             IF ((FEATURE_OFFSETS(PROD_PTR + 0).FEATURE_FLAG AND OFOH) <> 0)
221   3             THEN DO;
222   4                 DELTA = (INT(FEATURE_OFFSETS(PROD_PTR + 0).FEATURE)
                             - INT(WORK_TABLE(LABEL_FLAG).FEATURE_1));

223   4                 IF (TOLERANCE_TBL(PROD_PTR).FEATURE_1 < UNSIGN(IABS(DELTA))) THEN DO;
225   5                     ER_CODE = '7';
226   5                     CALL PROD_EJECT(8);
227   5                     RETURN;
228   5                     END;
229   4             END;

                /*  EVALUATE FEATURE 2  */

230   3             IF ((FEATURE_OFFSETS(PROD_PTR + 20).FEATURE_FLAG AND OFOH) <> 0)
231   3             THEN DO;
232   4                 DELTA = (INT(FEATURE_OFFSETS(PROD_PTR + 20).FEATURE)
                             - INT(WORK_TABLE(LABEL_FLAG).FEATURE_2));

233   4                 IF (TOLERANCE_TBL(PROD_PTR).FEATURE_2 < UNSIGN(IABS(DELTA))) THEN DO;
235   5                     ER_CODE = '8';
236   5                     CALL PROD_EJECT(9);
237   5                     RETURN;
238   5                     END;
239   4             END;
240   3             END;
241   2         END EVAL_DATA;

                /*  PROCEDURE TO EJECT PRODUCT  */

242   1         PROD_EJECT: PROCEDURE(ER_INDEX) PUBLIC;
243   2         DCL ER_INDEX        WORD;
```

```
244   2        DO;
               /*  CHECK TO SEE IF NO_B_FLAG SHOULD BE SET  */
245   3        IF (LABEL_FLAG = 0) THEN NO_B_FLAG = 07FH;
               /*  SET ER_FLAG FOR PRINT  */
247   3            ER_FLAG = 07FH;
248   3        IF (BUFFER_FLAG <> 77) THEN CALL INIT_EJ_BUFFER;
               /*  ROTATE CHARACTER BUFFER  */
250   3            IF (J = 38) THEN DO;
252   4                DO I = 0 TO 35;
253   5                EJ_BUFFER(I) = EJ_BUFFER(I + 3);
254   5                END;
255   4                J = 35;
256   4            END;
               /*  SET UP ERROR CODE FOR PRINTING  */
257   3            IF (LABEL_FLAG = 0)
258   3                THEN EJ_BUFFER(J := J + 1) = 'A';
259   3                ELSE EJ_BUFFER(J := J + 1) = 'B';
260   3            EJ_BUFFER(J := J + 1) = ER_CODE;
261   3            EJ_BUFFER(J := J + 1) = ' ';
               /* INCREMENT ER CODE BINS  */
262   3        IF LABEL_FLAG = 0 THEN LAB_INDEX = 0;
264   3            ELSE LAB_INDEX = 10;
265   3        ER_CODE_TBL(ER_INDEX + LAB_INDEX) = ER_CODE_TBL(ER_INDEX + LAB_INDEX) + 1;
               /*   TURN PRODUCT EJECT LINE ON */
266   3        PORT$A$REG = PORT$A$REG OR P_EJECT_ON;
267   3        OUTPUT(PORT_A) = PORT$A$REG;
268   3        PORT$A$REG = PORT$A$REG AND P_EJECT_OFF;
269   3        OUTPUT(PORT_A) = PORT$A$REG;
270   3        END;
271   2        END PROD_EJECT;
272   1        INIT_EJ_BUFFER: PROCEDURE PUBLIC;
273   2        DO;
274   3            J = 65535;
275   3            BUFFER_FLAG = 77;
276   3            DO I = 0 TO 38;
277   4            EJ_BUFFER(I) = ' ';
278   4            END;
279   3        END;
280   2        END INIT_EJ_BUFFER;
281   1        END EVAL_DATA_MODULE;
```

```
MODULE INFORMATION:

     CODE AREA SIZE     = 0429H   1065D
     CONSTANT AREA SIZE = 0000H      0D
     VARIABLE AREA SIZE = 0012H     18D
     MAXIMUM STACK SIZE = 0006H      6D
     516 LINES READ
     0 PROGRAM WARNINGS
     0 PROGRAM ERRORS

DICTIONARY SUMMARY:

     47KB MEMORY AVAILABLE
     11KB MEMORY USED   (23%)
     0KB DISK SPACE USED

END OF PL/M-86 COMPILATION

iRMX 86 PL/M-86 V2.3 COMPILATION OF MODULE TALLY_DATA_MODULE
OBJECT MODULE PLACED IN SOURCE/TALLY.OBJ
COMPILER INVOKED BY:  :LANG:PLM86 SOURCE/TALLY.PLM OPTIMIZE(3) ROM SET(TARGET=1)

               $INCLUDE(SOURCE/COPYRIGHT)
         =     /*
```

```
      = ************************************************************************
      = *                                                                      *
      = *                                                                      *
      = *                   COPYRIGHT CHESEBROUGH-POND'S INC.                  *
      = *                                                                      *
      = *                   (c) 1983, CHESEBROUGH-POND'S INC.                  *
      = *                                                                      *
      = *                                                                      *
      = *                                                                      *
      = *                                                                      *
      = *     ALL RIGHTS RESERVED. NO PART OF THIS PROGRAM MAY BE REPRODUCED,  *
      = *     TRANSMITTED, TRANSCRIBED, STORED IN A RETRIEVAL SYSTEM, OR       *
      = *     TRANSLATED INTO ANY LANGUAGE OR COMPUTER LANGUAGE, IN ANY FORM   *
      = *     OR BY ANY MEANS, ELECTRONIC, MECHANICAL, MAGNETIC, OPTICAL,      *
      = *     CHEMICAL, MANUAL OR OTHERWISE, WITHOUT THE EXPRESS WRITTEN PER-  *
      = *     MISSION OF CHESEBROUGH-POND'S INC., 33 BENEDICT PLACE, GREENWICH,*
      = *     CONNECTICUT.                                                     *
      = *                                                                      *
      = *                                                                      *
      = ************************************************************************

      = */

        $TITLE(' TALLY DATA MODULE')
 1      TALLY_DATA_MODULE:
        DO;
        $INCLUDE(SOURCE/DECLARE.EXT)
 2  1 = DECLARE      DCL      LITERALLY    'DECLARE';
 3  1 = DECLARE      LIT      LITERALLY    'LITERALLY';
        $INCLUDE(SOURCE/XTERMHAND.EXT)
 4  1 = INIT_USART: PROCEDURE EXTERNAL;
 5  2 = END INIT_USART;
 6  1 = WRITE: PROCEDURE(BUFFER_PTR,BLENGTH) EXTERNAL;
 7  2 =         DCL BUFFER_PTR  POINTER;
 8  2 =         DCL BLENGTH WORD;
 9  2 = END WRITE;
10  1 = READ: PROCEDURE(BUFFER_PTR,BLENGTH)WORD EXTERNAL;
11  2 =         DCL      BUFFER_PTR  POINTER;
12  2 =         DCL      BLENGTH    WORD;
13  2 = END READ;
        $INCLUDE(SOURCE/IWCONV.EXT)
      = $SAVE
      = $NOLIST

        /*  VARIABLE DECLARATIONS PUBLIC  */
35  1   DCL IGRAD             WORD EXTERNAL;
36  1   DCL PARAM1            INTEGER EXTERNAL;
37  1   DCL BUFFER (24)       BYTE EXTERNAL;
38  1   DCL ER_CODE_TBL (20) WORD EXTERNAL;
39  1   DCL PKG_SUM           DWORD EXTERNAL;
40  1   DCL CURS_LOC (24)     WORD EXTERNAL;
41  1   DCL CURS_LOC_2 (24)   WORD EXTERNAL;
42  1   DCL NOBYTES           WORD EXTERNAL;
43  1   DCL PROD_NUM          WORD EXTERNAL;
44  1   DCL PROD_PTR          WORD EXTERNAL;
45  1   DCL SIZE              WORD EXTERNAL;
46  1   DCL CTABLE_OFF        WORD EXTERNAL;
47  1   DCL VERT_CL           WORD EXTERNAL;
48  1   DCL HOR_DIST          WORD EXTERNAL;
49  1   DCL VERT_DIST         WORD EXTERNAL;
50  1   DCL LABEL_FLAG        BYTE EXTERNAL;
51  1   DCL CFUNC             BYTE EXTERNAL;
52  1   DCL IMAGF             BYTE EXTERNAL;
53  1   DCL DIR_PTR           BYTE EXTERNAL;

        /* LOCAL VARIABLE DECLARATIONS */
54  1   DCL (I,J,K,TTHRESH) WORD;
55  1   DCL CENTER1           WORD;
56  1   DCL CENTER2           WORD;
57  1   DCL DELTA             INTEGER;
58  1   DCL ER_CODE           BYTE;
59  1   DCL POSE              INTEGER;
60  1   DCL LAB_INDEX         WORD;
61  1   DCL A_SUM             DWORD;
62  1   DCL B_SUM             DWORD;
63  1   DCL ER_SUM            DWORD;
64  1   DCL TEMP              DWORD;
65  1   DCL T_BUFF (4)        BYTE;
        /* LITERALL DECLARATIONS  */
66  1   DCL CAMERA_ON         LIT      '03H';
67  1   DCL CAMERA_OFF        LIT      '00H';
68  1   DCL DATA_REG          LIT      '00H';
69  1   DCL COMMD_REG         LIT      '03H';
70  1   DCL HOZ_ADD_LO        LIT      '04H';
71  1   DCL HOZ_ADD_HI        LIT      '05H';
72  1   DCL VERT_ADD          LIT      '06H';
73  1   DCL POST_INC_READ     LIT      '01H';
```

```
 74   1        DCL POST_INC_WRITE  LIT      '02H';
 75   1        DCL CLRSCRN         LIT      '1BH,6AH,0CH';
 76   1        DCL SET_CUR         LIT      '1BH,59H';
 77   1        DCL ESC             LIT      '1BH';
 78   1        DCL CRLF            LIT      'CALL WRITE(@(13,10),2)';
 79   1        DCL CR              LIT      '0DH';
 80   1        DCL LF              LIT      '0AH';
 81   1        DCL RESTC           LIT      '00H';
 82   1        DCL DISC            LIT      '03H';
 83   1        DCL MOVC            LIT      '02H';
 84   1        DCL CUR1            LIT      '00H';
 85   1        DCL CUR2            LIT      '04H';
 86   1        DCL CUR3            LIT      '08H';
 87   1        DCL CUR4            LIT      '0CH';
 88   1        DCL HOMC            LIT      '01H';
 89   1        DCL ENAX            LIT      '010H';
 90   1        DCL ENAY            LIT      '020H';
 91   1        DCL F_IMG           LIT      '00H';
 92   1        DCL B_IMG           LIT      '040H';

 93   1        DCL PROD_NAM_TBL (20) STRUCTURE(NAM_BUFFER(20) BYTE) EXTERNAL;

               $INCLUDE(SOURCE/OFFSETS.LIB)
           =   $SAVE
           =   $NOLIST

               /*  EXTERNAL PROCEDURE DECLARATIONS  */

102   1        CURSOR_ROUTINE: PROCEDURE(CURSOR_TABLE,FUNCT) EXTERNAL;
103   2            DCL CURSOR_TABLE    POINTER;
104   2            DCL FUNCT           BYTE;
105   2        END CURSOR_ROUTINE;

106   1        GRAD_PROFILE: PROCEDURE(CURSOR_TABLE,IMAGE_PTR,SIZE_PTR) EXTERNAL;
107   2            DCL CURSOR_TABLE    POINTER;
108   2            DCL IMAGE_PTR       POINTER;
109   2            DCL SIZE_PTR        POINTER;
110   2        END GRAD_PROFILE;

111   1        TIMER: PROCEDURE(J) EXTERNAL;
112   2            DCL J               WORD;
113   2        END TIMER;

114   1        TRANS_IMAGE: PROCEDURE(IFLAG) EXTERNAL;
115   2            DCL IFLAG           BYTE;
116   2        END TRANS_IMAGE;

117   1        INIT_CUR: PROCEDURE(TABLE_PTR) EXTERNAL;
118   2            DCL TABLE_PTR       POINTER;
119   2        END INIT_CUR;

120   1        LOC_CLOSURE: PROCEDURE EXTERNAL;
121   2        END LOC_CLOSURE;

               /*  PROCEDURE TO PRINT PRODUCTION DATA  */


122   1        TALLY: PROCEDURE PUBLIC;

123   2        DCL TALLY_MENU (*) BYTE DATA(CLRSCRN,'PRODUCTION TALLY: ',SET_CUR,22H,22H,
                       'ERRORS. ',SET_CUR,22H,2FH,'A-LABEL    B-LABEL',SET_CUR,24H,20H,
                       'P PACKAGE: ',SET_CUR,25H,20H,'C CLOSURE: ',SET_CUR,26H,20H,
                       '1 LABEL LEFT: ',SET_CUR,27H,20H,'2 LABEL RIGHT: ',SET_CUR,28H,20H,
                       '3 LABEL HIGH: ',SET_CUR,29H,20H,'4 LABEL LOW: ',SET_CUR,2AH,20H,
                       '5 LABEL WIDTH: ',SET_CUR,2BH,20H,'6 LABEL SKEW: ');
124   2        DCL TALLY_MENU_A (*) BYTE DATA(SET_CUR,2CH,20H,'7 FEATURE 1: ',SET_CUR,
                       2DH,20H,'8 FEATURE 2: ',SET_CUR,2FH,22H,'TOTAL: ',SET_CUR,30H,22H,
                       'TOTAL ERRORS: ',SET_CUR,31H,22H,'TOTAL PRODUCTION: ',SET_CUR,
                       32H,20H,'ENTER R TO RESET TALLY. ',SET_CUR,33H,20H,
                       'ENTER RETURN TO QUIT. ');

125   2        DO;
126   3            A_SUM = 0;
127   3            B_SUM = 0;
128   3            ER_SUM = 0;

129   3            T_BUFF(0) = 1BH;
130   3            T_BUFF(1) = 59H;

131   3            CALL WRITE(@TALLY_MENU,LENGTH(TALLY_MENU));
132   3            CALL WRITE(@TALLY_MENU_A,LENGTH(TALLY_MENU_A));

133   3            BUFFER(0) = ' ';
134   3            DO WHILE (BUFFER(0) <> CR);
135   4            DO I = 0 TO 9;
136   5                K = ER_CODE_TBL(I);
137   5                A_SUM = A_SUM + DOUBLE(K);
138   5                T_BUFF(2) = 24H + LOW(I);
```

```
139   5             T_BUFF(3) = 2FH;
140   5             CALL WRITE(@T_BUFF,4);
141   5             CALL WRD$ASC(@BUFFER,@K);
142   5             CALL WRITE(@BUFFER,8);
143   5             K = ER_CODE_TBL(I + 10);
144   5             B_SUM = B_SUM + DOUBLE(K);
145   5             T_BUFF(3) = 39H;
146   5             CALL WRITE(@T_BUFF,4);
147   5             CALL WRD$ASC(@BUFFER,@K);
148   5             CALL WRITE(@BUFFER,8);
149   5         END;

150   4         TEMP = A_SUM;
151   4         CALL DWRD$ASC(@BUFFER,@TEMP);
152   4         CALL WRITE(@(SET_CUR,2FH,2EH),4);
153   4         CALL WRITE(@BUFFER,10);

154   4         TEMP = B_SUM;
155   4         CALL DWRD$ASC(@BUFFER,@TEMP);
156   4         CALL WRITE(@(SET_CUR,2FH,38H),4);
157   4         CALL WRITE(@BUFFER,10);

158   4         ER_SUM = A_SUM + B_SUM;
159   4         TEMP = ER_SUM;
160   4         CALL DWRD$ASC(@BUFFER,@TEMP);
161   4         CALL WRITE(@(SET_CUR,30H,38H),4);
162   4         CALL WRITE(@BUFFER,10);

163   4         TEMP = PKG_SUM;
164   4         CALL DWRD$ASC(@BUFFER,@TEMP);
165   4         CALL WRITE(@(SET_CUR,31H,38H),4);
166   4         CALL WRITE(@BUFFER,10);
167   4         CALL WRITE(@(SET_CUR,33H,37H),4);
168   4         CALL WRITE(@('  '),2);
169   4         CALL WRITE(@(SET_CUR,33H,37H),4);

170   4         NOBYTES = READ(@BUFFER,5);
171   4         IF BUFFER(0) = 'R' THEN DO;
173   5             DO I = 0 TO 19;
174   6             ER_CODE_TBL(I) = 0;
175   6             END;
176   5             A_SUM = 0;
177   5             B_SUM = 0;
178   5             ER_SUM = 0;
179   5             PKG_SUM = 0;
180   5         END;
181   4     END;  /* DO WHILE  */

182   3         IF BUFFER(0) = CR THEN RETURN;
184   3         END;
185   2     END TALLY;
186   1     END TALLY_DATA_MODULE;
```

```
MODULE INFORMATION:

     CODE AREA SIZE      = 0250H    592D
     CONSTANT AREA SIZE  = 0155H    341D
     VARIABLE AREA SIZE  = 0027H     39D
     MAXIMUM STACK SIZE  = 000CH     12D
     378 LINES READ
     0 PROGRAM WARNINGS
     0 PROGRAM ERRORS

DICTIONARY SUMMARY:

     47KB MEMORY AVAILABLE
     12KB MEMORY USED   (25%)
     0KB DISK SPACE USED

END OF PL/M-86 COMPILATION
```

```
iRMX 86 PL/M-86 V2.3 COMPILATION OF MODULE ALTER_PARAM_MODULE
OBJECT MODULE PLACED IN SOURCE/ALTER_PRM.OBJ
COMPILER INVOKED BY:   :LANG:PLM86 SOURCE/ALTER_PRM.PLM OPTIMIZE(3) ROM SET(TARGET=1)


              $INCLUDE(SOURCE/COPYRIGHT)
         =    /*
```

```
           =    ***********************************************************************
           =    *                                                                     *
           =    *                                                                     *
           =    *                 COPYRIGHT CHESEBROUGH-POND'S INC.                   *
           =    *                                                                     *
           =    *                 (c) 1983, CHESEBROUGH-POND'S INC.                   *
           =    *                                                                     *
           =    *                                                                     *
           =    *                                                                     *
           =    *                                                                     *
           =    *     ALL RIGHTS RESERVED. NO PART OF THIS PROGRAM MAY BE REPRODUCED, *
           =    *     TRANSMITTED, TRANSCRIBED, STORED IN A RETRIEVAL SYSTEM, OR      *
           =    *     TRANSLATED INTO ANY LANGUAGE OR COMPUTER LANGUAGE, IN ANY FORM  *
           =    *     OR BY ANY MEANS, ELECTRONIC, MECHANICAL, MAGNETIC, OPTICAL,     *
           =    *     CHEMICAL, MANUAL OR OTHERWISE, WITHOUT THE EXPRESS WRITTEN PER- *
           =    *     MISSION OF CHESEBROUGH-POND'S INC., 33 BENEDICT PLACE, GREENWICH, *
           =    *     CONNECTICUT.                                                    *
           =    *                                                                     *
           =    *                                                                     *
           =    ***********************************************************************

           =    */

                $TITLE('ALTER PARAM MODULE')
  1             ALTER_PARAM_MODULE:
                DO;
                $INCLUDE(SOURCE/DECLARE.EXT)
  2   1    =    DECLARE     DCL      LITERALLY    'DECLARE';
  3   1    =    DECLARE     LIT      LITERALLY    'LITERALLY';
                $INCLUDE(SOURCE/XTERMHAND.EXT)
  4   1    =    INIT_USART: PROCEDURE EXTERNAL;
  5   2    =    END INIT_USART;
  6   1    =    WRITE: PROCEDURE(BUFFER_PTR,BLENGTH) EXTERNAL;
  7   2    =            DCL BUFFER_PTR  POINTER;
  8   2    =            DCL BLENGTH WORD;
  9   2    =    END WRITE;
 10   1    =    READ: PROCEDURE(BUFFER_PTR,BLENGTH)WORD EXTERNAL;
 11   2    =            DCL      BUFFER_PTR  POINTER;
 12   2    =            DCL      BLENGTH     WORD;
 13   2    =    END READ;
                $INCLUDE(SOURCE/IWCONV.EXT)
           =    $SAVE
           =    $NOLIST

                /*  VARIABLE DECLARATIONS PUBLIC  */
 35   1         DCL IGRAD               WORD EXTERNAL;
 36   1         DCL PARAM1              INTEGER EXTERNAL;
 37   1         DCL BUFFER (24)         BYTE EXTERNAL;
 38   1         DCL ER_CODE_TBL (20) WORD EXTERNAL;
 39   1         DCL PKG_SUM             DWORD EXTERNAL;
 40   1         DCL CURS_LOC (24)       WORD EXTERNAL;
 41   1         DCL CURS_LOC_2 (24) WORD EXTERNAL;
 42   1         DCL NOBYTES             WORD EXTERNAL;
 43   1         DCL PROD_NUM            WORD EXTERNAL;
 44   1         DCL PROD_PTR            WORD EXTERNAL;
 45   1         DCL SIZE                WORD EXTERNAL;
 46   1         DCL CTABLE_OFF          WORD EXTERNAL;
 47   1         DCL VERT_CL             WORD EXTERNAL;
 48   1         DCL HOR_DIST            WORD EXTERNAL;
 49   1         DCL VERT_DIST           WORD EXTERNAL;
 50   1         DCL LABEL_FLAG          BYTE EXTERNAL;
 51   1         DCL CFUNC               BYTE EXTERNAL;
 52   1         DCL IMAGF               BYTE EXTERNAL;
 53   1         DCL DIR_PTR             BYTE EXTERNAL;

                /* LOCAL VARIABLE DECLARATIONS */
 54   1         DCL (I,J,K,TTHRESH) WORD;
 55   1         DCL CENTER1             WORD;
 56   1         DCL CENTER2             WORD;
 57   1         DCL DELTA               INTEGER;
 58   1         DCL ER_CODE             BYTE;
 59   1         DCL POSE                INTEGER;
 60   1         DCL LAB_INDEX           WORD;
 61   1         DCL TPROD_PTR           WORD;
 62   1         DCL TLABEL_FLAG         BYTE;
 63   1         DCL A_SUM               DWORD;
 64   1         DCL B_SUM               DWORD;
 65   1         DCL ER_SUM              DWORD;
 66   1         DCL TEMP                DWORD;
 67   1         DCL T_BUFF (4)          BYTE;
                /* LITERALL DECLARATIONS  */
 68   1         DCL CAMERA_ON           LIT     '03H';
 69   1         DCL CAMERA_OFF          LIT     '00H';
 70   1         DCL DATA_REG            LIT     '00H';
 71   1         DCL COMMD_REG           LIT     '03H';
 72   1         DCL HOZ_ADD_LO          LIT     '04H';
 73   1         DCL HOZ_ADD_HI          LIT     '05H';
```

```
 74   1     DCL VERT_ADD          LIT      '06H';
 75   1     DCL POST_INC_READ     LIT      '01H';
 76   1     DCL POST_INC_WRITE    LIT      '02H';
 77   1     DCL CLRSCRN           LIT      '1BH,6AH,0CH';
 78   1     DCL SET_CUR           LIT      '1BH,59H';
 79   1     DCL ESC               LIT      '1BH';
 80   1     DCL CRLF              LIT      'CALL WRITE(@(13,10),2)';
 81   1     DCL CR                LIT      '0DH';
 82   1     DCL LF                LIT      '0AH';
 83   1     DCL RESTC             LIT      '00H';
 84   1     DCL DISC              LIT      '03H';
 85   1     DCL MOVC              LIT      '02H';
 86   1     DCL CUR1              LIT      '00H';
 87   1     DCL CUR2              LIT      '04H';
 88   1     DCL CUR3              LIT      '08H';
 89   1     DCL CUR4              LIT      '0CH';
 90   1     DCL HOMC              LIT      '01H';
 91   1     DCL ENAX              LIT      '010H';
 92   1     DCL ENAY              LIT      '020H';
 93   1     DCL F_IMG             LIT      '00H';
 94   1     DCL B_IMG             LIT      '040H';

 95   1     DCL PROD_NAM_TBL (20) STRUCTURE(NAM_BUFFER(20) BYTE) EXTERNAL;

            $INCLUDE(SOURCE/OFFSETS.LIB)
          = $SAVE
          = $NOLIST

            /*  EXTERNAL PROCEDURE DECLARATIONS  */

104   1     CURSOR_ROUTINE: PROCEDURE(CURSOR_TABLE,FUNCT) EXTERNAL;
105   2         DCL CURSOR_TABLE     POINTER;
106   2         DCL FUNCT            BYTE;
107   2     END CURSOR_ROUTINE;

108   1     GRAD_PROFILE: PROCEDURE(CURSOR_TABLE,IMAGE_PTR,SIZE_PTR) EXTERNAL;
109   2         DCL CURSOR_TABLE     POINTER;
110   2         DCL IMAGE_PTR        POINTER;
111   2         DCL SIZE_PTR         POINTER;
112   2     END GRAD_PROFILE;

113   1     TIMER: PROCEDURE(J) EXTERNAL;
114   2         DCL J                WORD;
115   2     END TIMER;

116   1     TRANS_IMAGE: PROCEDURE(IFLAG) EXTERNAL;
117   2         DCL IFLAG            BYTE;
118   2     END TRANS_IMAGE;

119   1     INIT_CUR: PROCEDURE(TABLE_PTR) EXTERNAL;
120   2         DCL TABLE_PTR        POINTER;
121   2     END INIT_CUR;

122   1     LOC_CLOSURE: PROCEDURE EXTERNAL;
123   2     END LOC_CLOSURE;

124   1     DCL AP_LABEL (*) BYTE DATA(CLRSCRN,'SELECT LABEL A OR B - ');
125   1     DCL AP_MENU (*) BYTE DATA(CLRSCRN,SET_CUR,21H,21H,'SELECT PARAMETERS TO ALTER -',
                SET_CUR,23H,28H,'1: PACKAGE. ',SET_CUR,25H,28H,'2: CLOSURE. ',SET_CUR,
                27H,28H,'3: LABEL. ',SET_CUR,29H,28H,'4: FEATURE 1. ',SET_CUR,
                2BH,28H,'5: FEATURE 2. ',SET_CUR,2DH,28H,'6: RETURN',SET_CUR,21H,3EH);

126   1     DCL AP_ALT (*) BYTE DATA(SET_CUR,32H,20H,'ENTER PARAMETER TO ALTER - ');

127   1     DCL AP_NV  (*) BYTE DATA(SET_CUR,33H,20H,'ENTER NEW VALUE - ');

128   1     DCL AP_MENU_1 (*) BYTE DATA(CLRSCRN,'PACKAGE PARAMETERS: ',SET_CUR,22H,23H,
                '1. LEFT SIDE GRADIENT',SET_CUR,24H,23H,'2. RIGHT SIDE GRADIENT',
                SET_CUR,26H,23H,'3. LEFT VERT GRADIENT',SET_CUR,28H,23H,
                '4. RIGHT VERT GRADIENT',SET_CUR,2AH,23H,'5. PACKAGE WIDTH',
                SET_CUR,2CH,23H,'6. RETURN');

129   1     DCL AP_MENU_2 (*) BYTE DATA(CLRSCRN,'CLOSURE PARAMETERS: ',SET_CUR,22H,22H,
                '1. PT1 GRADIENT',SET_CUR,23H,22H,'2. PT2 GRADIENT',SET_CUR,24H,
                22H,'3. PT3 GRADIENT',SET_CUR,25H,22H,'4. PT4 GRADIENT',SET_CUR,
                26H,22H,'5. CLOSURE SKEW',SET_CUR,27H,22H,'6. CLOSURE WIDTH',
                SET_CUR,28H,22H,'7. CLOSURE CENTER',SET_CUR,29H,22H,
                '8. CLOSURE ELEVATION',SET_CUR,2AH,22H,'9. RETURN');

130   1     DCL AP_MENU_3 (*) BYTE DATA(CLRSCRN,'LABEL PARAMETERS: ',SET_CUR,22H,23H,
                '1. PT1 GRADIENT',SET_CUR,23H,23H,'2. PT2 GRADIENT',SET_CUR,24H,23H,
                '3. PT3 GRADIENT',SET_CUR,25H,23H,'4. PT4 GRADIENT',SET_CUR,26H,23H,
                '5. PT5 GRADIENT',SET_CUR,27H,23H,'6. PT6 GRADIENT',SET_CUR,28H,23H,
                '7. LABEL SKEW',SET_CUR,29H,23H,'8. LABEL WIDTH',SET_CUR,2AH,23H,
                '9. LABEL CENTER',SET_CUR,2BH,22H,'10. LABEL ELEVATION',
                SET_CUR,2CH,22H,'11. RETURN');

131   1     DCL AP_MENU_4 (*) BYTE DATA(CLRSCRN,'FEATURE 1 PARAMETERS: ',SET_CUR,22H,23H,
                '1. PT1 GRADIENT',SET_CUR,23H,23H,'2. PT2 GRADIENT',SET_CUR,24H,23H,
                '3. FEATURE',SET_CUR,25H,23H,'4. RETURN');
```

```
132   1      DCL AP_MENU_5 (*) BYTE DATA(CLRSCRN,'FEATURE 2 PARAMETERS:',SET_CUR,22H,23H,
                   '1.  PT1 GRADIENT',SET_CUR,23H,23H,'2.  PT2 GRADIENT',SET_CUR,24H,23H,
                   '3.  FEATURE',SET_CUR,25H,23H,'4.  RETURN');

             $EJECT
133   1      ALTER_PARAM: PROCEDURE PUBLIC;
134   2      DCL I         BYTE;
135   2      DO;
136   3          BUFFER(0) = ' ';
137   3          DO WHILE (BUFFER(0) <> 'A' AND BUFFER(0) <> 'B');
138   4              CALL WRITE(@AP_LABEL,LENGTH(AP_LABEL));
139   4              NOBYTES = READ(@BUFFER,5);
140   4              END;
141   3          TLABEL_FLAG = BUFFER(0) - 'A';
142   3          TPROD_PTR = (((PROD_NUM - 1) * 2) + DOUBLE(TLABEL_FLAG));

143   3          BUFFER(0) = ' ';
144   3          DO WHILE BUFFER(0) = ' ';
145   4          CALL WRITE(@AP_MENU,LENGTH(AP_MENU));
146   4          NOBYTES = READ(@BUFFER,5);
147   4          IF (BUFFER(0) = '6') THEN RETURN;
149   4          I = BUFFER(0) - '1';
             /*  CHECK FOR PROPER RANGE  */
150   4          IF ( I >= 0 AND I < 5) THEN DO;
152   5              DO CASE I;
153   6                  CALL ALT_PACK_PARAM;
154   6                  CALL ALT_CLO_PARAM;
155   6                  CALL ALT_LAB_PARAM;
156   6                  CALL ALT_F1_PARAM;
157   6                  CALL ALT_F2_PARAM;
158   6              END;
159   5          END;
160   4          ELSE BUFFER(0) = ' ';
161   4          END;
162   3          END;
163   2      END ALTER_PARAM;

             $EJECT
164   1      ALT_PACK_PARAM: PROCEDURE PUBLIC;
165   2      DCL (I,K)          WORD;
166   2      DCL J              BYTE;

167   2      DO;
168   3          BUFFER(0) = ' ';
169   3          DO WHILE (BUFFER(0) <> 'Q');
170   4          CALL WRITE(@AP_MENU_1,LENGTH(AP_MENU_1));
171   4          I = DOUBLE(LOW(PKG_OFFSETS(TPROD_PTR).HOZ_GRAD_LEFT));
172   4          CALL WRD$ASC(@BUFFER,@I);
173   4          BUFFER(0) = HIGH(PKG_OFFSETS(TPROD_PTR).HOZ_GRAD_LEFT);
174   4          CALL WRITE(@(SET_CUR,22H,3DH),4);
175   4          CALL WRITE(@BUFFER,8);
176   4          I = DOUBLE(LOW(PKG_OFFSETS(TPROD_PTR).HOZ_GRAD_RIGHT));
177   4          CALL WRD$ASC(@BUFFER,@I);
178   4          BUFFER(0) = HIGH(PKG_OFFSETS(TPROD_PTR).HOZ_GRAD_RIGHT);
179   4          CALL WRITE(@(SET_CUR,24H,3DH),4);
180   4          CALL WRITE(@BUFFER,8);
181   4          I = DOUBLE(LOW(PKG_OFFSETS(TPROD_PTR).VERT_GRAD_LEFT));
182   4          CALL WRD$ASC(@BUFFER,@I);
183   4          BUFFER(0) = HIGH(PKG_OFFSETS(TPROD_PTR).VERT_GRAD_LEFT);
184   4          CALL WRITE(@(SET_CUR,26H,3DH),4);
185   4          CALL WRITE(@BUFFER,8);
186   4          I = DOUBLE(LOW(PKG_OFFSETS(TPROD_PTR).VERT_GRAD_RIGHT));
187   4          CALL WRD$ASC(@BUFFER,@I);
188   4          BUFFER(0) = HIGH(PKG_OFFSETS(TPROD_PTR).VERT_GRAD_RIGHT);
189   4          CALL WRITE(@(SET_CUR,28H,3DH),4);
190   4          CALL WRITE(@BUFFER,8);
191   4          I = PKG_OFFSETS(TPROD_PTR).PKG_WIDTH;
192   4          CALL WRD$ASC(@BUFFER,@I);
193   4          CALL WRITE(@(SET_CUR,2AH,3DH),4);
194   4          CALL WRITE(@BUFFER,8);
195   4          CALL WRITE(@AP_ALT,LENGTH(AP_ALT));
196   4          NOBYTES = READ(@BUFFER,7);

197   4          IF (BUFFER(0) = '6') THEN DO;
199   5          BUFFER(0) = ' ';
200   5          RETURN;
201   5          END;

             /*  CHECK FOR CARRIAGE RETURN  */
202   4          IF (BUFFER(0) <> CR) THEN DO;

204   5          J = BUFFER(0) - 31H;
205   5          IF (J >= 0 AND J < 5) THEN DO;
207   6          CALL WRITE(@AP_NV,LENGTH(AP_NV));
208   6          NOBYTES = READ(@BUFFER,8);
209   6          IF (BUFFER(0) <> CR) THEN DO;
```

```
7          DO CASE J;
8              DO;
9              CALL IN_GRAD(@BUFFER,@K);
9              IF (K <> 0) THEN
9                  PKG_OFFSETS(TPROD_PTR).HOZ_GRAD_LEFT = K;
9              END;
8              DO;
9              CALL IN_GRAD(@BUFFER,@K);
9              IF (K <> 0) THEN
9                  PKG_OFFSETS(TPROD_PTR).HOZ_GRAD_RIGHT = K;
9              END;
8              DO;
9              CALL IN_GRAD(@BUFFER,@K);
9              IF (K <> 0) THEN
9                  PKG_OFFSETS(TPROD_PTR).VERT_GRAD_LEFT = K;
9              END;
8              DO;
9              CALL IN_GRAD(@BUFFER,@K);
9              IF (K <> 0) THEN
9                  PKG_OFFSETS(TPROD_PTR).VERT_GRAD_RIGHT = K;
9              END;
8              DO;
9              CALL ASC$WRD(@BUFFER,@K);
9              PKG_OFFSETS(TPROD_PTR).PKG_WIDTH = K;
9              END;
8              DO;
9              CALL ASC$WRD(@BUFFER,@K);
9              PKG_OFFSETS(TPROD_PTR).PKG_ELEV = K;
9              END;
8              END; /* DO CASE J */
7          END;
6          ELSE BUFFER(0) = ' ';
6          END;
5          ELSE BUFFER(0) = ' ';
5      END;
4      ELSE BUFFER(0) = ' ';
4      END;
3      END;
2      END ALT_PACK_PARAM;

       $EJECT
1      ALT_CLO_PARAM: PROCEDURE PUBLIC;
2      DCL (I,K)        WORD;
2      DCL II           INTEGER;
2      DCL J            BYTE;

2      DO;
3          BUFFER(0) = ' ';
3          DO WHILE (BUFFER(0) <> 'Q');
4          CALL WRITE(@AP_MENU_2,LENGTH(AP_MENU_2));
4          I = DOUBLE(LOW(CLOSURE_OFFSETS(TPROD_PTR).PT1_THRESH));
4          CALL WRD$ASC(@BUFFER,@I);
4          BUFFER(0) = HIGH(CLOSURE_OFFSETS(TPROD_PTR).PT1_THRESH);
4          CALL WRITE(@(SET_CUR,22H,3AH),4);
4          CALL WRITE(@BUFFER,8);
4          I = DOUBLE(LOW(CLOSURE_OFFSETS(TPROD_PTR).PT2_THRESH));
4          CALL WRD$ASC(@BUFFER,@I);
4          BUFFER(0) = HIGH(CLOSURE_OFFSETS(TPROD_PTR).PT2_THRESH);
4          CALL WRITE(@(SET_CUR,23H,3AH),4);
4          CALL WRITE(@BUFFER,8);
4          I = DOUBLE(LOW(CLOSURE_OFFSETS(TPROD_PTR).PT3_THRESH));
4          CALL WRD$ASC(@BUFFER,@I);
4          BUFFER(0) = HIGH(CLOSURE_OFFSETS(TPROD_PTR).PT3_THRESH);
4          CALL WRITE(@(SET_CUR,24H,3AH),4);
4          CALL WRITE(@BUFFER,8);
4          I = DOUBLE(LOW(CLOSURE_OFFSETS(TPROD_PTR).PT4_THRESH));
4          CALL WRD$ASC(@BUFFER,@I);
4          BUFFER(0) = HIGH(CLOSURE_OFFSETS(TPROD_PTR).PT4_THRESH);
4          CALL WRITE(@(SET_CUR,25H,3AH),4);
4          CALL WRITE(@BUFFER,8);
4          II = CLOSURE_OFFSETS(TPROD_PTR).CLOSURE_SKEW;
4          CALL INT$ASC(@BUFFER,@II);
4          CALL WRITE(@(SET_CUR,26H,3AH),4);
4          CALL WRITE(@BUFFER,8);
4          I = CLOSURE_OFFSETS(TPROD_PTR).CLOSURE_WIDTH;
4          CALL WRD$ASC(@BUFFER,@I);
4          CALL WRITE(@(SET_CUR,27H,3AH),4);
4          CALL WRITE(@BUFFER,8);
4          II = CLOSURE_OFFSETS(TPROD_PTR).CLOSURE_CENTER;
4          CALL INT$ASC(@BUFFER,@II);
4          CALL WRITE(@(SET_CUR,28H,3AH),4);
4          CALL WRITE(@BUFFER,8);
4          II = CLOSURE_OFFSETS(TPROD_PTR).CLOSURE_ELEV;
4          CALL INT$ASC(@BUFFER,@II);
4          CALL WRITE(@(SET_CUR,29H,3AH),4);
4          CALL WRITE(@BUFFER,8);
4          CALL WRITE(@AP_ALT,LENGTH(AP_ALT));
4          NOBYTES = READ(@BUFFER,7);
```

```
                /*  CHECK FOR Q  */
296   4             IF (BUFFER(0) = 'Q' OR BUFFER(0) = '9') THEN DO;
298   5                 BUFFER(0) = ' ';
299   5                 RETURN;
300   5             END;
                /*  CHECK FOR CARRIAGE RETURN  */
301   4             IF (BUFFER(0) <> CR) THEN DO;

303   5             J = BUFFER(0) - 31H;
304   5             IF (J >= 0 AND J < 7) THEN DO;
306   6             CALL WRITE(@AP_NV,LENGTH(AP_NV));
307   6             NOBYTES = READ(@BUFFER,8);
308   6             IF (BUFFER(0) <> CR) THEN DO;

310   7             DO CASE J;
311   8                 DO;
312   9                 CALL IN_GRAD(@BUFFER,@K);
313   9                 IF (K <> 0) THEN
314   9                     CLOSURE_OFFSETS(TPROD_PTR).PT1_THRESH = K;
315   9                 END;
316   8                 DO;
317   9                 CALL IN_GRAD(@BUFFER,@K);
318   9                 IF (K <> 0) THEN
319   9                     CLOSURE_OFFSETS(TPROD_PTR).PT2_THRESH = K;
320   9                 END;
321   8                 DO;
322   9                 CALL IN_GRAD(@BUFFER,@K);
323   9                 IF (K <> 0) THEN
324   9                     CLOSURE_OFFSETS(TPROD_PTR).PT3_THRESH = K;
325   9                 END;
326   8                 DO;
327   9                 CALL IN_GRAD(@BUFFER,@K);
328   9                 IF (K <> 0) THEN
329   9                     CLOSURE_OFFSETS(TPROD_PTR).PT4_THRESH = K;
330   9                 END;
331   8                 DO;
332   9                 CALL ASC$INT(@BUFFER,@II);
333   9                 CLOSURE_OFFSETS(TPROD_PTR).CLOSURE_SKEW = II;
334   9                 END;
335   8                 DO;
336   9                 CALL ASC$WRD(@BUFFER,@K);
337   9                 CLOSURE_OFFSETS(TPROD_PTR).CLOSURE_WIDTH = K;
338   9                 END;
339   8                 DO;
340   9                 CALL ASC$INT(@BUFFER,@II);
341   9                 CLOSURE_OFFSETS(TPROD_PTR).CLOSURE_CENTER = II;
342   9                 END;
343   8                 DO;
344   9                 CALL ASC$INT(@BUFFER,@II);
345   9                 CLOSURE_OFFSETS(TPROD_PTR).CLOSURE_ELEV = II;
346   9                 END;
347   8                 END; /* DO CASE J */
348   7             END;
349   6             ELSE BUFFER(0) = ' ';
350   6             END;
351   5             ELSE BUFFER(0) = ' ';
352   5         END;
353   4         ELSE BUFFER(0) = ' ';
354   4         END;
355   3         END;
356   2         END ALT_CLO_PARAM;

                $EJECT
357   1         ALT_LAB_PARAM: PROCEDURE PUBLIC;
358   2         DCL (I,K)        WORD;
359   2         DCL II           INTEGER;
360   2         DCL J            BYTE;

361   2         DO;
362   3             BUFFER(0) = ' ';
363   3             DO WHILE (BUFFER(0) <> 'Q');
364   4             CALL WRITE(@AP_MENU_3,LENGTH(AP_MENU_3));
365   4             I = DOUBLE(LOW(LABEL_OFFSETS(TPROD_PTR).PT1_THRESH));
366   4             CALL WRD$ASC(@BUFFER,@I);
367   4             BUFFER(0) = HIGH(LABEL_OFFSETS(TPROD_PTR).PT1_THRESH);
368   4             CALL WRITE(@(SET_CUR,22H,3AH),4);
369   4             CALL WRITE(@BUFFER,8);
370   4             I = DOUBLE(LOW(LABEL_OFFSETS(TPROD_PTR).PT2_THRESH));
371   4             CALL WRD$ASC(@BUFFER,@I);
372   4             BUFFER(0) = HIGH(LABEL_OFFSETS(TPROD_PTR).PT2_THRESH);
373   4             CALL WRITE(@(SET_CUR,23H,3AH),4);
374   4             CALL WRITE(@BUFFER,8);
375   4             I = DOUBLE(LOW(LABEL_OFFSETS(TPROD_PTR).PT3_THRESH));
376   4             CALL WRD$ASC(@BUFFER,@I);
377   4             BUFFER(0) = HIGH(LABEL_OFFSETS(TPROD_PTR).PT3_THRESH);
378   4             CALL WRITE(@(SET_CUR,24H,3AH),4);
379   4             CALL WRITE(@BUFFER,8);
```

```
380   4       I = DOUBLE(LOW(LABEL_OFFSETS(TPROD_PTR).PT4_THRESH));
381   4       CALL WRD$ASC(@BUFFER,@I);
382   4       BUFFER(0) = HIGH(LABEL_OFFSETS(TPROD_PTR).PT4_THRESH);
383   4       CALL WRITE(@(SET_CUR,25H,3AH),4);
384   4       CALL WRITE(@BUFFER,8);
385   4       I = DOUBLE(LOW(LABEL_OFFSETS(TPROD_PTR).PT5_THRESH));
386   4       CALL WRD$ASC(@BUFFER,@I);
387   4       BUFFER(0) = HIGH(LABEL_OFFSETS(TPROD_PTR).PT5_THRESH);
388   4       CALL WRITE(@(SET_CUR,26H,3AH),4);
389   4       CALL WRITE(@BUFFER,8);
390   4       I = DOUBLE(LOW(LABEL_OFFSETS(TPROD_PTR).PT6_THRESH));
391   4       CALL WRD$ASC(@BUFFER,@I);
392   4       BUFFER(0) = HIGH(LABEL_OFFSETS(TPROD_PTR).PT6_THRESH);
393   4       CALL WRITE(@(SET_CUR,27H,3AH),4);
394   4       CALL WRITE(@BUFFER,8);
395   4       II = LABEL_OFFSETS(TPROD_PTR).LABEL_SKEW;
396   4       CALL INT$ASC(@BUFFER,@II);
397   4       CALL WRITE(@(SET_CUR,28H,3AH),4);
398   4       CALL WRITE(@BUFFER,8);
399   4       I = LABEL_OFFSETS(TPROD_PTR).LABEL_WIDTH;
400   4       CALL WRD$ASC(@BUFFER,@I);
401   4       CALL WRITE(@(SET_CUR,29H,3AH),4);
402   4       CALL WRITE(@BUFFER,8);
403   4       II = LABEL_OFFSETS(TPROD_PTR).LABEL_CENTER;
404   4       CALL INT$ASC(@BUFFER,@II);
405   4       CALL WRITE(@(SET_CUR,2AH,3AH),4);
406   4       CALL WRITE(@BUFFER,8);
407   4       II = LABEL_OFFSETS(TPROD_PTR).LABEL_ELEV;
408   4       CALL INT$ASC(@BUFFER,@II);
409   4       CALL WRITE(@(SET_CUR,2BH,3AH),4);
410   4       CALL WRITE(@BUFFER,8);
411   4       CALL WRITE(@AP_ALT,LENGTH(AP_ALT));
412   4       NOBYTES = READ(@BUFFER,7);
            /*  CHECK FOR CARRIAGE RETURN  */
413   4       IF (BUFFER(0) <> CR) THEN DO;

415   5       CALL ASC$WRD(@BUFFER,@J);
416   5       IF (J = 11) THEN DO;
418   6       BUFFER(0) = ' ';
419   6       BUFFER(1) = ' ';
420   6       RETURN;
421   6       END;
422   5       J = J - 1;
423   5       IF (J >= 0 AND J < 10) THEN DO;
425   6       CALL WRITE(@AP_NV,LENGTH(AP_NV));
426   6       NOBYTES = READ(@BUFFER,8);
427   6       IF (BUFFER(0) <> CR) THEN DO;

429   7       DO CASE J;
430   8           DO;
431   9           CALL IN_GRAD(@BUFFER,@K);
432   9           IF (K <> 0) THEN
433   9               LABEL_OFFSETS(TPROD_PTR).PT1_THRESH = K;
434   9           END;
435   8           DO;
436   9           CALL IN_GRAD(@BUFFER,@K);
437   9           IF (K <> 0) THEN
438   9               LABEL_OFFSETS(TPROD_PTR).PT2_THRESH = K;
439   9           END;
440   8           DO;
441   9           CALL IN_GRAD(@BUFFER,@K);
442   9           IF (K <> 0) THEN
443   9               LABEL_OFFSETS(TPROD_PTR).PT3_THRESH = K;
444   9           END;
445   8           DO;
446   9           CALL IN_GRAD(@BUFFER,@K);
447   9           IF (K <> 0) THEN
448   9               LABEL_OFFSETS(TPROD_PTR).PT4_THRESH = K;
449   9           END;
450   8           DO;
451   9           CALL IN_GRAD(@BUFFER,@K);
452   9           IF (K <> 0) THEN
453   9               LABEL_OFFSETS(TPROD_PTR).PT5_THRESH = K;
454   9           END;
455   8           DO;
456   9           CALL IN_GRAD(@BUFFER,@K);
457   9           IF (K <> 0) THEN
458   9               LABEL_OFFSETS(TPROD_PTR).PT6_THRESH = K;
459   9           END;
460   8           DO;
461   9           CALL ASC$INT(@BUFFER,@II);
462   9           LABEL_OFFSETS(TPROD_PTR).LABEL_SKEW = II;
463   9           END;
464   8           DO;
465   9           CALL ASC$WRD(@BUFFER,@K);
466   9           LABEL_OFFSETS(TPROD_PTR).LABEL_WIDTH = K;
467   9           END;
468   8           DO;
469   9           CALL ASC$INT(@BUFFER,@II);
```

```
470   9           LABEL_OFFSETS(TPROD_PTR).LABEL_CENTER = II;
471   9           END;
472   8           DO;
473   9           CALL ASC$INT(@BUFFER,@II);
474   9           LABEL_OFFSETS(TPROD_PTR).LABEL_ELEV = II;
475   9           END;
476   8           END; /* DO CASE J */
477   7       END;
478   6       ELSE BUFFER(0) = ' ';
479   6       END;
480   5       ELSE BUFFER(0) = ' ';
481   5   END;
482   4   ELSE BUFFER(0) = ' ';
483   4   END;
484   3   END;
485   2   END ALT_LAB_PARAM;

          $EJECT
486   1   ALT_F1_PARAM: PROCEDURE PUBLIC;
487   2   DCL (I,K)        WORD;
488   2   DCL J            BYTE;

489   2   DO;
490   3       BUFFER(0) = ' ';
491   3       DO WHILE (BUFFER(0) <> 'Q');
492   4       CALL WRITE(@AP_MENU_4,LENGTH(AP_MENU_4));
493   4       I = DOUBLE(LOW(FEATURE_OFFSETS(TPROD_PTR).PT1_THRESH));
494   4       CALL WRD$ASC(@BUFFER,@I);
495   4       BUFFER(0) = HIGH(FEATURE_OFFSETS(TPROD_PTR).PT1_THRESH);
496   4       CALL WRITE(@(SET_CUR,22H,3AH),4);
497   4       CALL WRITE(@BUFFER,8);
498   4       I = DOUBLE(LOW(FEATURE_OFFSETS(TPROD_PTR).PT2_THRESH));
499   4       CALL WRD$ASC(@BUFFER,@I);
500   4       BUFFER(0) = HIGH(FEATURE_OFFSETS(TPROD_PTR).PT2_THRESH);
501   4       CALL WRITE(@(SET_CUR,23H,3AH),4);
502   4       CALL WRITE(@BUFFER,8);
503   4       I = FEATURE_OFFSETS(TPROD_PTR).FEATURE;
504   4       CALL WRD$ASC(@BUFFER,@I);
505   4       CALL WRITE(@(SET_CUR,24H,3AH),4);
506   4       CALL WRITE(@BUFFER,8);
507   4       CALL WRITE(@AP_ALT,LENGTH(AP_ALT));
508   4       NOBYTES = READ(@BUFFER,7);

          /*  CHECK FOR Q  */
509   4       IF (BUFFER(0) = 'Q' OR BUFFER(0) = '4') THEN DO;
511   5           BUFFER(0) = ' ';
512   5           RETURN;
513   5           END;

          /*  CHECK FOR CARRIAGE RETURN  */
514   4       IF (BUFFER(0) <> CR) THEN DO;

516   5       J = BUFFER(0) - 31H;
517   5       IF (J >= 0 AND J < 3) THEN DO;
519   6       CALL WRITE(@AP_NV,LENGTH(AP_NV));
520   6       NOBYTES = READ(@BUFFER,8);
521   6       IF (BUFFER(0) <> CR) THEN DO;

523   7       DO CASE J;
524   8           DO;
525   9           CALL IN_GRAD(@BUFFER,@K);
526   9           IF (K <> 0) THEN
527   9               FEATURE_OFFSETS(TPROD_PTR).PT1_THRESH = K;
528   9           END;
529   8           DO;
530   9           CALL IN_GRAD(@BUFFER,@K);
531   9           IF (K <> 0) THEN
532   9               FEATURE_OFFSETS(TPROD_PTR).PT2_THRESH = K;
533   9           END;
534   8           DO;
535   9           CALL ASC$WRD(@BUFFER,@K);
536   9           FEATURE_OFFSETS(TPROD_PTR).FEATURE = K;
537   9           END;
538   8           END; /* DO CASE J */
539   7       END;
540   6       ELSE BUFFER(0) = ' ';
541   6       END;
542   5       ELSE BUFFER(0) = ' ';
543   5   END;
544   4   ELSE BUFFER(0) = ' ';
545   4   END;
546   3   END;
547   2   END ALT_F1_PARAM;

          $EJECT
```

```
548  1   ALT_F2_PARAM: PROCEDURE PUBLIC;
549  2   DCL (I,K)        WORD;
550  2   DCL J            BYTE;

551  2   DO;
552  3       BUFFER(0) = ' ';
553  3       DO WHILE (BUFFER(0) <> 'Q');
554  4       CALL WRITE(@AP_MENU_5,LENGTH(AP_MENU_5));
555  4       I = DOUBLE(LOW(FEATURE_OFFSETS(TPROD_PTR + 20).PT1_THRESH));
556  4       CALL WRD$ASC(@BUFFER,@I);
557  4       BUFFER(0) = HIGH(FEATURE_OFFSETS(TPROD_PTR + 20).PT1_THRESH);
558  4       CALL WRITE(@(SET_CUR,22H,3AH),4);
559  4       CALL WRITE(@BUFFER,8);
560  4       I = DOUBLE(LOW(FEATURE_OFFSETS(TPROD_PTR + 20).PT2_THRESH));
561  4       CALL WRD$ASC(@BUFFER,@I);
562  4       BUFFER(0) = HIGH(FEATURE_OFFSETS(TPROD_PTR + 20).PT2_THRESH);
563  4       CALL WRITE(@(SET_CUR,23H,3AH),4);
564  4       CALL WRITE(@BUFFER,8);
565  4       I = FEATURE_OFFSETS(TPROD_PTR + 20).FEATURE;
566  4       CALL WRD$ASC(@BUFFER,@I);
567  4       CALL WRITE(@(SET_CUR,24H,3AH),4);
568  4       CALL WRITE(@BUFFER,8);
569  4       CALL WRITE(@AP_ALT,LENGTH(AP_ALT));
570  4       NOBYTES = READ(@BUFFER,7);

         /*  CHECK FOR Q  */
571  4       IF (BUFFER(0) = 'Q' OR BUFFER(0) = '4') THEN DO;
573  5           BUFFER(0) = ' ';
574  5           RETURN;
575  5       END;

         /*  CHECK FOR CARRIAGE RETURN  */
576  4       IF (BUFFER(0) <> CR) THEN DO;

578  5       J = BUFFER(0) - 31H;
579  5       IF (J >= 0 AND J < 3) THEN DO;
581  6       CALL WRITE(@AP_NV,LENGTH(AP_NV));
582  6       NOBYTES = READ(@BUFFER,8);
583  6       IF (BUFFER(0) <> CR) THEN DO;

585  7       DO CASE J;
586  8           DO;
587  9           CALL IN_GRAD(@BUFFER,@K);
588  9           IF (K <> 0) THEN
589  9               FEATURE_OFFSETS(TPROD_PTR + 20).PT1_THRESH = K;
590  9           END;
591  8           DO;
592  9           CALL IN_GRAD(@BUFFER,@K);
593  9           IF (K <> 0) THEN
594  9               FEATURE_OFFSETS(TPROD_PTR + 20).PT2_THRESH = K;
595  9           END;
596  8           DO;
597  9           CALL ASC$WRD(@BUFFER,@K);
598  9           FEATURE_OFFSETS(TPROD_PTR + 20).FEATURE = K;
599  9           END;
600  8           END; /* DO CASE J */
601  7       END;
602  6       ELSE BUFFER(0) = ' ';
603  6       END;
604  5       ELSE BUFFER(0) = ' ';
605  5   END;
606  4   ELSE BUFFER(0) = ' ';
607  4   END;
608  3   END;
609  2   END ALT_F2_PARAM;


610  1   IN_GRAD: PROCEDURE(BUFF_PTR,GRAD_PTR)PUBLIC;
611  2       DCL BUFF_PTR         POINTER;
612  2       DCL GRAD_PTR         POINTER;
613  2       DCL (BUFFER BASED BUFF_PTR) (8) BYTE;
614  2       DCL EGRAD BASED GRAD_PTR    WORD;
615  2       DCL TEMP             WORD;
616  2   DO;
617  3       IF (BUFFER(0) = '-' OR BUFFER(0) = '\') THEN DO;
619  4           TEMP = DOUBLE(BUFFER(0));
620  4           TEMP = SHL(TEMP,8);
621  4           BUFFER(0) = ' ';
622  4           END;
623  3           ELSE TEMP = 02B00H;
624  3       CALL ASC$WRD(@BUFFER,@EGRAD);
625  3       IF (EGRAD > 0 AND EGRAD < 64) THEN DO;
627  4       EGRAD = EGRAD OR TEMP;
628  4       END;
629  3       ELSE EGRAD = 0;
630  3       END;
631  2   END IN_GRAD;
```

```
632   1        END ALTER_PARAM_MODULE;


MODULE INFORMATION:

     CODE AREA SIZE      = 0FE8H   4072D
     CONSTANT AREA SIZE = 0436H   1078D
     VARIABLE AREA SIZE = 004AH     74D
     MAXIMUM STACK SIZE = 0014H     20D
     860 LINES READ
     0 PROGRAM WARNINGS
     0 PROGRAM ERRORS

DICTIONARY SUMMARY:

     47KB MEMORY AVAILABLE
     15KB MEMORY USED   (31%)
     0KB DISK SPACE USED

END OF PL/M-86 COMPILATION

iRMX 86 PL/M-86 V2.3 COMPILATION OF MODULE TERMINAL_HANDLER_MODULE
OBJECT MODULE PLACED IN SOURCE/TERMHAND.OBJ
COMPILER INVOKED BY:  :LANG:PLM86 SOURCE/TERMHAND.PLM OPTIMIZE(3) ROM SET(TARGET=1)


               $INCLUDE(SOURCE/COPYRIGHT)
          =    /*

          =    *****************************************************************************
          =    *                                                                           *
          =    *                                                                           *
          =    *                    COPYRIGHT CHESEBROUGH-POND'S INC.                      *
          =    *                                                                           *
          =    *                    (c) 1983, CHESEBROUGH-POND'S INC.                      *
          =    *                                                                           *
          =    *                                                                           *
          =    *                                                                           *
          =    *                                                                           *
          =    *      ALL RIGHTS RESERVED. NO PART OF THIS PROGRAM MAY BE REPRODUCED,      *
          =    *      TRANSMITTED, TRANSCRIBED, STORED IN A RETRIEVAL SYSTEM, OR           *
          =    *      TRANSLATED INTO ANY LANGUAGE OR COMPUTER LANGUAGE, IN ANY FORM       *
          =    *      OR BY ANY MEANS, ELECTRONIC, MECHANICAL, MAGNETIC, OPTICAL,          *
          =    *      CHEMICAL, MANUAL OR OTHERWISE, WITHOUT THE EXPRESS WRITTEN PER-      *
          =    *      MISSION OF CHESEBROUGH-POND'S INC., 33 BENEDICT PLACE, GREENWICH,    *
          =    *      CONNECTICUT.                                                         *
          =    *                                                                           *
          =    *                                                                           *
          =    *****************************************************************************

          =    */
               $TITLE('TERMINAL HANDLER MODULE')
  1            TERMINAL_HANDLER_MODULE:
               DO;
  2   1        DECLARE DCL LITERALLY 'DECLARE';
  3   1        DECLARE LIT LITERALLY 'LITERALLY';

               /* DECLARE USART INITIALIZATION PARAMETERS */

  4   1            DCL      BAUD     LIT      '64';
  5   1            DCL      CDATA    LIT      '0D8H';
  6   1            DCL      TCMD     LIT      '0D6H';
  7   1            DCL      CSTS     LIT      '0DAH';
  8   1            DCL      CR       LIT      '0DH';
  9   1            DCL      LF       LIT      '0AH';
 10   1            DCL (I,J,K,L)     WORD;
 11   1            DCL      EOB      LIT      '07EH';
 12   1            DCL      TEST_MASK_1      LIT      '01H';
 13   1            DCL      TEST_MASK_2      LIT      '02H';
 14   1            DCL      TEST_MASK_3      LIT      '080H';
 15   1            DCL      TEST     BYTE;
 16   1            DCL      IN_CHAR  BYTE;
 17   1            DCL      DEL              LIT      '07FH';
 18   1            DCL      ASCII_MASK       LIT      '7FH';
 19   1            DCL      BS               LIT      '08H';
 20   1            DCL      SPACE            LIT      '20H';
               /* USART INITIALIZATION  */

 21   1        INIT_USART: PROCEDURE PUBLIC;
 22   2        WAIT_DEL: PROCEDURE;
 23   3        DO;
 24   4            DO I = 1 TO 512;
 25   5            END;
 26   4            END;
 27   3        END WAIT_DEL;
               /* INITIALIZATION STARTS HERE */
```

```
2        DO;
3            OUTPUT(CSTS) = 00H;
3            CALL WAIT_DEL;
3            OUTPUT(CSTS) = 00H;
3            CALL WAIT_DEL;
3            OUTPUT(CSTS) = 00H;
3            CALL WAIT_DEL;
3            OUTPUT(CSTS) = 00H;
3            CALL WAIT_DEL;
3            OUTPUT(CSTS) = 040H;
3            CALL WAIT_DEL;
3            OUTPUT(CSTS) = 04EH;
3            CALL WAIT_DEL;
3            OUTPUT(CSTS) = 037H;
3            CALL WAIT_DEL;
3            OUTPUT(TCMD) = 0B6H;
3            J = BAUD;
3            OUTPUT(0D4H) = LOW(J);
3            OUTPUT(0D4H) = HIGH(J);
3            CALL WAIT_DEL;
3        END;
2        END INIT_USART;


1        WRITE: PROCEDURE(BUFFER_PTR,BLENGTH) PUBLIC;
2                DCL      BUFFER_PTR   POINTER;
2                DCL      BLENGTH      WORD;
2                DCL      (BUFFER BASED BUFFER_PTR) (256) BYTE;
2        DO;
3            DO J = 0 TO BLENGTH -1;
4                DO WHILE (TEST_MASK_1 AND INPUT(CSTS)) = 0;
5                END;
4                OUTPUT(CDATA) = BUFFER(J);
4                END;
3            END;
2        END WRITE;

1        READ: PROCEDURE(BUFFER_PTR,BLENGTH)WORD PUBLIC;
2                DCL      BUFFER_PTR   POINTER;
2                DCL      BLENGTH      WORD;
2                DCL      (BUFFER BASED BUFFER_PTR) (256) BYTE;
2        DO;
3            J = 0;
3            IN_CHAR = ' ';
3            DO WHILE ((IN_CHAR <> CR) AND (J<= BLENGTH) AND (J>= 0));
4                DO WHILE (TEST_MASK_2 AND INPUT(CSTS)) = 0;
5                END;
4                IN_CHAR =ASCII_MASK AND INPUT(CDATA);

         /* ECHO CHARACTER BACK TO TERMINAL */

4                DO WHILE (TEST_MASK_1 AND INPUT(CSTS)) = 0;
5                    END;
4                OUTPUT(CDATA) = IN_CHAR;

         /* CHECK FOR DELETE */

4                IF IN_CHAR <> BS THEN
4                   DO;
5                   BUFFER(J) = IN_CHAR;
5                   J = J + 1;
5                END;
4                ELSE DO;

5                    IF (J-1) >= 0 THEN
5                    DO;
6                        J=J-1;

6                        DO WHILE (TEST_MASK_1 AND INPUT(CSTS)) = 0;
7                         END;
6                        OUTPUT(CDATA)=SPACE;

6                        DO WHILE (TEST_MASK_1 AND INPUT(CSTS)) = 0;
7                        END;
6                        OUTPUT(CDATA)=BS;
6                    END;
5                END;

4            END; /* DO WHILE IN_CHAR */
3        END;
2        RETURN J;
2        END READ;
1        END TERMINAL_HANDLER_MODULE;
```

```
MODULE INFORMATION:

     CODE AREA SIZE     = 0102H    258D
     CONSTANT AREA SIZE = 0000H      0D
     VARIABLE AREA SIZE = 000AH     10D
     MAXIMUM STACK SIZE = 0008H      8D
     146 LINES READ
     0 PROGRAM WARNINGS
     0 PROGRAM ERRORS

DICTIONARY SUMMARY:

     47KB MEMORY AVAILABLE
     4KB MEMORY USED   (8%)
     0KB DISK SPACE USED
END OF PL/M-86 COMPILATION


RMX 86 PL/M-86 V2.3 COMPILATION OF MODULE GRAD_PROFILE_MODULE
OBJECT MODULE PLACED IN SOURCE/GRAD_PROF.OBJ
COMPILER INVOKED BY:   :LANG:PLM86 SOURCE/GRAD_PROF.PLM OPTIMIZE(3) ROM SET(TARGET=1)


              $INCLUDE(SOURCE/COPYRIGHT)
          =   /*

          =   ***********************************************************************
          =   *                                                                     *
          =   *                                                                     *
          =   *                 COPYRIGHT CHESEBROUGH-POND'S INC.                   *
          =   *                                                                     *
          =   *                 (c) 1983, CHESEBROUGH-POND'S INC.                   *
          =   *                                                                     *
          =   *                                                                     *
          =   *                                                                     *
          =   *                                                                     *
          =   *      ALL RIGHTS RESERVED. NO PART OF THIS PROGRAM MAY BE REPRODUCED,*
          =   *      TRANSMITTED, TRANSCRIBED, STORED IN A RETRIEVAL SYSTEM, OR     *
          =   *      TRANSLATED INTO ANY LANGUAGE OR COMPUTER LANGUAGE, IN ANY FORM *
          =   *      OR BY ANY MEANS, ELECTRONIC, MECHANICAL, MAGNETIC, OPTICAL,    *
          =   *      CHEMICAL, MANUAL OR OTHERWISE, WITHOUT THE EXPRESS WRITTEN PER-*
          =   *      MISSION OF CHESEBROUGH-POND'S INC., 33 BENEDICT PLACE, GREENWICH,*
          =   *      CONNECTICUT.                                                   *
          =   *                                                                     *
          =   *                                                                     *
          =   ***********************************************************************


          =   */

              $TITLE('LIB PROGRAM TO COMPUTE AND DISPLAY GRADIENT PROFILE')
  1           GRAD_PROFILE_MODULE:
              DO;
              $INCLUDE(SOURCE/DCL)
  2   1   =   DECLARE     DCL     LITERALLY    'DECLARE';
  3   1   =   DECLARE     LIT     LITERALLY    'LITERALLY';
              $INCLUDE(SOURCE/DATADCL2)
  4   1   =   DCL     CAMERA_ON        LIT '03H';
  5   1   =   DCL     CAMERA_OFF       LIT '00H';
  6   1   =   DCL     DATA_REG         LIT '10H';
  7   1   =   DCL     COMMD_REG        LIT '13H';
  8   1   =   DCL     HOZ_ADD_LO       LIT '14H';
  9   1   =   DCL     HOZ_ADD_HI       LIT '15H';
 10   1   =   DCL     VERT_ADD         LIT '16H';
 11   1   =   DCL     POST_INC_WRITE   LIT '02H';
 12   1   =   DCL     POST_INC_READ    LIT '01H';
 13   1   =   DCL     SET_HI_BIT       LIT 'DO; OUTPUT(15H)=1; OUTPUT(25H)=1; END; ';
 14   1   =   DCL     CLR_HI_BIT       LIT 'DO; OUTPUT(15H)=0; OUTPUT(25H)=0; END; ';

 15   1       GRAD_PROFILE:
                  PROCEDURE(CURSOR_TABLE, IMAGE_PTR, SIZE_PTR)          PUBLIC;
 16   2           DCL     CURSOR_TABLE          POINTER;
 17   2           DCL     IMAGE_PTR                   POINTER,
 18   2           DCL     SIZE_PTR                    POINTER;
 19   2           DCL (CURSOR_CORD BASED CURSOR_TABLE)(24) WORD;
 20   2           DCL     IMAGE BASED IMAGE_PTR             WORD;
 21   2           DCL     SIZE  BASED SIZE_PTR              WORD;
 22   2           DCL     (I, J)                WORD;
 23   2           DCL (ROW1, ROW2, COL1, COL2)  WORD;
 24   2           DCL     ADJ_IP                BYTE;
 25   2           DCL     START_DISP            WORD;
 26   2           DCL     GRAD                  INTEGER;


              /*      DETERMINE IMAGE ADDRESS      */
```

```
 27   2        IMAGE=SHR(IMAGE,2);
 28   2        IF IMAGE =0 THEN ADJ_IP=10H;
 30   2                    ELSE ADJ_IP=0;

           /*      READ CURSOR CORDINATES        */

 31   2        ROW1=CURSOR_CORD(IMAGE);
 32   2        ROW2=CURSOR_CORD(IMAGE+2);
 33   2        COL1=CURSOR_CORD(IMAGE+1);
 34   2        COL2=CURSOR_CORD(IMAGE+3);

           /*      ADJUST INDEX POLARITY         */

 35   2        IF ROW1> ROW2 THEN
 36   2        DO;
 37   3            I=ROW1;
 38   3            ROW1=ROW2;
 39   3            ROW2=I;
 40   3        END;

 41   2        IF COL1> COL2 THEN
 42   2        DO;
 43   3            I=COL1;
 44   3            COL1=COL2;
 45   3            COL2=I;
 46   3        END;

           /*      DETERMINE DIRECTION OF PROFILE        */

 47   2        IF COL1-COL2 <> 0 THEN
 48   2        DO;
                   /* HORIZONTAL PROFILE */

                   /* DETERMINE LOCATION OF DISPLAY */

 49   3            IF ROW1>120 THEN START_DISP=75;
 51   3                        ELSE START_DISP=165;

                   /* DRAW AND MARK AXIS    */

 52   4            IF COL1>255 THEN SET_HI_BIT
 57   3                        ELSE CLR_HI_BIT;
 62   3            OUTPUT(HOZ_ADD_LO +IMAGE)=LOW(COL1);
 63   3            DO I=START_DISP-35 TO START_DISP +35 BY 5;
 64   4                OUTPUT(VERT_ADD +IMAGE)=LOW(I);
 65   4                DO J= COL1-1 TO COL1 +1;
 66   6                    IF J>255     THEN SET_HI_BIT
 71   5                                 ELSE CLR_HI_BIT;
 76   5                    OUTPUT(HOZ_ADD_LO +IMAGE)=LOW(J);
 77   5                    OUTPUT(DATA_REG +IMAGE)=63;
 78   5                END;
 79   4            END;

                   /* COMPUTE GRADIENT      */

 80   3            DO I=COL1 TO COL2;
 81   4                OUTPUT(VERT_ADD +ADJ_IP)=LOW(ROW1);
 82   5                IF I+SIZE> 255  THEN SET_HI_BIT
 87   4                                ELSE CLR_HI_BIT;
 92   4                OUTPUT(HOZ_ADD_LO+ADJ_IP)=LOW(I) + LOW(SIZE);
 93   4                GRAD=INT(INPUT(DATA_REG +ADJ_IP));
 94   5                IF I-SIZE > 255 THEN SET_HI_BIT
 99   4                                ELSE CLR_HI_BIT;
104   4                OUTPUT(HOZ_ADD_LO +ADJ_IP)=LOW(I)-LOW(SIZE);
105   4                GRAD=GRAD- INT(INPUT(DATA_REG+ADJ_IP));

                       /* DISPLAY EVALUATION POINT      */

106   5                IF I>255     THEN SET_HI_BIT
111   4                             ELSE CLR_HI_BIT;
116   4                OUTPUT(HOZ_ADD_LO +IMAGE)=LOW(I);
117   4                OUTPUT(VERT_ADD +IMAGE)=LOW(ROW1);
118   4                OUTPUT(DATA_REG +IMAGE)=63;

                       /*  DISPLAY  PROFILE          */

119   4                Dº J= START_DISP - 35 TO START_DISP;
120   5                    OUTPUT(VERT_ADD+IMAGE)=LOW(J);
121   5                    IF INT(START_DISP-J) > GRAD THEN OUTPUT(DATA_REG+IMAGE)=0;
123   5                                             ELSE OUTPUT(DATA_REG+IMAGE)=63;
124   5                END;

125   4                DO J= START_DISP TO START_DISP +35;
126   5                    OUTPUT(VERT_ADD +IMAGE)=LOW(J);
127   5                    IF INT(J-START_DISP) < -(GRAD)  THEN OUTPUT(DATA_REG+IMAGE)=63;
129   5                                                 ELSE OUTPUT(DATA_REG+IMAGE)=0;
130   5                END;
131   4            END;
```

```
132   3          END;
133   2          ELSE DO;

                     /*      VERTICAL PROFILE          */
                     /*      DETERMINE LOCATION OF DISPALY    */

134   3              IF COL1>160 THEN START_DISP=75;
136   3                          ELSE START_DISP=245;


                     /*      DRAW AND MARK AXIS        */
137   3              OUTPUT(VERT_ADD +IMAGE)=LOW(ROW1);
138   3              DO I =START_DISP -35 TO START_DISP + 35 BY 5;
139   5                  IF I >255    THEN SET_HI_BIT
144   4                               ELSE CLR_HI_BIT;
149   4                  OUTPUT(HOZ_ADD_LO +IMAGE)=LOW(I);
150   4                  DO J=ROW1 - 2 TO ROW1;
151   5                      OUTPUT(VERT_ADD +IMAGE)=LOW(J);
152   5                      OUTPUT(DATA_REG +IMAGE)=63;
153   5                  END;
154   4              END;

                     /*      COMPUTE GRADIENT          */

155   3              DO I=ROW1 TO ROW2;
156   5                  IF COL1>255 THEN SET_HI_BIT
161   4                               ELSE CLR_HI_BIT;
166   4                  OUTPUT(HOZ_ADD_LO +ADJ_IP)=LOW(COL1);
167   4                  OUTPUT(VERT_ADD +ADJ_IP)=LOW(I)+LOW(SIZE);
168   4                  GRAD=INT(INPUT(DATA_REG+ADJ_IP));
169   4                  OUTPUT(VERT_ADD +ADJ_IP)=LOW(I)-LOW(SIZE);
170   4                  GRAD=GRAD-INT(INPUT(DATA_REG +ADJ_IP));

                     /*      DISPLAY EVALUATION POINT         */

171   4                  OUTPUT(VERT_ADD+IMAGE)=LOW(I);
172   4                  OUTPUT(HOZ_ADD_LO +IMAGE)=LOW(COL1);
173   4                  OUTPUT(DATA_REG+IMAGE)=63;

                     /*           DISPLAY PROFILE              */

174   4                  DO J=START_DISP -35 TO START_DISP;
175   6                      IF J>255 THEN SET_HI_BIT
180   5                                ELSE CLR_HI_BIT;
185   5                      OUTPUT(HOZ_ADD_LO +IMAGE)=LOW(J);
186   5                      IF INT(START_DISP -J)> GRAD THEN OUTPUT(DATA_REG+IMAGE)=0;
188   5                                                ELSE OUTPUT(DATA_REG+IMAGE)=63;
189   5                  END;

190   4                  DO J=START_DISP TO START_DISP+35;
191   6                      IF J>255     THEN SET_HI_BIT
196   5                                   ELSE CLR_HI_BIT;
201   5                      OUTPUT(HOZ_ADD_LO +IMAGE)=LOW(J);
202   5                      IF INT(J - START_DISP)<-(GRAD)THEN OUTPUT(DATA_REG+IMAGE)=63;
204   5                                                ELSE OUTPUT(DATA_REG+IMAGE)=0;
205   5                  END;
206   4              END.

207   3              END;
208   2          END GRAD_PROFILE;
209   1      END GRAD_PROFILE_MODULE;


MODULE INFORMATION:

     CODE AREA SIZE      = 0441H    1089D
     CONSTANT AREA SIZE  = 0000H       0D
     VARIABLE AREA SIZE  = 0011H      17D
     MAXIMUM STACK SIZE  = 0014H      20D
     215 LINES READ
     0 PROGRAM WARNINGS
     0 PROGRAM ERRORS

DICTIONARY SUMMARY:

     47KB MEMORY AVAILABLE
     4KB MEMORY USED   (8%)
     0KB DISK SPACE USED

END OF PL/M-86 COMPILATION
```

```
iRMX 86 PL/M-86 V2.3 COMPILATION OF MODULE CNVRSN
OBJECT MODULE PLACED IN SOURCE/IWCONV.OBJ
COMPILER INVOKED BY:  :LANG:PLM86 SOURCE/IWCONV.PLM OPTIMIZE(3) ROM SET(TARGET=1)


              $INCLUDE(SOURCE/COPYRIGHT)
          =   /*

          =   ***************************************************************************
          =   *                                                                         *
          =   *                                                                         *
          =   *                   COPYRIGHT CHESEBROUGH-POND'S INC.                     *
          =   *                                                                         *
          =   *                   (c) 1983, CHESEBROUGH-POND'S INC.                     *
          =   *                                                                         *
          =   *                                                                         *
          =   *                                                                         *
          =   *                                                                         *
          =   *    ALL RIGHTS RESERVED. NO PART OF THIS PROGRAM MAY BE REPRODUCED,      *
          =   *    TRANSMITTED, TRANSCRIBED, STORED IN A RETRIEVAL SYSTEM, OR           *
          =   *    TRANSLATED INTO ANY LANGUAGE OR COMPUTER LANGUAGE, IN ANY FORM       *
          =   *    OR BY ANY MEANS, ELECTRONIC, MECHANICAL, MAGNETIC, OPTICAL,          *
          =   *    CHEMICAL, MANUAL OR OTHERWISE, WITHOUT THE EXPRESS WRITTEN PER-      *
          =   *    MISSION OF CHESEBROUGH-POND'S INC., 33 BENEDICT PLACE, GREENWICH,    *
          =   *    CONNECTICUT.                                                         *
          =   *                                                                         *
          =   *                                                                         *
          =   ***************************************************************************

          =   */

  1           CNVRSN: DO;

  2    1      ASC$WRD: PROCEDURE ( BUFF_PTR,NUM_PTR) PUBLIC;
  3    2          DECLARE     BUFF_PTR     POINTER,
                              NUM_PTR      POINTER;
  4    2          DECLARE     (BUFFER BASED BUFF_PTR)(8) BYTE;
  5    2          DECLARE     NUMBER BASED NUM_PTR WORD;
  6    2          DECLARE     (LENGTH,N,I)     WORD;
  7    2          DECLARE     WEIGHT (5) WORD DATA(1,10,100,1000,10000);

  8    2          DO;

              /* FIND END OF BUFFER */
  9    3                N = 0;
 10    3                DO WHILE BUFFER(N) <> ODH;
 11    4                N = N + 1;
 12    4                END;

 13    3                LENGTH = N - 1;
              /* CLEAR LEADING BLANKS */
 14    3              DO N = 0 TO LENGTH;
 15    4                IF BUFFER(N) = ' ' THEN BUFFER(N) = 30H;
 17    4                END;

              /* CONVERT TO WORD VALUE */
 18    3              NUMBER = 0;
 19    3              DO N = 0 TO LENGTH;
 20    4              NUMBER = NUMBER + (DOUBLE(BUFFER(LENGTH - N) - 30H) * WEIGHT(N));
 21    4              END;
 22    3          END;
 23    2      END ASC$WRD;


 24    1      ASC$INT: PROCEDURE ( BUFF_PTR,NUM_PTR) PUBLIC;
 25    2          DECLARE     BUFF_PTR     POINTER,
                              NUM_PTR      POINTER;
 26    2          DECLARE     (BUFFER BASED BUFF_PTR)(8) BYTE;
 27    2          DECLARE     INUMBER BASED NUM_PTR INTEGER;
 28    2          DECLARE     (I,J,K,TNUM)      WORD;
 29    2          DECLARE     SIGN              BYTE;

 30    2      DO;
 31    3          SIGN = '+';
 32    3      DO I = 0 TO 7;
 33    4          IF BUFFER(I) = '-' THEN
 34    4          DO;
 35    5              SIGN = '-';
 36    5              BUFFER(I) = 30H;
 37    5          END;
 38    4          IF BUFFER(I) = '+' THEN BUFFER(I) = 30H;
 40    4      END;
 41    3          CALL ASC$WRD(@BUFFER,@TNUM);
 42    3          INUMBER = INT(TNUM);
 43    3          IF SIGN = '-' THEN INUMBER = -(INUMBER);
 45    3      END;
 46    2      END ASC$INT;
```

```
WRD$ASC: PROCEDURE ( BUFF_PTR, NUM_PTR) PUBLIC;
    DECLARE      BUFF_PTR     POINTER,
                 NUM_PTR      POINTER;
    DECLARE      (BUFFER BASED BUFF_PTR)(8) BYTE;
    DECLARE      NUMBER BASED NUM_PTR WORD;
    DECLARE      (XNUM, TNUM, N) WORD;
    DECLARE      WEIGHT (5) WORD DATA(10000, 1000, 100, 10, 1);

    DO;
        DO N = 0 TO 7;  /* CLEAR BUFFER */
        BUFFER(N) = ' ';
        END;
/* CONVERT TO ASCII */
        XNUM = NUMBER;
        DO N = 0 TO 4;
        TNUM = XNUM / WEIGHT(N);
        BUFFER(N + 2) = TNUM + 030H;
        XNUM = XNUM - TNUM * WEIGHT(N);
        END;
/* BLANK LEADING ZEROS  */
        N = 2;
        DO WHILE (BUFFER(N) = 30H AND N < 6);
        BUFFER(N) = 020H;
        N = N + 1;
        END;
    END;
END WRD$ASC;

/* ****************************************************************

    THIS ROUTINE CONVERTS A BINARY VALUE (BYTE OR ADDRESS) TO AN
    ASCII CHARACTER STRING THAT REPRESENTS THE VALUE OF THE NUMBER
    IN A SPECIFIED BASE.

    VALUE   THE BINARY NUMBER TO BE CONVERTED
    BASE    THE RADIX OR 'BASE', 2, 8, 10 OR 16
    LC  THE LEFT FILL CHARACTER
    BUFADR  ADDRESS OF THE OUTPUT FIELD
    WIDTH   THE WIDTH OF THE OUTPUT FIELD

***************************************************************** */

DWRD$ASC: PROCEDURE(BUFFPTR, NUMPTR) PUBLIC;

DECLARE BUFFPTR      POINTER;
DECLARE NUMPTR       POINTER;
DECLARE (CHARS BASED BUFFPTR) (10) BYTE;
DECLARE VALUE BASED NUMPTR  DWORD;
DECLARE BASE         WORD;
DECLARE DBASE        WORD;
DECLARE LC           BYTE;
DECLARE WIDTH        WORD;
DECLARE I            WORD;
DECLARE DIGITS (*)       BYTE     DATA     ('0123456789ABCDEF');

DO;
    BASE = 10;
    WIDTH = 10;
    LC = ' ';

DO I = 1 TO WIDTH;
    DBASE = VALUE MOD 10;
    CHARS(WIDTH - I) = DIGITS(DBASE);
    VALUE=VALUE / BASE;
END;
I=0;
DO WHILE CHARS(I) = '0' AND I < WIDTH - 1;
    CHARS(I)=LC;
    I = I + 1;
END;
END;
END DWRD$ASC;


INT$ASC: PROCEDURE ( BUFF_PTR, NUM_PTR) PUBLIC;
    DECLARE      BUFF_PTR     POINTER,
                 NUM_PTR      POINTER;
    DECLARE      (BUFFER BASED BUFF_PTR)(8) BYTE;
    DECLARE      INUMBER BASED NUM_PTR INTEGER;
    DECLARE      (I, J, TNUM)        WORD;
    DECLARE      SIGN                BYTE;
DO;
    IF INUMBER < 0 THEN SIGN = '-';
        ELSE SIGN = '+';
    TNUM = UNSIGN(IABS(INUMBER));
    CALL WRD$ASC(@BUFFER, @TNUM);
    BUFFER(0) = SIGN;
END;
END INT$ASC;
```

```
112   1      HEX$BYTE: PROCEDURE(BYTE$PTR,BUF$PTR) PUBLIC ;
113   2        DECLARE(BYTE$PTR,BUF$PTR) POINTER;
114   2        DECLARE BYTE$VALUE BASED BYTE$PTR BYTE;
115   2        DECLARE (FIELD BASED BUF$PTR)(2) BYTE;
116   2        DECLARE N                          INTEGER;
117   2      DO N = 0 TO 1;
118   3       IF FIELD(N) < 03AH THEN
119   3          FIELD(N) = FIELD(N) - 030H;
120   3        ELSE  FIELD(N) = FIELD(N) - 037H;
121   3      END;
122   2      BYTE$VALUE = (FIELD(0)* 16 + FIELD(1));
123   2      RETURN;
124   2      END HEX$BYTE;

125   1      BYTE$HEX: PROCEDURE(BYTE$PTR,BUF$PTR) PUBLIC ;
126   2        DECLARE (BYTE$PTR,BUF$PTR) POINTER;
127   2        DECLARE BYTE$VALUE BASED BYTE$PTR BYTE;
128   2        DECLARE (FIELD BASED BUF$PTR)(2) BYTE;
129   2        DECLARE (TEM1,TEM2)    BYTE;
130   2        TEM1 = BYTE$VALUE/16;
131   2        TEM2 = BYTE$VALUE- 16*TEM1;
132   2        IF TEM1 > 9 THEN FIELD(0) = TEM1 + 037H;
134   2        ELSE FIELD(0) = TEM1 + 030H;
135   2        IF TEM2 > 9 THEN FIELD(1) = TEM2 + 037H;
137   2        ELSE FIELD(1) = TEM2 + 030H;
138   2      RETURN;
139   2      END BYTE$HEX;
140   1      END CNVRSN;


MODULE INFORMATION:

     CODE AREA SIZE      = 02F8H     760D
     CONSTANT AREA SIZE = 0024H      36D
     VARIABLE AREA SIZE = 0029H      41D
     MAXIMUM STACK SIZE = 0016H      22D
     203 LINES READ
     0 PROGRAM WARNINGS
     0 PROGRAM ERRORS

DICTIONARY SUMMARY:

     47KB MEMORY AVAILABLE
     5KB MEMORY USED   (10%)
     0KB DISK SPACE USED
 END OF PL/M-86 COMPILATION

iRMX 86 PL/M-86 V2.3 COMPILATION OF MODULE LOCATOR_MODULE
OBJECT MODULE PLACED IN SOURCE/LOCATE.OBJ
COMPILER INVOKED BY:  :LANG:PLM86 SOURCE/LOCATE.PLM OPTIMIZE(3) ROM SET(TARGET=1)


             $INCLUDE(SOURCE/COPYRIGHT)
        =    /*

        =    ****************************************************************************
        =    *                                                                          *
        =    *                                                                          *
        =    *                    COPYRIGHT CHESEBROUGH-POND'S INC.                     *
        =    *                                                                          *
        =    *                    (c) 1983, CHESEBROUGH-POND'S INC.                     *
        =    *                                                                          *
        =    *                                                                          *
        =    *                                                                          *
        =    *                                                                          *
        =    *      ALL RIGHTS RESERVED. NO PART OF THIS PROGRAM MAY BE REPRODUCED,     *
        =    *      TRANSMITTED, TRANSCRIBED, STORED IN A RETRIEVAL SYSTEM, OR          *
        =    *      TRANSLATED INTO ANY LANGUAGE OR COMPUTER LANGUAGE, IN ANY FORM      *
        =    *      OR BY ANY MEANS, ELECTRONIC, MECHANICAL, MAGNETIC, OPTICAL,         *
        =    *      CHEMICAL, MANUAL OR OTHERWISE, WITHOUT THE EXPRESS WRITTEN PER-     *
        =    *      MISSION OF CHESEBROUGH-POND'S INC., 33 BENEDICT PLACE, GREENWICH,   *
        =    *      CONNECTICUT.                                                        *
        =    *                                                                          *
        =    *                                                                          *
        =    ****************************************************************************


        =    */

             $TITLE(' PACKAGE LOCATOR ALGORITHM')
   1         LOCATOR_MODULE:
             DO;

             /* EXTERNAL DECLARATIONS  */
```

```
              $INCLUDE(SOURCE/DECLARE.EXT)
2    1   =    DECLARE      DCL      LITERALLY    'DECLARE';
3    1   =    DECLARE      LIT      LITERALLY    'LITERALLY';
4    1        EDGE_GRADIENT: PROCEDURE(IMAGE_PTR,FUNCTION_PTR,ST_ROW_PTR,ST_COL_PTR,
                                  THRESHOLD_PTR,MAX_COUNT_PTR,GRAD_COUNT_PTR,
                                  EXCEP_PTR) EXTERNAL;
5    2            DCL      IMAGE_PTR        POINTER,
                           FUNCTION_PTR     POINTER,
                           ST_ROW_PTR       POINTER,
                           ST_COL_PTR       POINTER,
                           THRESHOLD_PTR    POINTER,
                           MAX_COUNT_PTR    POINTER,
                           GRAD_COUNT_PTR   POINTER,
                           EXCEP_PTR        POINTER;
6    2        END; /*EDGEGRAD*/

7    1        DCL PROD_NAM_TBL (20) STRUCTURE(NAM_BUFFER(20) BYTE) EXTERNAL;

               $INCLUDE(SOURCE/OFFSETS.LIB)
         =     $SAVE
         =     $NOLIST

16   1         DCL PROD_PTR          WORD EXTERNAL;
17   1         DCL LABEL_FLAG        BYTE EXTERNAL;
18   1         DCL FEATURE_INDEX     WORD EXTERNAL;

               /* VARIABLE DECLARATIONS */
19   1         DCL START_ROW         WORD;
20   1         DCL START_COLL        WORD;
21   1         DCL LOOP_COUNT        WORD;
22   1         DCL DONE_FLAG         WORD;
23   1         DCL OLD_ROW           WORD;
24   1         DCL OLD_COLL          WORD;
25   1         DCL ROW_COUNT         WORD;
26   1         DCL COL_COUNT         WORD;
27   1         DCL CENTER_ELEV       WORD;
28   1         DCL LEFT_ELEV         WORD;
29   1         DCL RIGHT_ELEV        WORD;
30   1         DCL LEFT_EDGE         WORD;
31   1         DCL RIGHT_EDGE        WORD;
32   1         DCL MAX_COUNT         WORD;
33   1         DCL GRAD_COUNT        WORD;
34   1         DCL VERT_CL           WORD;
35   1         DCL PACK_WIDTH        WORD;
36   1         DCL (I,J,K,L)         WORD;
37   1         DCL GRADIENT          WORD;
38   1         DCL EDGE1             WORD;
39   1         DCL EDGE2             WORD;
40   1         DCL EDGE3             WORD;
41   1         DCL EDGE4             WORD;
42   1         DCL EDGE5             WORD;
43   1         DCL EDGE6             WORD;
44   1         DCL HOZ_FLAG          INTEGER;
45   1         DCL VER_FLAG          INTEGER;
46   1         DCL ORIENT            BYTE;
47   1         DCL D_INCR            BYTE;
48   1         DCL D_GRAD            BYTE;
49   1         DCL D_TRK             BYTE;
50   1         DCL GFUNCT            BYTE;
51   1         DCL IMG_PLN           BYTE;
52   1         DCL EXCEP             BYTE;
53   1         DCL GRAD_THRESH       BYTE;
54   1         DCL TGRAD             BYTE;
55   1         DCL HOZ_TRK           LIT      '00H';
56   1         DCL VERT_TRK          LIT      '04H';
57   1         DCL COUNT_G           LIT      '08H';
58   1         DCL INCREMENT         LIT      '010H';
59   1         DCL SIG_INCR          LIT      '050H';
60   1         DCL NEG_INCR          LIT      '080H';
61   1         DCL POS_GRAD          LIT      '01H';
62   1         DCL NEG_GRAD          LIT      '02H';
63   1         DCL ABS_GRAD          LIT      '03H';

               $EJECT

64   1         LOC_PACKAGE:   PROCEDURE PUBLIC;

65   2         DO;       /*  LOCATE PACKAGE HORIZONTALLY  */

               /* GET STARTING ROW AND COLLUMN ADDRESSES FROM PKG_OFFSETS */

66   3         START_ROW = PKG_OFFSETS(PROD_PTR).HOZ_ST_ELEV;
67   3         START_COLL = PKG_OFFSETS(PROD_PTR).HOZ_ST_LEFT;
68   3         MAX_COUNT = 160;

               /* DETERMINE DATACUBE ADDRESS */

69   3             IF LABEL_FLAG = 0 THEN IMG_PLN = 010H;
71   3                 ELSE IMG_PLN = 020H;
```

```
/*  FIND LEFT PACKAGE EDGE  */
IF HIGH(PKG_OFFSETS(PROD_PTR).HOZ_GRAD_LEFT) = '-' THEN TGRAD = NEG_GRAD;
IF HIGH(PKG_OFFSETS(PROD_PTR).HOZ_GRAD_LEFT) = '+' THEN TGRAD = POS_GRAD;
IF HIGH(PKG_OFFSETS(PROD_PTR).HOZ_GRAD_LEFT) = '\' THEN TGRAD = ABS_GRAD;
GRAD_THRESH = LOW(PKG_OFFSETS(PROD_PTR).HOZ_GRAD_LEFT);

GFUNCT = INCREMENT OR HOZ_TRK OR TGRAD;
CALL EDGE_GRADIENT(@IMG_PLN,@GFUNCT,@START_ROW,@START_COLL,@GRAD_THRESH,
             @MAX_COUNT,@GRAD_COUNT,@EXCEP);
LEFT_EDGE = START_COLL;

/*  FIND RIGHT EDGE  */
IF HIGH(PKG_OFFSETS(PROD_PTR).HOZ_GRAD_RIGHT) = '-' THEN TGRAD = NEG_GRAD;
IF HIGH(PKG_OFFSETS(PROD_PTR).HOZ_GRAD_RIGHT) = '+' THEN TGRAD = POS_GRAD;
IF HIGH(PKG_OFFSETS(PROD_PTR).HOZ_GRAD_RIGHT) = '\' THEN TGRAD = ABS_GRAD;
GRAD_THRESH = LOW(PKG_OFFSETS(PROD_PTR).HOZ_GRAD_RIGHT);
START_COLL = PKG_OFFSETS(PROD_PTR).HOZ_ST_RIGHT;
GFUNCT = NEG_INCR OR INCREMENT OR HOZ_TRK OR TGRAD;

CALL EDGE_GRADIENT(@IMG_PLN,@GFUNCT,@START_ROW,@START_COLL,@GRAD_THRESH,
             @MAX_COUNT,@GRAD_COUNT,@EXCEP);

RIGHT_EDGE = START_COLL;

/*  COMPUTE PACKAGE CENTERLINE  */
WORK_TABLE(LABEL_FLAG).PACKAGE_CENTER = (LEFT_EDGE + RIGHT_EDGE) / 2;

/*  COMPUTE PACKAGE WIDTH  */
WORK_TABLE(LABEL_FLAG).PACKAGE_WIDTH = RIGHT_EDGE - LEFT_EDGE;


/*  LOCATE VERTICAL REFERENCE EDGE  */
IF HIGH(PKG_OFFSETS(PROD_PTR).VERT_GRAD_LEFT) = '-' THEN TGRAD = NEG_GRAD;
IF HIGH(PKG_OFFSETS(PROD_PTR).VERT_GRAD_LEFT) = '+' THEN TGRAD = POS_GRAD;
IF HIGH(PKG_OFFSETS(PROD_PTR).VERT_GRAD_LEFT) = '\' THEN TGRAD = ABS_GRAD;
GRAD_THRESH = LOW(PKG_OFFSETS(PROD_PTR).VERT_GRAD_LEFT);
MAX_COUNT = 120;

/*  LOCATE LEFT END VERTICAL REFERENCE EDGE  */

START_ROW = PKG_OFFSETS(PROD_PTR).VERT_ST_ELEL;
START_COLL = UNSIGN(INT(WORK_TABLE(LABEL_FLAG).PACKAGE_CENTER)-PKG_OFFSETS(PROD_PTR)
             VERT_ST_LEFT);
GFUNCT = INCREMENT OR VERT_TRK OR TGRAD;
CALL EDGE_GRADIENT(@IMG_PLN,@GFUNCT,@START_ROW,@START_COLL,@GRAD_THRESH,
             @MAX_COUNT,@GRAD_COUNT,@EXCEP);
LEFT_ELEV = START_ROW;

/*  LOCATE RIGHT END VERTICAL REFERENCE EDGE  */
IF HIGH(PKG_OFFSETS(PROD_PTR).VERT_GRAD_RIGHT) = '-' THEN TGRAD = NEG_GRAD;
IF HIGH(PKG_OFFSETS(PROD_PTR).VERT_GRAD_RIGHT) = '+' THEN TGRAD = POS_GRAD;
IF HIGH(PKG_OFFSETS(PROD_PTR).VERT_GRAD_RIGHT) = '\' THEN TGRAD = ABS_GRAD;
GRAD_THRESH = LOW(PKG_OFFSETS(PROD_PTR).VERT_GRAD_RIGHT);
START_ROW = PKG_OFFSETS(PROD_PTR).VERT_ST_ELER;
START_COLL = UNSIGN(INT(WORK_TABLE(LABEL_FLAG).PACKAGE_CENTER) - PKG_OFFSETS(PROD_PTR)
             VERT_ST_RIGHT);
GFUNCT = INCREMENT OR VERT_TRK OR TGRAD;
CALL EDGE_GRADIENT(@IMG_PLN,@GFUNCT,@START_ROW,@START_COLL,@GRAD_THRESH,
             @MAX_COUNT,@GRAD_COUNT,@EXCEP);
RIGHT_ELEV = START_ROW;

/*  STORE PARAMETERS FOR FURTHER EVALUATION  */
WORK_TABLE(LABEL_FLAG).PACKAGE_ELEV = (LEFT_ELEV + RIGHT_ELEV) / 2;

END;
END LOC_PACKAGE;

$EJECT

/*  CLOSURE LOCATOR PROCEDURE  */

LOC_CLOSURE: PROCEDURE PUBLIC;
DCL TEM1    INTEGER;
DCL TEM2    INTEGER;
DO;

/*  TEST FOR CLOSURE REQUIREMENTS  */

    IF ((CLOSURE_OFFSETS(PROD_PTR).CLOSURE_FLAG AND OFOH) <> 0) THEN
    DO;

/*  DETERMINE CLOSURE ORIENTATION  */

    IF ((CLOSURE_OFFSETS(PROD_PTR).CLOSURE_FLAG AND OFH) <> 0) THEN
    DO;
        ORIENT = OFH;
        D_TRK = VERT_TRK;
    END;
    ELSE
    DO;
```

```
135   5              ORIENT = 0;
136   5              D_TRK = 0;
137   5          END;

          /*  DETERMINE IMAGE PLANE  */

138   4          IF LABEL_FLAG = 0
139   4              THEN IMG_PLN = 010H;
140   4              ELSE IMG_PLN = 020H;
          /*  LOCATE POINT 1 EDGE  */

          /*  DETERMINE STARTING POINT FOR GRADIENT SEARCH  */
141   4          START_ROW = UNSIGN(INT(WORK_TABLE(LABEL_FLAG).PACKAGE_ELEV) -
                             CLOSURE_OFFSETS(PROD_PTR).PT1_VERT_ST);
142   4          START_COLL = UNSIGN(INT(WORK_TABLE(LABEL_FLAG).PACKAGE_CENTER) -
                             CLOSURE_OFFSETS(PROD_PTR).PT1_HOZ_ST);

          /*  DETERMINE DIRECTION AND LENGTH OF GRADIENT SEARCH TRACK  */

143   4          IF (CLOSURE_OFFSETS(PROD_PTR).PT1_COUNT < 0)
144   4              THEN D_INCR = NEG_INCR;
145   4              ELSE D_INCR = 0;
146   4          MAX_COUNT = UNSIGN(IABS(CLOSURE_OFFSETS(PROD_PTR).PT1_COUNT));

          /*  DETERMINE DIRECTION AND MAGNITUDE OF GRADIENT THRESHOLD  */

147   4          IF HIGH(CLOSURE_OFFSETS(PROD_PTR).PT1_THRESH) = '-' THEN D_GRAD = NEG_GRAD;
149   4          IF HIGH(CLOSURE_OFFSETS(PROD_PTR).PT1_THRESH) = '+' THEN D_GRAD = POS_GRAD;
151   4          IF HIGH(CLOSURE_OFFSETS(PROD_PTR).PT1_THRESH) = '\' THEN D_GRAD = ABS_GRAD;
153   4          GRAD_THRESH = LOW(CLOSURE_OFFSETS(PROD_PTR).PT1_THRESH);

          /*  SET UP FUNCTION CODE FOR EDGE GRADIENT CALL  */

154   4          GFUNCT = INCREMENT OR D_INCR OR D_TRK OR D_GRAD;

          /*  FIND EDGE  */

155   4          CALL EDGE_GRADIENT(@IMG_PLN,@GFUNCT,@START_ROW,@START_COLL,
                                 @GRAD_THRESH,@MAX_COUNT,@GRAD_COUNT,@EXCEP);

          /*  STORE EDGE LOCATION  FOR LATER CALCULATION  */

156   4          IF (ORIENT = 0FH)
157   4              THEN EDGE1 = START_ROW;
158   4              ELSE EDGE1 = START_COLL;

          /*  LOCATE POINT 2 EDGE  */

          /*  DETERMINE STARTING POINT FOR GRADIENT SEARCH  */
159   4          START_ROW = UNSIGN(INT(WORK_TABLE(LABEL_FLAG).PACKAGE_ELEV) -
                             CLOSURE_OFFSETS(PROD_PTR).PT2_VERT_ST);
160   4          START_COLL = UNSIGN(INT(WORK_TABLE(LABEL_FLAG).PACKAGE_CENTER) -
                             CLOSURE_OFFSETS(PROD_PTR).PT2_HOZ_ST);

          /*  DETERMINE DIRECTION AND LENGTH OF GRADIENT SEARCH TRACK  */

161   4          IF CLOSURE_OFFSETS(PROD_PTR).PT2_COUNT < 0
162   4              THEN D_INCR = 0;
163   4              ELSE D_INCR = NEG_INCR;
164   4          MAX_COUNT = UNSIGN(IABS(CLOSURE_OFFSETS(PROD_PTR).PT2_COUNT));

          /*  DETERMINE DIRECTION AND MAGNITUDE OF GRADIENT THRESHOLD  */

165   4          IF HIGH(CLOSURE_OFFSETS(PROD_PTR).PT2_THRESH) = '-' THEN D_GRAD = NEG_GRAD;
167   4          IF HIGH(CLOSURE_OFFSETS(PROD_PTR).PT2_THRESH) = '+' THEN D_GRAD = POS_GRAD;
169   4          IF HIGH(CLOSURE_OFFSETS(PROD_PTR).PT2_THRESH) = '\' THEN D_GRAD = ABS_GRAD;
171   4          GRAD_THRESH = LOW(CLOSURE_OFFSETS(PROD_PTR).PT2_THRESH);

          /*  SET UP FUNCTION CODE FOR EDGE GRADIENT CALL  */

172   4          GFUNCT = INCREMENT OR D_INCR OR D_TRK OR D_GRAD;

          /*  FIND EDGE  */

173   4          CALL EDGE_GRADIENT(@IMG_PLN,@GFUNCT,@START_ROW,@START_COLL,
                                 @GRAD_THRESH,@MAX_COUNT,@GRAD_COUNT,@EXCEP);

          /*  STORE EDGE LOCATION  FOR LATER CALCULATION  */

174   4          IF (ORIENT = 0FH)
175   4              THEN EDGE2 = START_ROW;
176   4              ELSE EDGE2 = START_COLL;

          /*  LOCATE POINT 3 EDGE  */

          /*  DETERMINE STARTING POINT FOR GRADIENT SEARCH  */
177   4          START_ROW = UNSIGN(INT(WORK_TABLE(LABEL_FLAG).PACKAGE_ELEV) -
                             CLOSURE_OFFSETS(PROD_PTR).PT3_VERT_ST);
```

```
178   4          START_COLL = UNSIGN(INT(WORK_TABLE(LABEL_FLAG).PACKAGE_CENTER) -
                              CLOSURE_OFFSETS(PROD_PTR).PT3_HOZ_ST);

             /*  DETERMINE DIRECTION AND LENGTH OF GRADIENT SEARCH TRACK  */
179   4          IF CLOSURE_OFFSETS(PROD_PTR).PT3_COUNT < 0
180   4              THEN D_INCR = NEG_INCR;
181   4              ELSE D_INCR = 0;
182   4          MAX_COUNT = UNSIGN(IABS(CLOSURE_OFFSETS(PROD_PTR).PT3_COUNT));

             /*  DETERMINE DIRECTION AND MAGNITUDE OF GRADIENT THRESHOLD  */

183   4          IF HIGH(CLOSURE_OFFSETS(PROD_PTR).PT3_THRESH) = '-' THEN D_GRAD = NEG_GRAD;
185   4          IF HIGH(CLOSURE_OFFSETS(PROD_PTR).PT3_THRESH) = '+' THEN D_GRAD = POS_GRAD;
187   4          IF HIGH(CLOSURE_OFFSETS(PROD_PTR).PT3_THRESH) = '\' THEN D_GRAD = ABS_GRAD;
189   4          GRAD_THRESH = LOW(CLOSURE_OFFSETS(PROD_PTR).PT3_THRESH);

             /*  SET UP FUNCTION CODE FOR EDGE GRADIENT CALL  */

190   4          GFUNCT = INCREMENT OR D_INCR OR D_TRK OR D_GRAD;

             /*  FIND EDGE  */

191   4          CALL EDGE_GRADIENT(@IMG_PLN,@GFUNCT,@START_ROW,@START_COLL,
                                    @GRAD_THRESH,@MAX_COUNT,@GRAD_COUNT,@EXCEP);

             /*  STORE EDGE LOCATION  FOR LATER CALCULATION  */

192   4          IF (ORIENT = OFH)
193   4              THEN EDGE3 = START_ROW;
194   4              ELSE EDGE3 = START_COLL;

             /*  LOCATE POINT 4 EDGE  */

             /*  DETERMINE STARTING POINT FOR GRADIENT SEARCH  */
195   4          START_ROW = UNSIGN(INT(WORK_TABLE(LABEL_FLAG).PACKAGE_ELEV) -
                             CLOSURE_OFFSETS(PROD_PTR).PT4_VERT_ST);
196   4          START_COLL = UNSIGN(INT(WORK_TABLE(LABEL_FLAG).PACKAGE_CENTER) -
                              CLOSURE_OFFSETS(PROD_PTR).PT4_HOZ_ST);

             /*  DETERMINE DIRECTION AND LENGTH OF GRADIENT SEARCH TRACK  */

197   4          IF (CLOSURE_OFFSETS(PROD_PTR).PT4_COUNT < 0)
198   4              THEN D_INCR = 0;
199   4              ELSE D_INCR = NEG_INCR;
200   4          MAX_COUNT = UNSIGN(IABS(CLOSURE_OFFSETS(PROD_PTR).PT4_COUNT));

             /*  DETERMINE DIRECTION AND MAGNITUDE OF GRADIENT THRESHOLD  */

201   4          IF HIGH(CLOSURE_OFFSETS(PROD_PTR).PT4_THRESH) = '-' THEN D_GRAD = NEG_GRAD;
203   4          IF HIGH(CLOSURE_OFFSETS(PROD_PTR).PT4_THRESH) = '+' THEN D_GRAD = POS_GRAD;
205   4          IF HIGH(CLOSURE_OFFSETS(PROD_PTR).PT4_THRESH) = '\' THEN D_GRAD = ABS_GRAD;
207   4          GRAD_THRESH = LOW(CLOSURE_OFFSETS(PROD_PTR).PT4_THRESH);

             /*  SET UP FUNCTION CODE FOR EDGE GRADIENT CALL  */

208   4          GFUNCT = INCREMENT OR D_INCR OR D_TRK OR D_GRAD;

             /*  FIND EDGE  */

209   4          CALL EDGE_GRADIENT(@IMG_PLN,@GFUNCT,@START_ROW,@START_COLL,
                                    @GRAD_THRESH,@MAX_COUNT,@GRAD_COUNT,@EXCEP);

             /*  STORE EDGE LOCATION  FOR LATER CALCULATION  */

210   4          IF (ORIENT = OFH)
211   4              THEN EDGE4 = START_ROW;
212   4              ELSE EDGE4 = START_COLL;

             /*  CALCULATE WORK TABLE VARIABLES  */

             /*  SKEW  */
213   4          TEM1 = INT((EDGE3 + EDGE4)/2);
214   4          TEM2 = INT((EDGE1 + EDGE2)/2);
215   4          TEM1 = TEM1 - TEM2;
216   4          WORK_TABLE(LABEL_FLAG).CLOSURE_SKEW = TEM1;

             /*  WIDTH  */
217   4          WORK_TABLE(LABEL_FLAG).CLOSURE_WIDTH = ((EDGE4 - EDGE3) + (EDGE2 - EDGE1))/2;

             /*  POSITION  */
218   4          IF ORIENT = OFH
219   4          THEN WORK_TABLE(LABEL_FLAG).CLOSURE_ELEV = ((EDGE3 + EDGE4)/2 +
                          (EDGE1 + EDGE2)/2) / 2;
220   4          ELSE WORK_TABLE(LABEL_FLAG).CLOSURE_CENTER = ((EDGE3 + EDGE4)/2 +
                          (EDGE1 + EDGE2)/2) / 2;
221   4      END;
222   3      END;
223   2      END LOC_CLOSURE;

             $EJECT
```

```
        /*  ROUTINE TO LOCATE LABEL ON PACKAGE  */

224  1  LOC_LABEL: PROCEDURE PUBLIC;
225  2  DO;

        /*  DETERMINE LABEL ORIENTATION  */

226  3      IF (LABEL_OFFSETS(PROD_PTR).LAB_AXIS AND OFH) <> 0 THEN
227  3      DO;
228  4          ORIENT = OFH;
229  4          D_TRK = VERT_TRK;
230  4      END;
231  3      ELSE
            DO;
232  4          ORIENT = 0;
233  4          D_TRK = 0;
234  4      END;

        /*  DETERMINE IMAGE PLANE  */

235  3      IF LABEL_FLAG = 0
236  3          THEN IMG_PLN = 010H;
237  3          ELSE IMG_PLN = 020H;
        /*  LOCATE POINT 1 EDGE  */

        /*  DETERMINE STARTING POINT FOR GRADIENT SEARCH  */
238  3      START_ROW = UNSIGN(INT(WORK_TABLE(LABEL_FLAG).PACKAGE_ELEV) -
                        LABEL_OFFSETS(PROD_PTR).PT1_VERT_ST);
239  3      START_COLL = UNSIGN(INT(WORK_TABLE(LABEL_FLAG).PACKAGE_CENTER) -
                        LABEL_OFFSETS(PROD_PTR).PT1_HOZ_ST);

        /*  DETERMINE DIRECTION AND LENGTH OF GRADIENT SEARCH TRACK  */

240  3      IF LABEL_OFFSETS(PROD_PTR).PT1_COUNT < 0
241  3          THEN D_INCR = NEG_INCR;
242  3          ELSE D_INCR = 0;
243  3      MAX_COUNT = UNSIGN(IABS(LABEL_OFFSETS(PROD_PTR).PT1_COUNT));

        /*  DETERMINE DIRECTION AND MAGNITUDE OF GRADIENT THRESHOLD  */

244  3      IF HIGH(LABEL_OFFSETS(PROD_PTR).PT1_THRESH) = '-' THEN D_GRAD = NEG_GRAD;
246  3      IF HIGH(LABEL_OFFSETS(PROD_PTR).PT1_THRESH) = '+' THEN D_GRAD = POS_GRAD;
248  3      IF HIGH(LABEL_OFFSETS(PROD_PTR).PT1_THRESH) = '\' THEN D_GRAD = ABS_GRAD;
250  3      GRAD_THRESH = LOW(LABEL_OFFSETS(PROD_PTR).PT1_THRESH);

        /*  SET UP FUNCTION CODE FOR EDGE GRADIENT CALL  */

251  3      GFUNCT = INCREMENT OR D_INCR OR D_TRK OR D_GRAD;

        /*  FIND EDGE  */

252  3      CALL EDGE_GRADIENT(@IMG_PLN,@GFUNCT,@START_ROW,@START_COLL,
                               @GRAD_THRESH,@MAX_COUNT,@GRAD_COUNT,@EXCEP);

        /*  STORE EDGE LOCATION  FOR LATER CALCULATION  */

253  3      IF ORIENT = OFH
254  3          THEN EDGE1 = START_ROW;
255  3          ELSE EDGE1 = START_COLL;

        /*  LOCATE POINT 2 EDGE  */

        /*  DETERMINE STARTING POINT FOR GRADIENT SEARCH  */
256  3      START_ROW = UNSIGN(INT(WORK_TABLE(LABEL_FLAG).PACKAGE_ELEV) -
                        LABEL_OFFSETS(PROD_PTR).PT2_VERT_ST);
257  3      START_COLL = UNSIGN(INT(WORK_TABLE(LABEL_FLAG).PACKAGE_CENTER) -
                        LABEL_OFFSETS(PROD_PTR).PT2_HOZ_ST);

        /*  DETERMINE DIRECTION AND LENGTH OF GRADIENT SEARCH TRACK  */

258  3      IF LABEL_OFFSETS(PROD_PTR).PT2_COUNT < 0
259  3          THEN D_INCR = 0;
260  3          ELSE D_INCR = NEG_INCR;
261  3      MAX_COUNT = UNSIGN(IABS(LABEL_OFFSETS(PROD_PTR).PT2_COUNT));

        /*  DETERMINE DIRECTION AND MAGNITUDE OF GRADIENT THRESHOLD  */

262  3      IF HIGH(LABEL_OFFSETS(PROD_PTR).PT2_THRESH) = '-' THEN D_GRAD = NEG_GRAD;
264  3      IF HIGH(LABEL_OFFSETS(PROD_PTR).PT2_THRESH) = '+' THEN D_GRAD = POS_GRAD;
266  3      IF HIGH(LABEL_OFFSETS(PROD_PTR).PT2_THRESH) = '\' THEN D_GRAD = ABS_GRAD;
268  3      GRAD_THRESH = LOW(LABEL_OFFSETS(PROD_PTR).PT2_THRESH);

        /*  SET UP FUNCTION CODE FOR EDGE GRADIENT CALL  */

269  3      GFUNCT = INCREMENT OR D_INCR OR D_TRK OR D_GRAD;

        /*  FIND EDGE  */
```

```
270  3        CALL EDGE_GRADIENT(@IMG_PLN,@GFUNCT,@START_ROW,@START_COLL,
                         @GRAD_THRESH,@MAX_COUNT,@GRAD_COUNT,@EXCEP);

          /*  STORE EDGE LOCATION  FOR LATER CALCULATION  */

271  3        IF ORIENT = 0FH
272  3            THEN EDGE2 = START_ROW;
273  3            ELSE EDGE2 = START_COLL;

          /*  LOCATE POINT 3 EDGE  */

          /*  DETERMINE STARTING POINT FOR GRADIENT SEARCH  */
274  3        START_ROW = UNSIGN(INT(WORK_TABLE(LABEL_FLAG).PACKAGE_ELEV) -
                      LABEL_OFFSETS(PROD_PTR).PT3_VERT_ST);
275  3        START_COLL = UNSIGN(INT(WORK_TABLE(LABEL_FLAG).PACKAGE_CENTER) -
                      LABEL_OFFSETS(PROD_PTR).PT3_HOZ_ST);

          /*  DETERMINE DIRECTION AND LENGTH OF GRADIENT SEARCH TRACK  */

276  3        IF LABEL_OFFSETS(PROD_PTR).PT3_COUNT < 0
277  3            THEN D_INCR = NEG_INCR;
278  3            ELSE D_INCR = 0;
279  3        MAX_COUNT = UNSIGN(IABS(LABEL_OFFSETS(PROD_PTR).PT3_COUNT));

          /*  DETERMINE DIRECTION AND MAGNITUDE OF GRADIENT THRESHOLD  */
280  3        IF HIGH(LABEL_OFFSETS(PROD_PTR).PT3_THRESH) = '-' THEN D_GRAD = NEG_GRAD;
282  3        IF HIGH(LABEL_OFFSETS(PROD_PTR).PT3_THRESH) = '+' THEN D_GRAD = POS_GRAD;
284  3        IF HIGH(LABEL_OFFSETS(PROD_PTR).PT3_THRESH) = '\' THEN D_GRAD = ABS_GRAD;
286  3        GRAD_THRESH = LOW(LABEL_OFFSETS(PROD_PTR).PT3_THRESH);

          /*  SET UP FUNCTION CODE FOR EDGE GRADIENT CALL  */

287  3        GFUNCT = INCREMENT OR D_INCR OR D_TRK OR D_GRAD;

          /*  FIND EDGE  */

288  3        CALL EDGE_GRADIENT(@IMG_PLN,@GFUNCT,@START_ROW,@START_COLL,
                         @GRAD_THRESH,@MAX_COUNT,@GRAD_COUNT,@EXCEP);

          /*  STORE EDGE LOCATION  FOR LATER CALCULATION  */

289  3        IF ORIENT = 0FH
290  3            THEN EDGE3 = START_ROW;
291  3            ELSE EDGE3 = START_COLL;

          /*  LOCATE POINT 4 EDGE  */

          /*  DETERMINE STARTING POINT FOR GRADIENT SEARCH  */
292  3        START_ROW = UNSIGN(INT(WORK_TABLE(LABEL_FLAG).PACKAGE_ELEV) -
                      LABEL_OFFSETS(PROD_PTR).PT4_VERT_ST);
293  3        START_COLL = UNSIGN(INT(WORK_TABLE(LABEL_FLAG).PACKAGE_CENTER) -
                      LABEL_OFFSETS(PROD_PTR).PT4_HOZ_ST);

          /*  DETERMINE DIRECTION AND LENGTH OF GRADIENT SEARCH TRACK  */

294  3        IF (LABEL_OFFSETS(PROD_PTR).PT4_COUNT < 0)
295  3            THEN D_INCR = 0;
296  3            ELSE D_INCR = NEG_INCR;
297  3        MAX_COUNT = UNSIGN(IABS(LABEL_OFFSETS(PROD_PTR).PT4_COUNT));

          /*  DETERMINE DIRECTION AND MAGNITUDE OF GRADIENT THRESHOLD  */

298  3        IF HIGH(LABEL_OFFSETS(PROD_PTR).PT4_THRESH) = '-' THEN D_GRAD = NEG_GRAD;
300  3        IF HIGH(LABEL_OFFSETS(PROD_PTR).PT4_THRESH) = '+' THEN D_GRAD = POS_GRAD;
302  3        IF HIGH(LABEL_OFFSETS(PROD_PTR).PT4_THRESH) = '\' THEN D_GRAD = ABS_GRAD;
304  3        GRAD_THRESH = LOW(LABEL_OFFSETS(PROD_PTR).PT4_THRESH);

          /*  SET UP FUNCTION CODE FOR EDGE GRADIENT CALL  */

305  3        GFUNCT = INCREMENT OR D_INCR OR D_TRK OR D_GRAD;

          /*  FIND EDGE  */

306  3        CALL EDGE_GRADIENT(@IMG_PLN,@GFUNCT,@START_ROW,@START_COLL,
                         @GRAD_THRESH,@MAX_COUNT,@GRAD_COUNT,@EXCEP);

          /*  STORE EDGE LOCATION  FOR LATER CALCULATION  */

307  3        IF ORIENT = 0FH
308  3            THEN EDGE4 = START_ROW;
309  3            ELSE EDGE4 = START_COLL;
          /*  LOCATE POINT 5 EDGE  */

          /*  DETERMINE STARTING POINT FOR GRADIENT SEARCH  */
310  3        START_ROW = UNSIGN(INT(WORK_TABLE(LABEL_FLAG).PACKAGE_ELEV) -
                      LABEL_OFFSETS(PROD_PTR).PT5_VERT_ST);
311  3        START_COLL = UNSIGN(INT(WORK_TABLE(LABEL_FLAG).PACKAGE_CENTER) -
                      LABEL_OFFSETS(PROD_PTR).PT5_HOZ_ST);
```

```
                /*  DETERMINE DIRECTION AND LENGTH OF GRADIENT SEARCH TRACK  */

312   3         IF LABEL_OFFSETS(PROD_PTR).PT5_COUNT < 0
313   3             THEN D_INCR = NEG_INCR;
314   3             ELSE D_INCR = 0;
315   3         MAX_COUNT = UNSIGN(IABS(LABEL_OFFSETS(PROD_PTR).PT5_COUNT));

                /*  DETERMINE DIRECTION AND MAGNITUDE OF GRADIENT THRESHOLD  */

316   3         IF HIGH(LABEL_OFFSETS(PROD_PTR).PT5_THRESH) = '-' THEN D_GRAD = NEG_GRAD;
318   3         IF HIGH(LABEL_OFFSETS(PROD_PTR).PT5_THRESH) = '+' THEN D_GRAD = POS_GRAD;
320   3         IF HIGH(LABEL_OFFSETS(PROD_PTR).PT5_THRESH) = '\' THEN D_GRAD = ABS_GRAD;
322   3         GRAD_THRESH = LOW(LABEL_OFFSETS(PROD_PTR).PT5_THRESH);

                /*  SET UP FUNCTION CODE FOR EDGE GRADIENT CALL  */
323   3         IF D_TRK = HOZ_TRK THEN D_TRK = VERT_TRK;
325   3             ELSE D_TRK = HOZ_TRK;

326   3         GFUNCT = INCREMENT OR D_INCR OR D_TRK OR D_GRAD;

                /*  FIND EDGE  */

327   3         CALL EDGE_GRADIENT(@IMG_PLN,@GFUNCT,@START_ROW,@START_COLL,
                                   @GRAD_THRESH,@MAX_COUNT,@GRAD_COUNT,@EXCEP);

                /*  STORE EDGE LOCATION  FOR LATER CALCULATION  */

328   3         IF ORIENT = 0FH
329   3             THEN EDGE5 = START_COLL;
330   3             ELSE EDGE5 = START_ROW;

                /*  LOCATE POINT 6 EDGE  */

                /*  DETERMINE STARTING POINT FOR GRADIENT SEARCH  */
331   3         START_ROW = UNSIGN(INT(WORK_TABLE(LABEL_FLAG).PACKAGE_ELEV) -
                            LABEL_OFFSETS(PROD_PTR).PT6_VERT_ST);
332   3         START_COLL = UNSIGN(INT(WORK_TABLE(LABEL_FLAG).PACKAGE_CENTER) -
                            LABEL_OFFSETS(PROD_PTR).PT6_HOZ_ST);

                /*  DETERMINE DIRECTION AND LENGTH OF GRADIENT SEARCH TRACK  */

333   3         IF (LABEL_OFFSETS(PROD_PTR).PT6_COUNT < 0)
334   3             THEN D_INCR = 0;
335   3             ELSE D_INCR = NEG_INCR;
336   3         MAX_COUNT = UNSIGN(IABS(LABEL_OFFSETS(PROD_PTR).PT6_COUNT));

                /*  DETERMINE DIRECTION AND MAGNITUDE OF GRADIENT THRESHOLD  */

337   3         IF HIGH(LABEL_OFFSETS(PROD_PTR).PT6_THRESH) = '-' THEN D_GRAD = NEG_GRAD;
339   3         IF HIGH(LABEL_OFFSETS(PROD_PTR).PT6_THRESH) = '+' THEN D_GRAD = POS_GRAD;
341   3         IF HIGH(LABEL_OFFSETS(PROD_PTR).PT6_THRESH) = '\' THEN D_GRAD = ABS_GRAD;
343   3         GRAD_THRESH = LOW(LABEL_OFFSETS(PROD_PTR).PT6_THRESH);

                /*  SET UP FUNCTION CODE FOR EDGE GRADIENT CALL  */

344   3         GFUNCT = INCREMENT OR D_INCR OR D_TRK OR D_GRAD;

                /*  FIND EDGE  */

345   3         CALL EDGE_GRADIENT(@IMG_PLN,@GFUNCT,@START_ROW,@START_COLL,
                                   @GRAD_THRESH,@MAX_COUNT,@GRAD_COUNT,@EXCEP);

                /*  STORE EDGE LOCATION  FOR LATER CALCULATION  */

346   3         IF ORIENT = 0FH
347   3             THEN EDGE6 = START_COLL;
348   3             ELSE EDGE6 = START_ROW;

                /*  CALCULATE WORK TABLE VARIABLES  */

                /*  SKEW  */
349   3         WORK_TABLE(LABEL_FLAG).LABEL_SKEW = (INT((EDGE3 +EDGE4)/2) -
                                                   INT((EDGE1 + EDGE2)/2));

                /*  WIDTH  */
350   3         WORK_TABLE(LABEL_FLAG).LABEL_WIDTH = ((EDGE4 - EDGE3) + (EDGE2 - EDGE1))/2;

                /*  POSITION  */
351   3         IF ORIENT = 0FH
352   3         THEN DO;
353   4             WORK_TABLE(LABEL_FLAG).LABEL_ELEV = ((EDGE3 + EDGE4)/2 +
                    (EDGE1 + EDGE2)/2) / 2;
354   4              WORK_TABLE(LABEL_FLAG).LABEL_CENTER = (EDGE5 + EDGE6) / 2;
355   4             END;
356   3         ELSE DO;
357   4             WORK_TABLE(LABEL_FLAG).LABEL_ELEV = (EDGE5 + EDGE6) / 2;
358   4             WORK_TABLE(LABEL_FLAG).LABEL_CENTER = ((EDGE3 + EDGE4)/2 +
                    (EDGE1 + EDGE2)/2) / 2;
```

```
359  4              END;
360  3        END;
361  2        END LOC_LABEL;

              $EJECT
362  1        LOC_LABEL2: PROCEDURE PUBLIC;
363  2        DO;


              /*  DETERMINE IMAGE PLANE  */

364  3            IF LABEL_FLAG = 0
365  3                THEN IMG_PLN = 010H;
366  3                ELSE IMG_PLN = 020H;
              /*  LOCATE POINT 1 EDGE  */


              /*  DETERMINE DIRECTION AND LENGTH OF GRADIENT SEARCH TRACK  */
              /*  DETERMINE DIRECTION OF SCAN SEARCH  */
367  3            IF (IABS(LABEL_OFFSETS(PROD_PTR).PT5_COUNT) > 1) THEN DO; /* VERTICAL */
369  4                D_TRK = VERT_TRK;
370  4                MAX_COUNT = UNSIGN(IABS(LABEL_OFFSETS(PROD_PTR).PT3_COUNT));
371  4                IF (LABEL_OFFSETS(PROD_PTR).PT5_COUNT = 2) THEN  /* POSITIVE */
372  4                    D_INCR = 0;
373  4                ELSE
                          D_INCR = NEG_INCR;
374  4                IF (LABEL_OFFSETS(PROD_PTR).PT1_COUNT > 0) THEN HOZ_FLAG = 1;
376  4                    ELSE HOZ_FLAG = -1;
377  4                VER_FLAG = 0;
378  4                END;
379  3            ELSE DO; /* HORIZONTAL */
380  4                D_TRK = 0;
381  4                MAX_COUNT = UNSIGN(IABS(LABEL_OFFSETS(PROD_PTR).PT1_COUNT));
382  4                IF (LABEL_OFFSETS(PROD_PTR).PT5_COUNT = 1) THEN /* POSITIVE */
383  4                    D_INCR = 0;
384  4                ELSE
                          D_INCR = NEG_INCR;
385  4                IF (LABEL_OFFSETS(PROD_PTR).PT3_COUNT > 0) THEN VER_FLAG = 1;
387  4                    ELSE VER_FLAG = -1;
388  4                HOZ_FLAG = 0;
389  4            END;


              /*  DETERMINE DIRECTION AND MAGNITUDE OF GRADIENT THRESHOLD  */

390  3            IF HIGH(LABEL_OFFSETS(PROD_PTR).PT1_THRESH) = '-' THEN D_GRAD = NEG_GRAD;
392  3            IF HIGH(LABEL_OFFSETS(PROD_PTR).PT1_THRESH) = '+' THEN D_GRAD = POS_GRAD;
394  3            IF HIGH(LABEL_OFFSETS(PROD_PTR).PT1_THRESH) = '\' THEN D_GRAD = ABS_GRAD;
396  3            GRAD_THRESH = LOW(LABEL_OFFSETS(PROD_PTR).PT1_THRESH);

              /*  SET UP FUNCTION CODE FOR EDGE GRADIENT CALL  */

397  3            GFUNCT = INCREMENT OR D_INCR OR D_TRK OR D_GRAD;

              /*  SET UP LOOP GET SEARCH DIRECTION  */
398  3            IF (HOZ_FLAG = 0) THEN LOOP_COUNT = UNSIGN(IABS(LABEL_OFFSETS(PROD_PTR)
399  3                                                          PT3_COUNT));
400  3            ELSE LOOP_COUNT = UNSIGN(IABS(LABEL_OFFSETS(PROD_PTR).PT1_COUNT));
401  3            START_ROW = UNSIGN(INT(WORK_TABLE(LABEL_FLAG).PACKAGE_ELEV) -
                              LABEL_OFFSETS(PROD_PTR).PT1_VERT_ST);
402  3            START_COLL = UNSIGN(INT(WORK_TABLE(LABEL_FLAG).PACKAGE_CENTER) -
                              LABEL_OFFSETS(PROD_PTR).PT1_HOZ_ST);


              /*  FIND EDGE  */
403  3            DONE_FLAG = 0;
404  3            J = 0;

405  3            DO WHILE(DONE_FLAG = 0 AND J <> LOOP_COUNT);
406  4                    OLD_COLL = START_COLL;
407  4                    OLD_ROW  = START_ROW;
408  4            CALL EDGE_GRADIENT(@IMG_PLN,@GFUNCT,@START_ROW,@START_COLL,
                                  @GRAD_THRESH,@MAX_COUNT,@GRAD_COUNT,@EXCEP);

409  4            IF (START_ROW <> OLD_ROW OR START_COLL <> OLD_COLL) THEN
410  4                DO;
411  5                    DONE_FLAG = 1;
412  5                END;
413  4                ELSE DO;
414  5                    START_ROW = UNSIGN(INT(START_ROW) + VER_FLAG);
415  5                    START_COLL = UNSIGN(INT(START_COLL) + HOZ_FLAG);
416  5                    J = J + 1;
417  5                END;
418  4            END; /* DO WHILE */
              /*  STORE POINT LOCATION  FOR LATER CALCULATION  */
              /*  CHECK FOR  POINT FOUND  */

419  3            IF (DONE_FLAG = 1) THEN DO;
```

```
421    4         EDGE1 = START_COLL;
422    4         EDGE2 = START_ROW;
423    4         END;
424    3         ELSE DO;
425    4         EDGE1 = 0;
426    4         EDGE2 = 0;
427    4         END;

              /* LOCATE POINT 2 EDGE */

              /* DETERMINE DIRECTION AND LENGTH OF GRADIENT SEARCH TRACK */
              /* DETERMINE DIRECTION OF SCAN SEARCH */
428    3         IF (IABS(LABEL_OFFSETS(PROD_PTR).PT6_COUNT) > 1) THEN DO; /* VERTICAL */
430    4             D_TRK = VERT_TRK;
431    4             MAX_COUNT = UNSIGN(IABS(LABEL_OFFSETS(PROD_PTR).PT4_COUNT));
432    4             IF (LABEL_OFFSETS(PROD_PTR).PT6_COUNT = 2) THEN  /* POSITIVE */
433    4                 D_INCR = 0;
434    4             ELSE
                         D_INCR = NEG_INCR;
435    4             IF (LABEL_OFFSETS(PROD_PTR).PT2_COUNT > 0) THEN HOZ_FLAG = 1;
437    4                 ELSE HOZ_FLAG = -1;
438    4             VER_FLAG = 0;
439    4             END;
440    3         ELSE DO; /* HORIZONTAL */
441    4             D_TRK = 0;
442    4             MAX_COUNT = UNSIGN(IABS(LABEL_OFFSETS(PROD_PTR).PT2_COUNT));
443    4             IF (LABEL_OFFSETS(PROD_PTR).PT6_COUNT = 1) THEN /* POSITIVE */
444    4                 D_INCR = 0;
445    4             ELSE
                         D_INCR = NEG_INCR;
446    4             IF (LABEL_OFFSETS(PROD_PTR).PT4_COUNT > 0) THEN VER_FLAG = 1;
448    4                 ELSE VER_FLAG = -1;
449    4             HOZ_FLAG = 0;
450    4         END;

              /* DETERMINE DIRECTION AND MAGNITUDE OF GRADIENT THRESHOLD */

451    3         IF HIGH(LABEL_OFFSETS(PROD_PTR).PT2_THRESH) = '-' THEN D_GRAD = NEG_GRAD;
453    3         IF HIGH(LABEL_OFFSETS(PROD_PTR).PT2_THRESH) = '+' THEN D_GRAD = POS_GRAD;
455    3         IF HIGH(LABEL_OFFSETS(PROD_PTR).PT2_THRESH) = '\' THEN D_GRAD = ABS_GRAD;
457    3         GRAD_THRESH = LOW(LABEL_OFFSETS(PROD_PTR).PT2_THRESH);

              /* SET UP FUNCTION CODE FOR EDGE GRADIENT CALL */

458    3         GFUNCT = INCREMENT OR D_INCR OR D_TRK OR D_GRAD;

              /* SET UP LOOP GET SEARCH DIRECTION */
459    3         IF (HOZ_FLAG = 0) THEN LOOP_COUNT = UNSIGN(IABS(LABEL_OFFSETS(PROD_PTR).
460    3                                                   PT4_COUNT));
461    3         ELSE LOOP_COUNT = UNSIGN(IABS(LABEL_OFFSETS(PROD_PTR).PT2_COUNT));
462    3         START_ROW = UNSIGN(INT(WORK_TABLE(LABEL_FLAG).PACKAGE_ELEV) -
                             LABEL_OFFSETS(PROD_PTR).PT2_VERT_ST);
463    3         START_COLL = UNSIGN(INT(WORK_TABLE(LABEL_FLAG).PACKAGE_CENTER) -
                             LABEL_OFFSETS(PROD_PTR).PT2_HOZ_ST);


              /* FIND EDGE */
464    3         DONE_FLAG = 0;
465    3         J = 0;

466    3         DO WHILE(DONE_FLAG = 0 AND J <> LOOP_COUNT);
467    4                 OLD_COLL = START_COLL;
468    4                 OLD_ROW  = START_ROW;
469    4         CALL EDGE_GRADIENT(@IMG_PLN,@GFUNCT,@START_ROW,@START_COLL,
                                 @GRAD_THRESH,@MAX_COUNT,@GRAD_COUNT,@EXCEP);

470    4         IF (START_ROW <> OLD_ROW OR START_COLL <> OLD_COLL) THEN
471    4             DO;
472    5                 DONE_FLAG = 1;
473    5             END;
474    4             ELSE DO;
475    5                 START_ROW = UNSIGN(INT(START_ROW) + VER_FLAG);
476    5                 START_COLL = UNSIGN(INT(START_COLL) + HOZ_FLAG);
477    5                 J = J + 1;
478    5             END;
479    4         END; /* DO WHILE */
              /* STORE POINT LOCATION  FOR LATER CALCULATION */
              /* SEE IF POINT HAS BEEN FOUND */
480    3         IF (DONE_FLAG = 1) THEN DO;
482    4         EDGE3 = START_COLL;
483    4         EDGE4 = START_ROW;
484    4         END;
485    3         ELSE DO;
486    4         EDGE3 = 0;
487    4         EDGE4 = 0;
```

```
488   4           END;

              /*  CHECK FOR MISSING POINT INFORMATION */
489   3           IF ((EDGE1 = 0 AND EDGE2 = 0) OR (EDGE3 = 0 AND EDGE4 = 0)) THEN DO;
              /*  SKEW  */
491   4           WORK_TABLE(LABEL_FLAG).LABEL_SKEW = -(500);

              /*  WIDTH  */
492   4           WORK_TABLE(LABEL_FLAG).LABEL_WIDTH = 500;

              /*  POSITION  */
493   4               WORK_TABLE(LABEL_FLAG).LABEL_ELEV = -(500);
494   4                WORK_TABLE(LABEL_FLAG).LABEL_CENTER = -(500);

495   4           END;
496   3           ELSE DO;
              /*  CALCULATE WORK TABLE VARIABLES  */

              /*  SKEW  */
497   4           WORK_TABLE(LABEL_FLAG).LABEL_SKEW = (INT(EDGE4) - INT(EDGE2));

              /*  WIDTH  */
498   4           WORK_TABLE(LABEL_FLAG).LABEL_WIDTH = (EDGE3 - EDGE1);

              /*  POSITION  */
499   4               WORK_TABLE(LABEL_FLAG).LABEL_ELEV = ((EDGE2 + EDGE4)/2);
500   4                WORK_TABLE(LABEL_FLAG).LABEL_CENTER = (EDGE1 + EDGE3) / 2;
501   4           END;
502   3       END;
503   2       END LOC_LABEL2;

              $EJECT
              /*  FEATURE ALGORITHM  */
504   1       LOC_FEATURE: PROCEDURE(INDEX) PUBLIC;
505   2       DCL INDEX WORD;
506   2       DCL FEATURE WORD;
507   2       DCL CPOINT BYTE;
508   2       DO;
509   3       IF INDEX = 1 THEN FEATURE_INDEX = 0;
511   3           ELSE FEATURE_INDEX = 20;
512   3       CPOINT = FEATURE_OFFSETS(PROD_PTR + FEATURE_INDEX).FEATURE_FLAG AND OFOH;
513   3       CPOINT = SHR(CPOINT,4);
514   3       IF CPOINT > 0 THEN DO;
516   4       CPOINT = CPOINT - 1;
517   4       DO CASE CPOINT;
              /* CASE 0 */
518   5       DO;
519   6           FEATURE = MEASURE_DIST;
520   6           END;
              /* CASE 1 */
521   5       DO;
522   6           FEATURE = GRAD_SIGNATURE;
523   6       END;
              /* CASE 2 */
524   5       DO;
525   6           FEATURE = AREA_GRAD_COUNT;
526   6           END;
527   5       END; /* DO CASE */
528   4       IF INDEX = 1 THEN
529   4           WORK_TABLE(LABEL_FLAG).FEATURE_1 = FEATURE;
530   4       ELSE
              WORK_TABLE(LABEL_FLAG).FEATURE_2 = FEATURE;
531   4       END;
532   3       END;
533   2       END LOC_FEATURE;

              $EJECT
534   1       MEASURE_DIST: PROCEDURE WORD PUBLIC;
535   2       DO;

              /*  DETERMINE FEATURE ORIENTATION  */

536   3           IF (FEATURE_OFFSETS(PROD_PTR + FEATURE_INDEX).FEATURE_FLAG AND OFH) <> 0 THEN
537   3           DO;
538   4               ORIENT = OFH;
539   4               D_TRK = HOZ_TRK;
540   4           END;
541   3           ELSE
              DO;
542   4               ORIENT = 0;
543   4               D_TRK = VERT_TRK;

544   4           END;

              /*  DETERMINE IMAGE PLANE  */

545   3           IF LABEL_FLAG = 0
```

```
546   3          THEN IMG_PLN = 010H;
547   3          ELSE IMG_PLN = 020H;
            /*  LOCATE POINT 1 EDGE  */

            /*  DETERMINE STARTING POINT FOR GRADIENT SEARCH  */
548   3         START_ROW = UNSIGN(INT(WORK_TABLE(LABEL_FLAG).LABEL_ELEV) -
                            FEATURE_OFFSETS(PROD_PTR + FEATURE_INDEX).PT1_VERT_ST);
549   3         START_COLL = UNSIGN(INT(WORK_TABLE(LABEL_FLAG).LABEL_CENTER) -
                            FEATURE_OFFSETS(PROD_PTR + FEATURE_INDEX).PT1_HOZ_ST);

            /*  DETERMINE DIRECTION AND LENGTH OF GRADIENT SEARCH TRACK  */

550   3         IF FEATURE_OFFSETS(PROD_PTR + FEATURE_INDEX).PT1_COUNT < 0
551   3             THEN D_INCR = NEG_INCR;
552   3             ELSE D_INCR = 0;
553   3         MAX_COUNT = UNSIGN(IABS(FEATURE_OFFSETS(PROD_PTR + FEATURE_INDEX).PT1_COUNT));

            /*  DETERMINE DIRECTION AND MAGNITUDE OF GRADIENT THRESHOLD  */

554   3         IF HIGH(FEATURE_OFFSETS(PROD_PTR+FEATURE_INDEX).PT1_THRESH)='-'THEN D_GRAD=NEG_GRAD;
556   3         IF HIGH(FEATURE_OFFSETS(PROD_PTR+FEATURE_INDEX).PT1_THRESH)='+'THEN D_GRAD=POS_GRAD;
558   3         IF HIGH(FEATURE_OFFSETS(PROD_PTR+FEATURE_INDEX).PT1_THRESH)='\'THEN D_GRAD=ABS_GRAD;
560   3         GRAD_THRESH = LOW(FEATURE_OFFSETS(PROD_PTR + FEATURE_INDEX).PT1_THRESH);

            /*  SET UP FUNCTION CODE FOR EDGE GRADIENT CALL  */

561   3         GFUNCT = INCREMENT OR D_INCR OR D_TRK OR D_GRAD;

            /*  FIND EDGE  */

562   3         CALL EDGE_GRADIENT(@IMG_PLN,@GFUNCT,@START_ROW,@START_COLL,
                                   @GRAD_THRESH,@MAX_COUNT,@GRAD_COUNT,@EXCEP);

            /*  STORE EDGE LOCATION  FOR LATER CALCULATION  */

563   3         IF ORIENT = OFH
564   3             THEN EDGE1 = START_COLL;
565   3             ELSE EDGE1 = START_ROW;

            /*  LOCATE POINT 2 EDGE  */

            /*  DETERMINE STARTING POINT FOR GRADIENT SEARCH  */
566   3         START_ROW = UNSIGN(INT(WORK_TABLE(LABEL_FLAG).LABEL_ELEV) -
                            FEATURE_OFFSETS(PROD_PTR + FEATURE_INDEX).PT2_VERT_ST);
567   3         START_COLL = UNSIGN(INT(WORK_TABLE(LABEL_FLAG).LABEL_CENTER) -
                            FEATURE_OFFSETS(PROD_PTR + FEATURE_INDEX).PT2_HOZ_ST);

            /*  DETERMINE DIRECTION AND LENGTH OF GRADIENT SEARCH TRACK  */

568   3         IF FEATURE_OFFSETS(PROD_PTR + FEATURE_INDEX).PT2_COUNT < 0
569   3             THEN D_INCR = 0;
570   3             ELSE D_INCR = NEG_INCR;
571   3         MAX_COUNT = UNSIGN(IABS(FEATURE_OFFSETS(PROD_PTR + FEATURE_INDEX).PT2_COUNT));

            /*  DETERMINE DIRECTION AND MAGNITUDE OF GRADIENT THRESHOLD  */

572   3         IF HIGH(FEATURE_OFFSETS(PROD_PTR+FEATURE_INDEX).PT2_THRESH)='-'THEN D_GRAD=NEG_GRAD;
574   3         IF HIGH(FEATURE_OFFSETS(PROD_PTR+FEATURE_INDEX).PT2_THRESH)='+'THEN D_GRAD=POS_GRAD;
576   3         IF HIGH(FEATURE_OFFSETS(PROD_PTR+FEATURE_INDEX).PT2_THRESH)='\'THEN D_GRAD=ABS_GRAD;
578   3         GRAD_THRESH = LOW(FEATURE_OFFSETS(PROD_PTR + FEATURE_INDEX).PT2_THRESH);

            /*  SET UP FUNCTION CODE FOR EDGE GRADIENT CALL  */

579   3         GFUNCT = INCREMENT OR D_INCR OR D_TRK OR D_GRAD;

            /*  FIND EDGE  */

580   3         CALL EDGE_GRADIENT(@IMG_PLN,@GFUNCT,@START_ROW,@START_COLL,
                                   @GRAD_THRESH,@MAX_COUNT,@GRAD_COUNT,@EXCEP);

            /*  STORE EDGE LOCATION  FOR LATER CALCULATION  */

581   3         IF ORIENT = OFH
582   3             THEN EDGE2 = START_COLL;
583   3             ELSE EDGE2 = START_ROW;


            /*  CALCULATE DISTANCE  */
584   3         IF (EDGE1 > EDGE2) THEN J = EDGE1 - EDGE2;
586   3             ELSE J = EDGE2 - EDGE1;

            /*  RETURN DISTANCE  */

587   3         RETURN J;
588   3     END;
589   2     END MEASURE_DIST;

            $EJECT
```

```
                /*  GRADIENT SIGNATURE FEATURE EXTRACTOR  */

590   1         GRAD_SIGNATURE. PROCEDURE WORD PUBLIC;
591   2         DO;
                /*  DETERMINE FEATURE ORIENTATION  */

592   3             IF (FEATURE_OFFSETS(PROD_PTR + FEATURE_INDEX).FEATURE_FLAG AND OFH) <> 0 THEN
593   3             DO;
594   4                 ORIENT = OFH;
595   4                 D_TRK = HOZ_TRK;
596   4             END;
597   3             ELSE
                    DO;
598   4                 ORIENT = 0;
599   4                 D_TRK = VERT_TRK;

600   4             END;

                /*  DETERMINE IMAGE PLANE  */

601   3             IF LABEL_FLAG = 0
602   3                 THEN IMG_PLN = 010H;
603   3                 ELSE IMG_PLN = 020H;

                /*  DETERMINE STARTING POINT FOR GRADIENT SEARCH  */
604   3             START_ROW = UNSIGN(INT(WORK_TABLE(LABEL_FLAG).LABEL_ELEV) -
                                FEATURE_OFFSETS(PROD_PTR + FEATURE_INDEX).PT1_VERT_ST);
605   3             START_COLL = UNSIGN(INT(WORK_TABLE(LABEL_FLAG).LABEL_CENTER) -
                                FEATURE_OFFSETS(PROD_PTR + FEATURE_INDEX).PT1_HOZ_ST);

                /*  DETERMINE DIRECTION AND LENGTH OF GRADIENT SEARCH TRACK  */

606   3             IF FEATURE_OFFSETS(PROD_PTR + FEATURE_INDEX).PT1_COUNT < 0
607   3                 THEN D_INCR = NEG_INCR;
608   3                 ELSE D_INCR = 0;
609   3             MAX_COUNT = UNSIGN(IABS(FEATURE_OFFSETS(PROD_PTR + FEATURE_INDEX).PT1_COUNT));

                /*  DETERMINE DIRECTION AND MAGNITUDE OF GRADIENT THRESHOLD  */
610   3             D_GRAD = POS_GRAD;

611   3             GRAD_THRESH = LOW(FEATURE_OFFSETS(PROD_PTR + FEATURE_INDEX).PT1_THRESH);

                /*  SET UP FUNCTION CODE FOR EDGE GRADIENT CALL  */

612   3             GFUNCT = SIG_INCR OR D_INCR OR D_TRK OR D_GRAD;

                /*  FIND EDGE  */

613   3             GRAD_COUNT = 0;
614   3             CALL EDGE_GRADIENT(@IMG_PLN,@GFUNCT,@START_ROW,@START_COLL,
                                   @GRAD_THRESH,@MAX_COUNT,@GRAD_COUNT,@EXCEP);

615   3             J = GRAD_COUNT;
616   3             RETURN J;
617   3         END;
618   2         END GRAD_SIGNATURE;
                $EJECT

619   1         AREA_GRAD_COUNT: PROCEDURE WORD PUBLIC;
620   2         DO;
                /*  DETERMINE FEATURE ORIENTATION  */

621   3             IF (FEATURE_OFFSETS(PROD_PTR + FEATURE_INDEX).FEATURE_FLAG AND OFH) <> 0 THEN
622   3             DO;
623   4                 ORIENT = OFH;
624   4                 D_TRK = HOZ_TRK;
625   4             END;
626   3             ELSE
                    DO;
627   4                 ORIENT = 0;
628   4                 D_TRK = VERT_TRK;

629   4             END;

                /*  DETERMINE IMAGE PLANE  */

630   3             IF LABEL_FLAG = 0
631   3                 THEN IMG_PLN = 010H;
632   3                 ELSE IMG_PLN = 020H;

                /*  DETERMINE STARTING POINT FOR GRADIENT SEARCH  */
633   3             START_ROW = UNSIGN(INT(WORK_TABLE(LABEL_FLAG).LABEL_ELEV) -
                                FEATURE_OFFSETS(PROD_PTR + FEATURE_INDEX).PT1_VERT_ST);
634   3             START_COLL = UNSIGN(INT(WORK_TABLE(LABEL_FLAG).LABEL_CENTER) -
                                FEATURE_OFFSETS(PROD_PTR + FEATURE_INDEX).PT1_HOZ_ST);

                /*  DETERMINE DIRECTION AND LENGTH OF GRADIENT SEARCH TRACK  */
635   3             COL_COUNT = UNSIGN(FEATURE_OFFSETS(PROD_PTR + FEATURE_INDEX).PT1_COUNT);
```

```
636   3          ROW_COUNT = UNSIGN(FEATURE_OFFSETS(PROD_PTR + FEATURE_INDEX).PT2_COUNT);

637   3          IF (ORIENT = OFH) THEN DO;
639   4          MAX_COUNT = COL_COUNT;
640   4          END;
641   3          ELSE DO;
642   4          MAX_COUNT = ROW_COUNT;
643   4          END;


            /*   DETERMINE DIRECTION AND MAGNITUDE OF GRADIENT THRESHOLD  */
644   3          IF HIGH(FEATURE_OFFSETS(PROD_PTR+FEATURE_INDEX).PT1_THRESH)='-'THEN D_GRAD=NEG_GRAD;
646   3          IF HIGH(FEATURE_OFFSETS(PROD_PTR+FEATURE_INDEX).PT1_THRESH)='+'THEN D_GRAD=POS_GRAD;
648   3          IF HIGH(FEATURE_OFFSETS(PROD_PTR+FEATURE_INDEX).PT1_THRESH)='\'THEN D_GRAD=ABS_GRAD;

650   3          GRAD_THRESH = LOW(FEATURE_OFFSETS(PROD_PTR + FEATURE_INDEX).PT1_THRESH);

            /*   SET UP FUNCTION CODE FOR EDGE GRADIENT CALL  */
651   3          D_INCR = 0;
652   3          GRAD_COUNT = 0;
653   3          J = 0;
654   3          GFUNCT = INCREMENT OR D_INCR OR D_TRK OR D_GRAD OR COUNT_G;

            /*   GET AREA GRADIENT COUNT  */
655   3          IF ORIENT = OFH THEN DO;
657   4          DO K = START_ROW TO (START_ROW + ROW_COUNT);
658   5          GRAD_COUNT = 0;
659   5          CALL EDGE_GRADIENT(@IMG_PLN,@GFUNCT,@K,@START_COLL,
                                    @GRAD_THRESH,@MAX_COUNT,@GRAD_COUNT,@EXCEP);
660   5          J = J + GRAD_COUNT;
661   5          END;
662   4          END;
663   3          ELSE DO;
664   4          DO L = START_COLL TO (START_COLL + COL_COUNT);
665   5          GRAD_COUNT = 0;
666   5          CALL EDGE_GRADIENT(@IMG_PLN,@GFUNCT,@START_ROW,@L,
                                    @GRAD_THRESH,@MAX_COUNT,@GRAD_COUNT,@EXCEP);
667   5          J = J + GRAD_COUNT;
668   5          END;
669   4          END;
670   3          RETURN J;
671   3      END;
672   2      END AREA_GRAD_COUNT;
673   1      END LOCATOR_MODULE;


MODULE INFORMATION:

     CODE AREA SIZE     = 18A2H   6306D
     CONSTANT AREA SIZE = 0000H      0D
     VARIABLE AREA SIZE = 004CH     76D
     MAXIMUM STACK SIZE = 0024H     36D
     1257 LINES READ
     0 PROGRAM WARNINGS
     0 PROGRAM ERRORS

DICTIONARY SUMMARY:

     47KB MEMORY AVAILABLE
     10KB MEMORY USED   (21%)
     0KB DISK SPACE USED

END OF PL/M-86 COMPILATION
 iRMX 86 PL/M-86 V2.3 COMPILATION OF MODULE EDGE_GRADIENT_MODULE
 OBJECT MODULE PLACED IN SOURCE/EDGEGRAD.OBJ
 COMPILER INVOKED BY:   :LANG:PLM86 SOURCE/EDGEGRAD.PLM OPTIMIZE(3) ROM SET(TARGET=1)


               $INCLUDE(SOURCE/COPYRIGHT)
           =   /*

           =   ***********************************************************************
           =   *                                                                     *
           =   *                                                                     *
           =   *                   COPYRIGHT CHESEBROUGH-POND'S INC.                 *
           =   *                                                                     *
           =   *                   (c) 1983, CHESEBROUGH-POND'S INC.                 *
           =   *                                                                     *
           =   *                                                                     *
           =   *                                                                     *
           =   *                                                                     *
           =   *     ALL RIGHTS RESERVED. NO PART OF THIS PROGRAM MAY BE REPRODUCED, *
           =   *     TRANSMITTED, TRANSCRIBED, STORED IN A RETRIEVAL SYSTEM, OR      *
           =   *     TRANSLATED INTO ANY LANGUAGE OR COMPUTER LANGUAGE, IN ANY FORM  *
           =   *     OR BY ANY MEANS, ELECTRONIC, MECHANICAL, MAGNETIC, OPTICAL,     *
```

```
     =   *     CHEMICAL, MANUAL OR OTHERWISE, WITHOUT THE EXPRESS WRITTEN PER-        *
     =   *     MISSION OF CHESEBROUGH-POND'S INC., 33 BENEDICT PLACE, GREENWICH,      *
     =   *     CONNECTICUT.                                                           *
     =   *                                                                            *
     =   *                                                                            *
     =   ******************************************************************************

     =   */

             $TITLE('EDGE GRADIENT LOCATOR AND COUNTER PROGRAM')
  1          EDGE_GRADIENT_MODULE:
             DO;
  2    1     DECLARE     DCL      LITERALLY     'DECLARE';
  3    1     DECLARE     LIT      LITERALLY     'LITERALLY';
  4    1     DCL      CAMERA_ON        LIT '03H';
  5    1     DCL      CAMERA_OFF       LIT '00H';
  6    1     DCL      DATA_REG         LIT '00H';
  7    1     DCL      COMMD_REG        LIT '03H';
  8    1     DCL      HOZ_ADD_LO       LIT '04H';
  9    1     DCL      HOZ_ADD_HI       LIT '05H';
 10    1     DCL      VERT_ADD         LIT '06H';
 11    1     DCL      POST_INC_WRITE   LIT '02H';
 12    1     DCL      POST_INC_READ    LIT '01H';
 13    1     EDGE_GRADIENT: PROCEDURE(IMAGE_PTR,FUNCTION_PTR,ST_ROW_PTR,ST_COL_PTR,
                                 THRESHOLD_PTR,MAX_COUNT_PTR,GRAD_COUNT_PTR,
                                 EXCEP_PTR) PUBLIC;
 14    2         DCL      IMAGE_PTR        POINTER,
                          FUNCTION_PTR     POINTER,
                          ST_ROW_PTR       POINTER,
                          ST_COL_PTR       POINTER,
                          THRESHOLD_PTR    POINTER,
                          MAX_COUNT_PTR    POINTER,
                          GRAD_COUNT_PTR   POINTER,
                        EXCEP_PTR        POINTER;
 15    2        DCL     IMAGE_ADD     BASED IMAGE_PTR      BYTE;
 16    2        DCL     FUNCTION      BASED FUNCTION_PTR   BYTE;
 17    2        DCL     ST_ROW        BASED ST_ROW_PTR     WORD;
 18    2        DCL     ST_COL        BASED ST_COL_PTR     WORD;
 19    2        DCL     THRESHOLD     BASED THRESHOLD_PTR  BYTE;
 20    2        DCL     MAX_COUNT     BASED MAX_COUNT_PTR  WORD;
 21    2        DCL     GRAD_COUNT    BASED GRAD_COUNT_PTR WORD;
 22    2        DCL     EXCEP_CODE    BASED EXCEP_PTR      BYTE;

            /* DECLARE FUNCTION CODE MASKS */

 23    2        DCL     GRAD_MASK             LIT      '00000011B';
 24    2        DCL     V_TRACK_MASK          LIT      '00000100B';
 25    2        DCL     GRAD_COUNT_MASK       LIT      '00001000B';
 26    2        DCL     INCREMENT_MASK        LIT      '00110000B';
 27    2        DCL     SIG_MASK              LIT      '01000000B';
 28    2        DCL     NEG_INCREMENT         LIT      '10000000B';
 29    2        DCL     BAD_PARAM             LIT      '00000001B';
 30    2        DCL     IMAGE_RANGE           LIT      '00000010B';
 31    2        DCL     NO_EDGE_FOUND         LIT      '00000100B';

            /*  DECLARE LOCAL VARIABLES    */

 32    2        DCL (I,J,K,L,M)       WORD;
 33    2        DCL LOOP_COUNT        WORD;
 34    2        DCL ROW_COUNT         WORD;
 35    2        DCL COL_COUNT         WORD;
 36    2        DCL ROW_INCR          INTEGER;
 37    2        DCL COL_INCR          INTEGER;
 38    2        DCL ITHRESH           INTEGER;
 39    2        DCL GRAD_CASE         WORD;
 40    2        DCL POI_CASE          WORD;
 41    2        DCL PIXPLUS           WORD;
 42    2        DCL PIXMINUS          WORD;
 43    2        DCL TARGET            WORD;
 44    2        DCL DELTA             INTEGER;
 45    2        DCL PEAK_1            INTEGER;
 46    2        DCL PEAK_2            INTEGER;
 47    2        DCL PEAK_3            INTEGER;
 48    2        DCL INCREMENT         WORD;
 49    2        DCL INCR_3            WORD;
 50    2        DCL H_ADD_LO          WORD;
 51    2        DCL H_ADD_HI          WORD;
 52    2        DCL V_ADD             WORD;
 53    2        DCL C_ADD             WORD;
 54    2        DCL D_ADD             WORD;

            /*  SETUP DATACUBE ADDRESSES  */
 55    2        H_ADD_LO = HOZ_ADD_LO + DOUBLE(IMAGE_ADD);
 56    2        H_ADD_HI = HOZ_ADD_HI + DOUBLE(IMAGE_ADD);
 57    2        V_ADD = VERT_ADD + DOUBLE(IMAGE_ADD);
 58    2        C_ADD = COMMD_REG + DOUBLE(IMAGE_ADD);
```

```
59   2         D_ADD = DATA_REG + DOUBLE(IMAGE_ADD);
            /*  SETUP HORIZONTAL AND VERTICAL  INCREMENTS  */

60   2         ROW_INCR = 0;
61   2         COL_INCR = 0;
62   2         EXCEP_CODE = 0;
63   2         GRAD_CASE = 0;
64   2         POI_CASE = 0;
65   2         PEAK_1 = 0;
66   2         PEAK_2 = 0;
67   2         PEAK_3 = 0;

            /*  DETERMINE INCREMENT  */

68   2         INCREMENT = SHR((FUNCTION AND INCREMENT_MASK),4);
69   2         IF INCREMENT = 0 THEN INCREMENT = 1;
71   2         INCR_3 = 3 * INCREMENT;

72   2             IF (FUNCTION AND V_TRACK_MASK) <> 0 THEN
73   2             DO;
74   3                 ROW_INCR = INT(INCREMENT);
75   3                 POI_CASE = 1;
76   3                 IF (FUNCTION AND NEG_INCREMENT) <> 0 THEN
77   3                     ROW_INCR = -(ROW_INCR);
78   3             END;
79   2         ELSE DO;
80   3                 COL_INCR = INT(INCREMENT);
81   3                 POI_CASE = 1;
82   3                 IF (FUNCTION AND NEG_INCREMENT) <> 0 THEN
83   3                     COL_INCR = -(COL_INCR);
84   3             END;

            /*  NO TRACK SELECTED CHECK FOR GRAD COUNT SELECTED  */
85   2             IF (FUNCTION AND GRAD_COUNT_MASK) <> 0 THEN
86   2             POI_CASE = 0;

            /*  SETUP GRADIENT COMPARISON CASE   */

87   2         GRAD_CASE = DOUBLE(FUNCTION AND GRAD_MASK);
88   2         IF (GRAD_CASE > 3) THEN
89   2             DO;

            /*  BAD GRADIENT MODE SELETCED  */

90   3             EXCEP_CODE = (EXCEP_CODE AND BAD_PARAM);
91   3             RETURN;
92   3         END;

            /*  SETUP VARIABLES FOR MAIN GRADIENT LOOP  */

93   2         PIXPLUS = 0;
94   2         PIXMINUS = 0;
95   2         DELTA = 0;
96   2         ROW_COUNT = ST_ROW;
97   2         COL_COUNT = ST_COL;
98   2         LOOP_COUNT = 0;
99   2         ITHRESH = INT(DOUBLE(THRESHOLD));

            /* CHECK FOR PROPER IMAGE BOUNDARIES */
100  2         IF(ST_COL > 319 OR ST_ROW > 239) THEN RETURN;
            /* MAIN GRADIENT LOOP */
102  2      DO WHILE LOOP_COUNT < MAX_COUNT;
103  3         PIXMINUS = TARGET;
104  3         TARGET = PIXPLUS;

            /* OUTPUT ADDRESSES TO DATA CUBE */
105  3         OUTPUT(V_ADD) = LOW(ROW_COUNT);
106  3         OUTPUT(H_ADD_LO) = LOW(COL_COUNT);
107  3         OUTPUT(H_ADD_HI) = HIGH(COL_COUNT);

            /* READ IN PIXEL DATA  */
108  3         PIXPLUS = DOUBLE(INPUT(D_ADD));

            /* WRITE TRACK BACK OUT */
109  3         IF (PIXPLUS < 32) THEN
110  3             OUTPUT(D_ADD) = 63;
111  3         ELSE
                   OUTPUT(D_ADD) = 0;

            /*  COMPUTE GRADIENT  */

112  3      IF LOOP_COUNT >= (INCR_3) THEN
113  3         DO;
114  4         DELTA = INT(PIXPLUS) - INT(PIXMINUS);

            /* CHECK FOR POINT OF INTEREST i.e. HIGH GRADIENT */

115  4         DO CASE GRAD_CASE;
```

```
116   5              ; /* CASE 0 NULL CASE */

117   5              DO; /* CASE 1 POS GRADIENT SELECTED NO ACTION REQ.  */
118   6              END; /* CASE 1 */

119   5              DO; /* CASE 2 NEG GRADIENT SELETCED NEGATE DELTA.   */
120   6                  DELTA = -(DELTA);
121   6              END;  /* CASE 2 */

122   5              DO; /* CASE 3 ABS VALUE OF DELTA DONT CARE ABOUT DIRECTION */
123   6                  DELTA = IABS(DELTA);
124   6              END; /* CASE 3 */
125   5          END; /* DO CASE */

         /*  CHECK FOR GRADIENT SIGNATURE  */

126   4          IF ((FUNCTION AND SIG_MASK) = 0) THEN
127   4          DO;
         /* COMPARE WITH THRESHOLD */

128   5          IF (DELTA >= ITHRESH) THEN
129   5              DO CASE POI_CASE;

130   6                  DO; /* CASE 0 , GRADIENT COUNTER*/
131   7                      GRAD_COUNT = GRAD_COUNT + 1;
132   7                  END; /* CASE 0*/

133   6                  DO; /* CASE 1 EDGE LOCATE FUNCTION */
                         /* UPDATE ROW AND COLLUMN POSITIONS AND EXIT */

134   7                      ST_ROW = UNSIGN(INT(ROW_COUNT) - ROW_INCR);
135   7                      ST_COL = UNSIGN(INT(COL_COUNT) - COL_INCR);
136   7                      RETURN;
137   7                  END; /* CASE 1 */
138   6              END; /* DO CASE */
139   5          END;
140   4          ELSE DO;
141   5                  PEAK_1 = PEAK_2;
142   5                  PEAK_2 = PEAK_3;
143   5                  PEAK_3 = DELTA;
144   5              IF (PEAK_2 > ITHRESH AND PEAK_2 > PEAK_1 AND PEAK_2 >= PEAK_3) THEN
145   5                  GRAD_COUNT = (SHL(GRAD_COUNT,1) OR 01H);

146   5              IF (PEAK_2 <= -(ITHRESH) AND PEAK_2 < PEAK_1 AND PEAK_2 <= PEAK_3) THEN
147   5                  GRAD_COUNT = (SHL(GRAD_COUNT,1));
148   5          END;
149   4          END; /* LOOPCOUNT IF */

         /* UPDATE COUNTERS */
150   3          LOOP_COUNT = LOOP_COUNT + 1;
151   3          ROW_COUNT = UNSIGN(INT(ROW_COUNT) + ROW_INCR);
152   3          COL_COUNT = UNSIGN(INT(COL_COUNT) + COL_INCR);

         /* CHECK FOR IMAGE BOUNDARIES */
153   3          IF (ROW_COUNT < 0 OR ROW_COUNT > 239 OR
                     COL_COUNT < 0 OR COL_COUNT > 319) THEN
154   3                  DO;
155   4                  EXCEP_CODE = EXCEP_CODE OR IMAGE_RANGE;
156   4                  RETURN;
157   4              END;
158   3      END; /* DO WHILE */

159   2      END; /*EDGEGRAD*/
160   1      END;


MODULE INFORMATION:

     CODE AREA SIZE     = 025FH     607D
     CONSTANT AREA SIZE = 0000H       0D
     VARIABLE AREA SIZE = 0036H      54D
     MAXIMUM STACK SIZE = 0024H      36D
     258 LINES READ
     0 PROGRAM WARNINGS
     0 PROGRAM ERRORS

DICTIONARY SUMMARY:

     47KB MEMORY AVAILABLE
     5KB MEMORY USED   (10%)
     0KB DISK SPACE USED

END OF PL/M-86 COMPILATION
```

```
iRMX 86 PL/M-86 V2.3 COMPILATION OF MODULE FRAMEGRABMODULE
OBJECT MODULE PLACED IN SOURCE/FRAMEGRAB.OBJ
COMPILER INVOKED BY:  :LANG:PLM86 SOURCE/FRAMEGRAB.PLM OPTIMIZE(3) ROM SET(TARGET=1)


              $INCLUDE(SOURCE/COPYRIGHT)
          =   /*

          =   *************************************************************************
          =   *                                                                       *
          =   *                                                                       *
          =   *                  COPYRIGHT CHESEBROUGH-POND'S INC.                    *
          =   *                                                                       *
          =   *                  (c) 1983, CHESEBROUGH-POND'S INC.                    *
          =   *                                                                       *
          =   *                                                                       *
          =   *                                                                       *
          =   *                                                                       *
          =   *     ALL RIGHTS RESERVED. NO PART OF THIS PROGRAM MAY BE REPRODUCED,   *
          =   *     TRANSMITTED, TRANSCRIBED, STORED IN A RETRIEVAL SYSTEM, OR        *
          =   *     TRANSLATED INTO ANY LANGUAGE OR COMPUTER LANGUAGE, IN ANY FORM    *
          =   *     OR BY ANY MEANS, ELECTRONIC, MECHANICAL, MAGNETIC, OPTICAL,       *
          =   *     CHEMICAL, MANUAL OR OTHERWISE, WITHOUT THE EXPRESS WRITTEN PER-   *
          =   *     MISSION OF CHESEBROUGH-POND'S INC., 33 BENEDICT PLACE, GREENWICH, *
          =   *     CONNECTICUT.                                                      *
          =   *                                                                       *
          =   *                                                                       *
          =   *************************************************************************

          =   */
              $TITLE('LIB PROGRAM TO AQUIRE IMAGE')
  1           FRAME$GRAB$MODULE:
              DO;
              $INCLUDE(SOURCE/DCL)
  2    1  =   DECLARE      DCL      LITERALLY    'DECLARE';
  3    1  =   DECLARE      LIT      LITERALLY    'LITERALLY';
              $INCLUDE(SOURCE/DATACUBEDCL)
  4    1  =   DCL      CAMERA_ON         LIT '03H';
  5    1  =   DCL      CAMERA_OFF        LIT '00H';
  6    1  =   DCL      DATA_REG          LIT '10H';
  7    1  =   DCL      COMMD_REG         LIT '13H';
  8    1  =   DCL      HOZ_ADD_LO        LIT '14H';
  9    1  =   DCL      HOZ_ADD_HI        LIT '15H';
 10    1  =   DCL      VERT_ADD          LIT '16H';
 11    1  =   DCL      POST_INC_WRITE    LIT '02H';
 12    1  =   DCL      POST_INC_READ     LIT '01H';
 13    1  =   DCL      DC_BUSY      LIT '40H';
 14    1  =   DCL      WAIT_DC           LIT 'DO WHILE ((INPUT(COMMD_REG) AND DC_BUSY) <> 0);
          =                                  END; ';
 15    1  =   DCL      SET_HI_BIT        LIT 'DO;OUTPUT(15H)=1;OUTPUT(25H)=1;END; ';
 16    1  =   DCL      CLR_HI_BIT        LIT 'DO;OUTPUT(15H)=0;OUTPUT(25H)=0;END; ';

 17    1          DCL      PORT_A       BYTE     EXTERNAL;
 18    1          DCL      PORT_B       BYTE     EXTERNAL;
 19    1          DCL      PORT_C       BYTE     EXTERNAL;
 20    1          DCL      PORT$A$REG   BYTE     EXTERNAL;
 21    1          DCL      PIP          LIT      '01H';
 22    1          DCL      VSYNC        LIT      '01H';
 23    1          DCL      STROBE       LIT      '01H';


 24    1          FRAME$GRAB:
                  PROCEDURE(CAMERA)   PUBLIC;
 25    2          DCL CAMERA  BYTE;

              /*  CLEAR POSITION ADDRESS REGISTERS  */
 26    2          OUTPUT(HOZ_ADD_LO) = 0;
 27    2          OUTPUT(HOZ_ADD_LO + 010H) = 0;
 28    2          OUTPUT(HOZ_ADD_HI) = 0;
 29    2          OUTPUT(HOZ_ADD_HI + 010H) = 0;
 30    2          OUTPUT(VERT_ADD) = 0;
 31    2          OUTPUT(VERT_ADD + 010H) = 0;

              /*  LOOK FOR VERTICAL BUMP DE BUMPS       */

 32    2          DO WHILE (NOT(INPUT(PORT_B)) AND VSYNC) <>0;
 33    3          END;
 34    2          DO WHILE (NOT(INPUT(PORT_B)) AND VSYNC) =0;
 35    3          END;

              /*  FIRE AWAY STROBES         */

 36    2          PORT$A$REG=PORT$A$REG OR STROBE;
 37    2          OUTPUT(PORT_A)=PORT$A$REG;

              /*  TAKE PICTURE          */
```

```
38   2          IF CAMERA < 20H THEN
39   2          DO;
40   3              OUTPUT(COMMD_REG + CAMERA)=CAMERA_ON;
41   3              OUTPUT(COMMD_REG + CAMERA)=CAMERA_OFF;
42   3          END;
43   2          ELSE DO;
44   3              OUTPUT(COMMD_REG )=CAMERA_ON;
45   3              OUTPUT(COMMD_REG+10H)=CAMERA_ON;
46   3              OUTPUT(COMMD_REG)=CAMERA_OFF;
47   3              OUTPUT(COMMD_REG+10H)=CAMERA_OFF;
48   3          END;

            /*  CHECK FOR BUSY       */

49   2          IF CAMERA > 10H THEN CAMERA=0;
51   2          DO WHILE (INPUT(COMMD_REG+CAMERA) AND DC_BUSY) =0;
52   3          END;

            /*  CHECK FOR DATACUBE COMPLETE      */

53   2          DO WHILE (INPUT(COMMD_REG+CAMERA) AND DC_BUSY) <>0;
54   3          END;


55   2          END FRAME$GRAB;
56   1      END FRAME$GRAB$MODULE;


MODULE INFORMATION:

     CODE AREA SIZE      = 0083H    131D
     CONSTANT AREA SIZE  = 0000H      0D
     VARIABLE AREA SIZE  = 0000H      0D
     MAXIMUM STACK SIZE  = 0004H      4D
     109 LINES READ
     0 PROGRAM WARNINGS
     0 PROGRAM ERRORS

DICTIONARY SUMMARY:

     47KB MEMORY AVAILABLE
     4KB MEMORY USED    (8%)
     0KB DISK SPACE USED

END OF PL/M-86 COMPILATION
 iRMX 86 PL/M-86 V2.3 COMPILATION OF MODULE CURSOR_MODULE
 OBJECT MODULE PLACED IN SOURCE/CURSOR_MOD.OBJ
 COMPILER INVOKED BY:   :LANG:PLM86 SOURCE/CURSOR_MOD.PLM OPTIMIZE(3) ROM SET(TARGET=1)


              $INCLUDE(SOURCE/COPYRIGHT)
            =  /*

            =  *****************************************************************************
            =  *                                                                           *
            =  *                                                                           *
            =  *                     COPYRIGHT CHESEBROUGH-POND'S INC.                     *
            =  *                                                                           *
            =  *                     (c) 1983, CHESEBROUGH-POND'S INC.                     *
            =  *                                                                           *
            =  *                                                                           *
            =  *                                                                           *
            =  *                                                                           *
            =  *    ALL RIGHTS RESERVED. NO PART OF THIS PROGRAM MAY BE REPRODUCED,        *
            =  *    TRANSMITTED, TRANSCRIBED, STORED IN A RETRIEVAL SYSTEM, OR             *
            =  *    TRANSLATED INTO ANY LANGUAGE OR COMPUTER LANGUAGE, IN ANY FORM         *
            =  *    OR BY ANY MEANS, ELECTRONIC, MECHANICAL, MAGNETIC, OPTICAL,            *
            =  *    CHEMICAL, MANUAL OR OTHERWISE, WITHOUT THE EXPRESS WRITTEN PER-        *
            =  *    MISSION OF CHESEBROUGH-POND'S INC., 33 BENEDICT PLACE, GREENWICH,      *
            =  *    CONNECTICUT.                                                           *
            =  *                                                                           *
            =  *                                                                           *
            =  *****************************************************************************


            =  */
              $TITLE('LIB PROGRAM TO EXECUTE CURSOR FUNCTION')
   1          CURSOR_MODULE:
              DO;
              $INCLUDE(SOURCE/DCL)
   2    1   = DECLARE      DCL      LITERALLY    'DECLARE';
   3    1   = DECLARE      LIT      LITERALLY    'LITERALLY';
              $INCLUDE(SOURCE/IWCONV.EXT)
            = $SAVE
            = $NOLIST
              /*
```

```
CURSOR ROUTINE TO UPDATE,MOVE AND DISPLAY ONE TO
FOUR CURSORS. A FUNCTION CODE (CURSOR_FUNCTION) IS
PASSED DEFINING THE TASK TO BE PERFORMED. THIS FUNCTION
CODE IS DEFINED AS FOLLOWS:

FUNCTION                          CODE

RESTORE  CURSORS                  XXXXXX00
HOME CURSOR                       XXXXXX01
MOVE CURSOR                       XXXXXX10
DISABLE CURSOR DISPLAY            XXXXXX11
CURSOR 1                          XXXX00XX
CURSOR 2                          XXXX01XX
CURSOR 3                          XXXX10XX
CURSOR 4                          XXXX11XX
ENABLE-X                          XXX1XXXX
ENABLE-Y                          XX1XXXXX
B/F IMAGE                         X1XXXXXX

CURSOR CORDINATES WILL BE UPDATED AND STORED (ROW,COL)
IN A TABLE BASED ON CURSOR_TABLE. AN EXCEPTION CODE WILL
BE RETURNED INDICATING THE TASK STATUS.



***** PROCEDURE DECLARATIONS *****

*/


25   1      CURSOR_HOME:
            PROCEDURE(CURSOR_TABLE,CURSOR,IMAGE)              EXTERNAL;
26   2      DCL CURSOR_TABLE    POINTER;
27   2      DCL (CURSOR,IMAGE)              BYTE;
28   2      END CURSOR_HOME;

29   1      MOVE_CURSOR:
            PROCEDURE(CURSOR_TABLE,CURSOR,IMAGE,DIR_ENABLE)       EXTERNAL;
30   2      DCL CURSOR_TABLE    POINTER;
31   2      DCL (DIR_ENABLE)            BYTE;
32   2      DCL (CURSOR,IMAGE)              BYTE;
33   2      END MOVE_CURSOR;

34   1      CUR_DISABLE:
            PROCEDURE(CURSOR_TABLE,CURSOR,IMAGE)                  EXTERNAL;
35   2      DCL CURSOR_TABLE    POINTER;
36   2      DCL (CURSOR,IMAGE)                  BYTE;
37   2      END CUR_DISABLE;

38   1      CUR_RESTOR:
            PROCEDURE(CURSOR_TABLE,IMAGE)                     EXTERNAL;
39   2      DCL CURSOR_TABLE    POINTER;
40   2      DCL IMAGE                           BYTE;
41   2      END CUR_RESTOR;

42   1      DCL     PORT_C      BYTE            EXTERNAL;

43   1      CURSOR_ROUTINE:
            PROCEDURE(CURSOR_TABLE,CUR_FUNCTION)        PUBLIC;
44   2      DCL CURSOR_TABLE    POINTER;
45   2      DCL CUR_FUNCTION                    BYTE;
46   2      DCL (CURSOR_CORD BASED CURSOR_TABLE)(24) WORD;
47   2      DCL FUNCTION_MASK       LIT     '00000011B';
48   2      DCL CURSOR_MASK         LIT     '00000011B';
49   2      DCL IMAGE_MASK          LIT     '00010000B';
50   2      DCL ENABLE_MASK         LIT     '00000011B';
51   2      DCL FUNCTION                        BYTE;
52   2      DCL (I,J)                           BYTE;
53   2      DCL DIR_ENABLE                      BYTE;
54   2      DCL (CURSOR,IMAGE)                  BYTE;
55   2      DCL STOP_MOVE           LIT     '10H';
56   2      DCL BEL                 LIT     '07H';
57   2      DCL CDATA               LIT     '0DBH';
```

```
              /*  READ FUNCTION CODE  */
 58   2           I=CUR_FUNCTION;
 59   2           I=SHR(I,2);

              /*  DETERMINE CURSOR NUMBER      */
 60   2           CURSOR= CURSOR_MASK AND I;

              /*  DETERMINE IMAGE PLANE    */
 61   2           IMAGE= IMAGE_MASK AND I;

              /*  STORE ENABLED DIRECTION      */
 62   2           I=SHR(I,2);
 63   2           DIR_ENABLE = ENABLE_MASK AND I;

              /*  DETERMINE FUNCTION       */
 64   2           FUNCTION = CUR_FUNCTION AND FUNCTION_MASK;

 65   2           IF ((FUNCTION <4) AND (FUNCTION >= 0 ))THEN
 66   2           DO CASE FUNCTION;
 67   3               DO; /* CASE 0   SET CURSORS TO STORED CORDINATES      */
 68   4                   CALL CUR_RESTOR(CURSOR_TABLE,IMAGE);
 69   4               END;

 70   3               DO; /* CASE 1   HOME AND DISPLAY CURSOR */
 71   4                   CALL CURSOR_HOME(CURSOR_TABLE,CURSOR,IMAGE);
 72   4               END;

 73   3               DO; /* CASE 2   MOVE CURSOR */
 74   4                   I=NOT(INPUT(PORT_C));
 75   4                   I=I AND STOP_MOVE;
 76   4                   DO WHILE I=0;
 77   5                       CALL MOVE_CURSOR(CURSOR_TABLE,CURSOR,IMAGE,DIR_ENABLE);
 78   5                       I=NOT(INPUT(PORT_C));
 79   5                       I= I AND STOP_MOVE;
 80   5                   END;
 81   4                   OUTPUT(CDATA)=BEL;
 82   4               END;

 83   3               DO; /* CASE 3   DISABLE CURSOR DISPLAY  */
 84   4                   DO I=1 TO 4;
 85   5                   CALL CUR_DISABLE(CURSOR_TABLE,(I-1),IMAGE);
 86   5                   END;
 87   4               END;
 88   3           END;
 89   2           END CURSOR_ROUTINE;
 90   1           END CURSOR_MODULE;
```

```
MODULE INFORMATION:

     CODE AREA SIZE     = 00C4H    196D
     CONSTANT AREA SIZE = 0000H      0D
     VARIABLE AREA SIZE = 0006H      6D
     MAXIMUM STACK SIZE = 0014H     20D
     211 LINES READ
     0 PROGRAM WARNINGS
     0 PROGRAM ERRORS

DICTIONARY SUMMARY:

     47KB MEMORY AVAILABLE
     5KB MEMORY USED   (10%)
     0KB DISK SPACE USED

END OF PL/M-86 COMPILATION
```

```
 iRMX 86 PL/M-86 V2.3 COMPILATION OF MODULE CURSOR_HOME_MODULE
 OBJECT MODULE PLACED IN SOURCE/CURSOR_HOM.OBJ
 COMPILER INVOKED BY:  :LANG:PLM86 SOURCE/CURSOR_HOM.PLM OPTIMIZE(3) ROM SET(TARGET=1)
```

```
          $INCLUDE(SOURCE/COPYRIGHT)
     =    /*

     =    ***************************************************************************
     =    *                                                                         *
     =    *                                                                         *
     =    *                    COPYRIGHT CHESEBROUGH-POND'S INC.                    *
     =    *                                                                         *
     =    *                    (c) 1983, CHESEBROUGH-POND'S INC.                    *
     =    *                                                                         *
```

```
           =   *                                                                      *
           =   *                                                                      *
           =   *                                                                      *
           =   *     ALL RIGHTS RESERVED. NO PART OF THIS PROGRAM MAY BE REPRODUCED,  *
           =   *     TRANSMITTED, TRANSCRIBED, STORED IN A RETRIEVAL SYSTEM, OR       *
           =   *     TRANSLATED INTO ANY LANGUAGE OR COMPUTER LANGUAGE, IN ANY FORM   *
           =   *     OR BY ANY MEANS, ELECTRONIC, MECHANICAL, MAGNETIC, OPTICAL,      *
           =   *     CHEMICAL, MANUAL OR OTHERWISE, WITHOUT THE EXPRESS WRITTEN PER-  *
           =   *     MISSION OF CHESEBROUGH-POND'S INC., 33 BENEDICT PLACE, GREENWICH,*
           =   *     CONNECTICUT.                                                     *
           =   *                                                                      *
           =   *                                                                      *
           =   ************************************************************************

           =   */
               $TITLE('LIB PROGRAM TO HOME AND DISPLAY CURSOR')
   1           CURSOR_HOME_MODULE:
               DO;
               $INCLUDE(SOURCE/DCL)
   2    1  =   DECLARE     DCL       LITERALLY    'DECLARE';
   3    1  =   DECLARE     LIT       LITERALLY    'LITERALLY';

   4    1          CUR_UPDATE:
                   PROCEDURE(CURSOR_TABLE, ROW, COL, CURSOR, IMAGE)        EXTERNAL;
   5    2          DCL CURSOR_TABLE                 POINTER;
   6    2          DCL (ROW, COL)                   WORD;
   7    2          DCL (CURSOR, IMAGE)              BYTE;
   8    2          END CUR_UPDATE;


   9    1          CUR_DISP:
                   PROCEDURE(CURSOR_TABLE, CURSOR, IMAGE)         EXTERNAL;
  10    2          DCL CURSOR_TABLE                 POINTER;
  11    2          DCL (CURSOR, IMAGE)              BYTE;
  12    2          END CUR_DISP;



  13    1          CURSOR_HOME:
                   PROCEDURE(CURSOR_TABLE, CURSOR, IMAGE)                 PUBLIC;
  14    2          DCL CURSOR_TABLE                         POINTER;
  15    2          DCL (CURSOR, IMAGE)                      BYTE;
  16    2          DCL (CURSOR_CORD BASED CURSOR_TABLE)(24) WORD;

               /*  SET CURSOR TO HOME CORDINATES (50,50)    */
  17    2          CALL CUR_UPDATE(CURSOR_TABLE, 50, 50, CURSOR, IMAGE);
  18    2          CALL CUR_DISP(CURSOR_TABLE, CURSOR, IMAGE);
  19    2          END CURSOR_HOME;
  20    1      END CURSOR_HOME_MODULE;


MODULE INFORMATION:

     CODE AREA SIZE     = 0028H     40D
     CONSTANT AREA SIZE = 0000H      0D
     VARIABLE AREA SIZE = 0000H      0D
     MAXIMUM STACK SIZE = 0018H     24D
     62 LINES READ
     0 PROGRAM WARNINGS
     0 PROGRAM ERRORS

DICTIONARY SUMMARY:

     47KB MEMORY AVAILABLE
     3KB MEMORY USED    (6%)
     0KB DISK SPACE USED

END OF PL/M-86 COMPILATION
  iRMX 86 PL/M-86 V2.3 COMPILATION OF MODULE CUR_DISP_MODULE
  OBJECT MODULE PLACED IN SOURCE/CUR_DISP.OBJ
  COMPILER INVOKED BY:  :LANG:PLM86 SOURCE/CUR_DISP.PLM OPTIMIZE(3) ROM SET(TARGET=1)


                 $INCLUDE(SOURCE/COPYRIGHT)
             =   /*

             =   ************************************************************************
             =   *                                                                      *
             =   *                                                                      *
             =   *                    COPYRIGHT CHESEBROUGH-POND'S INC.                 *
             =   *                                                                      *
             =   *                    (c) 1983, CHESEBROUGH-POND'S INC.                 *
```

```
           =   *                                                                        *
           =   *                                                                        *
           =   *                                                                        *
           =   *                                                                        *
           =   *     ALL RIGHTS RESERVED. NO PART OF THIS PROGRAM MAY BE REPRODUCED,    *
           =   *     TRANSMITTED, TRANSCRIBED, STORED IN A RETRIEVAL SYSTEM, OR         *
           =   *     TRANSLATED INTO ANY LANGUAGE OR COMPUTER LANGUAGE, IN ANY FORM     *
           =   *     OR BY ANY MEANS, ELECTRONIC, MECHANICAL, MAGNETIC, OPTICAL,        *
           =   *     CHEMICAL, MANUAL OR OTHERWISE, WITHOUT THE EXPRESS WRITTEN PER-    *
           =   *     MISSION OF CHESEBROUGH-POND'S INC., 33 BENEDICT PLACE, GREENWICH,  *
           =   *     CONNECTICUT.                                                       *
           =   *                                                                        *
           =   *                                                                        *
           =   **************************************************************************
```

```
           =   */
               $TITLE('LIB PROGRAM TO DISPLAY CURSOR CROSSHAIRS')
  1            CUR_DISP_MODULE:
               DO;
               $INCLUDE(SOURCE/DCL)
  2    1   =   DECLARE      DCL       LITERALLY     'DECLARE';
  3    1   =   DECLARE      LIT       LITERALLY     'LITERALLY';
               $INCLUDE(SOURCE/DATACUBEDCL)
  4    1   =   DCL      CAMERA_ON          LIT '03H';
  5    1   =   DCL      CAMERA_OFF         LIT '00H';
  6    1   =   DCL      DATA_REG           LIT '10H';
  7    1   =   DCL      COMMD_REG          LIT '13H';
  8    1   =   DCL      HOZ_ADD_LO         LIT '14H';
  9    1   =   DCL      HOZ_ADD_HI         LIT '15H';
 10    1   =   DCL      VERT_ADD           LIT '16H';
 11    1   =   DCL      POST_INC_WRITE     LIT '02H';
 12    1   =   DCL      POST_INC_READ      LIT '01H';
 13    1   =   DCL      DC_BUSY      LIT '40H';
 14    1   =   DCL      WAIT_DC            LIT 'DO WHILE ((INPUT(COMMD_REG) AND DC_BUSY) <> 0);
           =                                   END; ';
 15    1   =   DCL      SET_HI_BIT         LIT 'DO; OUTPUT(15H)=1; OUTPUT(25H)=1; END; ';
 16    1   =   DCL      CLR_HI_BIT         LIT 'DO; OUTPUT(15H)=0; OUTPUT(25H)=0; END; ';

 17    1           CUR_DISP:
                   PROCEDURE(CURSOR_TABLE, CURSOR, IMAGE)          PUBLIC;
 18    2           DCL CURSOR_TABLE             POINTER;
 19    2           DCL (CURSOR, IMAGE)       BYTE;
 20    2           DCL (CURSOR_CORD BASED CURSOR_TABLE)(24) WORD;
 21    2           DCL (J, ADJ_IP)           BYTE;
 22    2           DCL (I, ROW, COL)      WORD;


               /*  DETERMINE ADDRESS OD ADJACENT IMAGE */
 23    2           IF IMAGE =0 THEN ADJ_IP=10H;
 25    2                     ELSE ADJ_IP=0;


               /*  INITIALIZE  DATACUBES              */
 26    2           OUTPUT(COMMD_REG+IMAGE)=CAMERA_OFF;
 27    2           OUTPUT(COMMD_REG+ADJ_IP)=CAMERA_OFF;

               /*  DETERMINE CURSOR CORDINATES  */
 28    2               ROW=CURSOR_CORD(CURSOR *2 +IMAGE);
 29    2               COL=CURSOR_CORD(CURSOR *2 +IMAGE +1);


               /*  READ ADJACENT MEMORY AND DISPLAY CURSOR */
 30    3           IF COL > 255     THEN SET_HI_BIT
 35    2                            ELSE CLR_HI_BIT;
 40    2           OUTPUT(HOZ_ADD_LO +ADJ_IP)= LOW(COL);
 41    2           OUTPUT(HOZ_ADD_LO +IMAGE)= LOW(COL);
 42    2           DO I=(ROW -2) TO (ROW+2);
 43    3               OUTPUT(VERT_ADD +IMAGE)=LOW(I);
 44    3               OUTPUT(VERT_ADD +ADJ_IP)=LOW(I);
 45    3               J=INPUT(DATA_REG +ADJ_IP);
 46    3               IF J>32 THEN OUTPUT(DATA_REG +IMAGE)=0;
 48    3                       ELSE OUTPUT(DATA_REG +IMAGE)=63;
 49    3           END;

 50    2           OUTPUT(VERT_ADD +ADJ_IP)=LOW(ROW);
 51    2           OUTPUT(VERT_ADD +IMAGE)=LOW(ROW);
 52    2           DO I=(COL-2) TO (COL +2);
 53    4               IF I> 255     THEN SET_HI_BIT
 58    3                             ELSE CLR_HI_BIT;
 63    3               OUTPUT(HOZ_ADD_LO +IMAGE)=LOW(I);
 64    3               OUTPUT(HOZ_ADD_LO +ADJ_IP)=LOW(I);
 65    3               J=INPUT(DATA_REG+ADJ_IP);
 66    3               IF J>32 THEN OUTPUT(DATA_REG +IMAGE)=0;
 68    3                       ELSE OUTPUT(DATA_REG +IMAGE)=63;
```

```
 69   3            END;
 70   2            END CUR_DISP;
 71   1        END CUR_DISP_MODULE;


MODULE INFORMATION:

     CODE AREA SIZE     = 0155H    341D
     CONSTANT AREA SIZE = 0000H      0D
     VARIABLE AREA SIZE = 0008H      8D
     MAXIMUM STACK SIZE = 000AH     10D
     99 LINES READ
     0 PROGRAM WARNINGS
     0 PROGRAM ERRORS

DICTIONARY SUMMARY:

     47KB MEMORY AVAILABLE
     4KB MEMORY USED   (8%)
     0KB DISK SPACE USED

END OF PL/M-86 COMPILATION
iRMX 86 PL/M-86 V2.3 COMPILATION OF MODULE CUR_RESTOR_MODULE
OBJECT MODULE PLACED IN SOURCE/CUR_RESTOR.OBJ
COMPILER INVOKED BY:  :LANG:PLM86 SOURCE/CUR_RESTOR.PLM OPTIMIZE(3) ROM SET(TARGET=1)


            $INCLUDE(SOURCE/COPYRIGHT)
          = /*

          = ***********************************************************************
          = *                                                                     *
          = *                                                                     *
          = *                   COPYRIGHT CHESEBROUGH-POND'S INC.                 *
          = *                                                                     *
          = *                   (c) 1983, CHESEBROUGH-POND'S INC.                 *
          = *                                                                     *
          = *                                                                     *
          = *                                                                     *
          = *                                                                     *
          = *     ALL RIGHTS RESERVED. NO PART OF THIS PROGRAM MAY BE REPRODUCED, *
          = *     TRANSMITTED, TRANSCRIBED, STORED IN A RETRIEVAL SYSTEM, OR      *
          = *     TRANSLATED INTO ANY LANGUAGE OR COMPUTER LANGUAGE, IN ANY FORM  *
          = *     OR BY ANY MEANS, ELECTRONIC, MECHANICAL, MAGNETIC, OPTICAL,     *
          = *     CHEMICAL, MANUAL OR OTHERWISE, WITHOUT THE EXPRESS WRITTEN PER- *
          = *     MISSION OF CHESEBROUGH-POND'S INC., 33 BENEDICT PLACE, GREENWICH,*
          = *     CONNECTICUT.                                                    *
          = *                                                                     *
          = *                                                                     *
          = ***********************************************************************

          = */
            $TITLE('LIB PROGRAM TO RESTORE CURSORS AT THERE CORDINATES')
  1         CUR_RESTOR_MODULE:
            DO;
            $INCLUDE(SOURCE/DCL)
  2   1   = DECLARE      DCL      LITERALLY    'DECLARE';
  3   1   = DECLARE      LIT      LITERALLY    'LITERALLY';

  4   1         CUR_DISP:
                PROCEDURE(CURSOR_TABLE,CURSOR,IMAGE)            EXTERNAL;
  5   2         DCL CURSOR_TABLE                   POINTER;
  6   2         DCL (CURSOR,IMAGE)                 BYTE;
  7   2         END CUR_DISP;


  8   1         CUR_RESTOR:
                PROCEDURE(CURSOR_TABLE,IMAGE)                          PUBLIC;
  9   2         DCL CURSOR_TABLE                   POINTER;
 10   2         DCL (IMAGE)                    BYTE;
 11   2         DCL (CURSOR_CORD BASED CURSOR_TABLE)(24) WORD;
 12   2         DCL I                          BYTE;


 13   2         DO I=1 TO 4;
 14   3             CALL CUR_DISP(CURSOR_TABLE,(I-1),IMAGE);
 15   3         END;
 16   2         END CUR_RESTOR;
 17   1     END CUR_RESTOR_MODULE;
```

```
MODULE INFORMATION:

     CODE AREA SIZE     = 0027H     39D
     CONSTANT AREA SIZE = 0000H      0D
     VARIABLE AREA SIZE = 0001H      1D
     MAXIMUM STACK SIZE = 0012H     18D
     53 LINES READ
     0 PROGRAM WARNINGS
     0 PROGRAM ERRORS

DICTIONARY SUMMARY:

     47KB MEMORY AVAILABLE
     3KB MEMORY USED   (6%)
     0KB DISK SPACE USED

END OF PL/M-86 COMPILATION

iRMX 86 PL/M-86 V2.3 COMPILATION OF MODULE CUR_DISABLE_MODULE
OBJECT MODULE PLACED IN SOURCE/CUR_DISABL.OBJ
COMPILER INVOKED BY:  :LANG:PLM86 SOURCE/CUR_DISABL.PLM OPTIMIZE(3) ROM SET(TARGET=1)


            $INCLUDE(SOURCE/COPYRIGHT)
         =  /*

         =  ******************************************************************************
         =  *                                                                            *
         =  *                                                                            *
         =  *                     COPYRIGHT CHESEBROUGH-POND'S INC.                      *
         =  *                                                                            *
         =  *                     (c) 1983, CHESEBROUGH-POND'S INC.                      *
         =  *                                                                            *
         =  *                                                                            *
         =  *                                                                            *
         =  *                                                                            *
         =  *     ALL RIGHTS RESERVED. NO PART OF THIS PROGRAM MAY BE REPRODUCED,        *
         =  *     TRANSMITTED, TRANSCRIBED, STORED IN A RETRIEVAL SYSTEM, OR             *
         =  *     TRANSLATED INTO ANY LANGUAGE OR COMPUTER LANGUAGE, IN ANY FORM         *
         =  *     OR BY ANY MEANS, ELECTRONIC, MECHANICAL, MAGNETIC, OPTICAL,            *
         =  *     CHEMICAL, MANUAL OR OTHERWISE, WITHOUT THE EXPRESS WRITTEN PER-        *
         =  *     MISSION OF CHESEBROUGH-POND'S INC., 33 BENEDICT PLACE, GREENWICH,      *
         =  *     CONNECTICUT.                                                           *
         =  *                                                                            *
         =  *                                                                            *
         =  ******************************************************************************

         =  */

            $TITLE('LIB PROGRAM TO DISABLE A SELECTED CURSOR')
  1         CUR_DISABLE_MODULE:
            DO;
            $INCLUDE(SOURCE/DCL)
  2   1  =  DECLARE     DCL      LITERALLY    'DECLARE';
  3   1  =  DECLARE     LIT      LITERALLY    'LITERALLY';

  4   1         UPDATE_WIND:
                PROCEDURE(CURSOR_TABLE,CURSOR,IMAGE)          EXTERNAL;
  5   2         DCL CURSOR_TABLE          POINTER;
  6   2         DCL (CURSOR,IMAGE)        BYTE;
  7   2         END UPDATE_WIND;

  8   1         CUR_DISABLE:
                PROCEDURE(CURSOR_TABLE,CURSOR,IMAGE)          PUBLIC;
  9   2         DCL CURSOR_TABLE              POINTER;
 10   2         DCL (CURSOR,IMAGE)            BYTE;
 11   2         DCL (CURSOR_CORD BASED CURSOR_TABLE)(24) WORD;


 12   2         CALL UPDATE_WIND(CURSOR_TABLE,CURSOR,IMAGE);
 13   2         END CUR_DISABLE;
 14   1     END CUR_DISABLE_MODULE;

MODULE INFORMATION:

     CODE AREA SIZE     = 0015H     21D
     CONSTANT AREA SIZE = 0000H      0D
     VARIABLE AREA SIZE = 0000H      0D
     MAXIMUM STACK SIZE = 0014H     20D
     50 LINES READ
     0 PROGRAM WARNINGS
     0 PROGRAM ERRORS
```

```
DICTIONARY SUMMARY:

     47KB MEMORY AVAILABLE
     3KB MEMORY USED   (6%)
     0KB DISK SPACE USED

END OF PL/M-86 COMPILATION

iRMX 86 PL/M-86 V2.3 COMPILATION OF MODULE MOVE_CURSOR_MODULE
OBJECT MODULE PLACED IN SOURCE/MOVE_CURSR.OBJ
COMPILER INVOKED BY:  :LANG:PLM86 SOURCE/MOVE_CURSR.PLM OPTIMIZE(3) ROM SET(TARGET=1)

              $INCLUDE(SOURCE/COPYRIGHT)
          =   /*

          =   ******************************************************************************
          =   *                                                                            *
          =   *                                                                            *
          =   *                  COPYRIGHT CHESEBROUGH-POND'S INC.                         *
          =   *                                                                            *
          =   *                  (c) 1983, CHESEBROUGH-POND'S INC.                         *
          =   *                                                                            *
          =   *                                                                            *
          =   *                                                                            *
          =   *                                                                            *
          =   *    ALL RIGHTS RESERVED. NO PART OF THIS PROGRAM MAY BE REPRODUCED,         *
          =   *    TRANSMITTED, TRANSCRIBED, STORED IN A RETRIEVAL SYSTEM, OR              *
          =   *    TRANSLATED INTO ANY LANGUAGE OR COMPUTER LANGUAGE, IN ANY FORM          *
          =   *    OR BY ANY MEANS, ELECTRONIC, MECHANICAL, MAGNETIC, OPTICAL,             *
          =   *    CHEMICAL, MANUAL OR OTHERWISE, WITHOUT THE EXPRESS WRITTEN PER-         *
          =   *    MISSION OF CHESEBROUGH-POND'S INC., 33 BENEDICT PLACE, GREENWICH,       *
          =   *    CONNECTICUT.                                                            *
          =   *                                                                            *
          =   *                                                                            *
          =   ******************************************************************************

          =   */

              $TITLE('LIB PROGRAM TO MOVE CURSOR')
  1           MOVE_CURSOR_MODULE:
              DO;
              $INCLUDE(SOURCE/DCL)
  2    1  =   DECLARE    DCL    LITERALLY    'DECLARE';
  3    1  =   DECLARE    LIT    LITERALLY    'LITERALLY';
              $INCLUDE(SOURCE/IMCONV.EXT)
          =   $SAVE
          =   $NOLIST

 25    1         UPDATE_WIND:
                 PROCEDURE(CURSOR_TABLE,CURSOR,IMAGE)          EXTERNAL;
 26    2         DCL CURSOR_TABLE         POINTER;
 27    2         DCL (CURSOR,IMAGE)       BYTE;
 28    2         END UPDATE_WIND;

 29    1         MOVE:
                 PROCEDURE(CURSOR_TABLE,CURSOR,IMAGE,DIR)      EXTERNAL;
 30    2         DCL CURSOR_TABLE         POINTER;
 31    2         DCL (CURSOR,IMAGE)   BYTE;
 32    2         DCL DIR              BYTE;
 33    2         END MOVE;

 34    1         CUR_DISP:
                 PROCEDURE(CURSOR_TABLE,CURSOR,IMAGE)          EXTERNAL;
 35    2         DCL CURSOR_TABLE         POINTER;
 36    2         DCL (CURSOR,IMAGE)       BYTE;
 37    2         END CUR_DISP;

 38    1         DCL PORT_B       BYTE        EXTERNAL;

 39    1         MOVE_CURSOR:
                 PROCEDURE(CURSOR_TABLE,CURSOR,IMAGE,DIR_ENABLE) PUBLIC;
 40    2         DCL CURSOR_TABLE         POINTER;
 41    2         DCL (DIR_ENABLE)     BYTE;
 42    2         DCL (CURSOR,IMAGE)       BYTE;
 43    2         DCL (CURSOR_CORD BASED CURSOR_TABLE)(24) WORD;
 44    2         DCL I                    WORD;
 45    2         DCL DIR_MASK      LIT              '00000001B';
 46    2         DCL (J,K,DIR)                        BYTE;
 47    2         DCL X_ENABLE      LIT              '00000001B';
 48    2         DCL Y_ENABLE      LIT              '00000010B';
 49    2         DCL DELAY         INTEGER;
```

```
           /*  DETERMINE DIRECTION OF MOVEMENT      */
  2            DIR=NOT(INPUT(PORT_B));
  2            DIR=SHR(DIR,4);
  2            DO I=1 TO 4;
  3                J=DIR_MASK AND DIR;
  3                IF J=1 THEN
  3                DO CASE (I-1);
  4                    DO;      /* CASE 0  MOVE LEFT      */
  5                        IF(DIR_ENABLE AND X_ENABLE) >0 THEN
  5                        DO;
  6                            CALL UPDATE_WIND(CURSOR_TABLE,CURSOR,IMAGE);
  6                            K=0;
  6                            CALL MOVE(CURSOR_TABLE,CURSOR,IMAGE,K);
  6                            CALL CUR_DISP(CURSOR_TABLE,CURSOR,IMAGE);
  6                        END;
  5                    END;
  4                    DO;      /* CASE 1 MOVE RIGHT      */
  5                        IF(DIR_ENABLE AND X_ENABLE) >0 THEN
  5                        DO;
  6                            CALL UPDATE_WIND(CURSOR_TABLE,CURSOR,IMAGE);
  6                            K=1;
  6                            CALL MOVE(CURSOR_TABLE,CURSOR,IMAGE,K);
  6                            CALL CUR_DISP(CURSOR_TABLE,CURSOR,IMAGE);
  6                        END;
  5                    END;
  4                    DO;      /* CASE 2 MOVE UP         */
  5                        IF (DIR_ENABLE AND Y_ENABLE) > 0 THEN
  5                        DO;
  6                            CALL UPDATE_WIND(CURSOR_TABLE,CURSOR,IMAGE);
  6                            K=2;
  6                            CALL MOVE(CURSOR_TABLE,CURSOR,IMAGE,K);
  6                            CALL CUR_DISP(CURSOR_TABLE,CURSOR,IMAGE);
  6                        END;
  5                    END;
  4                    DO;      /* CASE 3 MOVE DOWN       */
  5                        IF (DIR_ENABLE AND Y_ENABLE) >0 THEN
  5                        DO;
  6                            CALL UPDATE_WIND(CURSOR_TABLE,CURSOR,IMAGE);
  6                            K=3;
  6                            CALL MOVE(CURSOR_TABLE,CURSOR,IMAGE,K);
  6                            CALL CUR_DISP(CURSOR_TABLE,CURSOR,IMAGE);
  6                        END;
  5                    END;
  4            END;
           /*      DISPLAY CURSORS       */

  3            DO J=1 TO 4;
  4            CALL CUR_DISP(CURSOR_TABLE,(J-1),IMAGE);
  4            END;

           /*      DELAY A BIT */

  3            DO DELAY=1 TO 800;
  4            END;

  3            DIR=SHR(DIR,1);
  3            END;
  2            END MOVE_CURSOR;
  1        END MOVE_CURSOR_MODULE;
```

```
MODULE INFORMATION:

     CODE AREA SIZE     = 010EH    270D
     CONSTANT AREA SIZE = 0000H      0D
     VARIABLE AREA SIZE = 0007H      7D
     MAXIMUM STACK SIZE = 0018H     24D
     159 LINES READ
     0 PROGRAM WARNINGS
     0 PROGRAM ERRORS

DICTIONARY SUMMARY:

     47KB MEMORY AVAILABLE
     4KB MEMORY USED   (8%)
     0KB DISK SPACE USED

END OF PL/M-86 COMPILATION
```

```
iRMX 86 PL/M-86 V2.3 COMPILATION OF MODULE UPDATE_WIND_MODULE
OBJECT MODULE PLACED IN SOURCE/UPDATE_WIN.OBJ
COMPILER INVOKED BY:  :LANG:PLM86 SOURCE/UPDATE_WIN.PLM OPTIMIZE(3) ROM SET(TARGET=1)

             $INCLUDE(SOURCE/COPYRIGHT)
          =  /*

          =  ****************************************************************************
          =  *                                                                          *
          =  *                                                                          *
          =  *                  COPYRIGHT CHESEBROUGH-POND'S INC.                       *
          =  *                                                                          *
          =  *                  (c) 1983, CHESEBROUGH-POND'S INC.                       *
          =  *                                                                          *
          =  *                                                                          *
          =  *                                                                          *
          =  *                                                                          *
          =  *    ALL RIGHTS RESERVED. NO PART OF THIS PROGRAM MAY BE REPRODUCED,       *
          =  *    TRANSMITTED, TRANSCRIBED, STORED IN A RETRIEVAL SYSTEM, OR            *
          =  *    TRANSLATED INTO ANY LANGUAGE OR COMPUTER LANGUAGE, IN ANY FORM        *
          =  *    OR BY ANY MEANS, ELECTRONIC, MECHANICAL, MAGNETIC, OPTICAL,           *
          =  *    CHEMICAL, MANUAL OR OTHERWISE, WITHOUT THE EXPRESS WRITTEN PER-       *
          =  *    MISSION OF CHESEBROUGH-POND'S INC., 33 BENEDICT PLACE, GREENWICH,     *
          =  *    CONNECTICUT.                                                          *
          =  *                                                                          *
          =  *                                                                          *
          =  ****************************************************************************

          =  */

             $TITLE('LIB PROGRAM TO RESTORE CURSOR WINDOW')
 1           UPDATE_WIND_MODULE:

             DO;
             $INCLUDE(SOURCE/DCL)
 2    1   =  DECLARE    DCL      LITERALLY   'DECLARE';
 3    1   =  DECLARE    LIT      LITERALLY   'LITERALLY';
             $INCLUDE(SOURCE/DATACUBEDCL)
 4    1   =  DCL     CAMERA_ON        LIT '03H';
 5    1   =  DCL     CAMERA_OFF       LIT '00H';
 6    1   =  DCL     DATA_REG         LIT '10H';
 7    1   =  DCL     COMMD_REG        LIT '13H';
 8    1   =  DCL     HOZ_ADD_LO       LIT '14H';
 9    1   =  DCL     HOZ_ADD_HI       LIT '15H';
10    1   =  DCL     VERT_ADD         LIT '16H';
11    1   =  DCL     POST_INC_WRITE   LIT '02H';
12    1   =  DCL     POST_INC_READ    LIT '01H';
13    1   =  DCL     DC_BUSY      LIT '40H';
14    1   =  DCL     WAIT_DC          LIT 'DO WHILE ((INPUT(COMMD_REG) AND DC_BUSY) <> 0);
          =                                END; ';
15    1   =  DCL     SET_HI_BIT       LIT 'DO;OUTPUT(15H)=1;OUTPUT(25H)=1;END; ';
16    1   =  DCL     CLR_HI_BIT       LIT 'DO;OUTPUT(15H)=0;OUTPUT(25H)=0;END; ';

17    1         UPDATE_WIND:
                PROCEDURE(CURSOR_TABLE,CURSOR,IMAGE)         PUBLIC;
18    2         DCL CURSOR_TABLE     POINTER;
19    2         DCL (CURSOR,IMAGE)        BYTE;
20    2         DCL (CURSOR_CORD BASED CURSOR_TABLE)(24) WORD;
21    2         DCL (I,J,ADJ_IP,ROW,COL)          WORD;

             /* DETERMINE ADDRESS OF ADJACENT IMAGE PLANE    */
22    2         IF IMAGE=0 THEN ADJ_IP =10H;
24    2                   ELSE ADJ_IP =0;

             /* DETERMINE CURSOR CORDINATES */
25    2         ROW=CURSOR_CORD(CURSOR *2+IMAGE);
26    2         COL=CURSOR_CORD(CURSOR *2+IMAGE +1);

             /* READ FROM ADJACENT IP TO IMAGE  */
27    3         IF COL> 255 THEN SET_HI_BIT
32    2                     ELSE CLR_HI_BIT;
37    2         OUTPUT(HOZ_ADD_LO +ADJ_IP)=LOW(COL);
38    2         OUTPUT(HOZ_ADD_LO +IMAGE)=LOW(COL);
39    2         DO I= (ROW-2) TO (ROW+2);
40    3             OUTPUT(VERT_ADD +IMAGE)=LOW(I);
41    3             OUTPUT(VERT_ADD +ADJ_IP)=LOW(I);
42    3             OUTPUT(DATA_REG +IMAGE)= INPUT(DATA_REG +ADJ_IP);
43    3         END;

44    2         OUTPUT(VERT_ADD +ADJ_IP) =LOW(ROW);
45    2         OUTPUT(VERT_ADD +IMAGE)= LOW(ROW);
46    2         DO I=(COL-2) TO (COL +2);
47    4             IF I > 255  THEN SET_HI_BIT
52    3                         ELSE CLR_HI_BIT;
```

```
57   3          OUTPUT(HOZ_ADD_LO +IMAGE)=LOW(I);
58   3          OUTPUT(HOZ_ADD_LO +ADJ_IP)=LOW(I);
59   3          OUTPUT(DATA_REG + IMAGE)=INPUT(DATA_REG +ADJ_IP);
60   3      END;
61   2      END UPDATE_WIND;
62   1  END UPDATE_WIND_MODULE;


MODULE INFORMATION:

     CODE AREA SIZE     = 0115H    277D
     CONSTANT AREA SIZE = 0000H      0D
     VARIABLE AREA SIZE = 000AH     10D
     MAXIMUM STACK SIZE = 000CH     12D
     87 LINES READ
     0 PROGRAM WARNINGS
     0 PROGRAM ERRORS

DICTIONARY SUMMARY:

     47KB MEMORY AVAILABLE
     4KB MEMORY USED   (8%)
     0KB DISK SPACE USED

END OF PL/M-86 COMPILATION
 iRMX 86 PL/M-86 V2.3 COMPILATION OF MODULE CUR_UPDATE_MODULE
 OBJECT MODULE PLACED IN SOURCE/CUR_UPDATE.OBJ
 COMPILER INVOKED BY:  :LANG:PLM86 SOURCE/CUR_UPDATE.PLM OPTIMIZE(3) ROM SET(TARGET=1)


             $INCLUDE(SOURCE/COPYRIGHT)
          =  /*

          =  ****************************************************************************
          =  *                                                                          *
          =  *                                                                          *
          =  *                  COPYRIGHT CHESEBROUGH-POND'S INC.                       *
          =  *                                                                          *
          =  *                  (c) 1983, CHESEBROUGH-POND'S INC.                       *
          =  *                                                                          *
          =  *                                                                          *
          =  *                                                                          *
          =  *                                                                          *
          =  *     ALL RIGHTS RESERVED. NO PART OF THIS PROGRAM MAY BE REPRODUCED,      *
          =  *     TRANSMITTED, TRANSCRIBED, STORED IN A RETRIEVAL SYSTEM, OR           *
          =  *     TRANSLATED INTO ANY LANGUAGE OR COMPUTER LANGUAGE, IN ANY FORM       *
          =  *     OR BY ANY MEANS, ELECTRONIC, MECHANICAL, MAGNETIC, OPTICAL,          *
          =  *     CHEMICAL, MANUAL OR OTHERWISE, WITHOUT THE EXPRESS WRITTEN PER-      *
          =  *     MISSION OF CHESEBROUGH-POND'S INC., 33 BENEDICT PLACE, GREENWICH,    *
          =  *     CONNECTICUT                                                          *
          =  *                                                                          *
          =  *                                                                          *
          =  ****************************************************************************

          =  */

             $TITLE('LIB PROGRAM TO UPDATE CURSOR CORDINATES')
  1          CUR_UPDATE_MODULE:
             DO;

             $INCLUDE(SOURCE/DCL)
  2    1  =  DECLARE      DCL      LITERALLY   'DECLARE';
  3    1  =  DECLARE      LIT      LITERALLY   'LITERALLY';
             $INCLUDE(SOURCE/IMCONV.EXT)
          =  $SAVE
          =  $NOLIST

 25    1         CUR_UPDATE:
                 PROCEDURE(CURSOR_TABLE,ROW,COL,CURSOR,IMAGE)    PUBLIC;
 26    2         DCL CURSOR_TABLE     POINTER;
 27    2         DCL (ROW,COL)        WORD;
 28    2         DCL (CURSOR,IMAGE)   BYTE;
 29    2         DCL (CURSOR_CORD BASED CURSOR_TABLE)(24) WORD;


 30    2         CURSOR_CORD(CURSOR * 2 +IMAGE)=ROW;
 31    2         CURSOR_CORD(CURSOR * 2 +IMAGE +1)=COL;


 32    2         END CUR_UPDATE;
```

```
  33   1        END CUR_UPDATE_MODULE;


MODULE INFORMATION:

     CODE AREA SIZE      = 0029H     41D
     CONSTANT AREA SIZE = 0000H      0D
     VARIABLE AREA SIZE = 0000H      0D
     MAXIMUM STACK SIZE = 000EH     14D
     86 LINES READ
     0 PROGRAM WARNINGS
 -   0 PROGRAM ERRORS

DICTIONARY SUMMARY:

     47KB MEMORY AVAILABLE
     4KB MEMORY USED    (8%)
     0KB DISK SPACE USED

END OF PL/M-86 COMPILATION

iRMX 86 PL/M-86 V2 3 COMPILATION OF MODULE MOVE_MODULE
OBJECT MODULE PLACED IN SOURCE/MOVE.OBJ
COMPILER INVOKED BY:  :LANG:PLM86 SOURCE/MOVE.PLM OPTIMIZE(3) ROM SET(TARGET=1)


              $INCLUDE(SOURCE/COPYRIGHT)
          =   /*

          =   ****************************************************************************
          =   *                                                                          *
          =   *                                                                          *
          =   *                     COPYRIGHT CHESEBROUGH-POND'S INC.                    *
          =   *                                                                          *
          =   *                     (c) 1983, CHESEBROUGH-POND'S INC.                    *
          =   *                                                                          *
          =   *                                                                          *
          =   *                                                                          *
          =   *                                                                          *
          =   *      ALL RIGHTS RESERVED. NO PART OF THIS PROGRAM MAY BE REPRODUCED,     *
          =   *      TRANSMITTED, TRANSCRIBED, STORED IN A RETRIEVAL SYSTEM, OR          *
          =   *      TRANSLATED INTO ANY LANGUAGE OR COMPUTER LANGUAGE, IN ANY FORM      *
          =   *      OR BY ANY MEANS, ELECTRONIC, MECHANICAL, MAGNETIC, OPTICAL,         *
          =   *      CHEMICAL, MANUAL OR OTHERWISE, WITHOUT THE EXPRESS WRITTEN PER-     *
          =   *      MISSION OF CHESEBROUGH-POND'S INC., 33 BENEDICT PLACE, GREENWICH,   *
          =   *      CONNECTICUT.                                                        *
          =   *                                                                          *
          =   *                                                                          *
          =   ****************************************************************************


          =   */
              $TITLE('LID PROGRAM TO MOVE CURSOR CORDINATES ')
   1          MOVE_MODULE:
              DO;
              $INCLUDE(SOURCE/DCL)
   2   1  =   DECLARE       DCL       LITERALLY    'DECLARE';
   3   1  =   DECLARE       LIT       LITERALLY    'LITERALLY';


   4   1          MOVE:
                  PROCEDURE(CURSOR_TABLE,CURSOR,IMAGE,DIR)          PUBLIC;
   5   2          DCL CURSOR_TABLE          POINTER;
   6   2          DCL DIR                         BYTE;
   7   2          DCL (CURSOR,IMAGE)              BYTE;
   8   2          DCL (CURSOR_CORD BASED CURSOR_TABLE)(24) WORD;
   9   2          DCL (I,J)                             BYTE;

              /*  MOVE ACCORDING TO DIRECTION       */
  10   2          DO CASE DIR;
  11   3              DO;       /* CASE 0  MOVE LEFT     */
  12   4                  IF CURSOR_CORD(CURSOR*2 +IMAGE +1) >4 THEN
  13   4                  DO;
  14   5                  CURSOR_CORD(CURSOR * 2+IMAGE+1)=(CURSOR_CORD(CURSOR*2+IMAGE+1))-1;
  15   5                  END;
  16   4              END;
  17   3              DO;       /* CASE 1  MOVE RIGHT    */
  18   4                  IF CURSOR_CORD(CURSOR*2+IMAGE+1) <316 THEN
  19   4                  DO;
  20   5                  CURSOR_CORD(CURSOR *2+IMAGE+1)=(CURSOR_CORD(CURSOR *2+IMAGE+1))+1;
  21   5                  END;
  22   4              END;
  23   3              DO;       /* CASE 2  MOVE UP       */
  24   4                  IF CURSOR_CORD(CURSOR*2+IMAGE) >4 THEN
  25   4                  DO;
  26   5                  CURSOR_CORD(CURSOR *2+IMAGE)=(CURSOR_CORD(CURSOR *2+IMAGE))-1;
  27   5                  END;
```

```
 4              END;
 3              DO;        /* CASE 3  MOVE DOWN     */
 4                  IF CURSOR_CORD(CURSOR*2+IMAGE)<236 THEN
 4                  DO;
 5                  CURSOR_CORD(CURSOR*2+IMAGE)=(CURSOR_CORD(CURSOR *2+IMAGE))+1;
 5                  END;
 4              END;
 3          END;
 2          END MOVE;
 1      END MOVE_MODULE;


MODULE INFORMATION:

     CODE AREA SIZE      = 009FH     159D
     CONSTANT AREA SIZE  = 0000H       0D
     VARIABLE AREA SIZE  = 0002H       2D
     MAXIMUM STACK SIZE  = 000CH      12D
     72 LINES READ
     0 PROGRAM WARNINGS
     0 PROGRAM ERRORS

DICTIONARY SUMMARY:

     47KB MEMORY AVAILABLE
     3KB MEMORY USED   (6%)
     0KB DISK SPACE USED

END OF PL/M-86 COMPILATION
```

What we claim is:

1. A video measuring system comprising:
(a) a TV camera for taking a picture, said camera having a two-axis array of photosensors;
(b) interface/memory circuitry connected to said TV camera for digitizing and storing said picture;
(c) a digital computer connected to said interface/-memory circuitry;
(d) a monitor connected to said computer for displaying the stored picture;
(e) a keyboard connected to said computer to permit an operator to communicate with said computer;
(f) means connected to said computer for locating a plurality of start search points for the picture on the monitor;
(g) means for storing the start search points;
(h) means for selecting and storing gradient thresholds for a plurality of points for the picture on the monitor, said gradient thresholds comprising digital numbers having both a sign and a magnitude; and
(i) means for storing the difference between a pair of points for the picture on the monitor.

2. A system according to claim 1 further comprising means for selecting and storing a tolerance for said difference.

3. A system according to claim 2 further comprising means for determining and storing horizontal and vertical references for the picture on the monitor and means for selecting and storing additional start search points for said picture, said additional start search points being located relative to said references.

4. A video measuring method comprising the steps of:
(a) taking a picture using a TV camera having a two-axis array of photosensors;
(b) digitizing and storing the picture;
(c) displaying the stored picture;
(d) locating a plurality of start search points for the picture;
(e) storing the start search points; and
(f) selecting and storing gradient thresholds for a plurality of points for the picture, said gradient thresholds comprising digital numbers having both a sign and a magnitude.

5. A method according to claim 4 further including the step of determining and storing the line signature for a line in the picture.

6. A method according to claim 4 further including the step of selecting and storing an area to be searched.

7. A method according to claim 6 further including the step of selecting and storing a search direction for the search area.

8. A method according to claim 6 further including the step of selecting and storing a gradient threshold for the search area.

9. A method according to claim 4 further including the step of storing the difference between a pair of points for the picture.

10. A method according to claim 9 further including the step of selecting and storing a tolerance for the difference between the pair of points.

11. A method according to claim 10 further including the steps of determining and storing references for the picture; and selecting and storing additional start search points for said picture, said additional start search points being located relative to said references.

12. A method according to any of claims 4 through 8 further including the steps of presenting an operator with a series of menus from which to make selections.

13. A method according to any of claims 4 through 8 further including the additional steps of:
(a) taking a second picture using a TV camera having a two-axis array of photosensors;
(b) digitizing and storing the second picture; and
(c) searching the second picture commencing with the start search points previously stored.

14. A method according to claim 13 further including the step of determining whether the gradient for the second picture exceeds the stored gradient threshold.

15. A method according to claim 13 wherein the step of locating a plurality of start search points for the first picture includes the step of moving a cursor on the monitor using a joystick.

16. A method according to claim 13 including the further step of determining and storing references for the second picture.

17. A method according to claim 16 wherein the search of the second picture utilizes less than about five percent of the picture elements.

18. A method according to claim 17 wherein the search of the second picture utilizes less than about one percent of the picture elements.

19. A video measuring method comprising the steps of:

(a) taking a first picture using a TV camera having a two-axis array of photosensors;
(b) digitizing and storing the first picture;
(c) displaying the first picture;
(d) locating and storing a plurality of start search points for the first picture;
(e) selecting and storing gradient thresholds for a plurality of points for the first picture, said gradient thresholds comprising digital numbers having both a sign and a magnitude;
(f) taking a second picture using a TV camera having a two-axis array of photosensors;
(g) digitizing and storing the second picture;
(h) searching the second picture commencing with the start search points previously stored; and
(i) determining whether the gradients for the second picture exceeds the stored gradient thresholds.

20. A method according to claim 19 further including the step of storing the difference between a pair of points for the first picture.

21. A method according to claim 20 further including the step of selecting a tolerance for the difference between the pair of points.

22. A method according to any of claims 19, 20 or 21 further including the steps of determining and storing horizontal and vertical references for the first picture; and selecting and storing additional start search points for said first picture, said additional start search points being located relative to said references.

23. A method according to claim 19, 20 or 21 further including the steps of determining and storing horizontal and vertical references for the first picture; selecting and storing additional start search points for said first picture, said additional start search points being located relative to said references; and determining and storing horizontal and vertical references for the second picture.

24. A method according to claim 19, 20 or 21 wherein said first and second pictures are pictures of packages and the second picture is taken while the package is moving.

25. A method according to any of claims 19, 20 or 21 further including the step of displaying the gradient for a point for the first picture.

26. A method according to any of claims 19, 20 or 21 wherein less than about five percent of the picture elements of the second picture are searched.

27. A method according to claim 26 wherein less than about one percent of the picture elements of the second picture are searched.

28. A method according to any of claims 19, 20 or 21 further including the steps of presenting an operator with a series of menus from which to make selections.

29. A method according to any of claims 19, 20 or 21 further including the steps of determining and storing the line signature for a line in the first picture; and searching the second picture to determine whether that line signature is present.

30. A method according to claim 29 wherein said line signature is stored as a binary number.

31. A method according to any of claims 19, 20 or 21 wherein the step of designating a plurality of start search points for the first picture includes the step of moving a cursor on the monitor.

32. A method according to claim 31 wherein the step of moving the cursor includes the step of manipulating a joystick.

33. A method according to any of claims 19, 20 or 21 further including the step of selecting and storing an area of the first picture to be searched.

34. A method according to claim 33 further including the step of selecting and storing a search direction for the search area.

35. A method according to claim 33 further including the step of selecting and storing a gradient threshold for the search area.

36. A video measuring method comprising the steps of:

(a) taking a first picture using a TV camera having a two-axis array of photosensors;
(b) digitizing and storing the first picture;
(c) displaying the first picture;
(d) locating a plurality of start search points for the first picture;
(e) storing the start search points;
(f) selecting a feature of the first picture to be measured by designating a pair of points;
(g) selecting and storing gradient thresholds for the pair of points, said gradient thresholds comprising digital numbers having both a sign and a magnitude;
(h) storing the difference between the pair of points;
(i) selecting and storing a tolerance for the different between the pair of points;
(j) taking a second picture using a TV camera having a two-axis array of photosensors;
(k) digitizing and storing the second picture;
(l) searching the second picture commencing with the stored start search points;
(m) determining whether the gradients for the second picture exceed the stored gradient thresholds;
(n) measuring the selected feature; and
(o) determining whether or not the measured feature is within tolerance.

37. A video measuring method according to claim 36 wherein less than one percent of the picture elements of the second picture are searched to make the measurement.

38. A method according to claim 36 wherein the step of locating a plurality of start search points includes the step of moving a cursor on the monitor.

39. A method according to any of claims 36, 37 or 38 further including the steps of presenting a series of menus to an operator.

40. A method according to claim 38 wherein the step of moving the cursor on the monitor includes the step of manipulating a joystick.

41. A method according to any of claims 36, 37 or 38 further including the steps of: determining and storing horizontal and vertical references for the first picture; and selecting and storing additional start search points for said first picture, said additional start search points being located relative to said references.

42. A method according to claim 41 further including the step of determining and storing horizontal and vertical references for the second picture.

* * * * *